United States Patent [19]
Kuroiwa et al.

[11] Patent Number: 5,809,552
[45] Date of Patent: Sep. 15, 1998

[54] DATA PROCESSING SYSTEM, MEMORY ACCESS DEVICE AND METHOD INCLUDING SELECTING THE NUMBER OF PIPELINE STAGES BASED ON PIPELINE CONDITIONS

[75] Inventors: Koichi Kuroiwa; Hideyuki Iino; Hiroyuki Fujiyama; Kenji Shirasawa; Masaharu Kimura; Noriko Kadomaru; Shinichi Utsunomiya; Makoto Miyagawa, all of Kawasaki, Japan

[73] Assignee: Fujitsu Limited, Kawasaki, Japan

[21] Appl. No.: 705,562

[22] Filed: Aug. 29, 1996

Related U.S. Application Data

[63] Continuation of Ser. No. 11,412, Jan. 29, 1993, abandoned.

[30] Foreign Application Priority Data

| | | | |
|---|---|---|---|
| Jan. 29, 1992 | [JP] | Japan | 4-014343 |
| Jan. 30, 1992 | [JP] | Japan | 4-014811 |
| Jan. 30, 1992 | [JP] | Japan | 4-015564 |
| Jan. 30, 1992 | [JP] | Japan | 4-015568 |
| Jan. 30, 1992 | [JP] | Japan | 4-015570 |
| Jan. 30, 1992 | [JP] | Japan | 4-015572 |
| Jan. 31, 1992 | [JP] | Japan | 4-016924 |
| Jan. 31, 1992 | [JP] | Japan | 4-017069 |
| Dec. 29, 1992 | [JP] | Japan | 4-361493 |

[51] Int. Cl.⁶ ............................................. G06F 13/00
[52] U.S. Cl. ...................... 711/169; 395/800.04; 395/287
[58] Field of Search ............................... 395/494, 495, 395/496, 497.03, 285, 287, 292, 294, 307, 395, 800.04; 711/167, 168, 169, 173

[56] References Cited

U.S. PATENT DOCUMENTS

| | | | |
|---|---|---|---|
| 4,172,287 | 10/1979 | Kawabe et al. | 364/736.03 |
| 4,760,525 | 7/1988 | Webb | 395/800.02 |
| 5,123,095 | 6/1992 | Papadopoulos et al. | 395/394 |
| 5,237,702 | 8/1993 | Hayashi et al. | 395/800.07 |
| 5,247,691 | 9/1993 | Sakai | 395/800.03 |
| 5,276,818 | 1/1994 | Okazawa et al. | 395/294 |

*Primary Examiner*—Glenn Gossage
*Attorney, Agent, or Firm*—Staas & Halsey

[57] ABSTRACT

A memory accessing device and method, in a data processing system which has pipelines, for correctly associating prefetched addresses from an address bus with corresponding prefetched data from a data bus, when sending data to and receiving data from an external memory. The memory accessing device has a condition determining device determining pipeline control conditions based on pipeline information and address information; a number-of-stages selecting device selecting the number of pipeline stages based on pipeline activation conditions and the pipeline control conditions; and a valid data detecting device detecting valid data positions in the prefetched data based on the number of pipeline stages selected and correctly associating the valid data positions in the prefetched data with the prefetched addresses. Additionally, a data input/output unit performs an arithmetic operation on data transferred from an external memory to a vector register, wherein the result of the arithmetic operation, upon completion, is transferred from the vector register to the external memory for storage. The data input/output unit has a data holding unit storing m-bit data units and rearranges exactly in the original order n pieces of m/n-bit data when n pieces of m/n-bit data are loaded from an external memory and then stored back into the external memory.

13 Claims, 132 Drawing Sheets

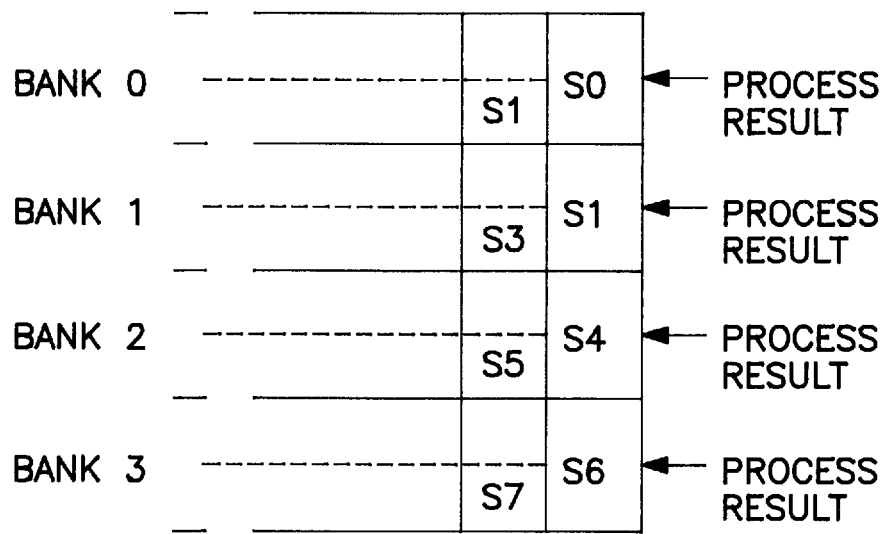
FIG. 27A
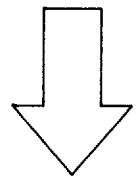
FIG. 27B
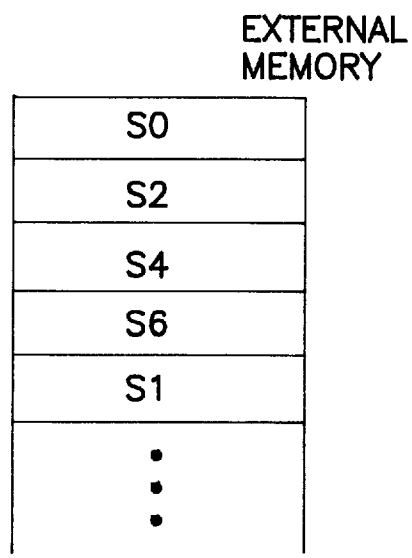

| | SUEX | SUEX | SEL-HIGHER ORDER | SEL-LOWER ORDER |
|---|---|---|---|---|
| 1 | ○ | × | INPUT IN HIGHER ORDER BITS | INPUT IN HIGHER ORDER BITS |
| 2 | × | ○ | INPUT IN LOWER ORDER BITS | INPUT IN LOWER ORDER BITS |
| 3 | ○ | ○ | INPUT IN HIGHER ORDER BITS | INPUT IN LOWER ORDER BITS |

FIG. 50

| DATA \ SELECTOR | DIU | DIL | DU | DL | OUTPUT OF LATCH AT PREVIOUS STEP |
|---|---|---|---|---|---|
| S1 | OTHER THAN DIL | (5)\|(1) & (3) \| TL1 | | | |
| S2 | (5)\|(1) & (2) \| TL1 | OTHER THAN DIU | | | |
| S3 | | | (4) &(6) FB<br>(4) &(7) &FC \| TL3 | (4) &(6) &FA \|<br>(4) &(7) &FB \| TL9 | OTHER THAN DU. DL |
| S4 | | | (8), (1) \| (4) & (6) &FA<br>(4) &(7) &FB \| TL6 | (4) &(7) & FA \| TL7 | OTHER THAN DU. DL |
| S5 | | | (9) \| TL4 \| TL5 | | OTHER THAN DU |
| S6 | | | (4) &(6) &FD<br>(4) &(7) &FA \| TL5 | (4) &(6) &FC \|<br>(4) &(7) &FD \| TL4 | OTHER THAN DU. DL |
| S7 | | | (10) \| (11) \| TL0 \| TL1<br>\| TL2 \| TL3 \| TS* | | OTHER THAN DU |
| S8 | | | (4) &(6) &FC \|<br>(4) &(7) &FD \| TL3 | (4) &(7) &FC \| (10) \|<br>(11) \| TL0 \| TL1 \|<br>TL2 \| TS* | OTHER THAN DU. DL |

(1) : NON-SERIAL 32 BITS
(2) : HIGHER ORDER BITS IN 64-BIT DATA ARE VALID
(3) : LOWER ORDER BITS IN 64-BIT DATA ARE VALID
(4) : 32-BIT STRIDE=+1
(5) : 32-BIT STRIDE=-1
(6) : 32 BITS ALIGNED
(7) : 32 BITS MIS-ALIGNED
(8) : 64-BIT DATA
(9) : INDIRECT LOAD (32,64 BITS)
(10) : DATA REGISTER TEST
(11) : ARITHMETIC OPERATION PIPELINE TEST

TL0 : LOAD PIPELINE TEST CODE 0
TL1 : LOAD PIPELINE TEST CODE 1
TL2 : LOAD PIPELINE TEST CODE 2
TL3 : LOAD PIPELINE TEST CODE 3
TL4 : LOAD PIPELINE TEST CODE 4
TL5 : LOAD PIPELINE TEST CODE 5
TL6 : LOAD PIPELINE TEST CODE 6
TL7 : LOAD PIPELINE TEST CODE 7
TL8 : LOAD PIPELINE TEST CODE 8
TL9 : LOAD PIPELINE TEST CODE 9
TS* : ALL STORE PIPELINE TEST CODES

FA : LOAD/STORE FLAG A
FB : LOAD/STORE FLAG B
FC : LOAD/STORE FLAG C
FD : LOAD/STORE FLAG D

& : INDICATES AND CONDITION
\| : INDICATES OR CONDITION

FIG. 64

① : 32BITS STRIDE+1 MISALIGNED
② : 32BITS STRIDE-1 ALIGNED
③ : 32BITS STRIDE-1 MISALIGNED

| IERR# | IREQ# | BURST# | TRANSFER TO | STATE |
|---|---|---|---|---|
| 1 | 1 | — | T1 | "STOP" BECAUSE OF NO BUS REQUEST |
| — | 0 | 0 | T3 | BURST MODE |
| 1 | 0 | 1 | T1 | BASIC MODE |
| 0 | 0 | 1 | T1 | "STOP" BECAUSE OF OCCURRENCE OF ERROR |

FIG. 103

| IERR# | IREQ# | TRANSFER TO | STATE |
|---|---|---|---|
| 1 | 1 | T1 | "STOP" BECAUSE OF NO BUS REQUEST |
| 1 | 0 | T1 | BUS CYCLE RESUMED FROM T1 |
| 0 | — | T1 | "STOP" BECAUSE OF OCCURRENCE OF ERROR |

FIG. 104

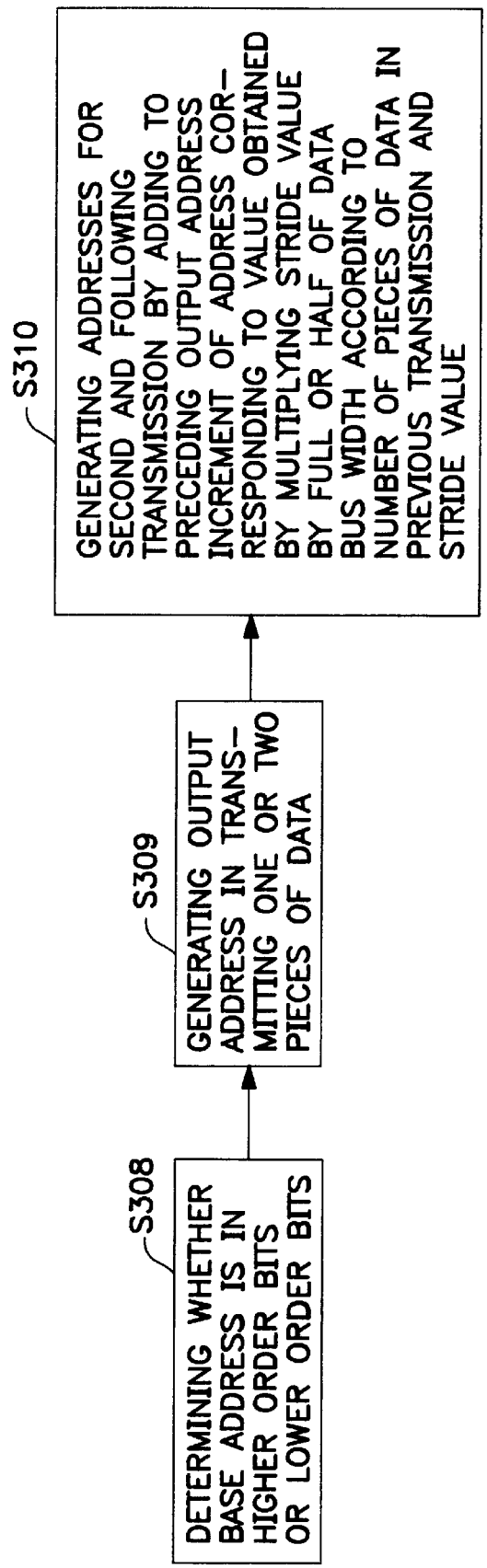
FIG. III

| | | | | * | 4 PIECES OF DATA ARE SIMULTANEOUSLY TRANSMITTED |
|---|---|---|---|---|---|
| ③ 10h | | 12h | BASE ADDRESS 0Ch | ② 0Rh | |
| ④ 18h | | 14h | 14h | 16h | 4 PIECES OF DATA ARE SIMULTANEOUSLY TRANSMITTED |
| ⑤ 20h | ⑥ 23h | | 16h | 1Eh | |
| | | | ⑦ 24h | | * |

☐ WHERE NO DATA EXIST

FIG. 120A

| | | | | ⁕ 4 PIECES OF DATA ARE SIMULTANEOUSLY TRANSMITTED |
|---|---|---|---|---|
| ⑤ 10h | | ⑦ 0Ch | ② 0Rh | |
| ④ 18h | 12h | 14h | 16h | 4 PIECES OF DATA ARE SIMULTANEOUSLY TRANSMITTED |
| ③ 20h | ② 22h | BASE ADDRESS 24h | 1Bh | ⁕ |
| | | | | |

☐ WHERE NO DATA EXIST

FIG. 120B

DATA PROCESSING SYSTEM, MEMORY ACCESS DEVICE AND METHOD INCLUDING SELECTING THE NUMBER OF PIPELINE STAGES BASED ON PIPELINE CONDITIONS

This application is a continuation, of application number 08/011,412, filed Jan. 29, 1993, now abandoned.

BACKGROUND OF THE INVENTION

1. Field of the Invention

The present invention relates to a memory accessing method used by a data processing unit, and more specifically to a vector arithmetic operation processor for accessing a memory after obtaining a bus use right in a computer system provided with vector arithmetic operation processors, etc. in addition to a central processing unit (CPU). That is, the present invention specifically relates to a memory accessing device for inputting and outputting data to and from memories after obtaining a bus use right.

2. Description of the Related Art

The assignee of this application has earlier developed inventions which are the subjects of the following pending U.S. patent applications Ser. No. 07/885,984 filed on May 20, 1992, now abandoned in favor of continuation application Ser. No. 08/635,568, filed on Apr. 22, 1996, and Ser. No. 07/988,596 filed on Dec. 10, 1992, now U.S. Pat. No. 5,699,553, which are expressly incorporated by reference herein.

With the development of high performance data processing systems, a plurality of processors have been incorporated into a data processing system, and specific processors for exclusively performing arithmetic operations or image data processes have been developed. FIG. 1 shows an example of a configuration for such data systems. In FIG. 1, for example, a vector processor unit (VPU) 2 for performing vector arithmetic operations is provided in a system in addition to a central processing unit (CPU) 1 in the system. The CPU 1 and the VPU 2 access a memory 5 through an address bus 3 and a data bus 4. That is, the vector processor unit 2 obtains a bus use right when it accesses the memory 5 so as to input and output necessary data to and from the memory 5.

The problems caused by a memory accessing device for inputting and outputting data to and from the memory 5 after obtaining a bus use right, such a device as the vector processor unit (VPU) 2 in a data processing system shown in FIG. 1, are explained by referring to in-house technologies shown in FIGS. 1 to 35 as the background of the present invention. The vector processor unit 2 provided in the data processing system shown in FIG. 1 performs arithmetic operations repeatedly at a high speed. It is especially effective in processing image data, performing a simulation, etc. where the same arithmetic operation is repeatedly carried out.

A vector processor has an architecture optimized for repeatedly performing an arithmetic operation such as the following example containing a D0 loop in FORTRAN.

```
D0 10 1 = 1,100
C(I) = A(I) * B(I)
10 CONTINUE
```

A vector process refers to a process in which the same arithmetic operation is repeatedly processed on plural pieces of data. Accordingly, it is indispensable to perform vector processes at a high speed in an arithmetic operation unit for repeatedly performing the same arithmetic operation for a great number of times.

With a common MPU (micro processing unit), a multiply instruction MUL is actually executed 100 times if an equation is assigned so as to repeatedly perform 100 times the above described multiplication. In this case, the instruction is fetched and decoded 100 times, and an operand involved is read and written also 100 times.

By contrast, with a vector processor, an arithmetic operation to be repeatedly performed the number of times specified by a register (the vector length) can be executed by one instruction when an arithmetic operation instruction to perform a multiplication, for example, and an input/output instruction, etc. are presented as a vector instruction. Thus, the time taken for fetching and decoding an instruction 99 times can be saved.

Accordingly, arithmetic operations can be performed efficiently by carrying out a vector process using a vector processor, greatly shortening the total time taken for completing necessary arithmetic operations.

Since the vector processor is provided with a plurality of arithmetic operation units so that instructions including input/output instructions in the same loop can be executed in parallel, arithmetic operations can be performed even more efficiently if an add instruction is contained in a D0 loop in FORTRAN language, that is, an arithmetic operation is to be repeatedly performed according to the following equations.

```
D0 10 1 = 1,100
C(I) = A(I) * B(I)
F(I) = D(I) + B(I)
10 CONTINUE
```

FIGS. 2 and 3 show the configuration of the vector processor unit realized as an in-house technology. FIG. 2 is a block diagram of the entire configuration of a vector arithmetic operation processor. The processor comprises a vector unit (VU) 10, a control unit (CU) 11, a bus control unit (BU) 12, an command buffer unit (CBU) 13, and an address unit (AU) 14.

The vector unit 10 contains a vector register and a vector arithmetic operation pipeline capable of operating in parallel.

The control unit 11 for performing an arithmetic operation process controls the entire operation of the entire vector arithmetic operation processor, decodes an instruction received from the command buffer unit 13, and activates a pipeline corresponding to each instruction while managing the timing of the entire operation.

The bus control unit 12 controls a bus to transmit data between an external memory such as the memory 5 shown in FIG. 1, or a host microprocessor such as the CPU 1, and a register in a vector arithmetic operation processor.

The command buffer unit 13 stores instruction strings, and the command buffer is written to sequentially from an entry point.

The address unit 14 generates address information in accessing an external memory. It converts address information and generates a physical address according to a predetermined address conversion mode such as a segment mode.

FIG. 3 shows the detailed block diagram of the vector unit 10 shown in the block diagram of the entire configuration in FIG. 2. The vector unit comprises various arithmetic operation pipelines 16, a vector register 17, a scalar register 18, and a mask register 19.

The vector arithmetic operation processor comprises an adder, a multiplier, a divider, an image graphic pipeline, and a mask arithmetic operation unit as various arithmetic operation pipelines 16. Each of them has a pipeline structure for performing arithmetic operations at a high speed.

Each of these arithmetic operation units has an independent data bus for connection to a register, and is operated in parallel with the other units. However, the adder and the image graphic pipeline share a data bus, and an instruction selects one of the two arithmetic operation units.

The vector register 17 stores an operand and an arithmetic operation result, etc. as an object to be processed by an arithmetic operation in a vector process. The scalar register 18 stores an operand in a scalar arithmetic operation, and a leading address, that is, a base address, at which data are loaded/stored. The mask register 19 stores mask information referred to during the execution of a vector arithmetic operation, that is, the information indicating the presence/absence of the condition of an arithmetic operation determined for each operand. A load/store pipeline inside the vector-pipeline transmits data at a high speed between an external memory and a vector register, a mask register, or a scalar register. However, is cannot load and store data simultaneously.

FIG. 4 is a view for explaining a memory accessing process performed by a memory accessing device 21 (corresponding to the VPU 2 shown in FIG. 1) to access a main storage device 22 (corresponding to the memory 5). FIG. 4 shows a memory accessing method in which more than one address is prefetched through the load/store pipeline explained by referring to FIG. 3.

The address is prefetched to the main storage device 22 through an address pipeline bus 23, and the data at the address are transmitted to the memory accessing device 21 through a data bus 24.

For example, in FIG. 4, the data inputting/outputting operation speed on the side of the memory is often lower than the operation speed of the vector arithmetic operation unit as a memory accessing device 21. Therefore, data cannot be accessed at a high speed without effective means. Accordingly, an interleaving method can be adopted to manifestly improve the data input/output speed by dividing the main storage device 22 into, for example, four banks such as bank 0 though bank 3 shown in FIG. 4, and sequentially accessing each bank separately.

Then, an address latch for latching an access address of each bank is provided for each of the four banks. Likewise, the vector register 17 shown in the FIG. 3 is divided into four banks each corresponding to a respective bank in the main storage device 22. The meaning of an input/output signal to the memory accessing device 21 shown in FIG. 4 is described later.

FIG. 5 is the time chart for a data accessing operation shown in FIG. 4. For example, in an address pipeline mode in which four addresses are prefetched, that is, a 4-stage pipeline mode, addresses n, n+4, n+8, . . . are latched in the address latch unit for bank 0 in the main storage device 22, addresses n+1, n+5, n+9, . . . for bank 1, addresses n+2, n+6, n+10, . . . for bank 2, and addresses n+3, n+7, n+11, . . . for bank 3 respectively.

Thus, the data at address n are transmitted from bank 0 to the memory accessing device 21 through the data bus 24 when address n+4 is prefetched form the memory accessing device 21. Afterwards, data are accessed continuously at the rate of one piece of data per 1-clock timing, that is, at an effective 1-clock cycle basis actually although the normal actual accessing operation is actually performed on a 4-clock cycle basis.

In FIG. 5, a data complete signal (DC#) is outputted from the main storage device 22 to the memory accessing device 21, and indicates an active state when it reaches the "L" level (indicated by symbol #). The signal means that the main storage device 22 has finished receiving data when it is receiving, and that it has finished outputting data to the data bus 24 when it is outputting.

FIG. 6 shows an example of a configuration of the load/store pipeline shown in FIG. 3. In FIG. 6, the load/store pipeline comprises an external storage device 26 provided outside the vector arithmetic operation processor, a data register 27 in the processor, a load pipeline 28 for loading data to the data register 27, and a store pipeline 29 for outputting from the data register 27 to the external storage device 26 the contents stored as an arithmetic operation result of the vector processor.

In FIG. 6, when data are loaded, the data outputted by the external storage device 26 are delayed by a plurality of latches L in the load pipeline LP 28 such that an appropriate timing can be maintained to synchronize the data with their addresses, and then they are applied to the data register 27. In storing data in the external storage device 26, a data output timing is adjusted by a plurality of latches L in the store pipeline SP 29. Thus, the data are successfully stored in the external storage device 26.

FIG. 7 is a timing chart of an example of a data reading operation from the main storage device 22 by the memory accessing device 21 shown in FIG. 4. FIG. 7 is a time chart of a data reading operation in the pipeline mode in which four load/store pipelines are provided, that is, four addresses are prefetched. The 4-pipeline mode is used when, as explained by referring to FIG. 4, an external memory such as the main storage device 22 is divided into four banks.

In FIG. 7, 32-bit address a1 is prefetched as the first address in the basic address mode at the first and second clocks. Then, at the third through the fifth clocks, addresses a2 through a4 are prefetched, and a total of four addresses a1 through a4 are prefetched. Outputting the first address a1 requires a 2-clock timing because data are accessed in the basic mode at this time. In the basic mode, one piece of data are received when one address is outputted.

On the other hand, addresses a2 through a4 are prefetched at the rate of one address per 1-clock timing after the pipeline mode is entered when a pipeline enable signal (PEN#) informing that the mode has been changed from the basic mode to the pipeline mode at the last half of the second clock indicates the "L" level.

In FIG. 7, a bus start signal (BS#) indicates the start of a bus cycle.

In this case, the memory accessing device 21 shown in FIG. 4 accesses the main storage device 22 as a bus master (a unit which has the bus use right).

The signal is outputted to indicate the start of a bus cycle operation by the memory accessing device 21. The signal is also used in latching an outputted address, and can be outputted during a bus cycle after the pipeline mode is entered. In FIG. 7, it is outputted for addresses a2 though a5.

A data strobe signal (DS#) in an input/output signal indicates that data are forwarded without modification to a data bus. In this case, it is outputted by the memory accessing device 21 as a bus master to issue a request for a data acknowledgment because the present operation is in a read cycle.

A read/write selection signal (R/W #) indicates a read of data at the H level (high level) when the memory accessing device 21 is a bus master.

An address valid signal (AV #) is an output signal when the memory accessing device 21 is a bus master, and indicates that an address is prefetched before data and a pipeline accessing process is being performed when this signal indicated the L level, that is, an active state. The output of an address is terminated when the signal indicates the inactive state.

In FIG. 7, when four addresses a1 through a4 are prefetched, 64-bit data d1, for example, are applied corresponding to the first address a1 because the number of pipeline stages is four. Simultaneously, a data complete signal DC# is applied from the main storage device 22. The second data d2 are applied when address a6 is outputted, that is, two clocks after data d1 are applied. This indicates that address a1 is outputted at a 2-clock timing in the basic mode. Then, data d3 through d8 are applied, each being applied at a 1-clock timing. Last data d8 are applied four clocks after corresponding address a8 is outputted.

FIG. 8 shows in detail the memory accessing process shown in FIG. 7. In FIG. 8, first address a1 is outputted at the first and the second clocks. However, the address is latched as an address in bank 0 in the main storage device at the rise of the second clock. Then, data 1 corresponding to the address a1 in bank 0 are accessed at a 4-clock timing. Data d1 are applied to the memory accessing device 21 by the main storage device 22 when address a4 is outputted. The pipeline mode has been entered when address a2 is outputted, and the address is latched as an address in bank 1 at the rise of a clock after the address is outputted. Then, data d2 corresponding to address a2 are accessed at a 4-clock timing. Thus, data d2 are accessed.

FIG. 9 is a time chart of an example of a data accessing process in a pipeline mode in which the number of pipeline stages is two, that is, two addresses are prefetched. It shows an example of a data accessing process in which a memory, for example, the main storage device 22 shown in FIG. 4, is divided into two banks. That is, the mode having two as the number of pipeline stages is operated in accessing a memory which is divided into two banks. It uses a memory accessible at a timing of two or less clocks.

For example, dividing a memory accessible at a timing of two or less clocks into four banks results in waste of the entire hardware because a memory accessible at a 2-clock timing can be accessed at a timing of effectively one or less clock by dividing the memory into two banks.

As shown in FIG. 9, first address a1 is prefetched in the basic mode at a 2-clock timing. Then, addresses are prefetched as shown in FIG. 7. Since the number of pipeline stages is two, two addresses a1 and a2 are first outputted. Then, since the number of pipeline stages is two, and the memory is divided into two banks, the data corresponding to first address a1 are applied two clocks after the address is prefetched, that is, when address a2 is outputted. Then, after another two clocks, the second data d2 are applied. Afterwards, data a3 through a6 are applied, each being applied at a 1-clock timing as in the case shown in FIG. 7.

FIG. 10 is a time chart of an example of a data accessing process in a mode in which the number of pipeline stages is one, that is, one address is prefetched. It is based on a memory accessible at a 1-clock timing as is the case shown in FIG. 9. Therefore, data corresponding to address a1 outputted in the basic mode are applied from the main storage device 22 to the memory accessing device 21 in the latter half of the second clock. Then, the pipeline mode is entered, and the second data d2 are applied two clocks after the first data d1 are outputted, that is, at a timing at which address a3 is prefetched.

Afterwards, data d3 through d6 are applied at the delay of one clock each after addresses a3 through a6 respectively.

FIG. 11 is a time chart of an example of a data accessing process in a mode in which the number of pipeline stages is four, that is, four addresses are prefetched with one wait cycle required. One wait cycle is required because one data can be accessed at a 5-clock timing to cover a low speed memory although the memory itself is divided into four banks as explained in FIG. 4. This is explained in detail by referring to FIG. 12.

In FIG. 12, during the first two clock periods, prefetched address a1 is latched at the rise of the second clock, and the corresponding data are applied a 5-clock timing when address a5 is prefetched. That is, data d1 are applied 1 clock later than the timing shown in FIG. 7. Address 2 is latched at the rise of a clock after it is outputted. Then, data d2 are applied at a 5-clock timing. This corresponds to the time after address a6 is outputted during two clock periods. That is, address a6 can be outputted immediately after data d1 are applied. However, at this time, the address previously before the above stated address in the corresponding bank, that is, address a2, is not followed by the output of data d2. Thus, after the output of address a6, it can be latched at a 2-clock timing.

Next, the background technology centering about an in-house technology is explained mainly for a memory accessing device for accessing a memory by functioning as a bus master after obtaining the bus use right, and also about the data length of the data processed by the memory accessing device, the bus width of a data bus in which the data are transmitted, and addresses added to data, etc.

In FIGS. 4 and 5, the main storage device 22 is divided into, for example, four banks, each bank storing 64 bit data and being added as its address 0, 1, 2, 3, . . . , n, n+1, n+2, n+3, n+4, . . . The bus width of the data bus 24 has not been explained yet, but implies value the same as that of the data length, that is, a 64-bit width.

FIG. 13 is a view of explaining an example of the data length and the data accessing method. As in FIG. 4, a memory is divided into four banks in FIG. 13.

FIG. 13A shows an example in which 32-bit data are stored in series, the actual data length is 64 bits when data are transmitted in 2 pieces using a 64-bit width data bus, and data are accessed as already described and as shown in FIGS. 4 and 5 in which addresses are arranged in series. At this time, since the value of the data length is the same as that of the width of the data bus, and the data are accessed in a series of addresses, there are no problems of needing to check each piece of inputted data as to whether or not it is valid or with what address is it associated.

By contrast, if the length of data to be accessed is 32 bits and the data are stored either in a lower-or higher-bit order position in a 64-bit bank as shown in FIG. 13B or 13C, then it is necessary to determine which is valid, the higher order data or the lower order data among data inputted through the 64-bit-width data bus.

Furthermore, if the length of data to be accessed is 32 bits and the data are accessed according to an indirect address, that is, an address consisting of a base address and an offset value as shown in FIG. 13D, it must be determined whether not data are located in higher order bits or lower order bits, and determined with which address the data are associated.

Next, a format of adding an address to each piece of data is explained. As explained by referring to FIG. 13, in the present invention, the data length of the data to be accessed is, for example, 64 or 32 bits. The following explanation is made assuming that a data address is given as, for example, a byte address, that is, an address is assigned to every byte, etc. Namely, as shown in FIG. 14, the unit in accessing data are 64 bits, that is, 8 bytes; or 32 bits, that is, 4 bytes. However, an address is assigned to each byte of data.

As shown in FIG. 14A, addresses 00H through 07H are added to data of a 64-bit access unit. In accessing the data, the address of the leading byte, that is, 00H, is actually used. If the access unit is 32 bits as shown in FIG. 14B, address 00H is assigned to the higher order 32-bit data, and address 04H to the lower order 32-bit data.

FIG. 15 shows the positions of 64-bit or 32-bit access unit data in a bank. As shown in FIG. 4, each bank in the main storage device 22 stores 64-bit data. If 64-bit data are sequentially stored in the bank as shown in FIG. 15A, 64-bit access can be performed reasonably. This state indicates that data are aligned on the eighth byte boundary.

On the other hand, as shown in FIG. 15B, 32 lower-order bits followed by 32 higher-order bits are stored in a bank for storing 64-bit data. Even if a piece of data consists of 64 serial bits, the data are not aligned on the eighth byte boundary. They are not accessed in a 64-bit unit, but in a 32-bit access. In this case, it can be considered that the 32-bit data are aligned on the fourth byte boundary.

If 32-bit data are located at any position in 64 bits in a bank as shown in FIG. 15C, then the data are not aligned on the fourth byte boundary. In this case, they are not picked up as data to be accessed according to the present invention.

Another addressing method using a base address and a stride is explained below. FIG. 16 is a view for explaining how to address in this method. In FIG. 16, 64-bit data, that is, 8-byte data are explained for simplicity, but the addressing method is just the same as that for 32-bit data.

In FIG. 16, the address of 64-bit data located at any position can be specified using a base address and a stride. That is, the address of data at any position can be obtained by adding their base address 00H, for example, which is the address of the first data D1, to the product of a stride and the data length.

For example, if data has a data address 00H and a stride of 2, then the address 10H of data D3 is specified as the address of data to be accessed after the first data. The stride can indicate a negative value. For example, if a base address is 10H and a stride is −1, then the data to be accessed after data D3 are data D2 at address 08H.

There is a big problem when a memory is accessed by the memory accessing method, that is, an interleaving method, explained by referring to FIGS. 4 through 16 using load/store pipelines. That is, it is very difficult to associate the information as to which is valid, higher-order bits or lower-order bits, in 64-bit data inputted through a 64-bit width data bus when, for example, 32-bit data are accessed with the prefetched address information and the data inputted 4 or 5 clocks (if one wait timing is allowed) after the address information is inputted when the number of stages of address pipelines is four, for example. This is the first problem to be solved by the present invention.

The reason for the first problem is that, when compared with the case where a next address is outputted after the reception of data associated with the outputted address in the basic mode so as to prefetch an address using an address pipeline according to the time chart shown in FIG. 7, for example, there co-exist a cycle in which addresses are outputted, a cycle in which addresses are outputted and read data are inputted, and a cycle in which only read data are inputted. This makes it hard to associate address information with input data.

In FIG. 7, only addresses are outputted in the first through the fourth clock cycles, that is, just after address a3 is outputted. In the following fifth through the ninth clock cycles, read data are inputted while addresses are outputted (addresses are converted when a data complete signal is applied). In the clock cycles in and following the tenth clock cycle, read data are inputted only. In the cycle where addresses are outputted and read data are inputted, no addresses are updated or no read data are received unless a response signal DC # from a memory indicates an active state.

Thus, in the data accessing method in which address pipelines are used, address information is prefetched by, for example, more than four clock cycles before corresponding data are inputted. Accordingly, data can be associated with their address by storing the address information in the memory accessing device 21 shown in FIG. 4.

For example, when 64-bit data are accessed according to serial addresses as explained in FIG. 13A, it is comparatively easy to associate prefetched addresses with inputted data. However, if either higher-order bit data or lower-order bit data are valid as described in FIGS. 13B through 13D, or if 32-bit data are accessed according to indirect addresses, it is indispensable to appropriately store prefetched address information so as to correctly associate it with input data.

The first problem that prefetched addresses are not easily associated with inputted data is also caused by the necessity of storing prefetched address information that does not depend only on the number of address pipeline stages, that is, the number of prefetched addresses. Namely, for example, even if the number of pipeline stages if four, the address outputting process may be suspended without prefetching four addresses for internal or external reasons. In this case, the number of pipeline stages does not match the number of prefetched addresses, and the reason other than the number of stages of address pipelines should be detected in storing address information so that address information can be appropriately controlled and stored.

Examples of cases where the number of prefetched addresses does not match the number of pipeline stages are explained as follows.

1. The number of pieces of data to be loaded can be smaller than the number of address pipeline stages. For example, with the memory accessing device 21 in which the number of pipeline stages 1, 2, and 5 are all accepted, one of these values is selected depending on the configuration of the bank of an external memory, an address generating method, and data size.

That is, as indicated by the timing applied to the case where only two pieces of data d1 and d2 are to be accessed when the number of pipeline stages is four as shown in FIG. 17, the address prefetching cycle is terminated to enter the data processing cycle when the number of pieces of data is equal to or smaller than four even if the selected number of pipeline stages is four.

Accordingly, even after the pipeline mode is entered with the number of pipeline stages set to four, addresses and data are associated such that addresses are prefetched by two pieces.

FIG. 18 shows in detail the data accessing process shown in FIG. 17. In a pipeline mode where the number of pipeline stages is four as indicated previously, it is assumed that a memory is accessed at a 4-clock cycle, and the data corresponding to address a1 latched at the second clock as shown in FIG. 18 are applied four clocks after the first clock from the main storage device 22 to the memory accessing device 21, and further two clock later the second data d2 are applied to the memory accessing device.

2. Next, an internal exception may occur.

For example, if the memory accessing device 21 for performing an address pipeline process performs internally in parallel with the memory accessing process an arithmetic operation involving a floating point, etc., and if an internal exception such as an overflow, an invalid arithmetic operation, etc., has arisen during the arithmetic operation, then the output of addresses is suspended immediately even while addresses are being prefetched, the data corresponding to the prefetched addresses should be inputted, and then the data accessing bus cycle should be terminated.

Unless the bus cycle is terminated immediately, the bus access is continued with an exception generated. In this case, an exception existence notification to the CPU is delayed longer. Thus, an error recovery process is delayed, thereby impairing the reliability of the system.

3. A TLB (translation look-aside buffer) entry request has been issued.

For example, a memory accessing device 21 for supporting an address converting process internally contains a TLB to enter address conversion information to the TLB. If a TLB error has arisen during the execution in a pipeline mode, then no more addresses exist to be generated, the address prefetching process is suspended immediately, only data are processed, the bus cycle is terminated, and the TLB entry cycle should be entered.

Another problem is that only data are processed with the output of their addresses suspended while the addresses are being preprefetched, and the number of prefetched address may not match the number of pieces of data in the following processes. This is exemplified by the case where a bus use right release request signal BRL# (hereinafter referred to as a BRL# signal) indicates an active state in a cycle in which a DC# signal is to be detected while addresses are prefetched as shown in FIG. 19.

For example, if the number of pipeline stages is four, it is determined whether or not a DC# signal has been returned including whether it is a bus cycle with or without a wait. Afterwards, output addresses are updated according to the input of a DC# signal from a memory. Generally, if the number of pipeline stages is smaller than the number of pieces of data to be accessed, then the output of addresses is terminated regardless of the existence of a wait, and the number of pieces of data processed in a bus cycle in which only data are processed matches the number of pipeline stages (refer to FIGS. 7, and 9 through 11).

For example, the memory accessing device 21 obtains a bus use right before it accesses the main storage device 22. However, sometimes a BRL# signal from another bus master indicates an active state, and the bus master may request a bus use right.

In such a case, if a BRL# signal is received only when it is a response signal from, for example, the main storage device 22 and indicates an active stage so as to prevent a malfunction, then the output of addresses is immediately suspended when the BRL# signal is received, a cycle in which only data are processed is entered, and the bus use right should be immediately released as soon as the data processes are completed.

Accordingly, if a BRL# signal as well as a DC# signal is received at the input of data d1 as shown in FIG. 19 and the output of addresses is suspended, then the number of pieces of data processed in the following cycle in which only data are processed is three, not matching the number "4" of prefetched addresses.

Next, the background of the second problem to be solved by the present invention is described by referring to the above described in-house technology. The first problem is that prefetched address information cannot be easily associated with data inputted to a memory accessing device when, for example, a 64-bit-width data bus is used in accessing 32-bit data, while the second problem is that it occurs in the accessing method performed using serial addresses of 64-bit data, that is, it occurs during the data access explained by referring to FIG. 13A.

FIG. 20 shows a data reading process for reading vector arithmetic operation data from a vector register explained by referring to FIG. 2. A vector register is divided into four banks, that is, banks 0 through 3 like the main storage device 22 explained in FIG. 4, each bank storing 64-bit data individually. It differs from FIG. 4 in that addresses in each bank are independently added, and that sequential access is performed on each bank using the same value of addresses.

That is, in FIG. 20, addresses are generated by an address generating section 30, and they are sequentially latched in address latches 0 through 3. The output of each address latch is respectively applied to banks 0 through 3 as read addresses, and data V0 through V3 are sequentially outputted from each bank. If the output of data V3 is completed, then an adder 31 adds "8" to the address, the resultant address is used in accessing data in banks 0 through 3, data V4 through V7 are sequentially outputted, and thus the data access is continued.

As shown in FIG. 21, a vector register shown in FIG. 20 for operating four pipelines (MLT, ADD, DIV, and L/S pipelines) in parallel is divided into four banks. In FIG. 20, data V0 through V7 are 64-bit data.

In this case, a read/write slot for each pipeline is fixed for each of four bank slot signals a, b, c, and d in a vector register to prevent a conflict among banks. That is, a bank slot corresponds to the timing at which each pipeline accesses the first element of a vector operand.

FIG. 21 shows the relationship between the operations of bank slots and banks in the vector register and the bank accessed by each pipeline. FIG. 22 shows the relationship between each pipeline and an available bank slot. That is, a multiplication pipeline is associated with slot a, an addition pipeline slot b, a division pipeline slot c, and a load/store pipeline slot d.

For example, since an MLT pipeline uses slot a, slot a starts its operation according to the timing stored in bank 0 in the data register, and then banks 0, 1, 2, and 3 of the vector register are accessed in this order (through a read port).

Then, when the start point of the bank access is fixed (bank 0 in this case), four banks are serially accessed from the start of the access as shown in FIG. 20.

Thus, a predetermined bank slot signal is controlled by the address generating section 30 such that an address is outputted from address latch 0 at the timing stored in bank 0. The address is latched in latches 1, 2, and 3 in each cycle, and data in four banks are outputted as V0, V1, V2, and V3 in each cycle.

If the data length of read data are larger than 4, the address is incremented, data V4, V5, V6, and V7 are sequentially outputted, and the above described process is repeated.

To explain the second problem to be solved by the present invention, data are read to the vector register explained in FIG. 20 from an external memory for storing two pieces of 32-bit data to an area for storing 64-bit data as aligned on the 8th byte boundaries. Then, an arithmetic operation performed by a vector arithmetic operation processor on the data is considered. FIG. 23 shows the data storage image in the external memory in such cases. If data are read from the external memory through a data bus of 64-bit width, then they are read to the vector register as a pair of 32-bit data such as D0 and D1, D2 and D3, . . .

FIG. 24 shows how to write a vector register data read from an external memory in the format similar to that shown in FIG. 20. As described above, data are read in 64-bit units as a pair such as D0 and D1, D2 and D3, . . . , and written to banks 0, 1, . . . respectively.

FIG. 25 explains how to perform an arithmetic operation through an addition pipeline in a vector arithmetic operation processor and how to write the result to a vector register. In FIG. 25, an addition result obtained by an addition pipeline 33 is written to a 64-bit register 34 on the output side. The addition pipeline 33 can perform two sets of additions in parallel, and two sets of input data are applied to two 64-bit registers 35 and 36 on the input side.

Concerning areas VR0, VR7, and VR10 in the vector register, the contents of VR0 and VR7 corresponding to bank 0 are added together and the sum is stored in VR10. In VR0 and VR7, 32-bit data A0 and A1, and B0 and B1 are stored.

Data A0 and B0 are stored each in a 32-bit area in the register 35 on the input side of the addition pipeline 33. The sum is stored in, for example, the high-order side of a 64-bit register on the output side. As a result, S0 is stored in 32 high-order bits of VR10. Similarly, data A1 and B1 are applied to the register 36 on the input side, and the sum is outputted to the 32 lower-order bits of the register 34 on the output side and stored as S1 to the 32 lower-order bits in bank 0 of the vector register VR10.

On the other hand, a vector arithmetic operation processor can issue a convert instruction for converting 32-bit single precision data to 64-bit double precision data. The conversion is carried out through the addition pipeline 33 as in the above described addition. However, since the register 34 on the output side of the address pipeline 33 consists of 64 bits, only one piece of double precision data as a result of the conversion result can be stored. Therefore, the address pipeline 33 cannot be operated in parallel. For example, the 32-bit data applied to the register 35 on the input side is converted to double precision, that is, to 64 bits, and the result is stored in the register 34 on the output side.

Assume that a convert instruction is executed on the data stored in a vector register in the format shown in FIG. 24. Since only one piece of 32-bit data can be applied to the pipeline 33, 32-bit data D0 in bank 0 is read as shown in FIG. 24 and converted to double precision. The result S1 is stored in the register 34 on the output side in 64-bits. As described above, the same address in banks 0 through 3 are sequentially accessed in FIGS. 20 and 24. Accordingly, data D2 in bank 2 is read after data D0 in bank 0 is read, and then converted to double precision.

FIG. 26 is an operational time chart for reading data from the vector register shown in FIG. 24, and for writing the conversion result to double precision data into a vector register. In FIG. 26, data D0, D2 and D4 are read from banks 0, 1, and 2 shown in FIG. 24 in this order, and the data are converted to double precision. Then, data D6 is read and data S0 is written as a conversion result of data D0. Next, data are read from bank 0. Accordingly, data D1 is read and data S2 is written as a conversion result to double precision from data D2. These processes are repeated.

FIGS. 27A–B show the contents of data stored after being converted to double precision. As shown in FIG. 24 and 26, the conversion results S0, S2, S4, and S6 converted from data D0, D2, D4, and D6 are stored in banks 0, 1, 2, and 3. Likewise, the following double-precision conversion results S1, S3, S5, and S7 are stored in this order.

Therefore, if the result is read from the vector register in the format shown in FIG. 20, and stored in an external memory through a store pipeline, data are arranged in the order of S0, S2, S4, S6, S1, . . . as shown in FIG. 27B. This indicates an order different from the order of data shown in FIG. 23, that is, D0, D1, D2, D3, . . .

Next, FIG. 28 is a block diagram showing a method of testing the load/store pipeline and the store pipeline shown in FIG. 6. Thus, in the method, plural steps of latches L forming part of the store pipeline and the load pipeline are connected through scan paths 29, and the load/store pipelines are tested by reading through all latches input data applied to the scan paths.

Thus, with the vector processor, results of data conversion processes are written "as is" to the vector register as if data were stored from, for example, the main storage device 22 to the vector register. Therefore, the vector processor necessarily has the following problems.

That is, if the process results are written as is to the vector register, then data are read in each cycle in the order of S0, S2, S4, and S6, followed by S1, S3, S5, and S7 when data in a bank are read for storage. This results because the order of the processed data are different from that of the data in the main storage device 22 when data in the vector register are stored in the main storage device 22.

On the other hand, when a data convert instruction is executed through an ADD pipeline, data should be accessed first from bank 0, and data D0 in bank 0 are read if data to be processed are to be read in the order they are arranged in the main storage device 22. Next, since the data inputted to an ADD pipeline is limited to one per one cycle, D1 cannot be applied to the ADD pipeline together with D0 if they can be read simultaneously. Therefore, data cannot be processed in the order they are arranged in the main storage device 22 unless access is performed to the same bank to read A1 to apply it to the ADD pipeline without first accessing four banks.

However, after the process of D0 is completed before D1 is processed, data are read from banks 1, 2, and 3, but they are not processed immediately, causing the problem that the performance of the processor is considerably deteriorated.

In the method of testing a load/store pipeline, all registers are checked through a scan path. At this time, since the test time is proportional to the bit length of a register, the actual test time becomes longer and longer because a longer bit length is used by modern microprocessors, causing the problem that testing cost rises proportionally.

As described above, the second problem to be solved by the present invention is that the order of data as stored in an external memory after being converted from, for example, single precision to double precision is different from that as originally stored in an external memory, and that the load/store pipeline test is subject to a high testing cost and prolonged test time because a testing scan path must be used.

Next, the third problem to be solved by the present invention is explained. As described by referring to FIGS. 1 through 3, the present invention relates to a central processing unit 1 of a system and a processor provided separately, for example, a memory accessing device for which a vector arithmetic operation processor obtains a bus use right to be a bus master to input/output data to and from a memory. As described by referring to FIGS. 2 and 3, an example of a vector arithmetic operation processor performs a predetermined arithmetic operation, for example, n pipeline stages vector arithmetic operations while controlling the data transmission among circuit elements such as vector registers, various arithmetic operation pipelines, etc. In the actual system, the optimum design of circuit elements, transmission control circuits, etc. is developed depending on individual processes.

However, in optimally designing elements and circuits, etc. depending on individual processes, it takes a long time to develop each of them individually. Another problem is that the contents of arithmetic operations cannot be changed easily. For example, the number of pipeline stages cannot be modified easily. This is the third problem to be solved by the present invention.

The fourth problem is explained below. Generally, the operation of a vector processor is synchronized with a clock inputted externally. The number of clocks required for one arithmetic operation unit, for example, an arithmetic operation pipeline, is fixed by a processor. With an input/output unit, for example, a load/store pipeline, the number of clocks is not necessarily fixed. That is, it depends on the speed of a memory connected to it, external factors, etc.

That is, when each arithmetic operation unit and input/output unit are operated in parallel in the same loop, the number of clocks required for one loop process depends on the number of clocks of the input/output unit. At this time, if the operation of the arithmetic operation unit is performed faster than the input/output unit, then the arithmetic operation unit cannot be synchronized with the data array. This problem is explained by referring to FIG. 29.

FIG. 29 is a timing chart showing the operation of a vector processor in which an input/output unit is operated at a 3-clock timing while a multiplier is operated at a 2-clock timing.

First, a multiplier performs arithmetic operation 1. In this case, since an input/output unit outputs the data in data array 1 as output 1 in synchronizing with the data, the arithmetic operation can be performed correctly. However, at the timing of arithmetic operation 2 of the multiplier, data array 1 is outputted because output 1 is effective in the input/output unit, and the arithmetic operation is performed on the data used in arithmetic operation 1.

To prevent such a problem, for example, a memory can be assigned the specification of only 2-clock operations to limit the speed of an external memory, or the operation of the input/output unit can be synchronized with the operation of the arithmetic operation unit. In the former case, the system becomes less flexible. In the latter case, the hardware becomes large to cover complicated control, and the high speed operation of the arithmetic operation cannot be realized practically. Thus, the fourth problem to be solved by the present invention is that process data cannot be provided at a correct timing due to the difference in speed between arithmetic operation pipelines and load/store pipelines.

Next, the background of the fifth problem to be solved by the present invention is explained by referring to the in-house technology. Some vector arithmetic operation processors shown in FIG. 2 are operated using an interlocking clock. The necessity of an interlocking clock is explained as follows.

In a vector arithmetic operation, etc., a vector processor performs an arithmetic operation after receiving data from an external bus process system to a register, for example, a vector register. The result is stored in the register again, and outputted to an external bus through an external bus process system. A series of these processes can be performed by an external bus process system and an internal process system (for example, an arithmetic operation system, a control system, etc.) in parallel.

That is, for example, if an internal process system is capable of processing one piece of data at a 1-clock timing, both systems can be synchronized to each other if an external process system is operated at a 1-clock timing. However, processes performed by the external bus process system are normally executed at a timing of 2 or more clocks, not at a 1-clock timing, causing an asynchronous process between the internal and external systems.

If an external bus process system cannot be synchronized with an internal process system, then an interlocking function is required to stop the internal operation after one piece of data is completed in a microprocessor until a process is terminated by the external bus process system, that is, until the next data arrives so that the processes of both systems can be synchronized.

FIG. 30 is a block diagram showing the internal configuration of a microprocessor using different clocks between the external bus process system and the internal process system.

A microprocessor 41 comprises an internal process system 42, an external bus process system 43, a system clock generating circuit 44 for generating a system clock, an interlock generating circuit 45 for generating an interlock, and an interlocking clock generating circuit 46 for generating interlocking clock.

47 is an external bus; CLK indicates a clock signal provided externally; and DC# indicates a data complete signal.

In a microprocessor 41 as shown in FIG. 30, an interlocking clock is generated by an interlocking clock generating circuit 46 as an internal clock so as to apply an interlock to an internal operation if necessary.

That is, an interlocking clock is stepped up each time a data complete signal (DC#) indicating the completion of a transmission of one piece of data to an external memory as a result of a process by the external bus process system 43 is received. One bus cycle, for example, the number of system clocks within the time taken for transmitting one piece of data depends on the timing at which a DC# signal is returned.

FIG. 31 is a timing chart showing the data transmission in the case described above. In the basic mode described above, assuming that data can be accessed at a 2-clock timing, one bus cycle can be composed of clock T1 of an address output timing (not shown in FIG. 31) and clock T2 indicating the timing at which data are transmitted from a memory. However, the bus cycle is terminated at the detection of a DC# signal. Unless it is detected, the bus cycle is extended by the delay time.

In FIG. 31, the bus cycle for the first data is terminated in a 2-clock cycle. However, since a DC# signal cannot be detected for the transmission of the next data, the bus cycle results in a 3-clock cycle. If a DC# signal cannot be detected at the rise of a clock between two bus cycles in FIG. 31, the interlock signal indicates the active state, that is, "L". It indicates the inactive state when a DC# signal indicates the active state at the rise of a clock. If the interlock signal indicates the active state at the rise of a clock, then a system clock is interlocked, and the clock pulse stops at that moment.

Thus, with the vector processor, the operation of the external bus process system 43 of the processor 41 is performed according to the system clock, while the operation of the internal process system 42 is performed according to the interlocking clock. That is, the internal process system 42 and the external bus process system 43 are operated according to different clocks, thus synchronizing with each other.

However, with such microprocessors, since an external bus process system uses a system clock, while an internal process system in a microprocessor uses an interlocking clock, there is the following problem.

That is, if exceptions such as errors relating to an address conversion, etc. in a bus system, then they may occur during an interlock in the internal process system 42 as shown in FIG. 32 because these exceptions occur at random.

At this time, since the internal process system 42 is interlocked, the processor is in the stop state and an exception notification signal cannot be received from the external bus system 43. Therefore, no actions can be taken to recover from the exception. This is the fifth problem to be solved by the present invention.

The sixth problem to be solved by the present invention is explained below. As described above, the data input/output speed of a memory is generally lower than the arithmetic operation speed of a processor. Therefore, the memory is divided into a plurality of banks as shown in FIGS. 4 and 5 in accessing the memory, which is referred to as an interleave method. Another example of a memory accessing method is a burst transmission method for collectively transmitting plural pieces of data from a memory by assigning an address only to the leading data of the plural pieces of data to be transmitted.

Since there are no handshaking processes, which are performed in the above described basic mode where one address is outputted to transmit one piece of data, between a memory accessing device and a memory in such a transmission method, there may occur a problem during the transmission of data. A handshaking process between a memory accessing device and a memory is described below.

FIG. 33 explains how a handshaking process is performed between a memory accessing device and a memory. In FIG. 33A, a central processing unit (CPU)1 of a system is omitted from the configuration shown in FIG. 1. A control line for sending a data strobe signal (DS#) from the processor 2 and a data complete signal (DC#) from the memory 5 is provided between the processor corresponding to the vector processor unit 2 shown in FIG. 1 and the memory 5. The present invention is explained below assuming that such a control line is provided between the processor 2, for example, a vector processor unit, and the memory 5, for example, the main storage device. First explained below by referring to FIG. 33 is a handshaking process in which data are accessed in the basic mode such that the processor receives one piece of data by outputting one address to the memory 5.

For example, data D=d0, d1, d2, and d3 corresponding to addresses ADD=a0, a 1, a2, and a3 shown in the operational time chart in FIG. 33B are written to a memory 5. Normally, a memory operating at a 2-clock timing (T1 and T2) requires eight clocks for accessing four data D=d0, d1, d2, and d3.

A handshaking method is used to minimize the influence of an error on the memory 5 and other systems when an internal error, etc. has arisen in the bus master processor 2 and the operation of the bus has become inoperative.

In the handshaking method, the processor 2 outputs a data strobe signal (hereinafter referred to as a DS# signal) indicating the valid duration of data, the memory 5 outputs a data complete signal (hereinafter referred to as a DC# signal) indicating the completion of receiving data, and the validity of both the DS# and DC# signals is determined so that malfunction of the device can be prevented.

For example, in the operational time chart shown in FIG. 33C indicating the data write control state from the processor 2 to the memory 5, if the data bus 4 is transmission-controlled by the handshaking method, then the processor 2 issues data D and a DS# signal indicates the active state (valid="L" (low level)) 1 after the processor 2 issues an address ADD.

Next, when a write address is specified in the memory 5 according to an address ADD, the memory 5 receives the data D on receiving a DS# signal indicating the active state 1, and a DS# signal indicates the active state 2 to notify the processor 2 of the completion of receiving data. Then, the processor 2 detects the active state 2 of the DC# signal, and makes it indicate the inactive (invalid) state 3 to terminate the operation of the bus.

Then, the memory 5 detects that the DS# signal indicates the inactive state 3, makes the DC# signal indicate the inactive state 4, and terminates the operation of the bus. In the transmission control of a data bus, the above described handshaking process must be successfully performed as a general rule. If it is not performed successfully, it may cause a malfunction in a data process.

In the burst-transmission method in which a DRAM (dynamic accessing RAM) is used in the memory 5 to realize continuous access, in contrast with the operation by the basic mode, if an error has arisen in a result of an arithmetic operation when the result of the arithmetic operation is burst-transmitted and written to the memory 5 by the processor 2 capable of performing arithmetic operations, and two pieces of data D=d0 and d1 are transmitted, then the third and the following pieces of data D=d2 and d3 cannot be written.

The processor stops the operation, passes a bus use right to the CPU, etc. so that the CPU can start an error process. However, once the memory 5 has started the burst transmission, it receives the remaining data D regardless of the access from the processor 2 and the CPU, and the DC# signal indicates the active state correspondingly.

Therefore, the contents of the data D written in the memory 5 are not guaranteed, and data and the time taken for processes often turn out to be wasteful, and it becomes difficult to ensure the normal operation of a bus. This is the sixth problem to be solved by the present invention.

Next, the seventh problem to be solved by the present invention is explained below. As described above, plural pieces of data are transmitted in the burst mode, for example, to absorb the difference in speed between an arithmetic operation by a vector processor and the input/output of data by a memory. The burst transmission mode is a kind of block transmission method. For example, an external memory having a dynamic RAM (DRAM) is connected to a vector arithmetic operation processor so that a large amount of data can be stored and the method can work the most efficiently when addresses are arranged sequentially.

Some data cannot be applied to the burst transmission depending on the type of arithmetic operations performed by a processor when, for example, they are not stored in consecutive address areas. In this case, transmitting data in the burst mode is less efficient than in the basic transmission mode, thereby undesirably influencing the system performance. This is the seventh problem to be solved by the present invention.

Next, the eighth problem to be solved by the present invention is explained below. As described above, it is assumed that data transmitted between a memory accessing device and a memory are assigned a byte address, that is, an address per byte. However, data to be transmitted after the transmission of the previous data are specified using a base address and a stride, etc. as described by referring to FIGS. 14 through 16.

FIG. 34 shows the method of specifying an address of transmission data using a base address and a stride. In FIG. 34, data in a memory are stored as aligned on the eighth byte boundary, and the address is specified by the address of the leading byte.

In FIG. 34, assuming that a base address is A__, the address of the data transmitted after data 0 can be specified by the value obtained by adding to the base address the product of the stride and the data length. Thus, data 1 is transmitted next.

If the data length is 64 bits and the data are aligned on the eighth byte boundary as shown in FIG. 34, then, there are no problems in its transmission efficiency. However, if the data length is 32 bits and two pieces of 32-bit data are stored in a 64-bit storage area, then it is more efficient to simultaneously transmit these two pieces of 32-bit data, that is, as if one piece of 64-bit data were transmitted. In the method, 32-bit data are transmitted as having the data length of 32 bits using a base address and a stride, not permitting two pieces of 32-bit data to be simultaneously transmitted. This is the eighth problem to be solved by the present invention.

Next, the ninth or the last problem to be solved by the present invention is explained below. As described above, a memory accessing device involved in the present invention is, for example, a vector arithmetic operation processor unit. If such processor units are integrated on one chip, the circuit scale becomes too large. The size of a chip loaded with such a large scale integrated circuit necessarily becomes large, and the wiring length must be long enough to run through the chip. The longer the wiring becomes, the more the process is delayed.

In FIG. 1, if the central processing unit (CPU) 1 reads the contents of a register as a result of an arithmetic operation of the vector processor unit 2, then the CPU 1 outputs the address in the register to the VPU 2, and the VPU 2 sends to the CPU 1 the contents of the register specified according to the address. In the VPU 2, the set-up time for an external input signal, that is, the input of an address, and the delay time until the output of the contents of the register in response to the input of the address greatly influence the high-frequency operation characteristic of an integrated circuit (LSI).

A single-phase clock is the most popular clock to be provided for LSls operating at a frequency higher than 50 MHz because there is a serious problem in the duty ratio of a provided clock when a 2-phase non-overlapping clock is generated in an LSI, and it is very difficult at a high frequency for an externally provided clock to have a desirable duty ratio. With a single-phase clock, the rise of a clock is significant, and data processed in one cycle are latched at the edge of the rise of a clock.

With an LSI having a single-phase clock and a large chip size, that is, a long wiring, a logical sum of an external signal inputted through an external terminal unit and an internal control signal is latched in a control block in the LSI so as to generate a 3-state control signal for a data bus and an address bus.

Then, the signals are led to the external terminal of the data bus and the address bus for control. The location of the control block in the LSI greatly influences the conditions of the set-up time for an external input signal for generating a 3-state control signal and the delay time of the output of data to a data bus and an output bus. Therefore, the location has been carefully determined, but a more effective method of determining the set-up time of an input signal and the delay time of an output signal, that is, the AC characteristic, is demanded.

FIG. 35 shows the position of the master slave latch for controlling three states of the data bus. Assume that the LSI shown in FIG. 35 is a processor in the form of a large scale integrated circuit, and that the processor contains a register read at a 2-clock timing. When the contents of a register (A register) 61 are read, a chip select signal (CS#) is detected in an address control unit 62 in at the first clock, a read selection signal is detected according to an R/W# signal, a 32-bit address (A<0:31>) is decoded, and an A register access signal is sent to a data bus control unit 63. The data bus control unit 63 obtains a logical sum of an A register access signal and an internal control signal, and the result is latched at the edge of the rise of a clock by a master slave latch 64. At the second clock, the latched A register access signal is sent to a data bus external terminal unit through a buffer 65. The data bus external terminal unit is provided with a plurality of drivers to drive a 64-bit data bus (D<0:63>). The outputs of the drivers are connected to the control terminal of the 3-state control cell of a data bus, and the content of the A register 61 is outputted from the LSI. The shadowed portion of the lower part in FIG. 35 is the data bus external terminal unit.

With the configuration described above, at the first clock relates to the time taken for decoding an address, that is, an external signal, obtaining the logical sum of the signal and a CS# signal or an R/W# signal, sending the result to the data bus control unit 63, and obtaining the logical sum of the result and an internal control signal and latching the result in the manner slave latch 64. That is, it directly relates to A<0:31> of the external signal and a set-up time of the CS# and R/W# signals.

At the second clock, an A register access signal latched by the data bus control unit 63 is sent to the data bus external terminal unit, a plurality of drivers are provided to drive 64-bit data, and then data are outputted. That is, there arises the problem that a delay occurs due to the wiring in a chip and greatly influences the delay time of an LSI directly.

Thus, the set-up time is closely associated with the delay time, and the position of the latch of the A register access signal determines the condition of the set-up time and the delay time. If the latch of the A register access signal is positioned near the terminal of the address, the CS#, and R/W# signals to relieve the condition of the set-up time, then the distance between the latch and the data bus external terminal becomes longer, influencing the delay due to the wiring and extending the delay time of the data outputted by the processor. If the latch of the A register access signal is positioned near the data bus external terminal unit to shorten the delay time, then the condition of the set-up time of the address, the CS#, and R/W# signals become severer. This is the ninth problem to be solved by the present invention.

SUMMARY OF THE INVENTION

The present invention aims at providing a memory accessing device for inputting/outputting data in an efficient manner by associating the data to be transmitted with prefetched addresses or by rearranging the data even when the data width is different from the bus width, wherein the memory accessing device provided in a processor unit making access to an external memory under the control of a central processing device via a system bus.

The first object of the present invention is to clearly associate address information (as to which is valid, higher order bits or lower order bits in 64-bit data inputted to a memory accessing device) with input data when 32-bit data are transmitted through a 64-bit width data bus. The first object is not limited to the transmission of 32-bit data. For example, when data are loaded with their addresses prefetched using a load/store pipe, address information can be associated with data even if the number of stages of address pipelines, that is, the number of prefetched addresses, does not match the number of pieces of data, or even if an internal or external error stops the prefetching of addresses.

The second object of the present invention is to rearrange the sequence of data with the load/store pipe such that results of arithmetic operations can be stored in an external memory in the order of the original data and to test the load/store pipe without additionally amounting a test scan line when arithmetic operations are performed on the data received through the load/store pipe and stored in a vector register in the vector processor unit, and the results are outputted to the external memory through the load/store pipe.

The third object of the present invention is to provide a basic circuit of an arithmetic operation circuit in a vector arithmetic operation processor as an example of a memory accessing device so that the minimum scale arithmetic operation can be performed by one basic circuit without any additional unit, and the scale of arithmetic operations can be easily changed by adding any number of the basic circuits.

The fourth object of the present invention is to provide an arithmetic operation device for adjusting the delay of an operational timing by controlling the operation of an arithmetic operation unit so as to solve the above described fourth problem of the time delay between the data processed by an arithmetic operation unit, that is, an arithmetic operation pipeline, of the vector arithmetic operation processor and the data processed by an input/output unit, that is, a load/store pipeline.

The fifth object of the present invention is to provide a microprocessor for exactly detecting an exception using an interlocking clock and for taking an appropriate action against the exception so as to solve the fifth problem that an exception notification signal cannot be received from the external bus system in the interlocked state because an internal process system of a microprocessor, such as a vector arithmetic operation processor, etc. uses an interlocking clock while an external bus process system uses a system clock.

The sixth object of the present invention is to ensure the normal operation during the data transmission even when an error has arisen in a bus cycle, that is, while data are being transmitted, so as to solve the sixth problem of the errors arising when data are transmitted between a memory accessing device and an external memory in the burst or the interleave mode.

The seventh object of the present invention is to improve the data transmission efficiency by switching the mode between the burst mode and the basic mode depending on the array of the data to be transmitted so as to solve the seventh problem that the data transmission efficiency is lower in the burst mode than in the basic mode if the data array is not appropriate for the burst transmission.

The eighth object of the present invention is to solve the above described eighth problem by generating an appropriate transmission address depending on the storage state of transmission data in a memory so that two pieces of 32-bit data using a 64-bit width data bus.

The ninth object of the present invention is to solve the above described ninth problem by providing a large scale integrated circuit for improving the alternating current characteristic in such a large scale integrated circuit when memory accessing devices, for example, vector arithmetic processors, are integrated on one chip, especially characteristics of the set-up time for an externally inputted signal and of the delay time taken for outputting an output signal by an integrated circuit in response to the input signal so as to realize an operation at a high frequency.

A first feature of the present invention resides in a memory accessing device for sending data to or receiving it from an external memory after obtaining a bus use right, comprising data storing unit for storing data sent to or received from the external memory, and address/data control unit for controlling such that addresses prefetched for use in data access to an address bus between the memory accessing device and the external memory are correctly associated with data to be transmitted corresponding to the access.

A second feature of the present invention resides in a memory access apparatus for performing data input and output to and from an external memory for obtaining a bus use right, comprising data storing unit having at least one unit region for storing data of m bits (m is an integer), and data input and outputs unit for rearranging n data with m/n bit length when the data storing unit stores n data (n is an integer, $n \leq m$) each with a bit length of m/n in the data storing region for storing the data of m bits, when data is loaded into the data storing unit from the external memory or when data is stored in the external memory from the data storing unit.

A third feature of the present invention resides in a memory access apparatus for performing data input and output to and from an external memory by obtaining a bus right comprising memory unit for storing the data inputted by the memory access operation a first selecting circuit unit for selecting a bus in a first bus group in the memory access apparatus in accordance with a predetermined timing in order to output data on the selected bus, a second selecting circuit unit for selecting a bus in a second bus group in accordance with a predetermined timing and for outputting the data stored in the memory unit onto the selected bus; and an operation unit performing a predetermined operation by using the data outputted on the bus selected by the selecting circuit unit, thereby forming a basic circuit unit, and the memory access apparatus being formed of a plurality of the basic circuit units.

A fourth feature of the present invention resides in a memory access apparatus for performing data input and output to and from an external memory by obtaining a bus right comprising input and output unit for performing the data input and output to and from the external memory; operating unit for performing a predetermined operation by using the data input through the input and output unit; and control unit for arranging a shifting of operation timing by control of the operation of the operating unit based on a control signal from the outside when the operational timing of the input and output unit is shifted from that of the operation unit due to an external cause.

A fifth feature of the present invention resides in a memory access apparatus for performing data input and output to and from an external memory by obtaining a bus right comprising an interlock signal generating unit for generating an interlock signal for stopping the operation of an internal processing system for performing an internal process including an arithmetic operation within the memory access apparatus, interlocked clock generating unit for generating an interlocked clock which can be stopped for the period in which the interlock signal is generated, based on the system clock operating as a reference clock for an operation of the entire system including the memory access apparatus and the generated interlock signal, exception occurrence notifying unit for reporting the exception occurrence which notification is performed through the external bus process system, to the internal processing system after the internal process system starts operation, when the exception occurs in the state in which the internal processing system based on the interlocked clock does not perform the operation or the internal process system stops the operation immediately after the occurrence of the exception.

A sixth feature of the present invention resides in a memory access apparatus for performing the data input and output to and from an external memory by obtaining a bus right comprising data processing unit for performing the transfer of the data to be input and output from and to an external memory, and transfer control unit for detecting an based on an input from the data processing unit and for determining, based on the detection result whether subsequent data should continue to be transferred after a transfer of a series of data.

A seventh feature of the present invention resides in a memory access apparatus for performing data input and output, to and from an external memory, having a burst mode in which a plurality of data is transferred as a continuous data upon access using a single address, by obtaining the bus right comprises, a burst condition judging unit for judging the appropriateness of a transfer in the burst mode based on information relating to the data to be transferred when the data input and output is performed; and a switching control unit for switching the data transfer mode to one of a basic mode for transferring one data on each access and a burst transfer mode for performing a burst mode transfer.

A eighth feature of the present invention resides in an address generating method for use in a memory access apparatus for performing data input and output from and to an external memory by obtaining a bus use right, and generating an address of transfer data for enabling two data units with N/2 bits to be transmitted simultaneously on a data bus having a width of N bits (N is an even number) by using a base address and stride value, comprising the steps of judging whether the base address designates the higher N/2-bit side or the lower N/2-bit side of an N-bit data storing region for the N bits for storing two data with N/2 bits and whether the stride value is 1 or −1;

generating an address for the first transfer data when the value of the stride is 1 or −1; and generating the second and the subsequent data unit transfer addresses by adding the address increment corresponding to the value obtained by multiplying a value by N or N/2 to the address of the previous transfer data unit depending on the number of the previous transfer data units and the stride value.

A ninth feature of the present invention resides in an integrated circuit for integrating a memory access apparatus for performing an input and output operation to or from an external memory by obtaining a bus use right comprising a master latch unit for latching the data access signal which is obtained as a operation of an input signal input which is provided from the outside of the memory access apparatus and which designates the data input from the memory access apparatus and control signal provided in the memory access apparatus, the master latch unit being provided near the terminal receiving the input signal to the memory access apparatus; and a slave latch unit for receiving an input from the master latch unit and outputting a control signal of the data output, being provided near the output terminal of the data signal output from the memory access apparatus so that the delay time from the output of the master latch unit to the output of the data is substantially equal to the set-up time corresponding to the period from the inputting from the outside to the latching of the data access signal corresponding to the input when the data access signal is latched by the master latch unit.

BRIEF DESCRIPTION OF THE DRAWINGS

FIG. 27A and 27B show a method of storing a conversion process result to a vector register;

FIG. 50 shows the selection signal in the data selector unit;

FIG. 64 shows the selection conditions of a selector in the load pipeline;

FIG. 103 shows the condition (1) of the transition of internal states shown in FIG. 102;

FIG. 104 shows the condition (2) of the transition of internal states shown in FIG. 102;

FIG. 111 if a functional block diagram according to the eighth embodiment of the present invention;

FIGS. 120A and 120B are views for explaining the method of generating data transmission addresses when more data are to be transmitted simultaneously through a data bus of, for example, 64-bit width, that is, when four pieces of 16-bit data are simultaneously transmitted;

FIG. 121 is a block diagram for explaining the principle of the ninth embodiment of the present invention;

FIG. 122 is a block diagram showing the configuration of the vector processor unit according to the ninth embodiment;

FIG. 123 is a block diagram showing the arrangement of the master latches and the slave latches according to the ninth embodiment;

FIG. 124 is a block diagram showing the configuration of the address control unit;

FIG. 125 is a block diagram showing the configuration of the address determining unit;

FIG. 126 is a block diagram showing the configuration of the data bus control unit (DCNT);

FIG. 127 is a block diagram showing the configuration of the input/output (I/O) unit; and FIG. 128 is a time chart for explaining the effect of the ninth embodiment.

DESCRIPTION OF THE PREFERRED EMBODIMENTS

Figure 1:
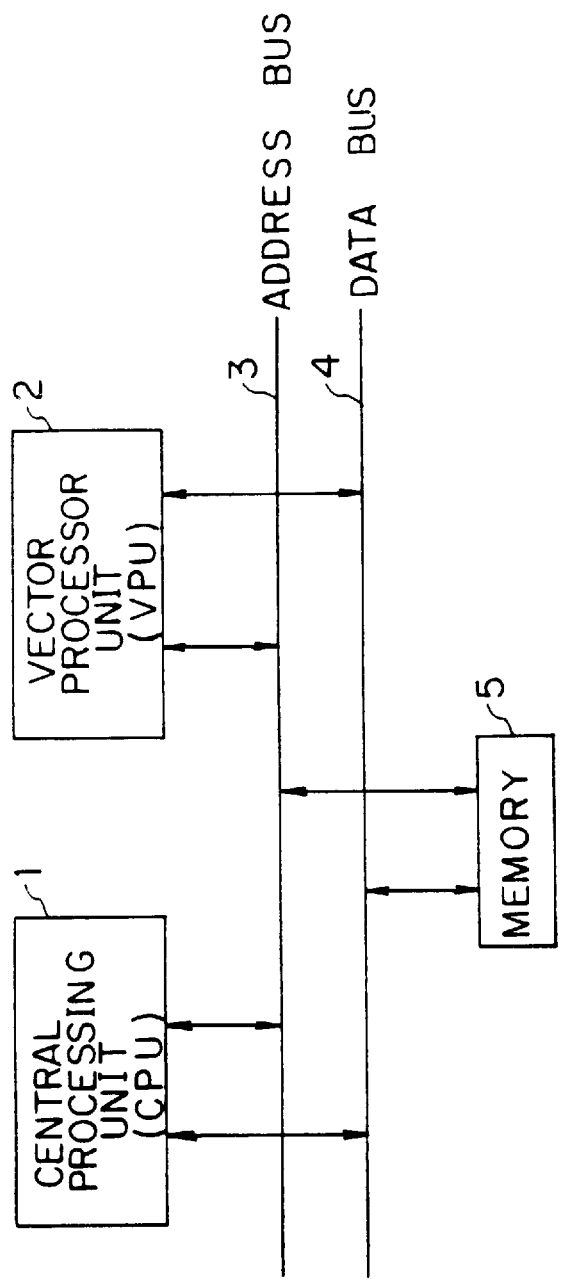
FIG. 1 shows the configuration of the data processing system in the related art technology.
Figure 2:
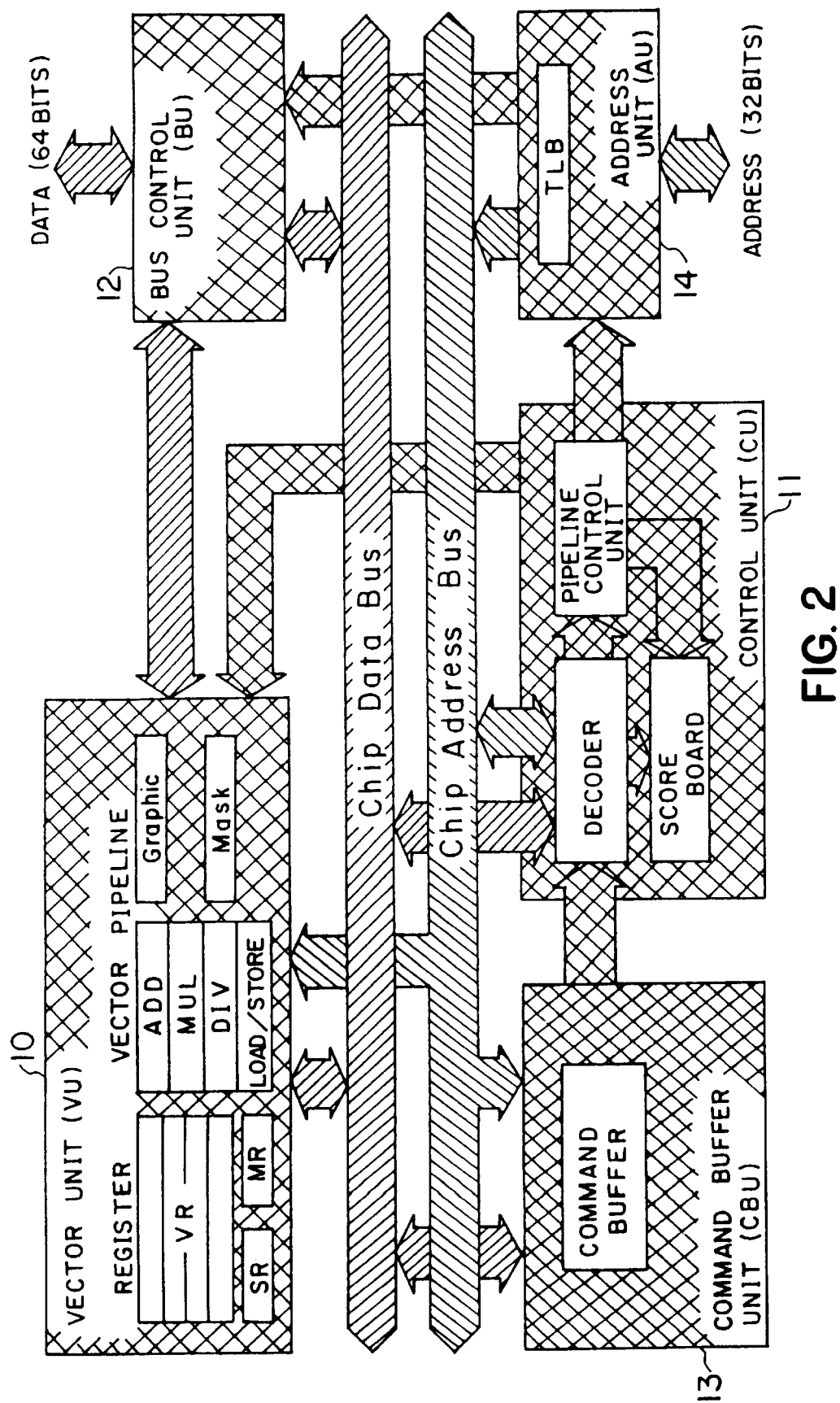
FIG. 2 is a block diagram showing the entire configuration of the vector arithmetic processor.
Figure 3:
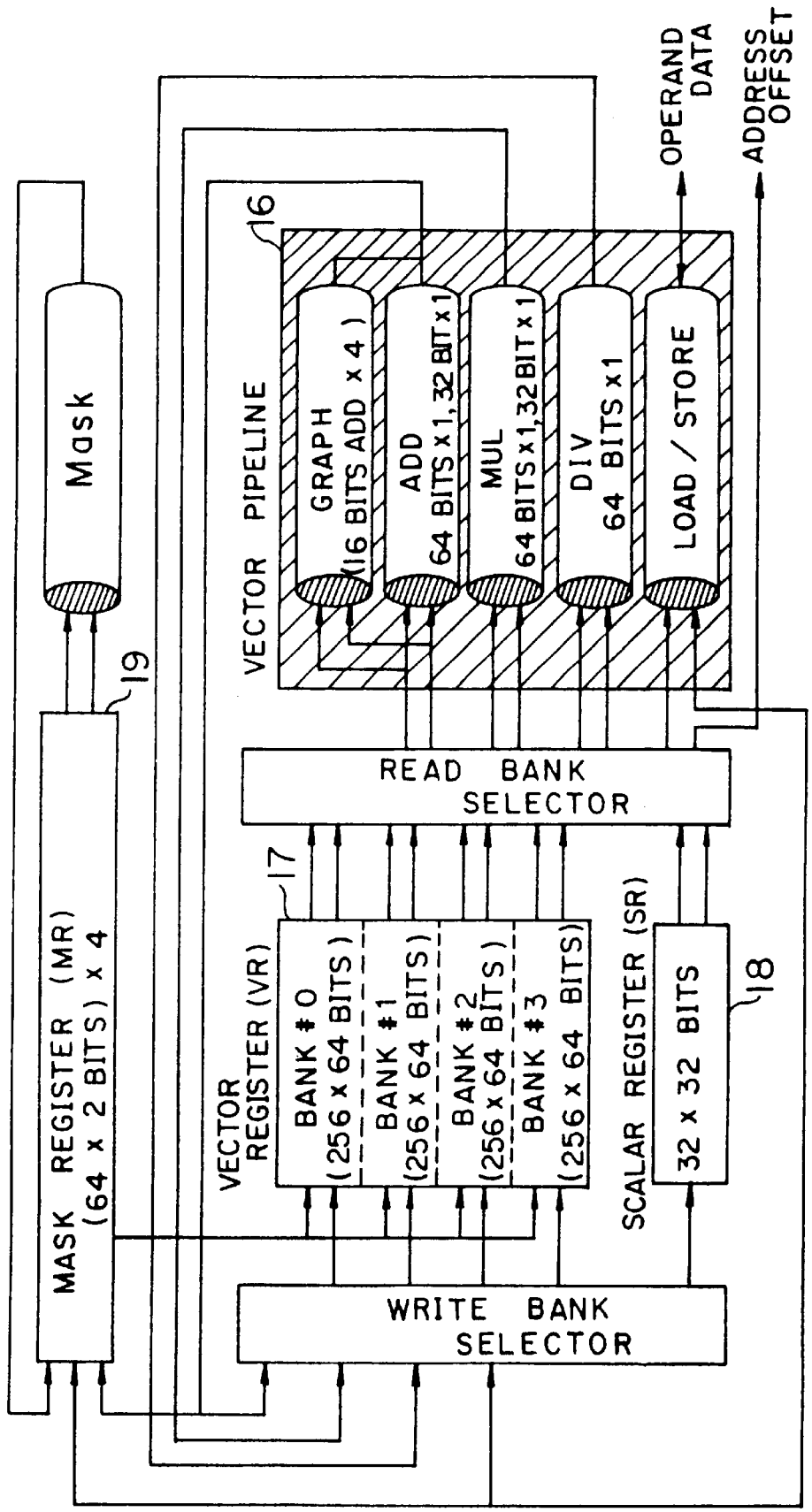
FIG. 3 is a block diagram showing the detailed configuration of the vector unit shown in FIG. 2.
Figure 4:
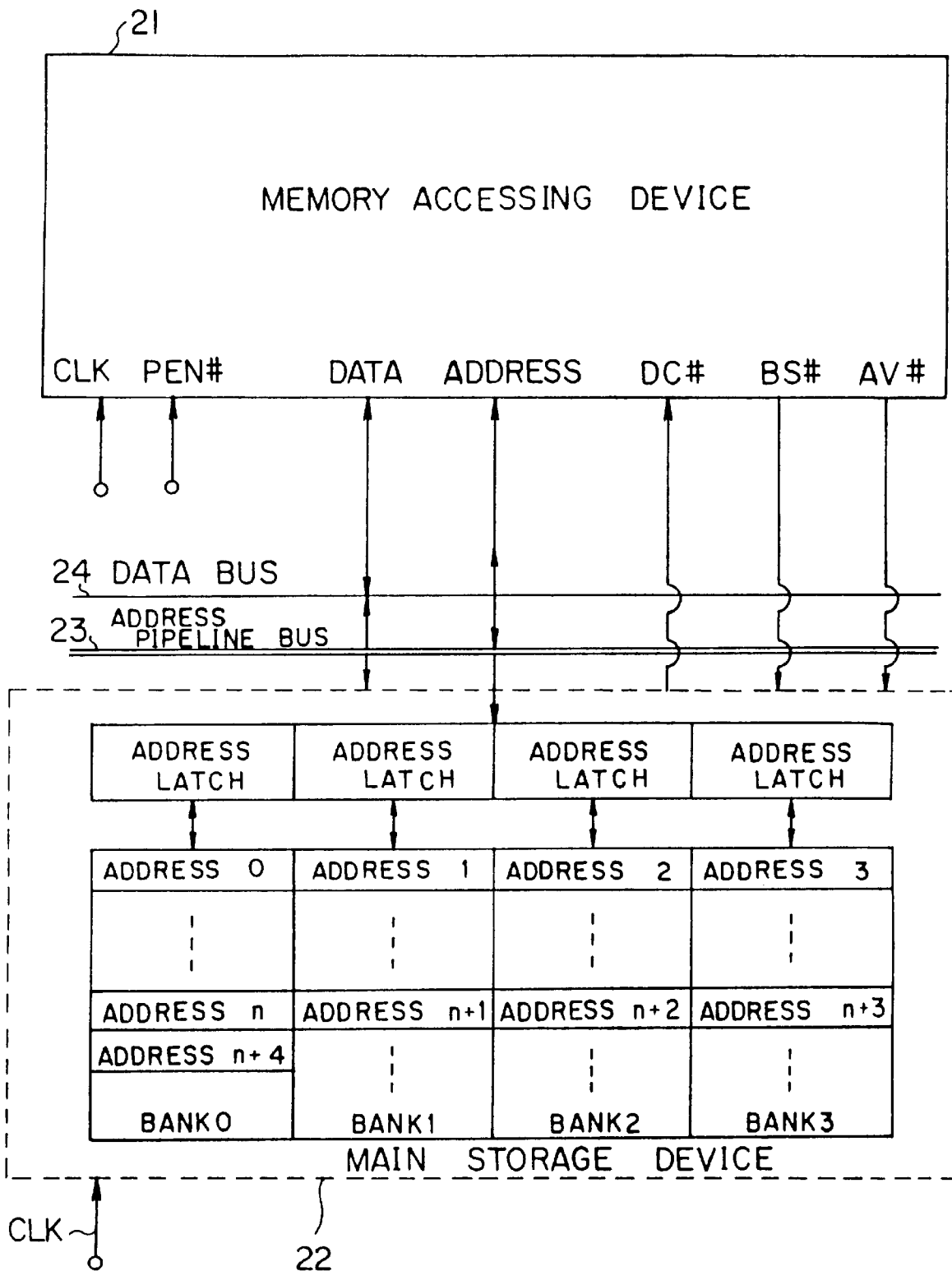
FIG. 4 shows the access from a memory accessing device to a main storage device.
Figure 5:
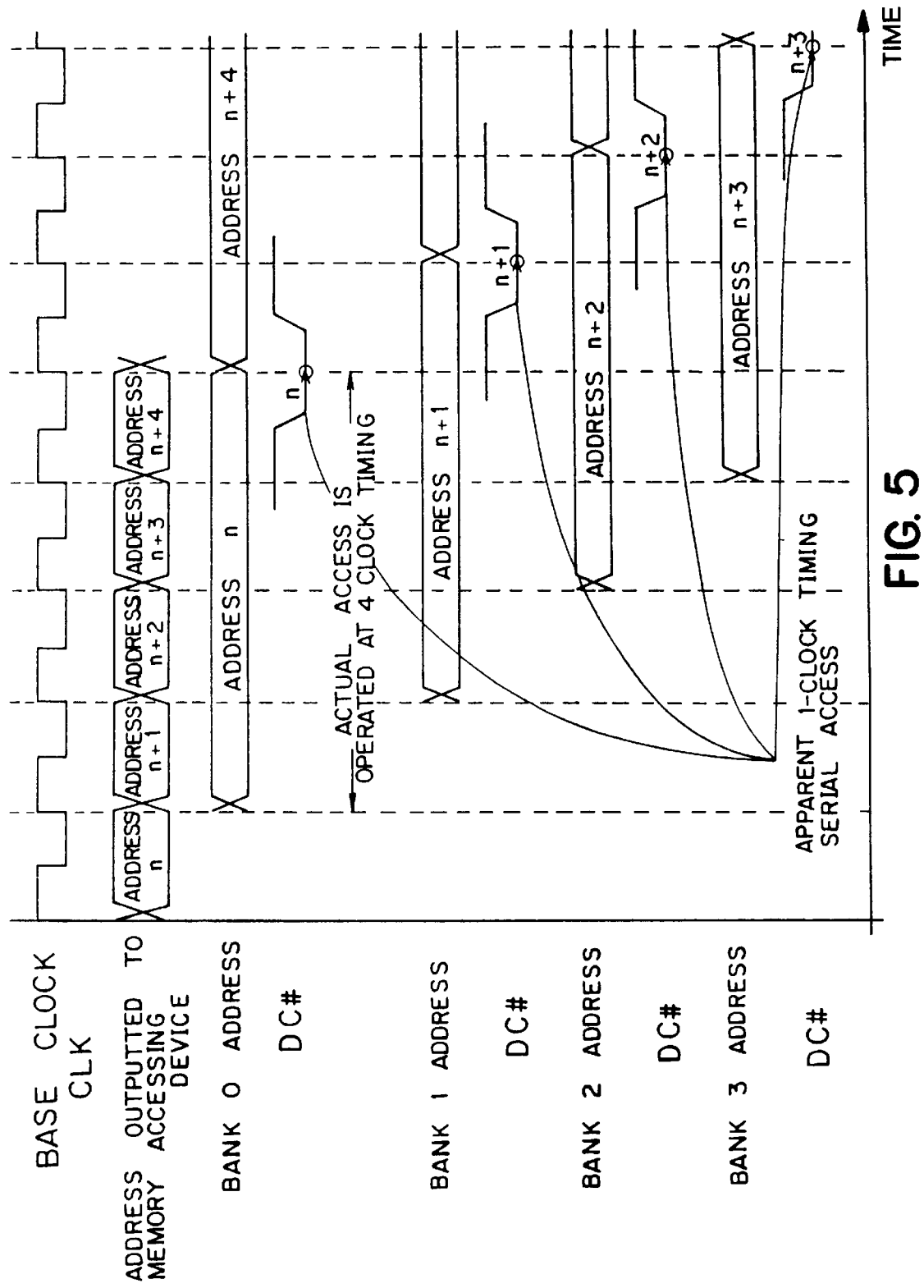
FIG. 5 is a time chart of a memory accessing operation shown in FIG. 4.
Figure 6:
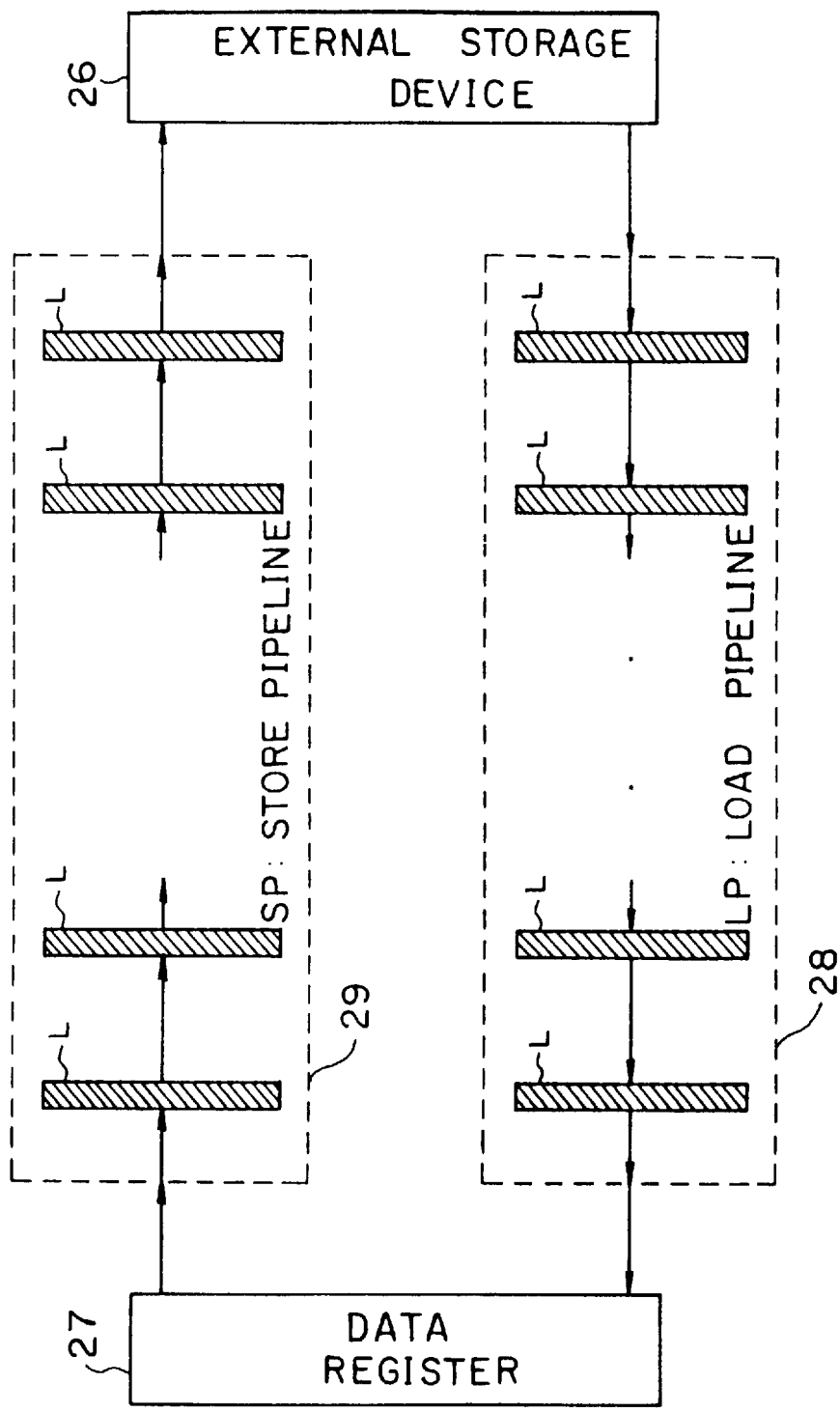
FIG. 6 shows a configuration example of a load/store pipeline shown in FIG. 4.
Figure 7:
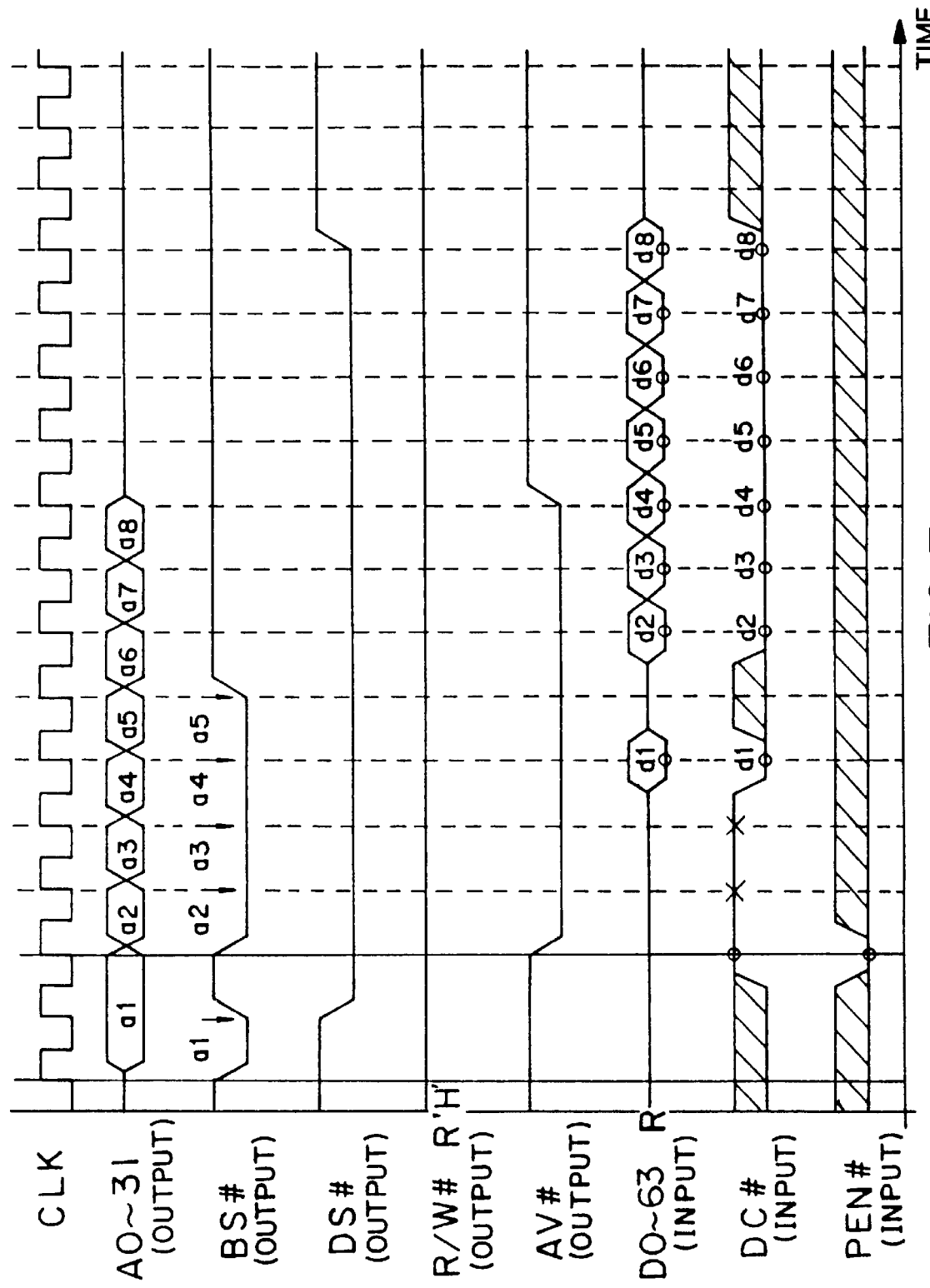
FIG. 7 is a time chart (1) of an example of a data reading operation shown in FIG. 4.
Figure 8:
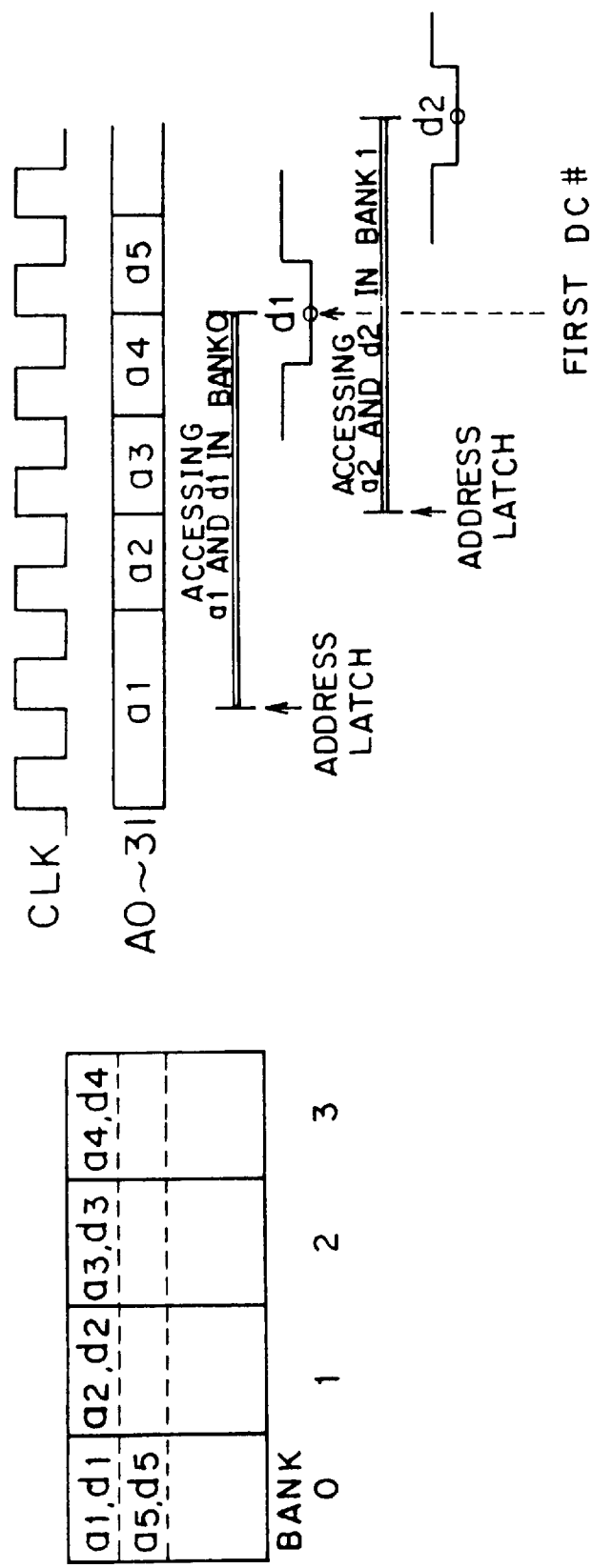
FIG. 8 is a view for explaining in detail the memory accessing operation shown in FIG. 7.
Figure 9:
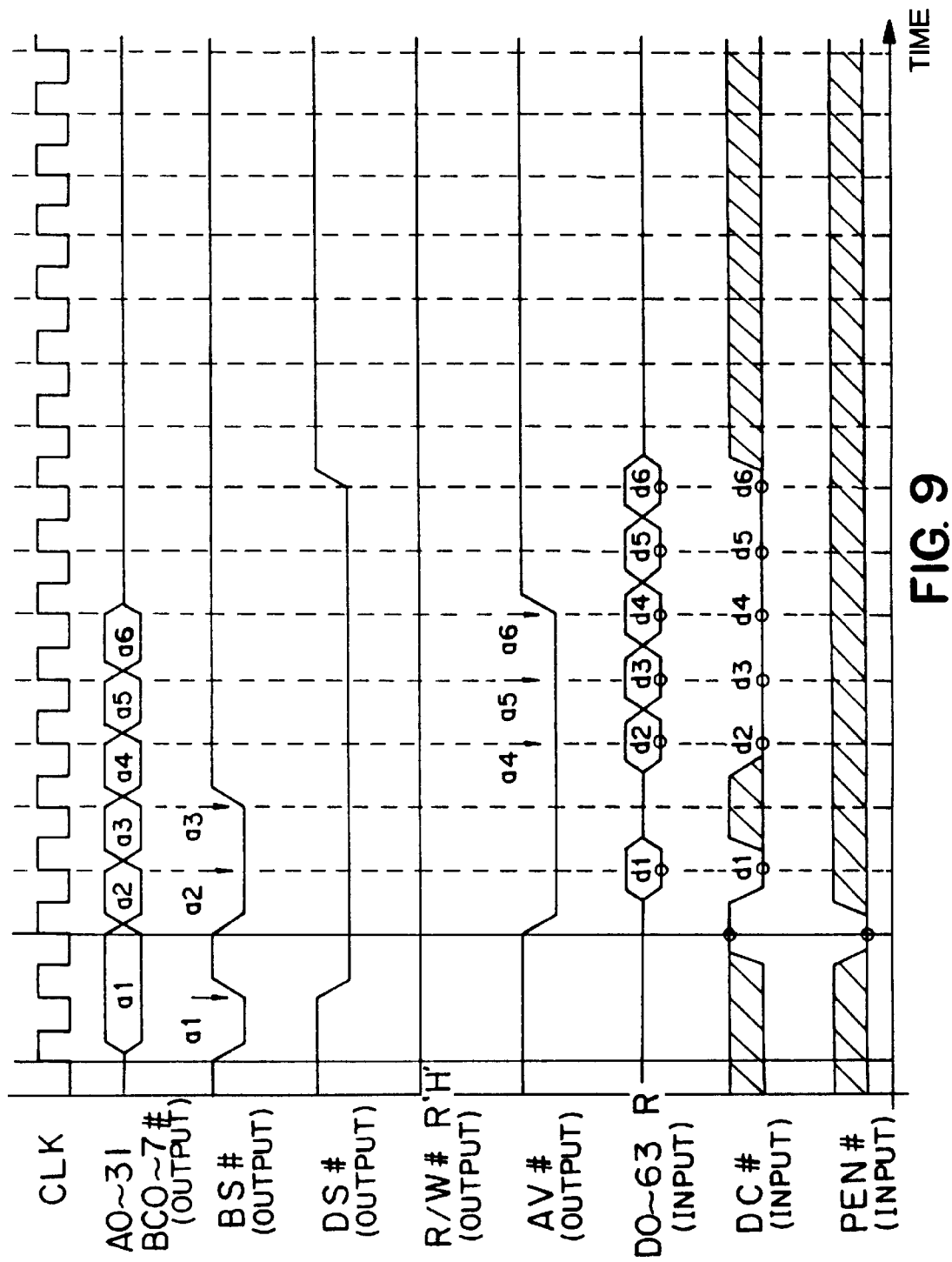
FIG. 9 is a time chart (2) of an example of a data reading operation shown in FIG. 4.
Figure 10:
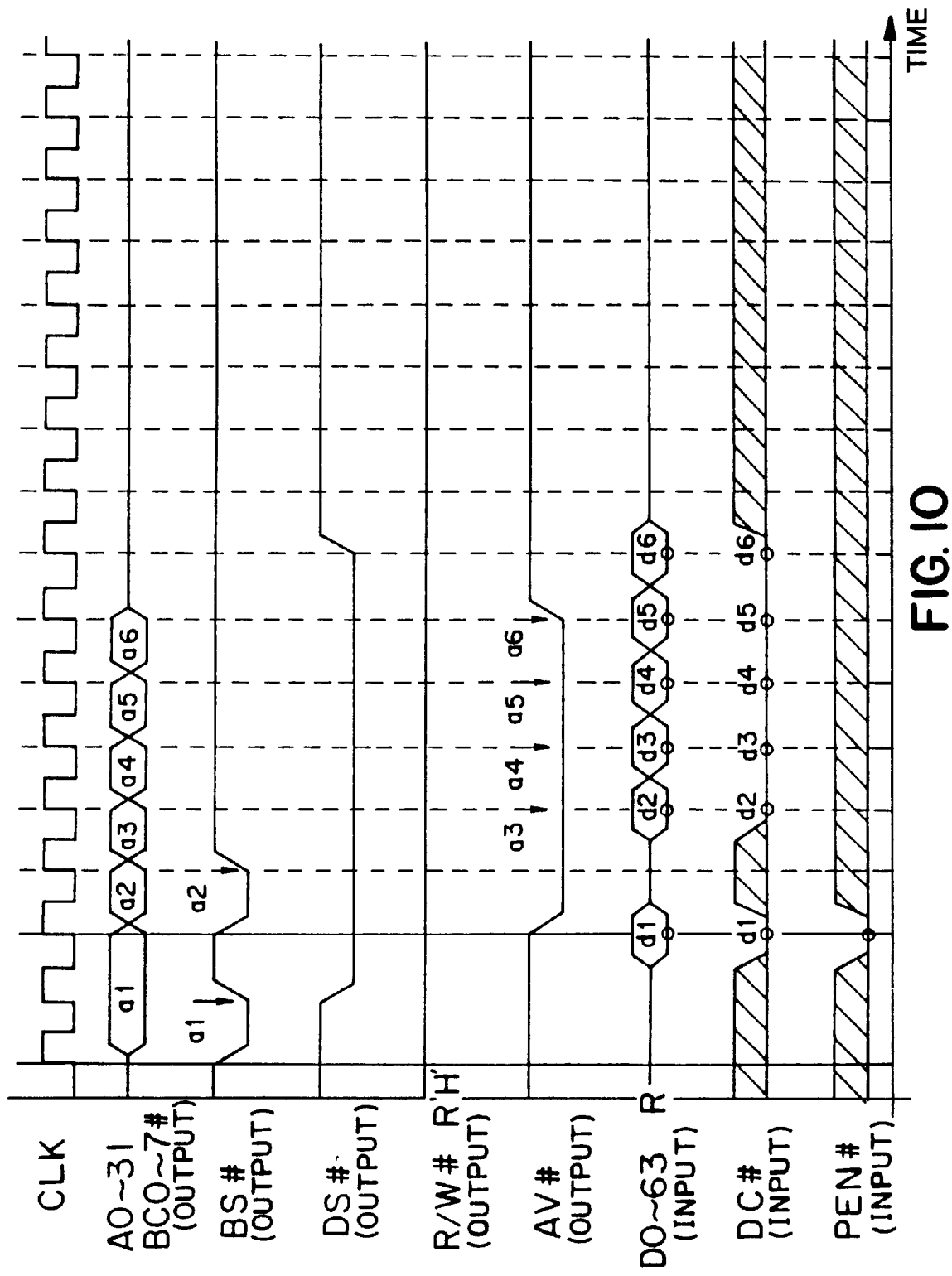
FIG. 10 is a time chart (3) of an example of a data reading operation shown in FIG. 4.
Figure 11:
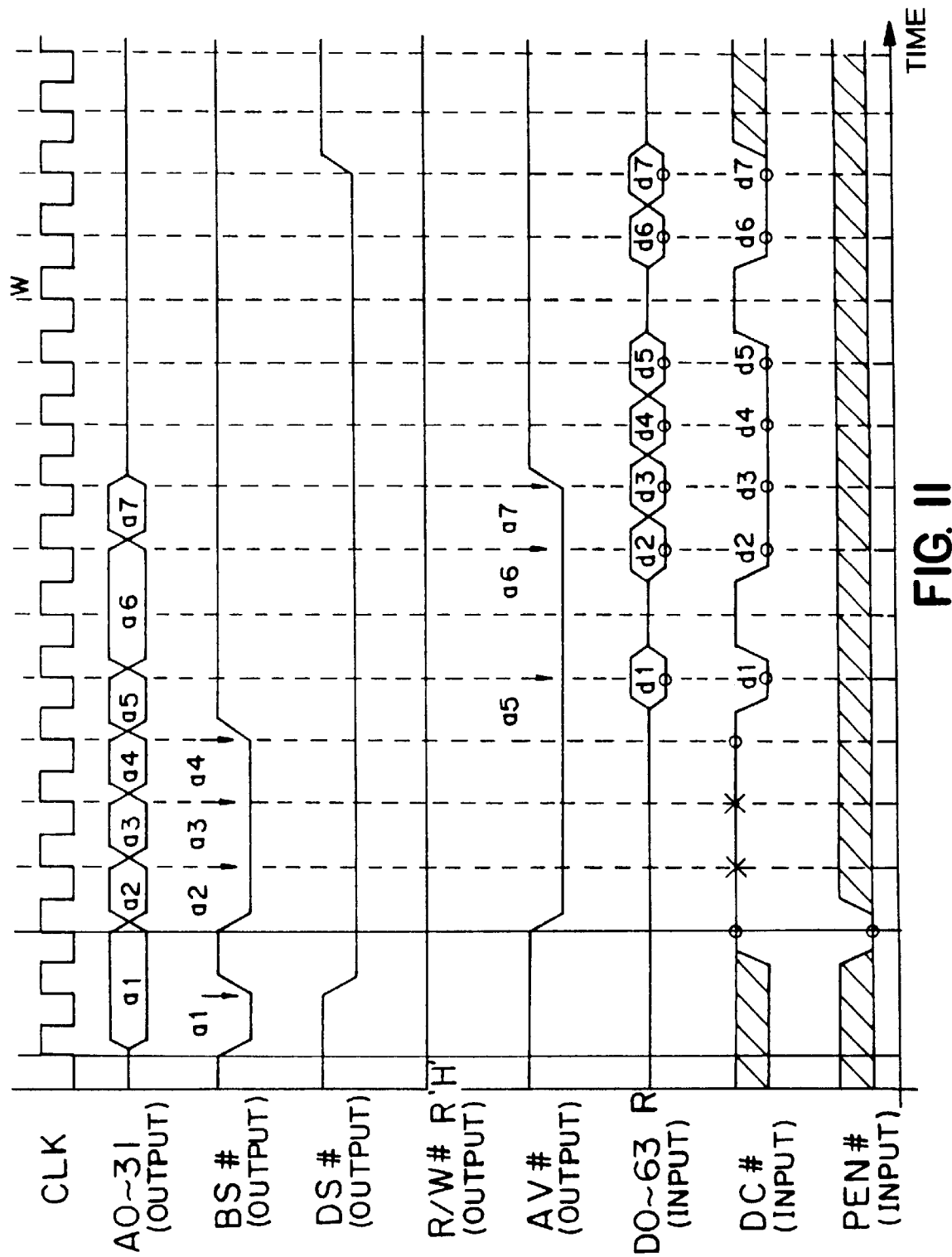
FIG. 11 is a time chart (4) of an example of a data reading operation shown in FIG. 4.
Figure 12:
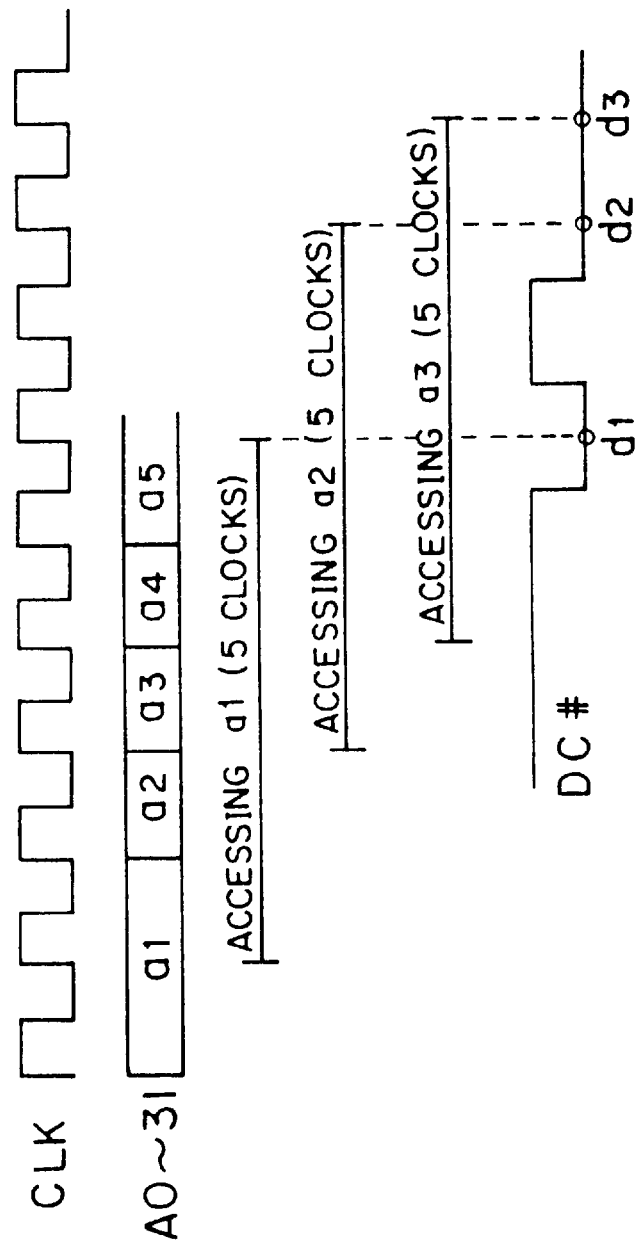
FIG. 12 is a view for explaining in detail the memory accessing operation shown in FIG. 11.
Figure 13A:
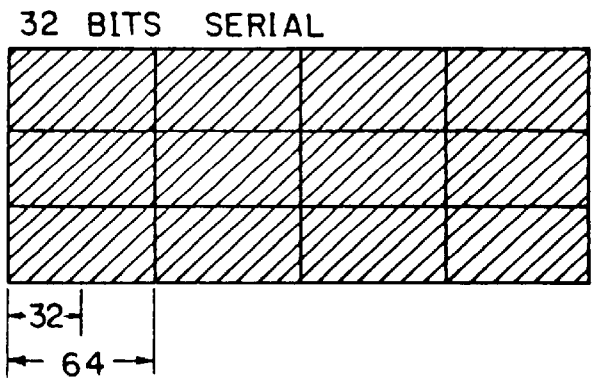
FIGS. 13A, 13B, 13C and 13D show an example of a data length and a data accessing method.
Figure 13B:
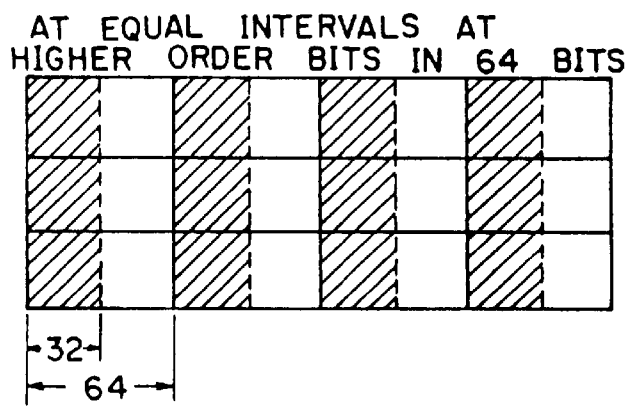
Figure 13C:
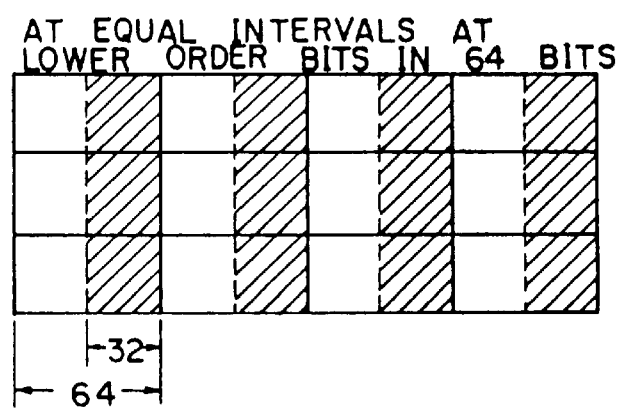
Figure 13D:
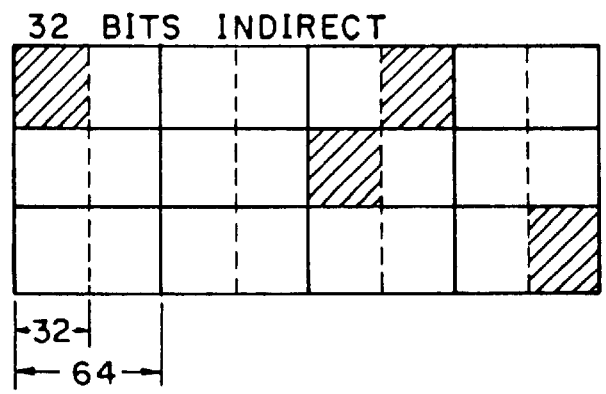
Figure 14A:
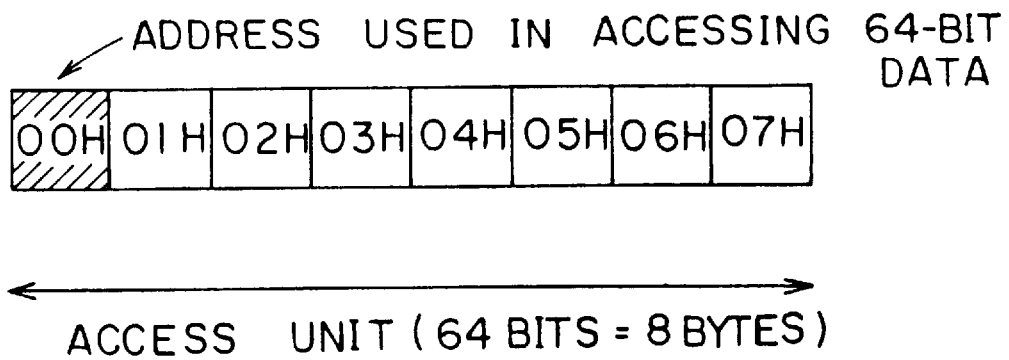
FIGS. 14A and 14B are a view for explaining the address to be added to data.
Figure 14B:
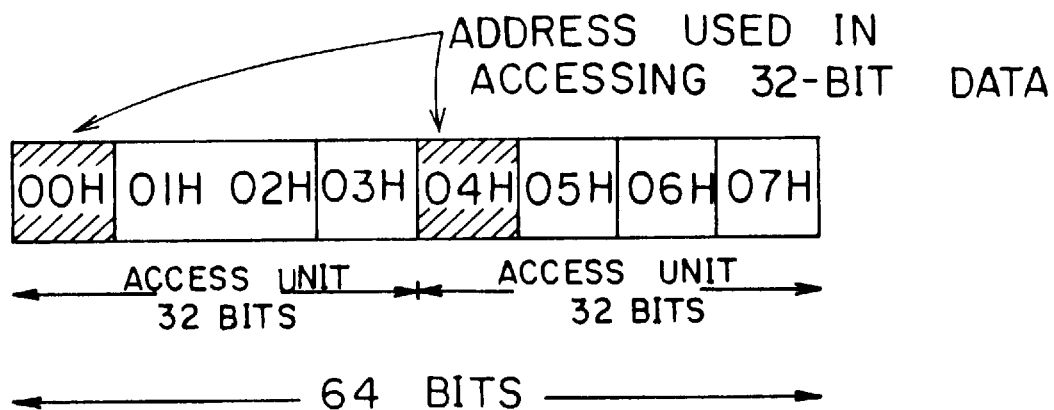
Figure 36:
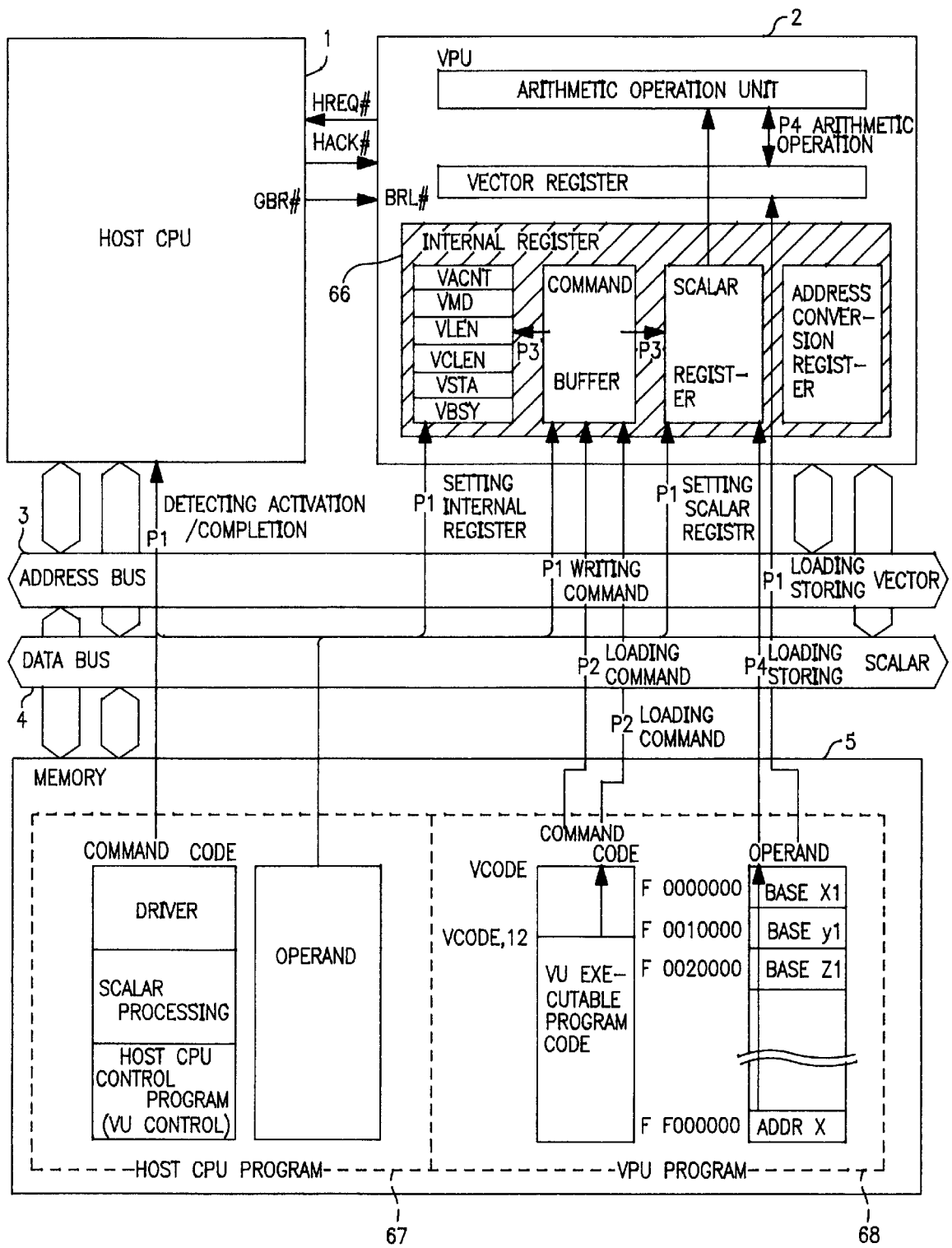
FIG. 36 is a block diagram depicting components of a computer system involved with the arithmetic operations by a vector processor unit activated by the CPU.

The memory accessing device according to the present invention is, for example, a vector arithmetic operation processor unit explained by referring to FIGS. 1 through 3. Data in an external memory can be accessed using the processor unit. A computer system provided with the processor unit is totally controlled by a central processing unit of the system, that is, a host CPU 1 as described by referring to FIG. 1. With the computer system, the procedure of performing a vector arithmetic operation by activating a vector processor unit 2 to perform a vector arithmetic operation is briefly explained below by referring to FIG. 36.

First, in phase P1, the host CPU 1 executes a control program stored in the memory 5, and initializes various internal registers 66 in the vector processor unit 2. The control program is stored in a host CPU program storage area 67 in the memory 5. After the initialization of an internal register 46, the host CPU 1 activates the vector processor unit 2.

In phase P2, an instruction code stored in a VPU program area 68 in the memory 5 is received by the VPU (vector processor unit) 2, and stored in an command buffer unit 13 shown in FIG. 2.

Then, in phase P3, the stored information is decoded by the command buffer unit 13, and the contents of the executable instruction are outputted to various internal registers, etc. depending on the decoding result. In phase P4, the vector processor unit 2 performs necessary arithmetic operations.

On completing these procedures, the host CPU 1 accesses various internal registers in the vector processor unit 2, and confirms the normal termination of the arithmetic operations. The present invention is also effective when the contents of the internal registers in the vector processor unit 2 are outputted to the host CPU 1 in response to the above described access.

The memory accessing device of the present invention sends/receives data to and from a memory after obtaining a bus use right to be a bus master. However, the input/output data are transmitted through a data bus, and addresses of the data are transmitted to and from the memory though an address bus. The vector processor unit shown in FIG. 2 manages the data transmission using a bus control unit 12, while the address transmission is controlled by an address unit 14. The configuration of the bus control unit and the address unit is further explained in detail.

Figure 37:
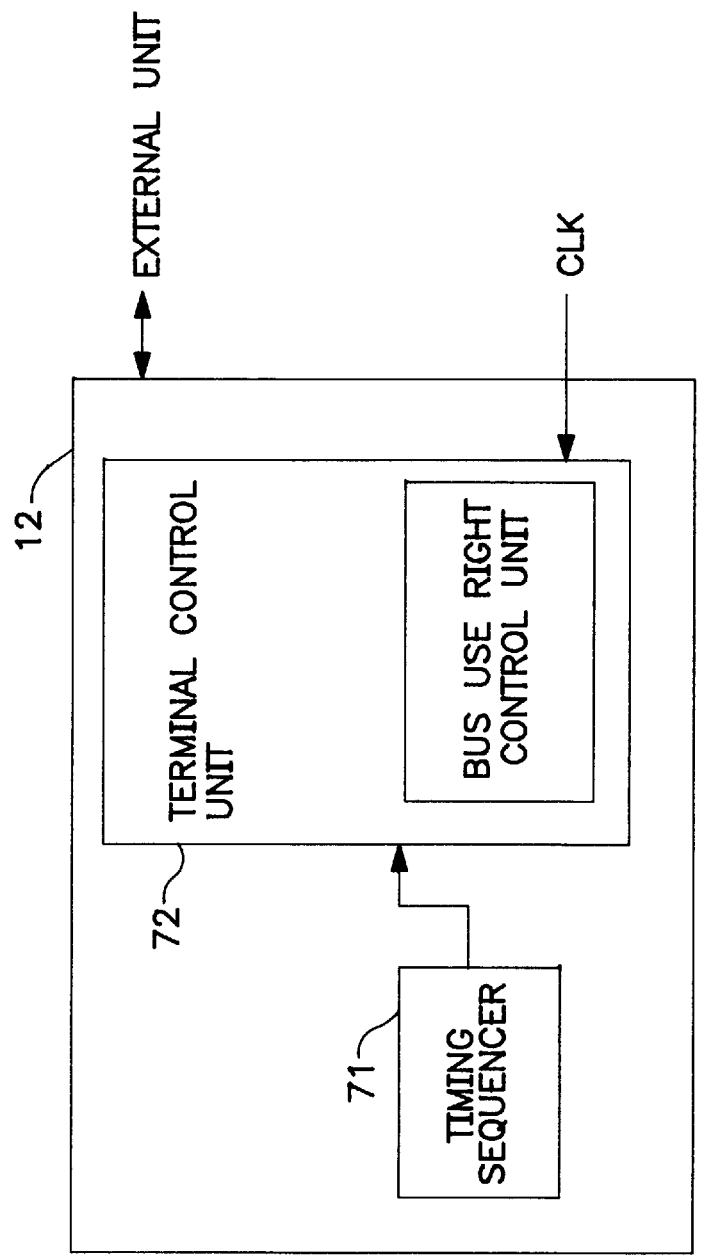
FIG. 37 is a block diagram showing the detailed configuration of the bus control unit.

FIG. 37 is a detailed block diagram of the configuration of the bus control unit. In FIG. 37, the bus control unit 12 comprises a timing sequencer 71 for outputting a state signal (explained later) depending on the internal state of the vector processor unit, and a terminal control unit 72 for controlling the input/output of data between the bus control unit and the external data bus. The terminal control unit 72 contains a bus use right control unit 73 for controlling the bus use right.

Figure 38:
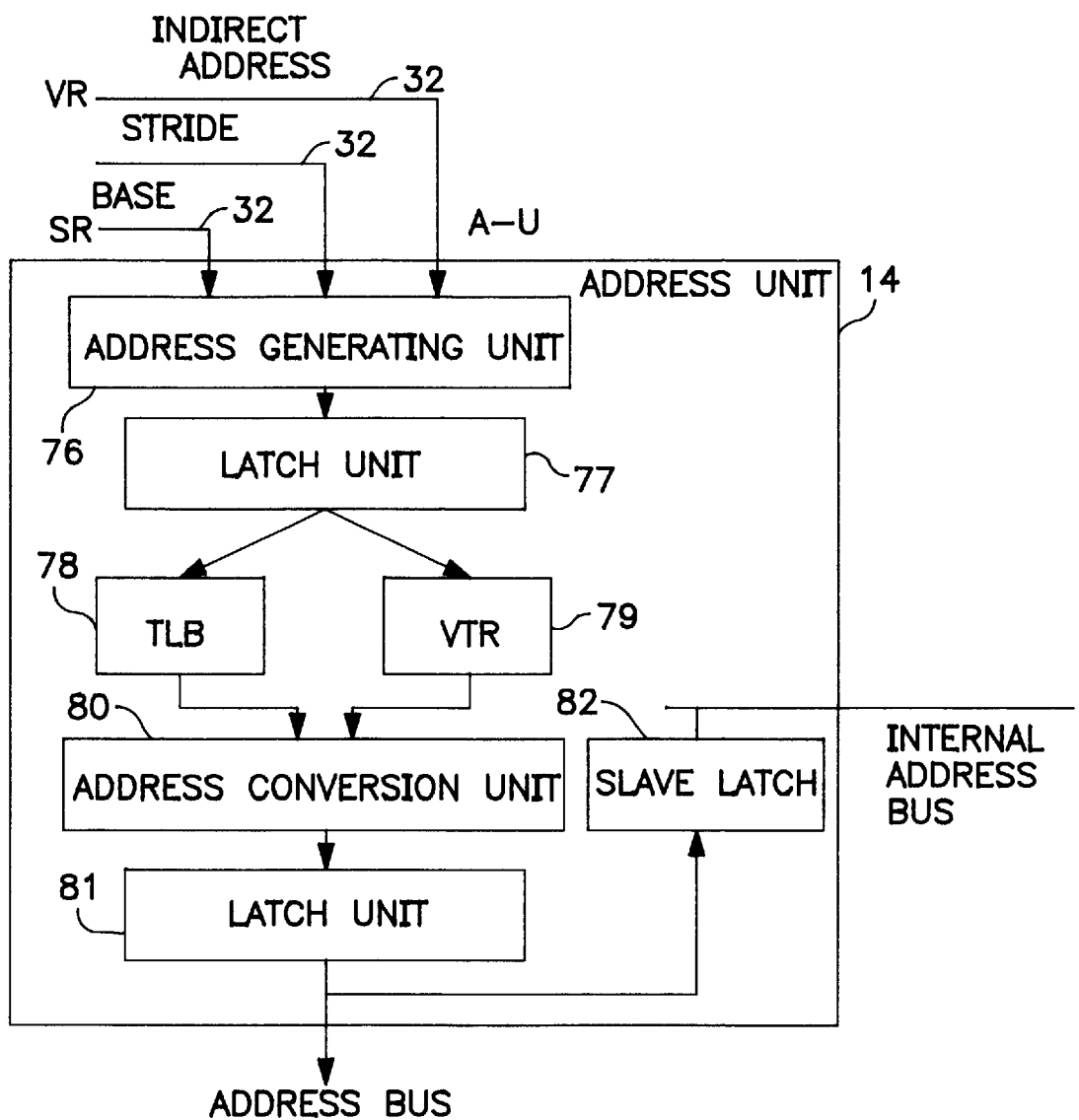
FIG. 38 is a block diagram showing the detailed configuration of the address unit.

FIG. 38 is a detailed block diagram of the address unit. In FIG. 38, the address unit 14 comprises an address generating unit 76 for generating an address in accessing data, a latch unit 77 for latching an address generated by the address generating unit 76, a look-aside buffer (TLB) 78 for converting an address received from the output of the latch unit 77, a translation register (VTR) 79, an address conversion unit 80 for converting an address using the outputs of the TLB 78 and the VTR 79, a latch 81 for latching the output of the address converting unit 80 and outputting it as an address conversion result to an external address bus, and a slave latch 82 for outputting the output of the latch 81 to an internal address bus. The address generating unit 76 receives from a scalar register SR a base address and a stride for use in generating an address, and an indirect address from a vector register VR.

Figure 39A:
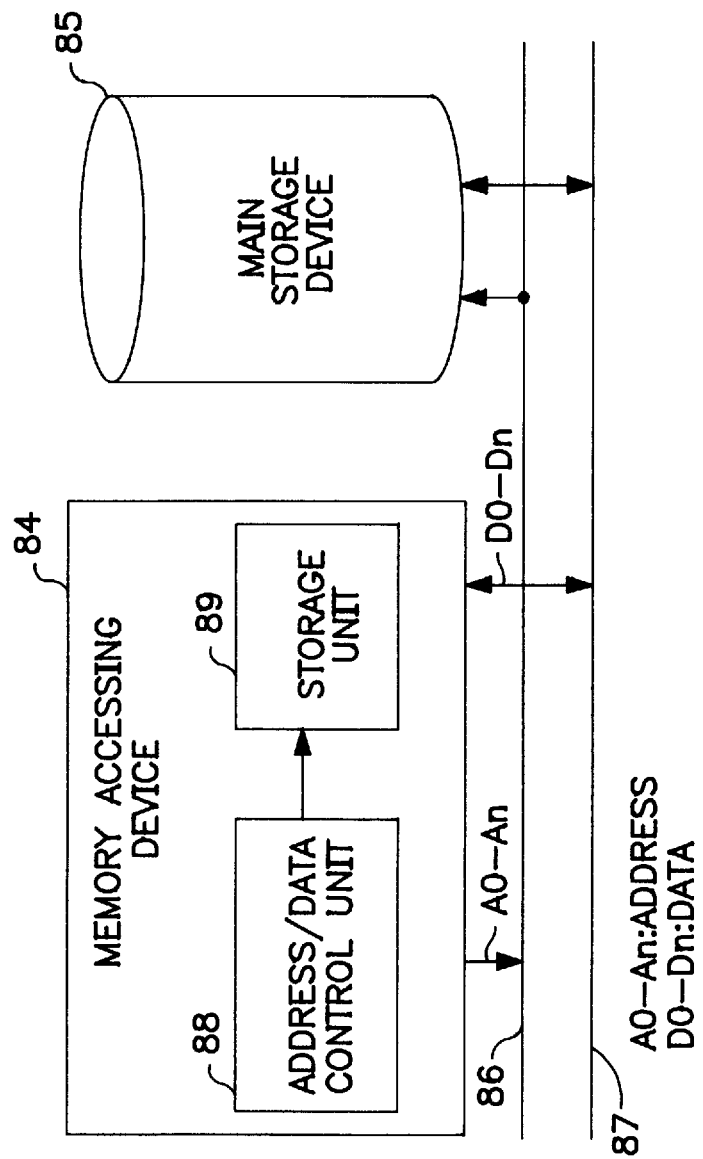
FIGS. 39A and 39B are block diagrams showing a high level conception of the first embodiment.
Figure 39B:
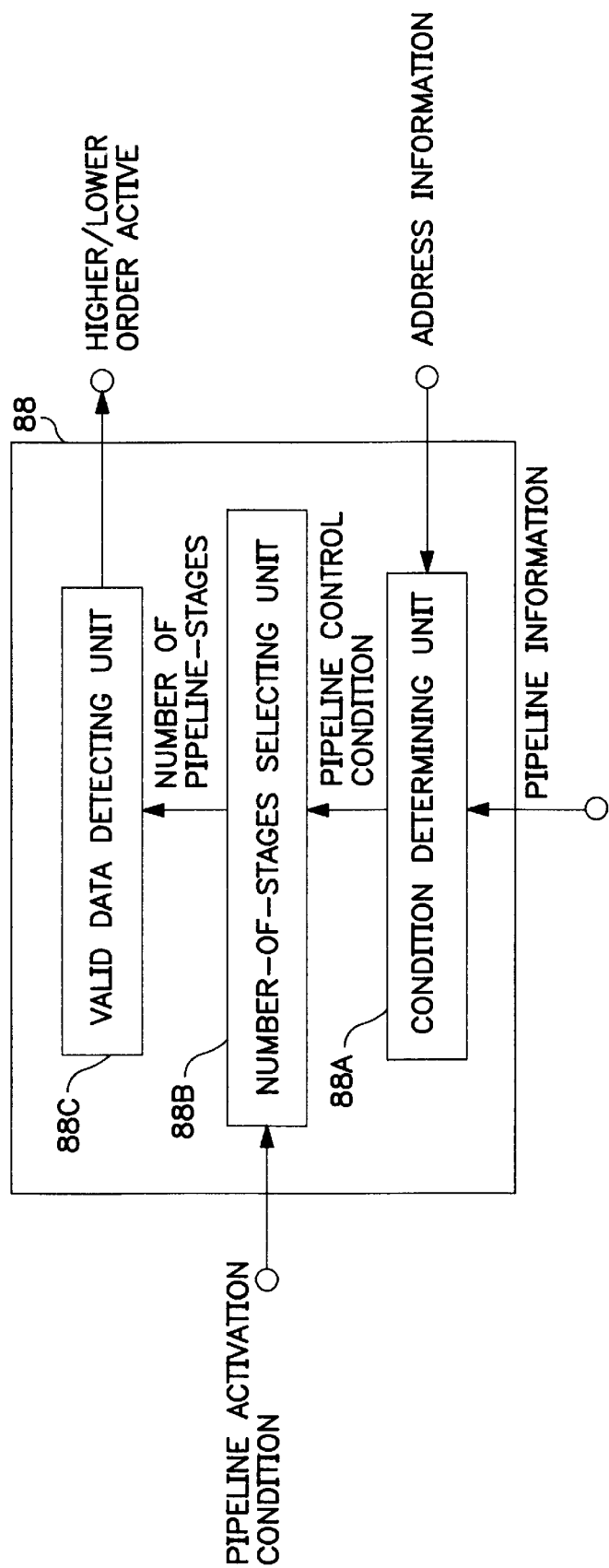

FIGS. 39A–B are block diagrams of the configuration of the first embodiment of the present invention. FIG. 39A contains a memory accessing device 84 corresponding to the vector processor unit 2 shown in FIG. 1, a main storage device 85 corresponding to the external memory 5 connected to the memory accessing device 84 via an address bus 86 and a data bus 87. The memory accessing device 84 comprises an address/data control unit 88 and a storage unit 89. The storage unit 89 corresponds to, for example, the vector register in the vector processor unit.

As seen in FIG. 39B, the address/data control unit 88 in the memory accessing device 84 comprises a condition determining unit 88A for determining the condition of the control of a pipeline according to pipeline information, a number-of-stages selecting unit 88B for selecting the number of pipeline stages according to the pipeline control condition and the pipeline activation condition, and a valid data detecting unit 88C for detecting according to the selected number of stages the valid data position, for example, 32 higher order bits or 32 lower order bits in 64-bit data.

As shown in FIG. 39A, the memory addressing device according to the first embodiment of the present invention is provided with the address/data control unit 88 for controlling such that n prefetched addresses A0 through An are associated with n pieces of data D0 through Dn relating to the memory access involved.

For example, even if the bus width of the data bus 87 is different from the size of data D0 through Dn, addresses A0 through An prefetched in relation to the read operation of data D0 through Dn by the main storage device 85 (memory access) are transmitted to the storage device 85 through the address bus 86.

At this time, as shown in FIG. 39B, a pipeline control condition is determined by the condition determining unit 88A in the address/data control unit 88 according to the pipeline information such as address information, an internal exception, a TLB entry request, release of bus use right, etc. inputted at the same timing as that of the prefetched addresses A0 through An. Then, the number-of-pipeline stages are selected by the number-of-pipeline stages selecting unit 88B according to the pipeline control condition and the pipeline activation condition indicating the number of activated pipelines.

The valid position of data D0 through Dn can be detected by the valid data detecting unit 88C according to the number-of-pipeline stages. Thus, the storage unit 89 of the memory accessing device (see FIG. 39A) is controlled separately for higher order bits and lower order bits, and the data D0 through Dn read from the main storage device 85 (hereinafter referred to as load data) are stored in the storage unit 89.

Therefore, output addresses A0 through An can be correctly associated with corresponding load data D0 through Dn even if there are coexisting different cycles such as a cycle in which only addresses are outputted, a cycle in which addresses are converted according to a DC# signal and read data are inputted, and a cycle in which only read data are inputted, or even if the data bus width is different from the input data size.

Address information can be maintained in the address/data control unit 88 until load data D0 through Dn to be read through the data bus 87 are applied to the memory accessing device even if the address information for data D0 through Dn are prefetched.

For example, the address information indicating which data D0 through D31 are valid in loaded data D0 through D63 loaded through the 64-bit data bus 87 can be maintained in the address/data control unit 88 until corresponding data D0 through D31 are loaded even if the main storage device 85 is connected to a 64-bit data bus and 32-bit data D0 through D31 are loaded, that is, when the data bus width is not equal to the data size.

When 32-bit data D0 through D31 are processed and aligned in series on the eighth byte boundary, the validity of the data can be determined by the valid data detecting unit 88C of the address/data control unit 88, and the determination result can be stored therein.

Figure 40:
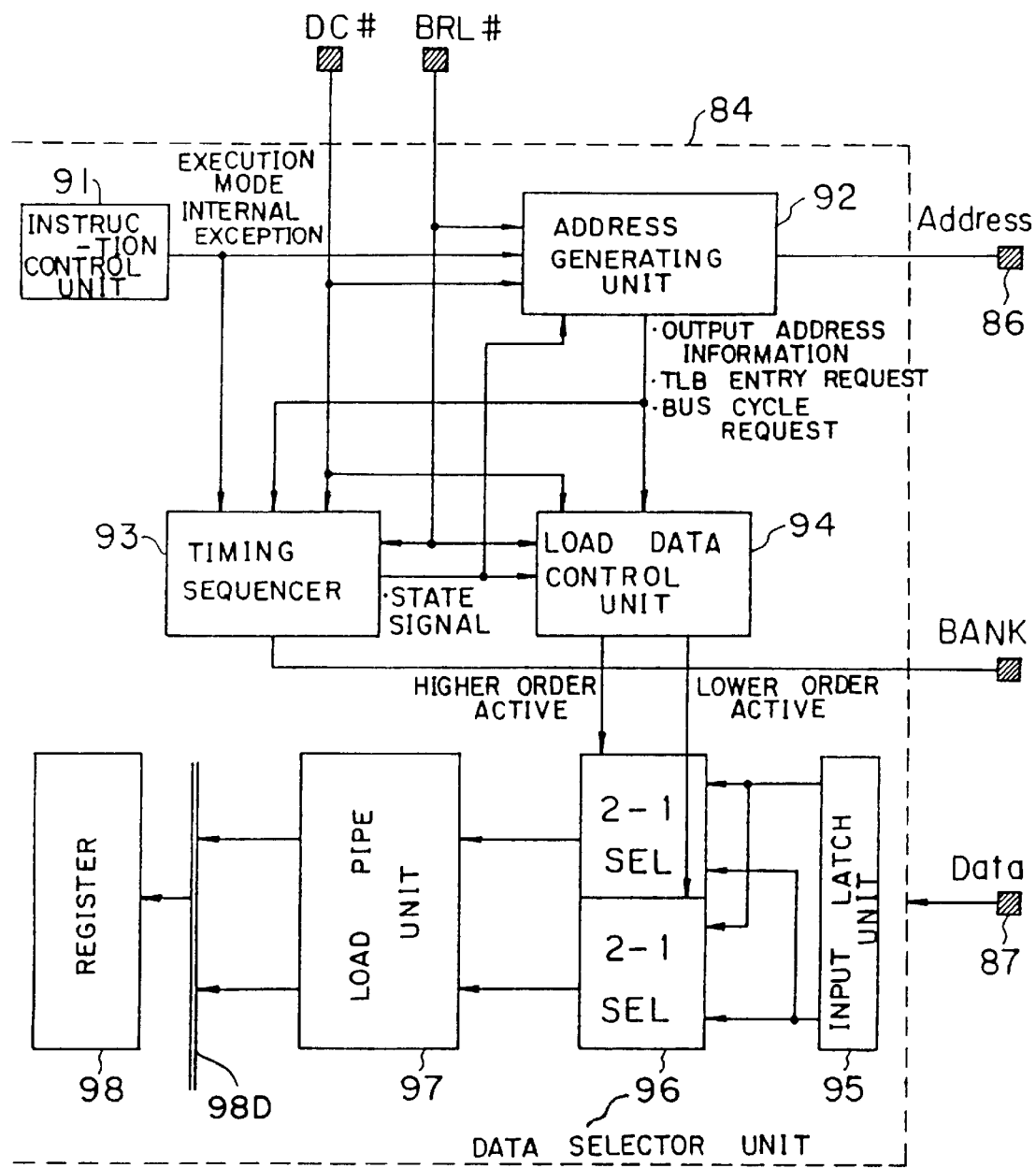
FIG. 40 is a block diagram showing the detailed configuration of the memory accessing device according to the first embodiment.

FIG. 40 explains the memory accessing device as the first embodiment of the present invention. FIGS. 41 through 49 are complementary views for FIG. 40. For example, the memory accessing device 84 connected to the main storage device 85 to access the memory comprises, as shown in FIG. 40, an instruction control unit 91, an address generating unit 92, a timing sequencer 93, a load data control unit 94, an input latch unit 95, a data selector unit 96, a load pipe unit 97, and a register 98. The terminal BANK shown in FIG. 40 is an external terminal, and is not shown in FIG. 39A.

The memory accessing device is a vector processor having a SIMD (single instruction/multiple data) architecture.

It also stores data D0 through Dn loaded from the main storage device 85 in the register 98 through the load pipe unit 97.

For example, the instruction control unit 91 decodes a given instruction, activates the address generating unit 92, etc. when it is a load instruction to read data D0 through Dn from the main storage device 85, and notifies the address generating unit 92 of the occurrence of an exceptional event when it has arisen.

The address generating unit 92 generates addresses A0 through An corresponding to data D0 through Dn loaded to the register 98. The address generating unit 92 notifies the load data control unit 94 of the information indicating which is valid, higher order bits or lower order bits in the data corresponding to the currently outputted address information, for example, a1, a2, . . ., etc.

The timing sequencer 93 determines the state of the clock cycle of a pipeline bus, etc., and outputs to the load data control unit 94 a state signal T1, T2, P4, P4B1, P4B2, . . . , etc.

The load data control unit 94 corresponds to the address/data control unit 88, and controls the correlation of prefetched addresses A0 through An to data D0 through Dn involved in the memory access. For example, the load data control unit 94 detects valid data in inputted load data (data read through the data bus). The internal configuration of the load data control unit 94 is described in detail in FIGS. 42 through 49.

The input latch 95 inputs and latches load data (can be referred to as simply "data"), and transmits them to the data selector unit 96. The data selector 96 selects valid data. For example, if the data size of data D0 through Dn inputted through the data bus for transmitting 64-bit data D0 through D63 is a 32-bit size, it associates valid data with higher order bits D32 through D64, or lower order bits D0 through D31.

The data selector unit 96 comprises two data selecting units (each hereinafter referred to as a 2-1 SEL) for selecting data after dividing D0 through Dn into a higher order group and a lower order group according to higher and lower order active signals outputted by the load data control unit 94. The load pipe unit 97 transmits the data to the register 98 at the output timing of load D0 though Dn. A higher order active signal indicates that 32 higher order bits are valid, while a lower order active signal indicates that 32 low order bits are valid.

The register 98 corresponds to the storage unit 89 and stores data D0 through Dn. The register 98 is controlled separately for higher order bits or lower order bits when the data bus width of the bank selector bus 98D for transmitting load data D0 through Dn is different from the size of data D0 through Dn. The bank selector bus 98D is a bus between the load pipe unit 97 and the register 98.

Figure 41:
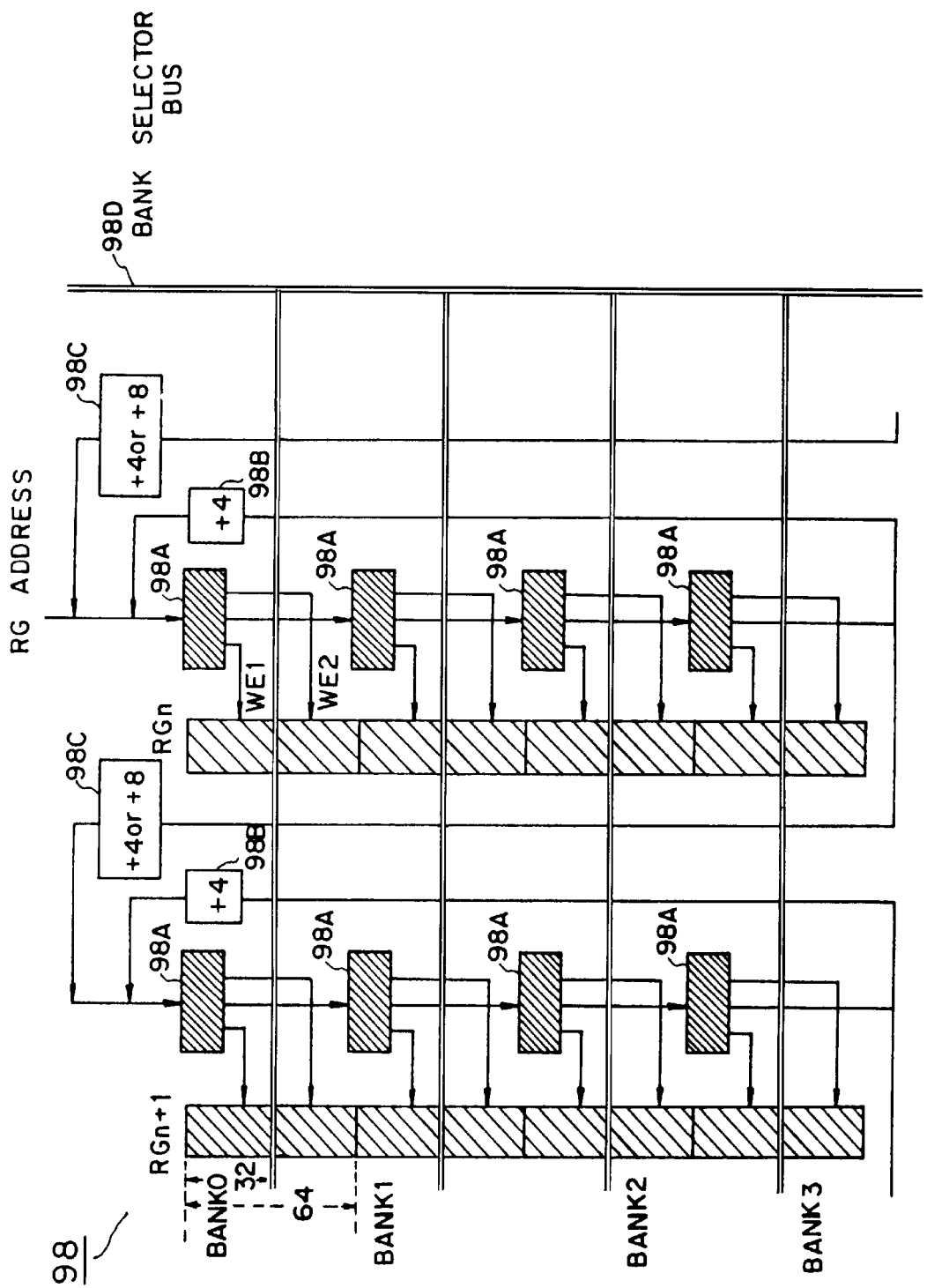
FIG. 41 is a block diagram showing the detailed configuration of a register according to the first embodiment.

For example, the register 98 has four banks (banks 0 through 3) each comprising 64 bits (32 higher order bits and 32 lower order bits) as shown in FIG. 41. The register 98 comprises register groups RGn and RGn$_{+1}$ connected to the bank selector bus 98D, a shift register 98A, and adders 98B and 98C. One register has the data width of the maximum data length, for example, 64 bits. For example, addresses are shared between higher order bits and lower order bits in four banks of register RGn. Lower order bits have values larger by four than those of higher order bits. Higher order bits of register RGn$_{+1}$ have values larger by eight than those of register RGn (byte address).

The function of the register 98 is described below. When a register address (hereinafter referred to as an RG address) is assigned to the shift register 98A using a register number of an instruction, a higher order inactive signal WE1 is outputted from the shift register 98A to higher order bits of register group RGn, and a lower order inactive signal WE2 is outputted to lower order bits of register group RGM.

Thus, load data are sequentially written from register group RGn to the next register group RGn$_{+1}$. At this time, an address is incremented by eight by the adder 98C to assign an address to the next register group RGn$_{+1}$, and the write/read of the data is controlled.

For example, to write 64-bit data, signals WE1 and WE2 are outputted, and the data are sequentially written to banks, starting with bank 0. That is, data are written to banks 0 through 3 while the addresses are shifted among shift registers A3. When data to be written to four banks BANK0 through BANK3 are written to register group RGn, addresses are incremented by eight, and control is passed to the writing operation to the next register group RGn. Next, a 332-bit size is specified, the higher order bits of each of the 64-bit banks of RGn are sequentially written according to the output of WE1. Then, the address is incremented by four by the adder 98B and the lower order bits in 64 bits of the same RGn according to the output of WE2. Since the address has been already incremented by four unlike the case of the 64-bit size, the address is incremented by four by the 98C. Then, control is passed to the writing operation to RGn$_{+1}$. For example, the load pipe unit 97 controls so that 32-bit data are transmitted to the register 98 after selecting higher order bits or lower order bits of the bank selector bus 98D.

The write control is performed by the register 98 so that RG addresses are incremented and higher order bits or lower order bits in 64 bits are write-enabled. For example, if data are not write-enabled, they are not written in the register 98. The data are transmitted through the bank selector bus 98D.

Figure 42:
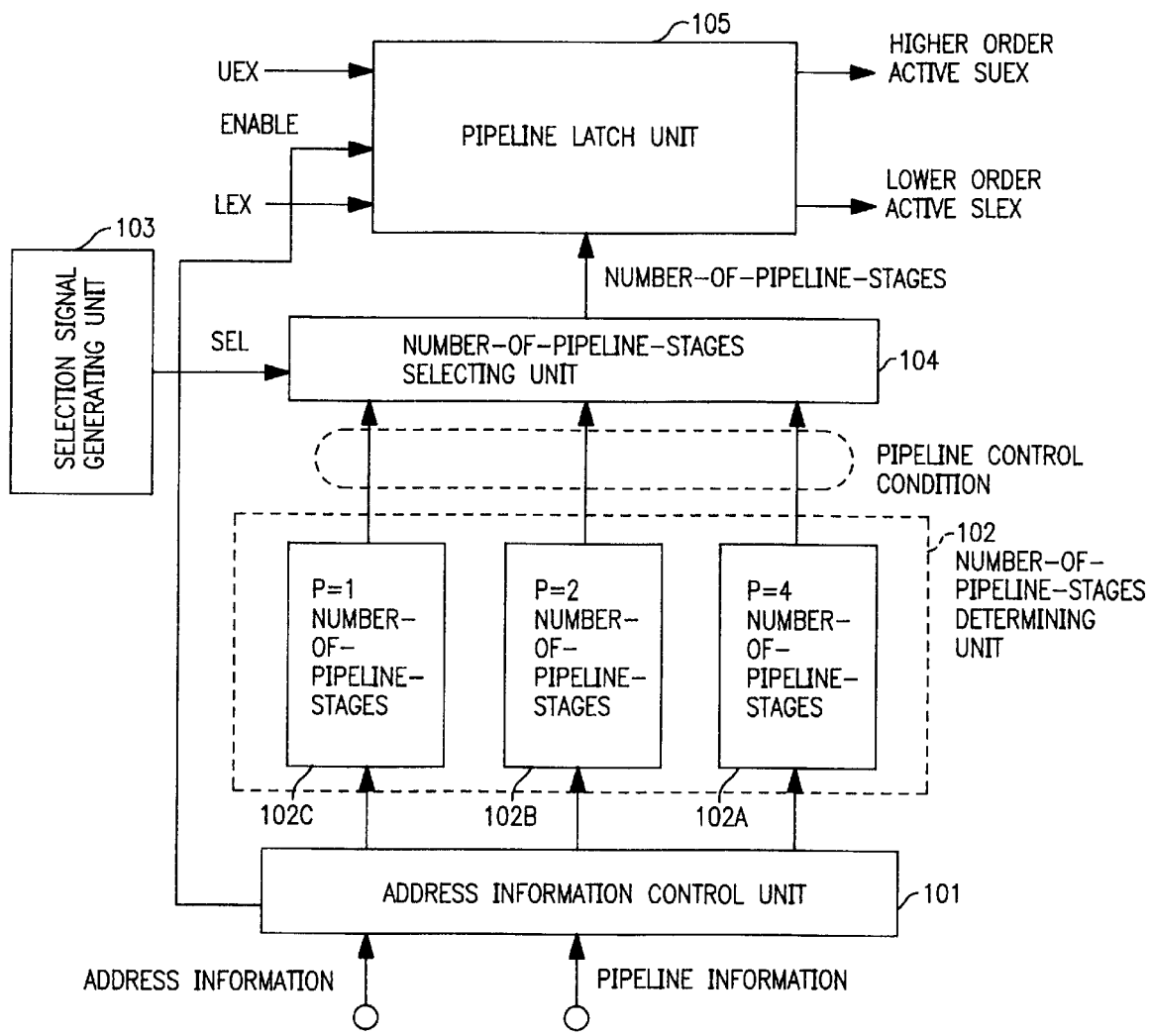
FIG. 42 is a block diagram showing the detailed configuration of the load data control unit according to the first embodiment.

FIG. 42 shows the configuration of the load data control unit according to the first embodiment of the present invention.

Figure 43:
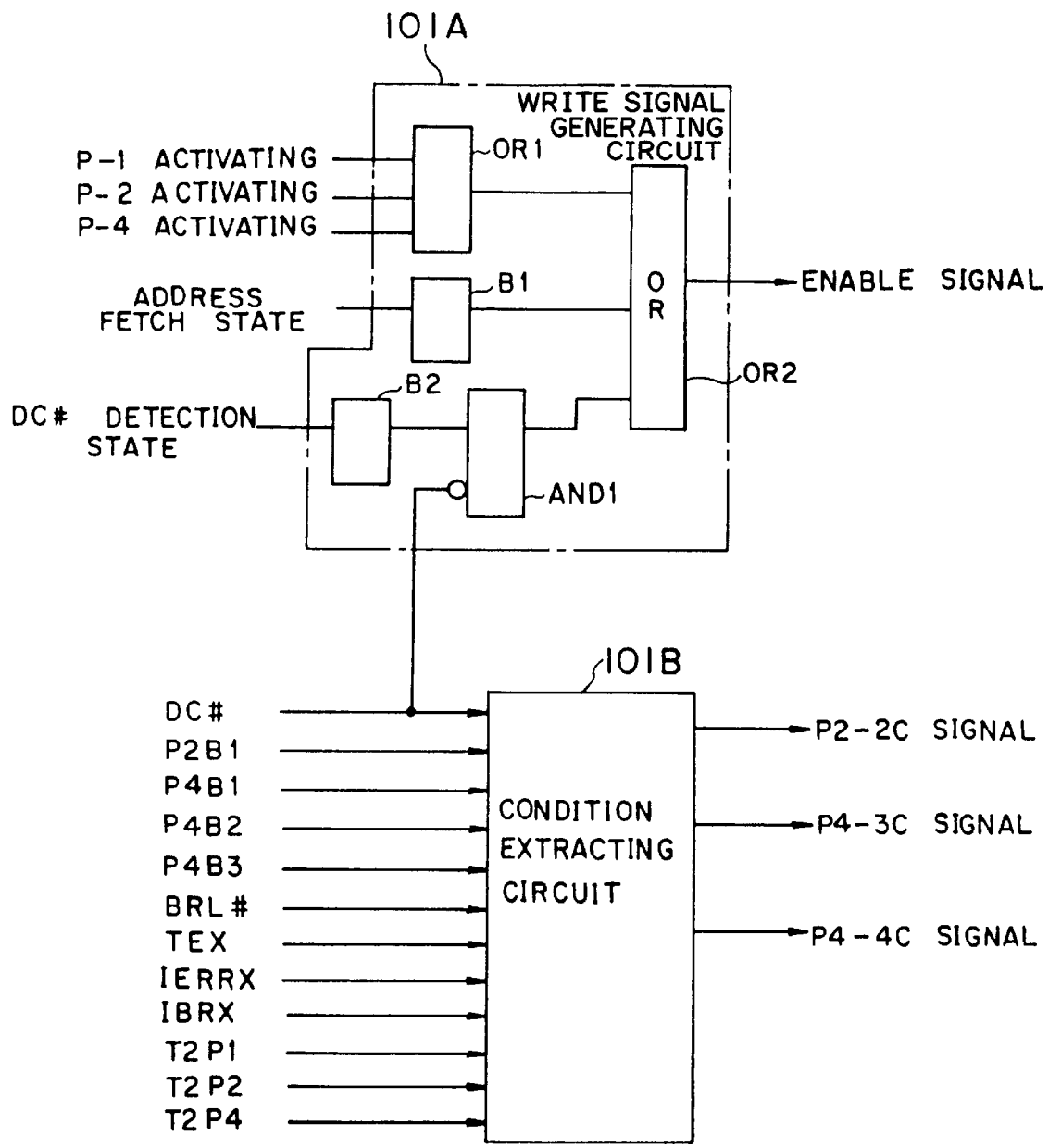
FIG. 43 is a block diagram showing the detailed configuration of the address information control unit according to the first embodiment.
Figure 44:
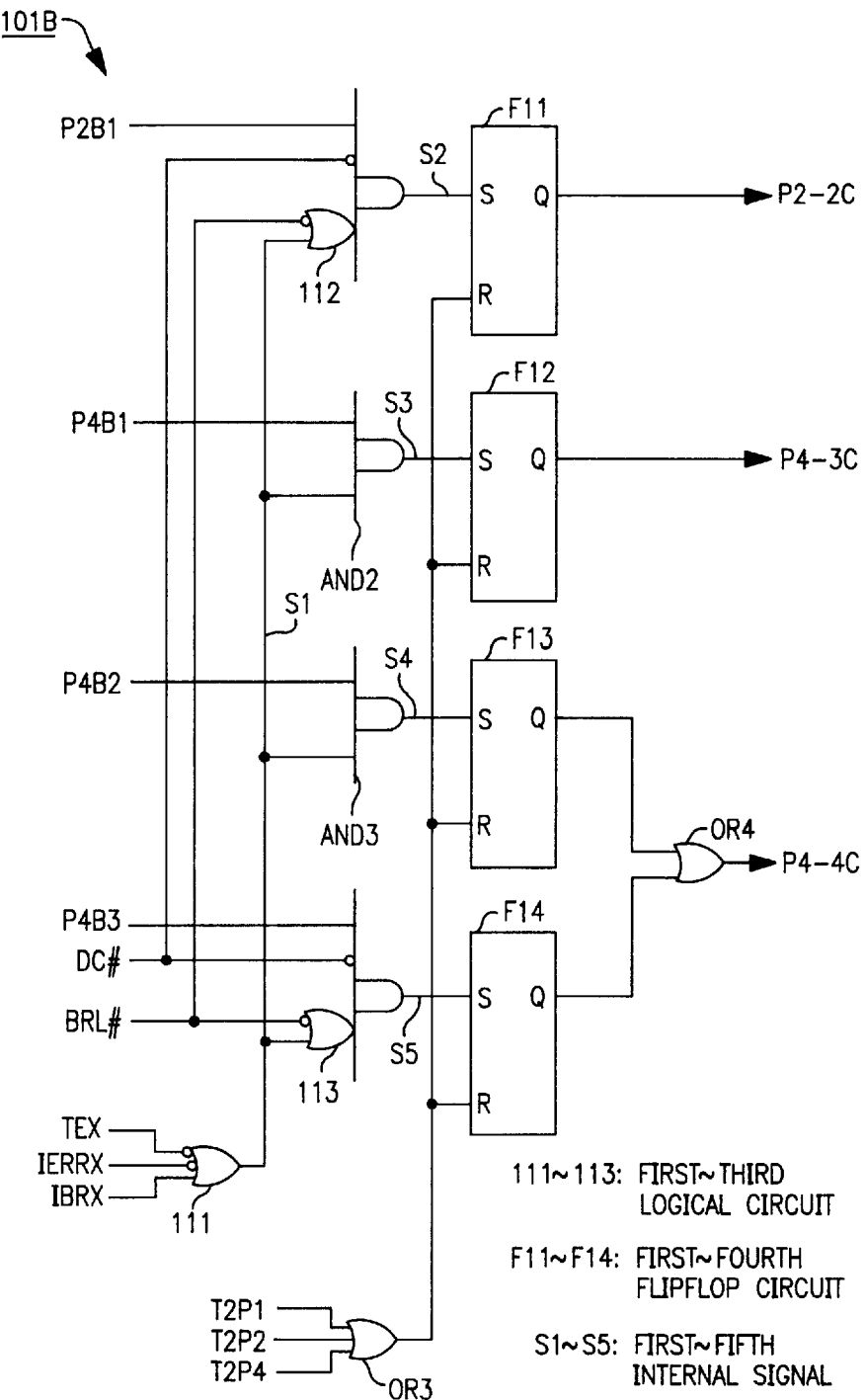
FIG. 44 is a block diagram showing the detailed configuration of the condition extracting circuit according to the first embodiment.
Figure 45:
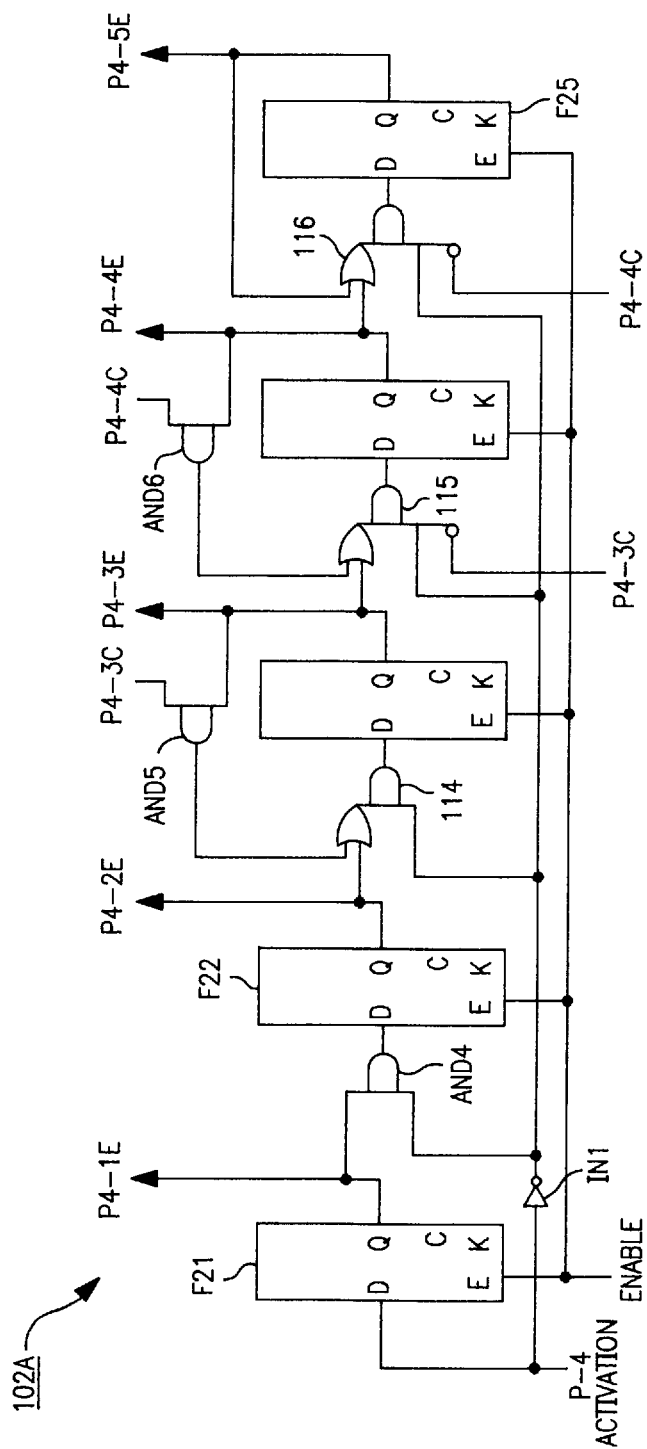
FIG. 45 shows the detailed configuration of the circuit of part the number-of-pipeline stages determining unit according to the first embodiment.
Figure 47:
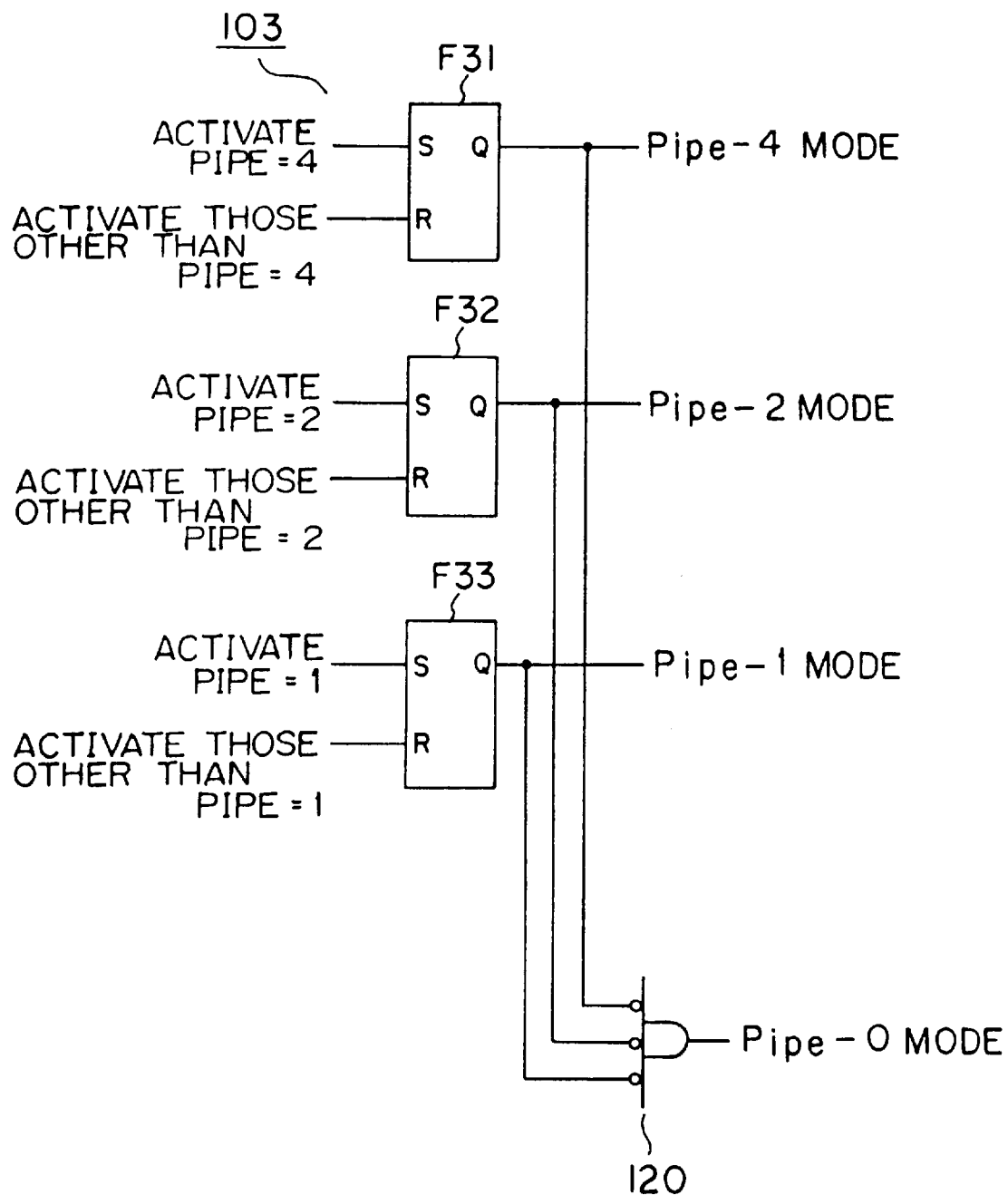
FIG. 47 shows the detailed configuration of the circuit of the selection signal generating unit according to the first embodiment.
Figure 48:
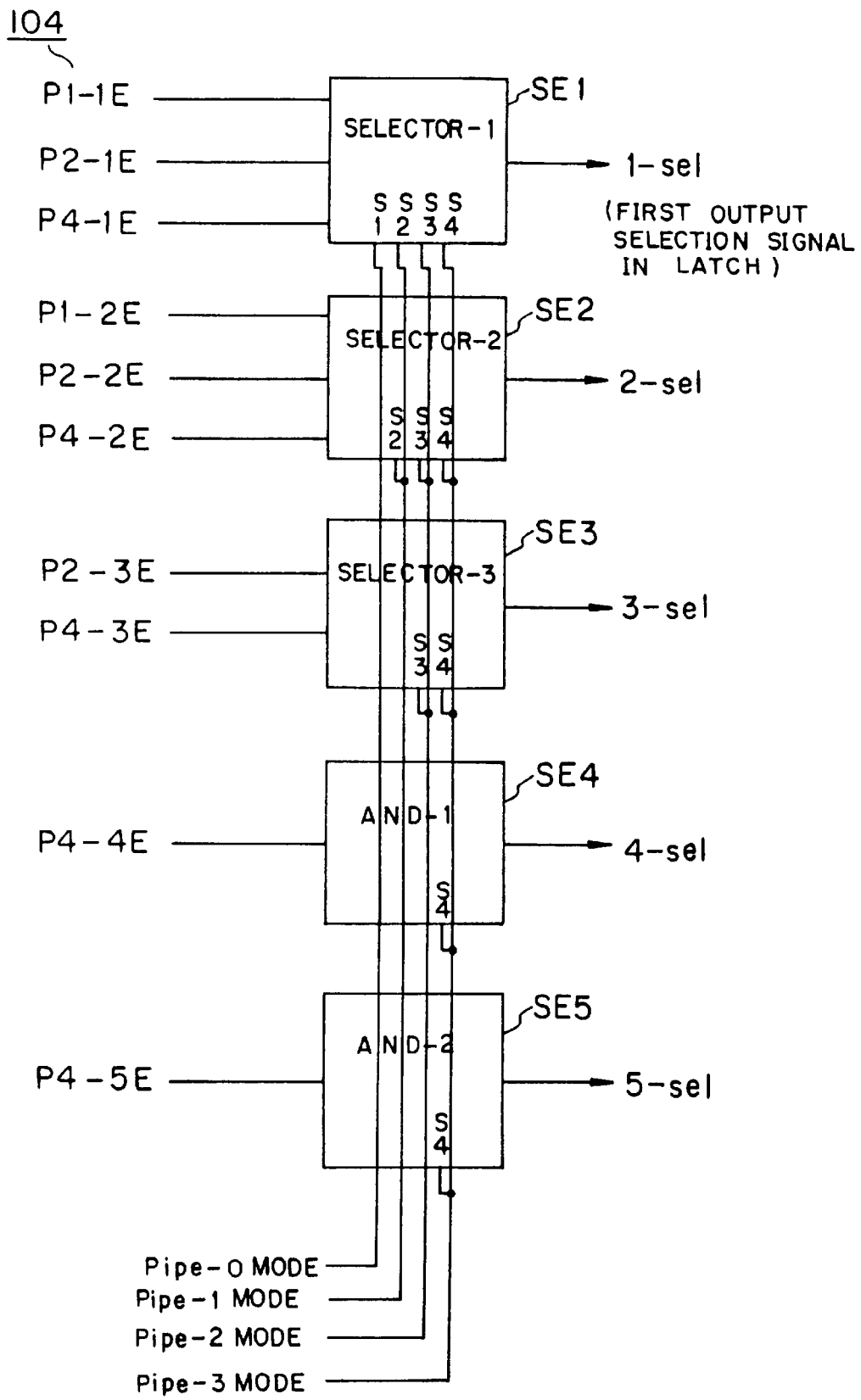
FIG. 48 is a block diagram showing the detailed configuration of the number-of-pipeline stages selecting unit according to the first embodiment.
Figure 49:
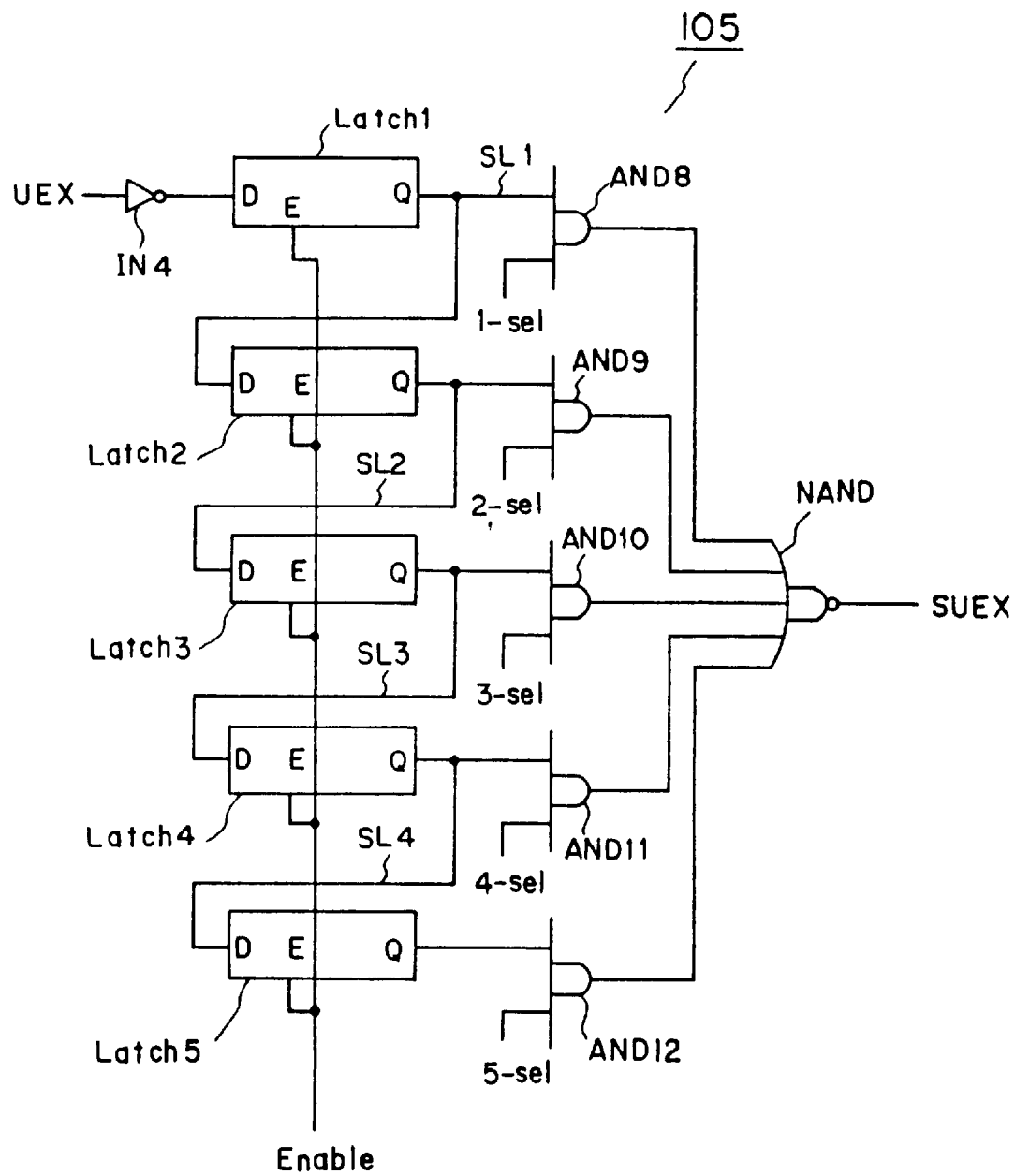
FIG. 49 shows the detailed configuration of the circuit of the pipeline latch unit according to the first embodiment.

FIG. 43 shows the configuration of the address information control unit; FIG. 44 shows the configuration of the condition extracting circuit; FIGS. 45 and 46 show the configuration (1 and 2) of the number-of-stages-of-pipelines determining unit; FIG. 47 shows the configuration of the selection signal generating unit, FIG. 48 shows the configuration of the number-of-stages-of-pipelines selecting unit; and FIG. 49 shows the configuration of the pipeline latch unit.

For example, the load control unit 94 for controlling, after determining valid data in loaded data d1, d2, . . . , the generation of write data D0 through D31 and D32 through D63 and the transmission of the write data D0 through D31 and D32 through D63 to the register 98 comprises an address information control unit 101, a number-of-pipeline-stages determining circuit 102, a selection signal generating unit 103, a number-of-pipeline-stages selecting unit 104, and a pipeline latch unit 105. Address information inputted to the information control unit 101 contains a TLB entry request and a bus cycle request, that is, the information outputted by the address generating unit 92 except the output address information (UEX, LEX). The pipeline control information is a state signal outputted by the timing sequencer 93. The SUEX and the SLEX outputted by the pipeline latch unit 105 are a higher order active signal and a lower order active signal respectively to be issued to the data selector unit 96.

That is, the address information control unit 101 and the number-of-pipeline-stages determining circuit 102 form the condition determining unit 88A and extract the pipeline control conditions according to the address information and the pipeline information. The internal configuration of the information control unit 101 is described in detail by referring to FIG. 43.

The number-of-pipeline-stages determining unit 102 comprises first through third pipeline/bus control units 102A through 102C, and each of the pipeline/bus control units 102A through 102C extract pipeline control conditions, and output them to the number-of-pipeline-stages selecting unit 104. The internal configuration of the number-of-pipeline-stages determining unit 102 is described in detail by referring to FIGS. 45 and 46.

The selection signal generating unit 103 and the number-of-pipeline-stages selecting unit 104 form the number-of-stages selecting unit 88B, and select the number of pipeline stages according to the pipeline selecting conditions comprising a mode signal SEL (hereinafter referred to as a SEL signal) indicating an activated pipeline, and the pipeline control conditions. The selection signal generating unit 103 is described in detail by referring to FIG. 47, and the internal configuration of the number-of-stages selecting unit is described in detail by referring to FIG. 48.

The pipeline latch unit 105 corresponding to the valid data detecting unit 88C, detects the valid position of data D0 through Dn according to the number of pipeline stages, a higher order address valid signal UEX (hereinafter referred to as a UEX signal), a lower order address valid signal LEX (hereinafter referred to as an LEX signal), and a write enable signal (hereinafter referred to as an enable signal), and outputs a higher order active signal SUEX (hereinafter referred to as a SUEX signal) and a lower order active signal SLEX (hereinafter referred to as a SLEX signal) to the data selector unit 96. The internal configuration of the pipeline latch unit 105 is described in detail by referring to FIG. 49.

Next, the configuration of each unit is described in detail. FIG. 43 shows the configuration of the address information control unit according to the first embodiment of the present invention. In FIG. 43, the address information control unit 101 comprises a write signal generating circuit 101A and a condition extracting circuit 101B.

That is, the write signal generating circuit 101A comprises three-input logical sum circuits (OR) 1 and OR2, input buffers B1 and B2, and a two-input logical product circuit AND 1. The three-input logical sum circuit OR1 outputs a signal indicating the result of a three-input logical sum to three-input logical sum circuit) OR2 according to a signal P-1 for activating the number of pipelines=1 as a pipeline control condition (hereinafter referred to as a P-1 activation signal), a signal P-2 for activating the number of pipelines=2 (hereinafter referred to as a P-2 activation signal), and a signal P-3 for activating the number of pipelines=3 (hereinafter referred to as a P-3 activation signal). These activation signals P-1, P-2, and P-3 are applied by the timing sequencer 93.

Input buffer B1 stores a prefetch state signal for addresses A0 though An, which is part of the address information. Input buffer B2 outputs to the two-input logical product circuit AND 1 and DC# detection state signal indicating the state in which a data complete signal DC# (hereinafter referred to as a DC# signal) is to be detected.

The two-input logical product circuit AND 1 outputs to three-input logical sum circuit OR2 a signal of a two-input logical product of a DC# detection state signal (it is an internal signal indicating the internal state of bus access, and is different from a DC# signal applied by a memory. In the present embodiment, a DC# signal is ignored unless it is inputted in the DC# detection state.) and an inverted DC# signal. Three-input logical sum circuit OR2 outputs an enable signal, that is, a signal indicating the three-input logical sum of the above described three signals to the pipeline latch unit 105 and the number-of-stages-of-pipelines determining unit 102, etc.

The condition extracting circuit 101B outputs a P2-2C signal, a P4-3C signal and a P4-4C signal, that is, condition signals for stopping the latching operation during the process performed by a plurality of latches provided in series in the pipeline latch unit 105 for latching output address information (UEX and LEX) according to a DC# signal, various state signals P2B1, P4B1, P4B2, P4B3, T2P1, T2P2, and T2P3, a bus use right release signal BRL# (hereinafter referred to as a BRL# signal), a TLB (translation look-aside buffer) entry request signal TEX (hereinafter referred to as a TEX signal), an internal exception signal IREEX (hereinafter referred to as an IREEX signal), and a bus cycle request signal IBRX (hereinafter referred to as an IBRX signal). Among these signals, those ending with "#" indicate "L" when they are active and are signals received externally, and those ending with "X" are outputted by the address generating unit 92 and form part of the address information. The other signals are part of the pipeline information.

For example, as shown in FIG. 44, the condition extracting circuit 101 B comprises first through third logical circuits 111 through 113, two-input logical product circuits AND2 and AND3, first through fourth flipflop circuits F11 through F14 (hereinafter referred to as first through fourth FF circuits), a three-input logical sum circuit OR3, and a two-input logical sum circuit OR4.

In FIG. 44, first logical circuit 111 outputs the first internal signal S1 to two-input logical product circuits AND2 and AND3, and second and third logical circuits 112 and 113 according to a TEX signal, an IREEX signal, and an IBRX signal. Second logical circuit 112 outputs the second internal signal S2 to first FF circuit F11 according to a state signal P2B1 (hereinafter referred to as P2B1 signal), an inverted DC# signal, a BRL# signal, and the first internal signal S1.

Two-input logical product circuit AND2 outputs the third internal signal S3 to second FF Circuit F12 according to a state signal P4B1 (hereinafter referred to as a P4B1 signal)

and the first internal signal S1. Two-input logical product circuit AND3 outputs the fourth internal signal S4 to third FF circuit F13 according to a state signal P4B2 (hereinafter referred to as a P4B2 signal) and the first internal signal S2.

Third logical circuit 113 outputs the fifth internal signal S5 to fourth FF circuit F14 according to a state signal P4B3 (hereinafter referred to as a P4B3 signal), an inverted DC# signal, a BRL# signal, and the first internal signal S1.

The three-input logical sum circuit OR3 outputs a signal indicating the three-input logical sum of state signals T2P1, T2P2, and T2P4 (hereinafter referred to as a T2P1 signal, a T2P2 signal, and a T2P4 signal respectively) to first through fourth FF circuits F11 through F14.

First through fourth FF circuits F11 through F14 use a result signal outputted by the three-input logical sum circuit OR3 as a reset clock, and output the second through fifth internal signals S2 through S5. For example, first FF circuits F11 outputs to the number-of-states-pipelines determining unit 102 a condition signal P2-2C (hereinafter referred to as a P2-2C signal) for stopping the latch at the second step when the number of pipeline stages=2 according to the second internal signal S2.

Second FF circuit F12 outputs to the number-of-stages-of-pipelines determining unit 102 a condition signal P4-3C (hereinafter referred to as a P4-3C signal) for stopping the latch at the third step when the number of pipeline stages=4 according to the third internal signal S3.

Third FF circuit F13, fourth FF circuit F14, and the two-input logical sum circuit OR4 output to the number-of-stages-of-pipelines determining unit 102 a signal indicating the two-input logical sum of the fourth and the fifth internal signals S4 and S5 as a condition signal P4-3C (hereinafter referred to as a P4-3C signal). The P4-4C signal is a condition signal and stops the latch at the fourth step when the number of pipelines=4.

Figure 46A:
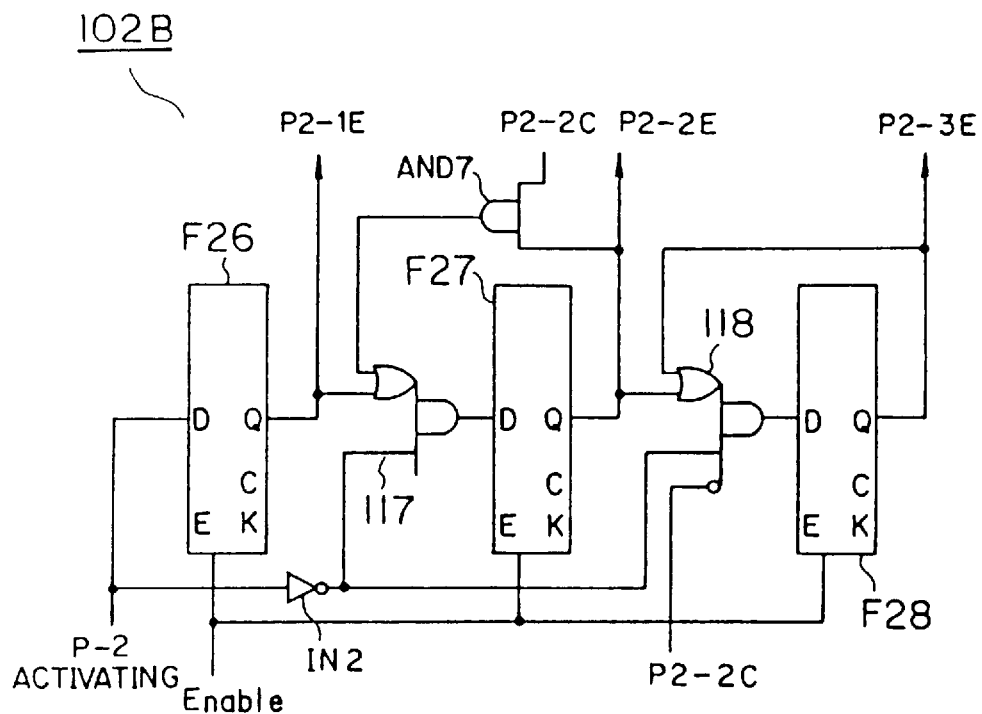
FIG. 46 shows the detailed configuration of the circuit of the remaining parts the number-of-pipeline stages determining unit according to the first embodiment not shown in FIG. 45.
Figure 46B:
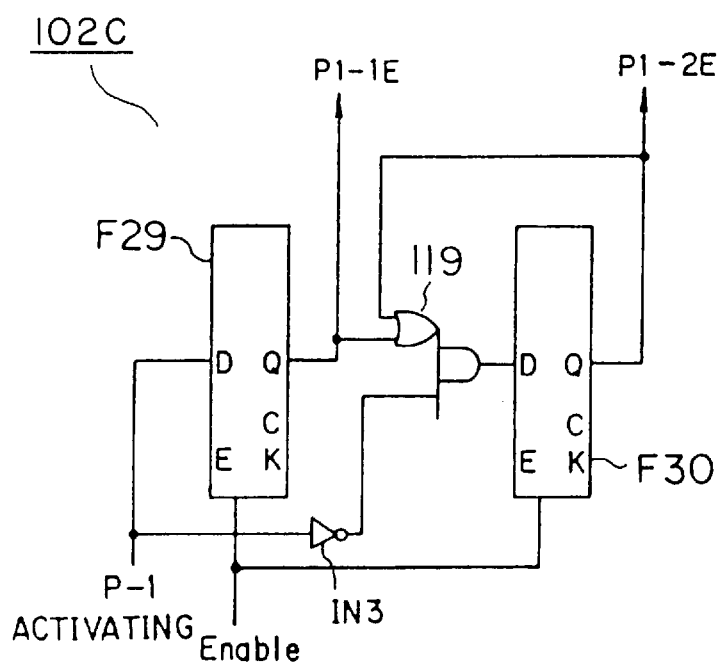

FIGS. 45 and 46A–B show the configuration (1 and 2) of the number-of-stages-of-pipelines determining unit according to the first embodiment of the present invention. FIG. 45 shows the configuration of first pipeline/bus control unit 102A.

As shown in FIG. 42, the number-of-stages-of-pipelines determining unit comprises first through third pipeline/bus control units 102A through 102C, and outputs as a pipeline control condition a stop control signal indicating in which step the latching operation by a plurality of latches in the pipeline latch unit 105 should be stopped. For example, if the number of pipeline stages=4 and the latching operation is stopped at the third step, then the latch of the address information is controlled to loop at the third step, not to involve the fourth and following steps as shown by referring to FIG. 49. That is, as shown in FIG. 45, the control units operate so that a signal P4-3E is outputted repeatedly.

In FIG. 45, when the number of pipeline stages=4 is selected, first pipeline/bus control unit 102A for determining the step in which the latching operation is to be stopped comprises first through fifth flipflop circuits (hereinafter referred to as first through fifth FF circuits F21 through F25) F21 through F25, an inverter IN1, two-input logical product circuits AND4 through AND6, and first through third logical circuits 114 through 116.

That is, first FF circuit F21 outputs to the number-of-stages-of-pipelines selecting unit 104 a signal P4-1E for stopping the latch at the first step when the number of pipeline stages=4 (hereinafter referred to as a P4-1E signal) according to a pipeline=4 activation signal P-4 activation (hereinafter referred to as a pipe 4 signal) and an enable signal.

Second FF circuit F22 outputs to the number-of-stages-of-pipelines 104 a signal P4-2E for stopping the latch at the second step when the number of pipeline stages=4 (hereinafter referred to as a P4-2E signal) according to an enable signal and a signal indicating the result obtained by processing the above described P4-1E signal and a pipe 4 signal inverted by inverter IN1 by two-input logical product circuit AND4 and.

Third FF circuit F23 outputs to the number-of-stages-of-pipelines selecting unit 104 a signal P4-3E (hereinafter referred to as a P4-3E signal) for stopping the latch at the third step when the number of pipeline stages=4 according to an enable signal and a signal obtained by processing by first logical circuit 114 the above described P4-2E signal, a pipe 4 signal inverted by inverter IN1, and a signal processed by two-input logical product circuit AND5. Two-input logical product circuit AND5 outputs to first logical circuit 114 a signal indicating a two-input logical sum of the P4-3E signal and the P4-3C signal.

Fourth FF circuit F24 outputs to the number-of-stages-of-pipelines selecting unit 104 a signal P4-4E (hereinafter referred to as a P4-4E signal) for stopping the latch at the fourth step when the number of pipeline stages=4 according to an enable signal and a signal obtained by processing by second logical circuit 115 the above described P4-3E signal, a pipe 4 signal inverted by inverter IN1, and a signal processed by two-input logical product circuit AND6. Two-input logical product circuit AND6 outputs to second logical circuit 115 a signal indicating a two-input logical sum of the P4-4E signal and the P4-4C signal.

Fifth FF circuit F25 outputs to the number-of-stages-of-pipelines selecting unit 104 a signal P4-5E signal (hereinafter referred to as a P4-5E signal) for stopping the latch at the fifth step when the number of pipeline stages=4 according to an enable signal and a signal obtained by processing by third logical circuit 116 the above described P4-4E signal, a P4-4C signal, a pipe 4 signal inverted by inverter IN1 and an output signal P4-5E of FF circuit F25.

FIGS. 46A and 46B show the configuration (2) of the number-of-stages-of-pipelines determining unit according to the first embodiment of the present invention. FIG. 46A shows the configuration of the second pipeline/bus control unit 102B.

In FIG. 46A, the second pipeline/bus control unit 102B for determining the step in which the latching operation is to be stopped when the number of stages of pipeline=2 comprises sixth through eighth flipflop circuits (hereinafter referred to as sixth through eighth FF circuits) F26 through F28, inverter IN2, two-input logical product circuit AND7, and fourth and fifth logical circuits 117 and 118.

That is, sixth FF circuit F26 outputs to the number-of-stages-of-pipeline selecting unit 104 a signal P2-1 E for stopping the latch at the first step when the number of pipeline stages=2 according to an enable signal and a pipeline=2 activation signal P-2 activation (hereinafter referred to as a pipe 1 signal).

Seventh FF circuit F27 outputs to the number-of-stages-of-pipelines selecting unit 104 a signal P2-2E (hereinafter referred to as a P2-2E signal) for stopping the latch at the second step when the number of pipeline stages=2 according to an enable signal and a signal obtained by processing by fourth logical circuit 117 the above described P2-1 E signal, a pipe 4 signal inverted by inverter IN2, and a signal processed by two-input logical product circuit AND7. Two-input logical product circuit AND7 outputs to fourth logical circuit 117 a signal indicating a two-input logical sum of the P2-2E signal and the P2-2C signal.

Eighth FF circuit F28 outputs to the number-of-stages-of-pipelines selecting unit 104 a signal P2-3E signal (hereinafter referred to as a P2-3E signal) for stopping the latch at the third step when the number of pipeline stages=2 according to an enable signal and a signal obtained by processing by fifth logical circuit 118 the above described P2-2E signal, a P2-2C signal, a pipe 2 signal inverted by inverter IN2 and an output signal P2-3E of FF circuit F28.

FIG. 46B shows the configuration of third pipeline/bus control unit 102C. In FIG. 46B, third pipeline/bus control unit 102 for determining the step in which the latching operation is to be stopped when the number of pipeline stages=1 is selected comprises ninth and tenth flipflop circuits (hereinafter referred to as ninth and tenth FF circuits respectively) F29 and F30, inverter IN3, and sixth logical circuit 119.

That is, ninth FF circuit F29 outputs to the number-of-stages-of-pipelines selecting unit 104 a signal P1-1E (hereinafter referred to as a P1-1E signal) for stopping the latch at the first step when the number of pipeline stages=1 according to a pipeline-1 activation signal P-1 activation (hereinafter referred to as a pipe 1 signal) and an enable signal.

Tenth FF circuit F30 outputs to the number-of-stages-of-pipelines selecting unit 104 a signal P1-2E for stopping the latch at the second step when the number of pipeline stages=1 (hereinafter referred to as a P1-2E signal) according to an enable signal and a signal obtained by processing by sixth logical sum circuit 119 the above described P1-1 E signal, a pipe 1 signal inverted by inverter IN3, and an output signal P1-2E of FF circuit F30.

FIG. 47 shows the configuration of the selection signal generating unit according to the first embodiment of the present invention. In FIG. 47, the selection signal generating unit 103 for outputting a pipe mode signal SEL indicating the activated pipeline comprises first through third flipflop circuits (hereinafter referred to as first through third FF circuits) F31 through F33, and a logical circuit 120.

That is, first FF circuit F31 outputs to the number-of-stages-of-pipelines selection unit 104 a mode signal pipe-4 indicating the transfer to the four pipeline mode (hereinafter referred to as a pipe-4 mode signal) after setting the pipe 4 signal to a set pulse and activation signals other than the pipe 4 signal to a reset pulse.

Second FF circuit outputs to the number-of-stages-of-pipelines selection unit 104 a mode signal pipe-2 indicating the transfer to the two pipeline mode (hereinafter referred to as a pipe-2 mode signal) after setting the pipe 2 signal to a set pulse and activation signals other than the pipe 2 signal to a reset pulse.

Third FF circuit F33 outputs to the number-of-stages-of-pipelines selection unit 104 a mode signal pipe-1 indicating the transfer to the one pipeline mode (hereinafter referred to as a pipe-1 mode signal) after setting the pipe 1 signal to a set pulse and activation signals other than the pipe 1 signal to a reset pulse.

The logical circuit 120 outputs a mode signal pipe-0 indicating any mode other than the pipeline mode (hereinafter referred to as a pipe-0 mode signal) according to a signal indicating a three-input logical product of the inverted values of a pipe-4 mode signal, a pipe-2 mode signal, and a pipe-1 mode signal. The pipe-4, pipe-2, pipe-1, and pipe-0 mode signals form a SEL signal indicating a pipeline selection condition.

FIG. 48 shows the configuration of the number-of-stages-of-pipelines selecting unit according to the first embodiment of the present invention. In FIG. 48, the number-of-stages-of-pipelines selecting unit for selecting a pipeline comprises first through fifth selector circuits SE1 through SE5.

That is, first selector circuit SE1 outputs a signal 1-SE for controlling the output of the contents of the first latch to the pipeline latch unit 105 (hereinafter referred to as a latch 1-SEL signal) according to a pipe-4 mode signal, a pipe-2 mode signal, a pipe-1 mode signal, a pipe-0 mode signal, a P1-1E signal, a P2-1E signal, and a P4-1E signal.

Second selector circuit SE2 outputs a signal 2-SE for controlling the output of the contents of the second latch to the pipeline latch unit 105 (hereinafter referred to as a latch 2-SEL signal) according to a pipe-4 mode signal, a pipe-2 mode signal, and a pipe-1 mode signal, a P1-2E signal, a P2-2E signal, and a P4-2E signal.

Third selector Circuit SE3 outputs a signal 3-SE for controlling the output of the contents of the third latch to the pipeline latch unit 105 (hereinafter referred to as a latch 3-SEL signal) according to a pipe-4 mode signal, a pipe-2 mode signal, a P2-3E signal, and a P4-3E signal.

Fourth selector Circuit SE4 outputs a signal 4-SE for controlling the output of the contents of the fourth latch to the pipeline latch unit 105 (hereinafter referred to as a latch 4-SEL signal) according to a pipe-4 mode signal and a P4-4E signal.

Fifth selector Circuit SE5 outputs a signal 5-SE for controlling the output of the contents of the fifth latch to the pipeline latch unit 105 (hereinafter referred to as a latch 5-SEL signal) according to a pipe-4 mode signal and a P4-5E signal).

FIG. 49 shows the configuration of the pipeline latch unit according to the first embodiment of the present invention. For example, the pipeline latch unit 105 for outputting a SUEX signal indicating that higher order bits are active, comprises first through fifth latch circuits latches 1 through 5 (hereinafter referred to as latches 1 through 5), inverter IN4, two-input logical product circuit AND8 through AND10, and a five-input negative logical product circuit NAND.

That is, first latch 1 latches according to an enable signal a signal obtained by inverting by inverter IN4 a UEX signal indicating that a higher order address is valid, and outputs first delay signal SL1 to second latch 2 and two-input logical product circuit AND8.

Second latch 2 latches first delay signal SL1 according to an enable signal, and outputs second delay signal SL2 to third latch 3 and two-input logical product circuit AND9. Third latch 3 latches second delay signal SL2 according to an enable signal, and outputs third delay signal SL3 to fourth latch 4 and two-input logical product circuit AND10. Fourth latch 4 latches third delay signal SL3 according to an enable signal, and outputs fourth delay signal SL4 to fifth latch 5 and two-input logical product circuit AND11. Fifth latch 5 latches fourth delay signal SL4 according to an enable signal, and outputs fifth delay signal SL5 to two-input logical product circuit AND12.

Two-input logical product circuit AND8 outputs to the five-input negative logical product circuit NAND a signal indicating a two-input logical product of the latch 1-SEL signal outputted by the number-of-stages-of-pipelines selecting unit 104 and first delay signal SL1.

Likewise, two-input logical product circuit AND9 outputs to the five-input negative logical product circuit NAND a signal indicating a two-input logical product of the latch 2-SEL signal and second delay signal SL2. Two-input logical product circuit AND10 outputs to the five-input negative logical product circuit NAND a signal indicating a two-input logical product of the latch 3-SEL signal and third delay signal SL3.

Two-input logical product circuit AND11 outputs to the five-input negative logical product circuit NAND a signal indicating a two-input logical product of the latch 4-SEL signal and fourth delay signal SL4. Two-input logical product circuit AND12 outputs to the five-input negative logical product circuit NAND a signal indicating a two-input logical product of the latch 5-SEL signal and fifth delay signal SL5.

The five-input negative logical product circuit NAND outputs to a data selector unit 106 a signal indicating five-input negative logic of various result signals as a SUEX signal indicating that higher order bits are active. The SUEX signal is used for determining the valid position of data applied through a pipeline bus. For example it indicates whether or not 32 higher bits in 64-bit data are valid.

An SLEX signal indicating that lower order bits are active can be outputted based on the above described configuration.

Thus, the memory accessing device according to the first embodiment of the present invention is provided with the load data control unit 94 comprising the address information control unit 101, the number-of-stages-of-pipelines determining unit 102, the selection signal generating unit 103, the number-of-stages-of-pipelines selecting unit 104, and the pipeline latch unit 105, as shown in FIGS. 40 through 49, so that prefetched addressed are correctly associated with data D0 through D31 involved in memory access.

For example, if the data bus width is not equal to the transmission data size, the addresses prefetched as involved in reading data D0 through D63 in the main storage unit (memory access) are transmitted to the main storage unit 85 though an address pipeline bus.

At this time, as shown in FIG. 39B, the pipeline control conditions are determined by the address information control unit 101 and the number-of-stages-of-pipelines determining unit 102 of the load data control unit 94 according to the output address information processed at the timing of the prefetched addresses and the address information such as internal exceptions, TLB entry requests, bus use right release, etc. The number of pipeline stages is selected by the number-of-stages-of-pipelines 104 according to the pipeline control conditions and the pipeline selection conditions.

The valid position of data D0 through D63 is detected by the pipeline latch unit 105 according to the number of pipeline stages. Then, valid data in load data D0 through D63 read from the main storage unit 85 can be correctly stored in the register 98 by controlling the register 98, as being divided to a higher order bit group and a lower order bit group, of the memory accessing device.

Therefore, even if different cycles such as cycles in which only addresses are outputted, cycles in which addresses are converted according to a DC# signal and read data are inputted, and cycles in which only read data are inputted coexist, even if the data bus width is not equal to the data size, or even if external factors such as the number of times of bus accessing operations, internal exceptions, TLB entries, bus use right release requests, etc. necessarily stop a bus access with insufficient number of pipeline stages, outputted addresses can be correctly associated with load data by limiting the number of pipeline stages by operating in a loop a signal in the pipeline latch unit 105.

Thus, inputted data d1, d2, . . . can be easily associated with address information a1, a2, . . . indicating valid data. Load data (output data) D0 through D63 to be transmitted to the bank selector bus 98D can be generated by selecting input data d1, d2, . . . according to SUEX and SLEX signals as selection signals 2-ISEL of the data selector unit 96 shown in FIG. 40.

FIG. 50 shows the correlation among selection signals SUEX and SLEX, and output data in the load pipe unit 97.

Next, the data processing method according to the first embodiment of the present invention is explained below by referring to the practical operations of the memory accessing device.

FIGS. 51 through 57 are operational time charts of the memory accessing device according to the first embodiment of the present invention. They are the time charts where the number of pipeline stages=4. For example, if 32-bit prefetched addresses-A0 through A31 involved in memory access are transmitted in the address pipeline process, the prefetched addresses are associated with data D0 through D63 based on the reset process (the reset of three flipflops F31 through F33 shown in FIG. 47) performed for the address pipelines.

Figure 51:
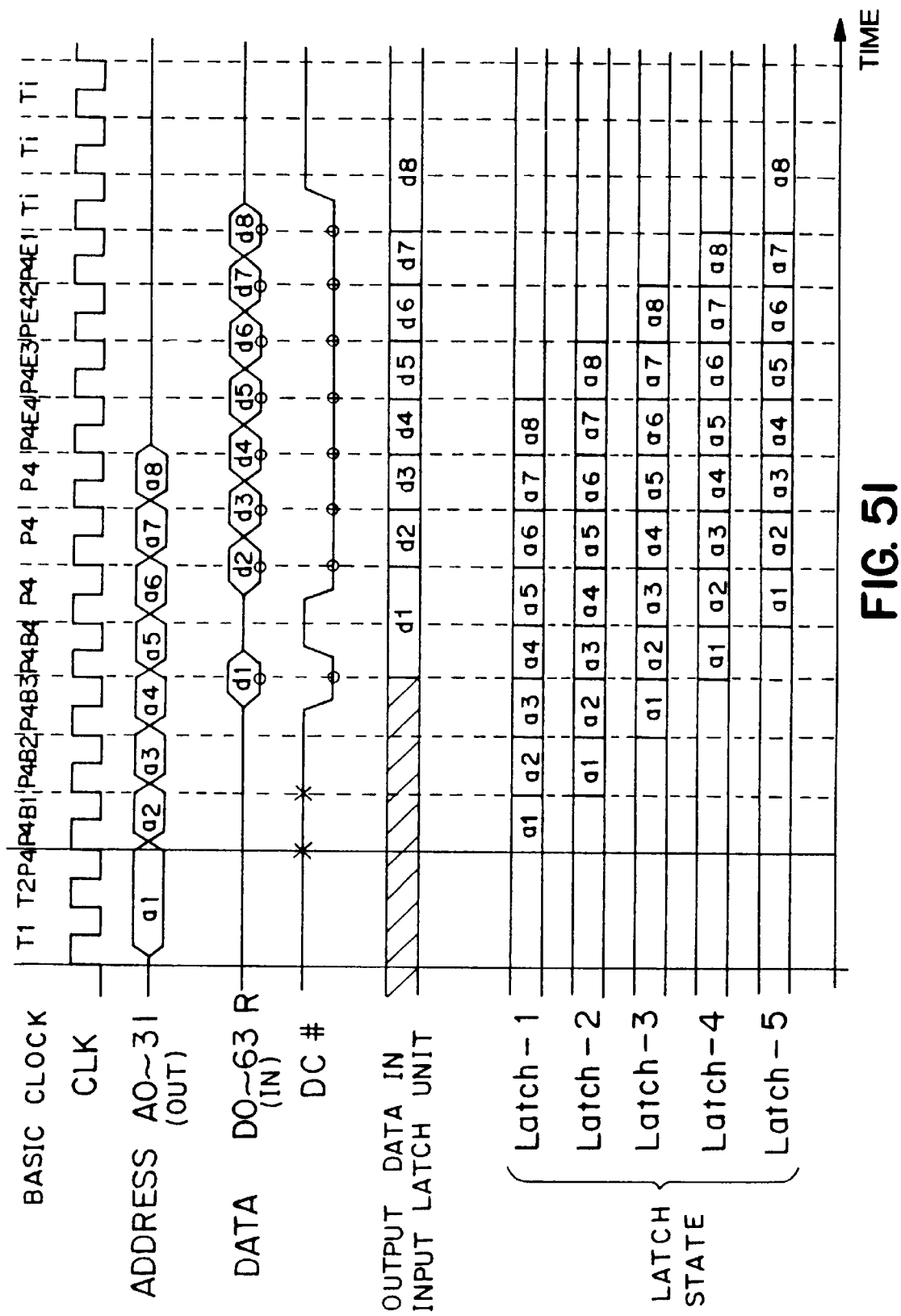
FIG. 51 is a time chart (1) for explaining the operation of the memory accessing device according to the first embodiment.

FIG. 51 is a typical time chart, that is a time chart used in the standard pipeline mode where the number of pieces of data is larger than the number of pipeline stages without wait. The number of pieces of data is eight, and the memory is operated at a 4-clock timing. Accordingly, data are applied four clocks after addresses are prefetched. The standard pipeline mode means an access mode where three different cycles coexist and operate in the same process, that is, cycles in which only addresses are outputted, cycles in which addresses are outputted and data are inputted and cycles in which only data are inputted.

Figure 52:
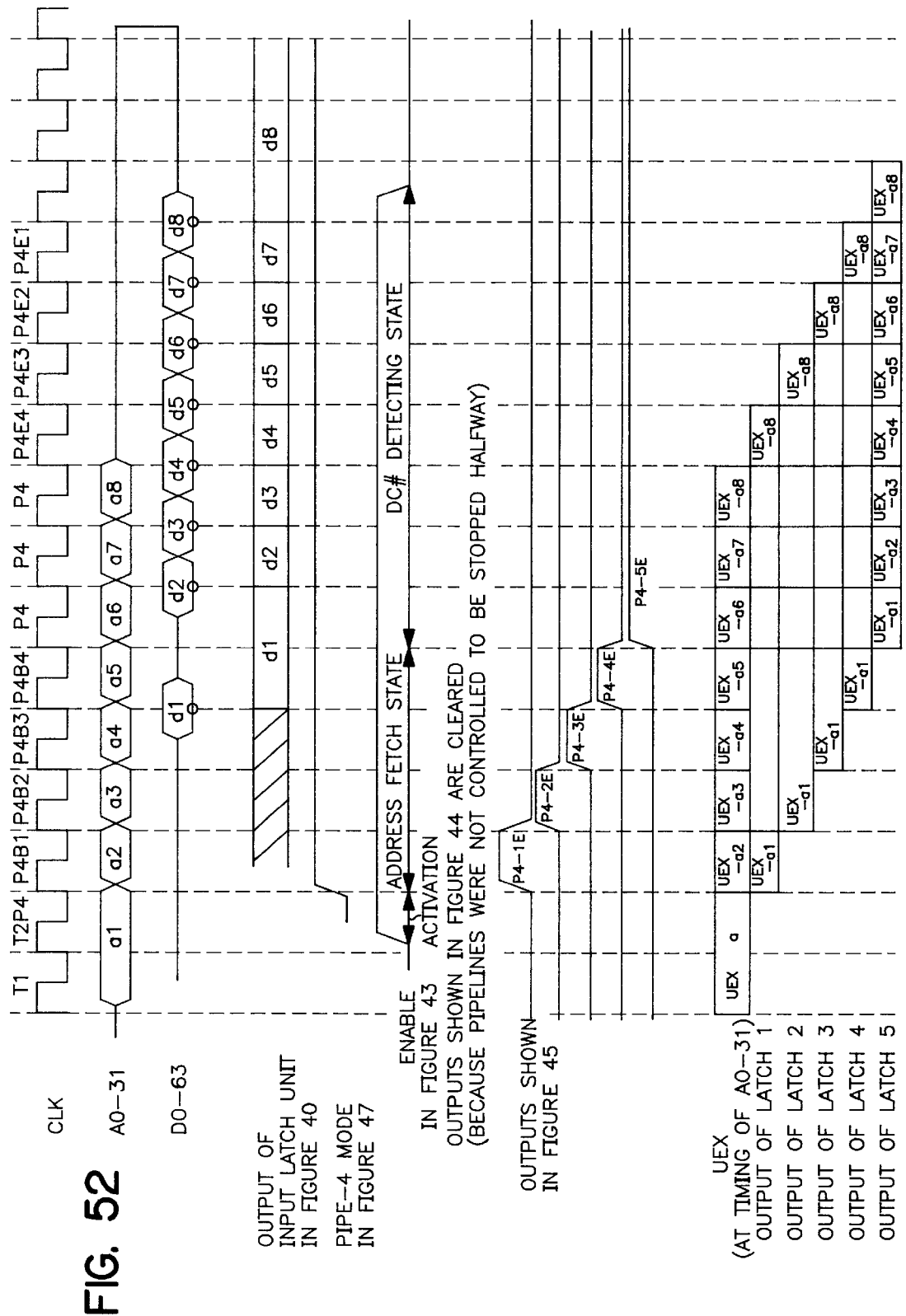
FIG. 52 is a time chart (1) for explaining the detailed operation of each unit according to the first embodiment shown in FIG. 51.
Figure 53:
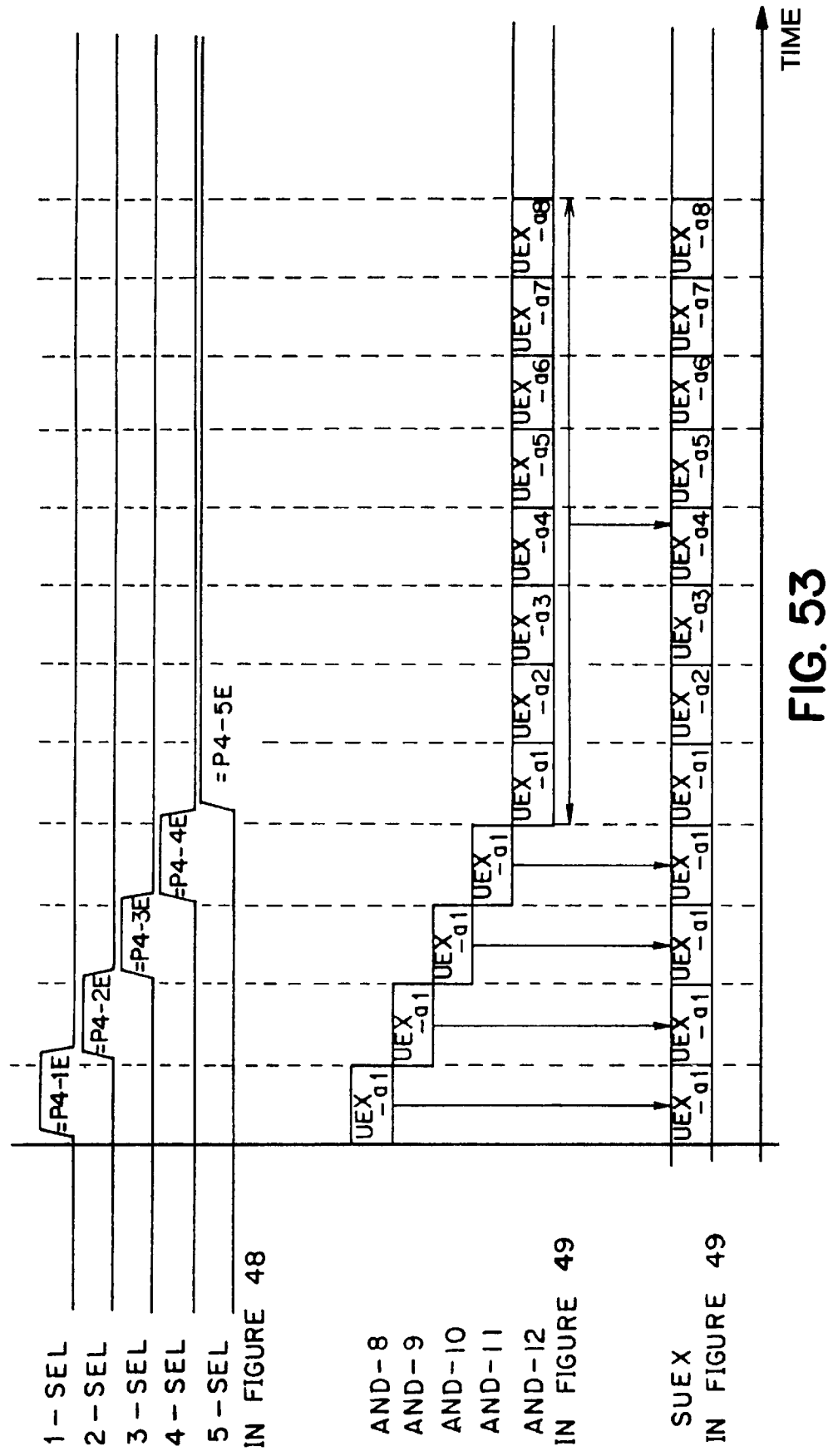
FIG. 53 is a time chart (2) for explaining the detailed operation of each unit according to the first embodiment shown in FIG. 51.

FIGS. 52 and 53 are the detailed time charts showing the operation of each unit of the first embodiment associated with the time chart shown in FIG. 51. In FIG. 52, since the number of pipeline stages is four, the pipe-4 mode is selected as shown in FIG. 47. One clock before the selection of the mode, a P-4 activation signal is applied to the write signal generating circuit 101A in the address information control unit shown in FIG. 43, making an enable signal indicate the active status. The active state is maintained until the last data d8 are inputted. In this state, the address prefetch state is maintained while addresses a2 through a5 are outputted, and the DC# detection state is maintained after address a6 has been outputted.

In FIG. 51, pipelines are not stopped during the process. Therefore, outputs P2-2C through P4-4C of the condition extracting circuit shown in FIG. 44 are all zero. Accordingly, in FIG. 45, after a P-4 activation signal has been inputted and an enable signal has indicated the active state, the outputs of flipflops F21 through F25 indicate "H" at each clock. After address a6 has been outputted, the output of F25, that is, P4-5E is retained at the "H" level. A P-4 activation signal not shown in FIG. 45 indicates "H" in the second clock period during the output of address a1. Afterwards, it indicates "L", and the output of inverter IN1 indicates constant "H" after the clock period in which address a2 is outputted.

In FIG. 49, if higher order address valid signals VEX-a1 through VEX-a8 respectively corresponding to addresses a1 through a8 are inputted at the timing of the input of addresses, and if the pipeline mode is entered, and if an enable signal indicates the active state, then the contents of the storage are sequentially latched at each clock from latch 1 to latch 5. For example, the contents of latch 5 represent a higher order address valid signal for address a1 at the output of address a6, and represent a higher order address valid signal for address a8 at the input of data d8.

FIG. 53 following FIG. 52 is a time chart indicating the detailed operation of each unit associated with the timing chart shown in FIG. 51. At the output of the number-of-stages-of-pipelines shown in FIG. 45, signals P4-1E through P4-5E are outputted by selectors SE1 through SE5 respectively in the number-of-stages-of-pipelines shown in FIG. 48. These signals are assigned to five AND circuits AND8 through AND12. At the input of these signals, AND8 through AND12 output the contents of latches 1 through 5. As a result, a higher order address valid signal for address a1 is outputted until data d1 are outputted by the input latch unit as an output SUEX of a NAND as shown in FIG. 51. Afterwards, higher order address valid signals for addresses a2 through a8 corresponding to the output data of the input latch unit are sequentially outputted at each clock.

Figure 54:
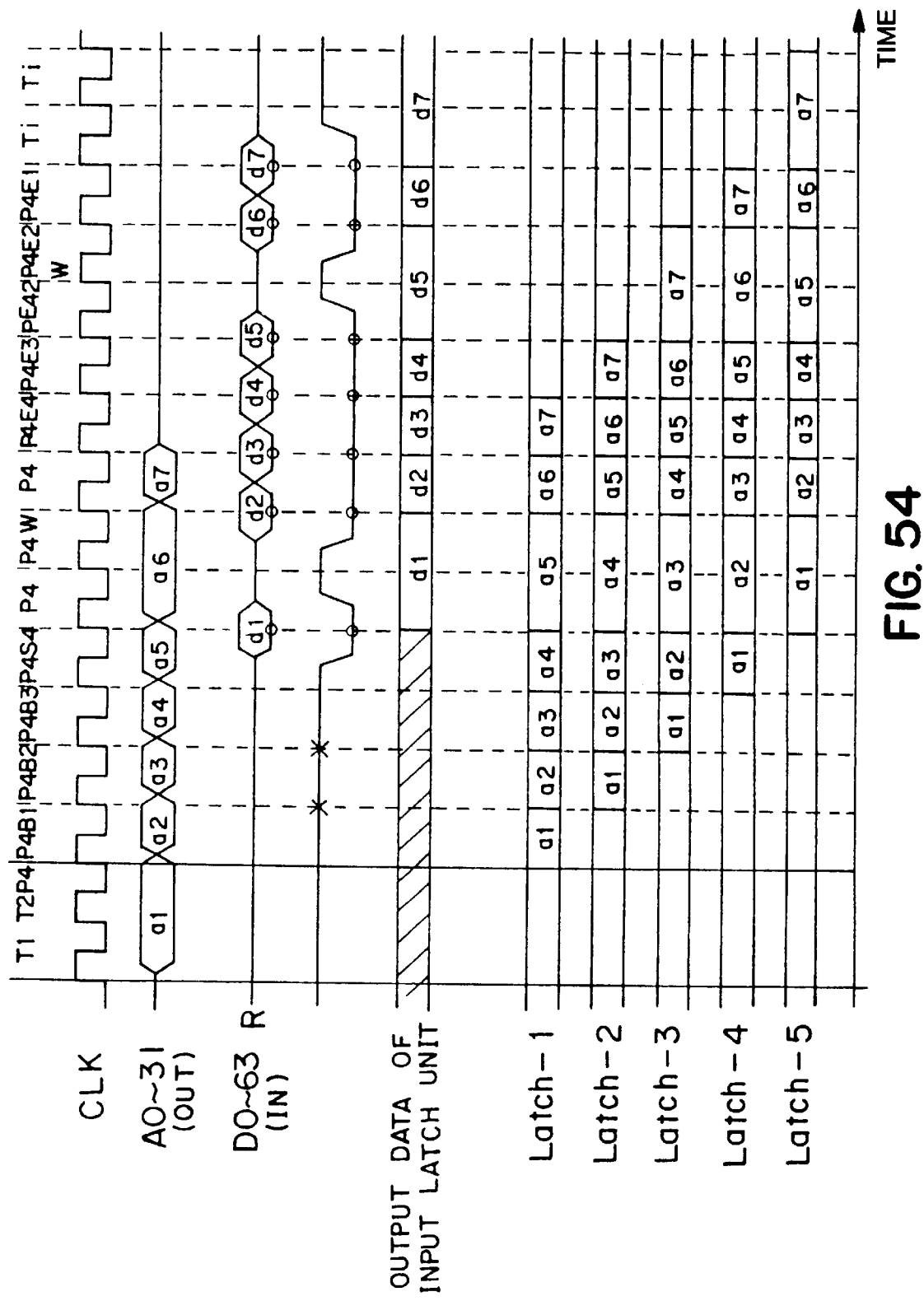
FIG. 54 is a time chart (2) for explaining the operation of the memory accessing device according to the first embodiment.

FIG. 54 is an operational time chart (2) according to the first embodiment of the present invention. It is different from FIG. 51 in that its memory is operated at a 5-clock timing, and that 1 wait is embedded.

Figure 55:
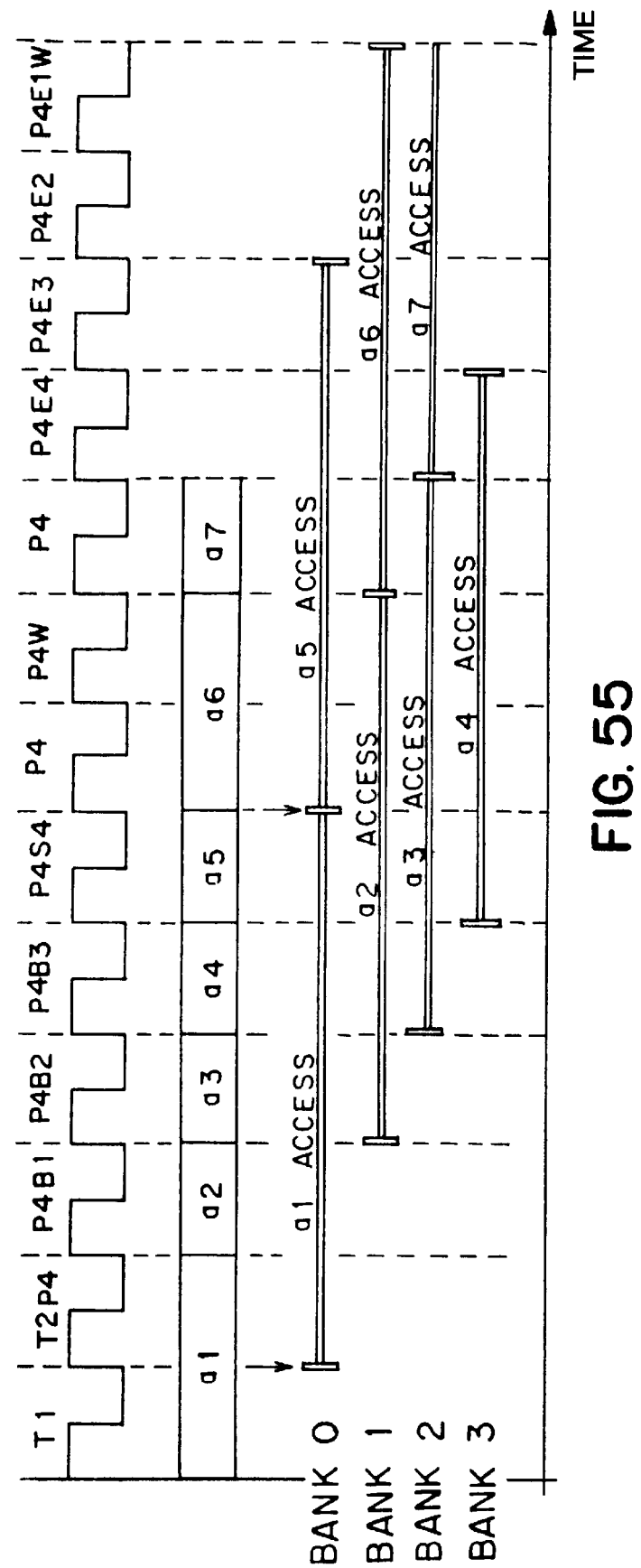
FIG. 55 is a view for explaining in detail 1-wait state shown in FIG. 54.

FIG. 55 is a view for explaining in detail the 1-wait state shown in FIG. 54. A wait state means the retention of the same state, and the value of the retention terminates when a data complete signal DC# is inputted from a memory. As described above, FIG. 54 shows an example where the number of pipeline stages is four with one wait embedded, and the memory access time is a 5-clock cycle. The output of address a6 is enabled when data d1 are inputted. However, the memory does not latch address a6 until data d2 corresponding to address a2 are accessed in the same bank. Therefore, address a6 is outputted covering two clock cycles. According to the present embodiment, if the number of pipeline stages if four and the wait state is entered, then a clock cycle is indicated as P4W.

The operation of each unit associated with the time chart shown in FIG. 54 is the same as that shown in FIGS. 52 and 53. Therefore, the detailed explanation is omitted and limited to the outline.

In FIG. 54, the pipeline control conditions are determined first according to the address information and the pipeline information. At this time, "the number of pipeline stages=4" and "one wait for the clock cycle P4W state" are implemented as pipeline information.

Then, the pipeline control conditions are determined to delay pipelines by the time taken for five latches until data d1 through d7 corresponding to prefetched addresses a1 through a7 are applied to the memory accessing device. At this time, a P4-5E signal for stopping the latch when the number of pipeline stages=4 is outputted to the number-of-stages-of-pipelines selecting unit 104.

Next, based on the pipeline control conditions and the pipeline mode, the number of pipeline stages is selected. At this time, the selection signal generating unit 102 outputs a SEL signal indicating the condition in selecting a pipeline, that is, indicating which pipeline has been activated. In the number-of-stages-of-pipelines selecting unit 104, latch 1-SEL signal through latch 5-SEL signal are outputted to the pipeline latch unit 105 respectively to select a pipeline.

Furthermore, based on the number of pipeline stages, the valid position of data D0 through D63 is determined. At this time, as shown in FIG. 51, the address information is delayed by the time taken for five latches by first latch 1 through fifth latch 5.

Thus, data d1 through d7 corresponding to prefetched addresses a1 through a7 are stored in the register 98.

Figure 56:
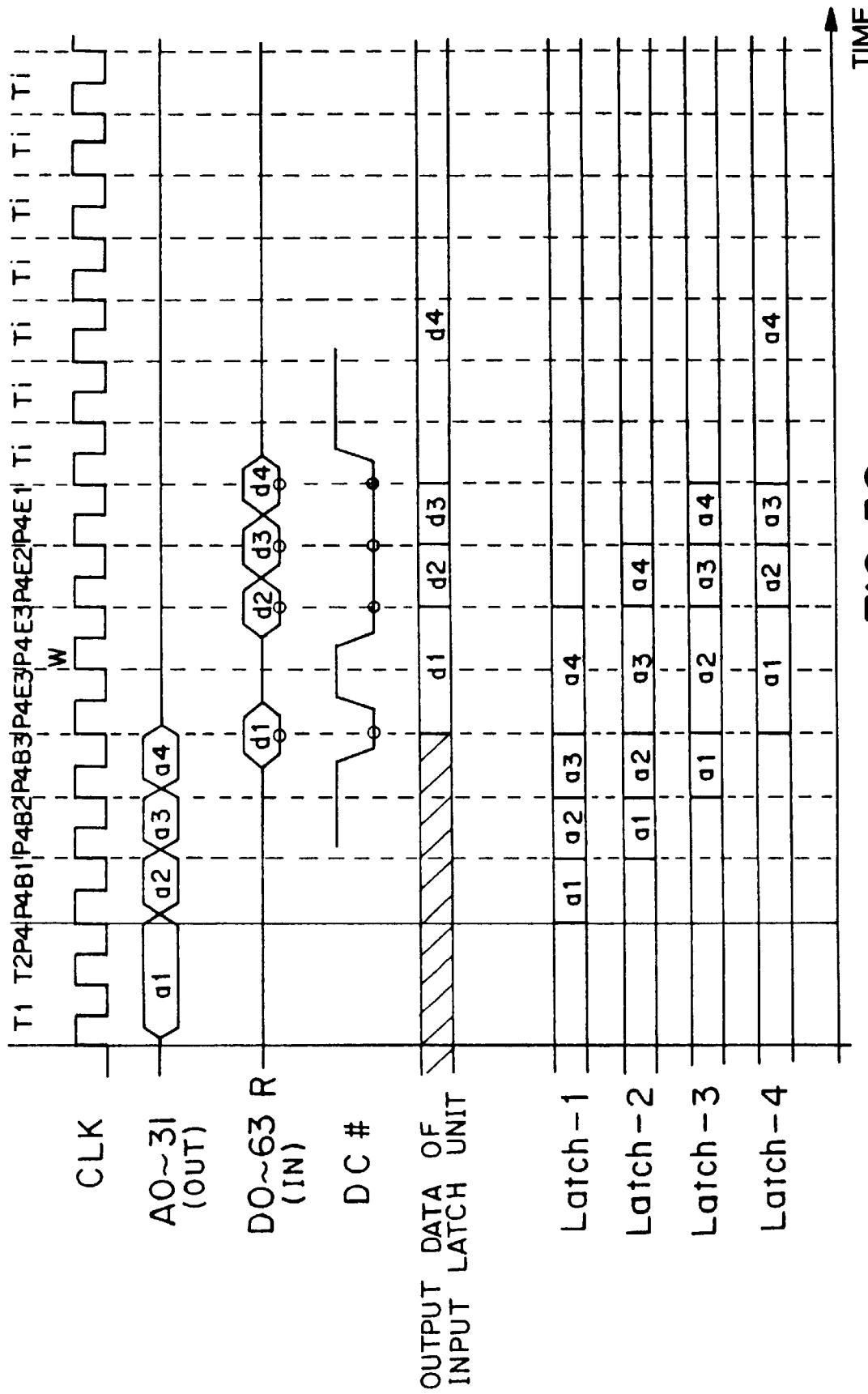
FIG. 56 is a time chart (3) for explaining the operation of the memory accessing device according to the first embodiment.
Figure 57:
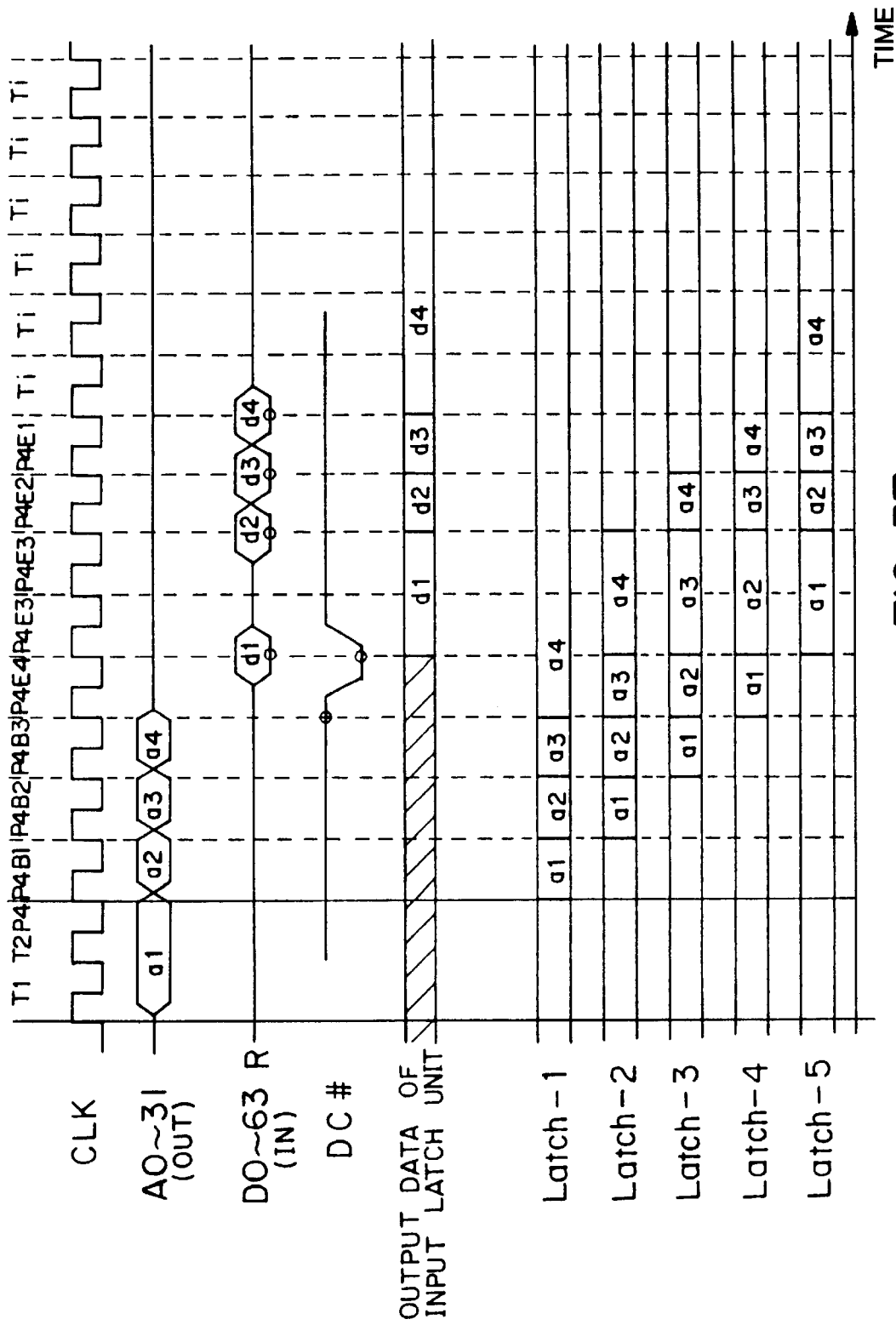
FIG. 57 is a time chart (4) for explaining the operation of the memory accessing device according to the first embodiment.

FIGS. 56 and 57 are the operational time charts (3 and 4) according to the first embodiment. In these figures, the number of pieces of transmitted data is four. In FIG. 56 (chart 3), the memory is operated at a 4-clock timing, while in FIG. 57 (chart 4), it is operated at a 5-clock timing. That is, in FIG. 56, the memory is accessed without wait, while, in FIG. 57, it is accessed involving 1 wait. In FIG. 57, the dot marked for the DC# signal at the clock at which address a4 is outputted indicates that a DC# signal has not been inputted from the memory when four addresses are prefetched.

In FIG. 56 (chart 3), the pipeline control condition such that the pipeline is delayed by the time taken for four latches is determined until data d1 through d4 corresponding to prefetched addresses a1 through a4 are inputted to the memory accessing device.

When the number of pipeline stages=4, a P4-4E signal for stopping the latch at the fourth step is outputted to the number-of-stages-of-pipelines selecting unit 104.

Next, based on the pipeline control conditions and the pipeline mode, the number of pipeline stages is selected. At this time, the number of pipeline stages is selected. At this time, the selection signal generating unit 102 outputs a SEL signal indicating the condition in selecting a pipeline, that is, indicating which pipeline has been activated. In the number-of-stages-of-pipelines selecting unit 104, latch 1-SEL signal through latch 4-SEL signal are outputted to the pipeline latch unit 105 respectively to select a pipeline.

Furthermore, based on the number of pipeline stages, the valid position of data D0 through D63 is determined. At this time, unlike the cases shown in FIGS. 51 and 54, the address information is delayed by the time taken for four latches by first latch 1 through fourth latch 4.

Thus, data d1 through d4 corresponding to prefetched addresses a1 through a4 are stored in the register 98.

In FIG. 57 (chart 4), the pipeline control condition such that the pipeline is delayed by the time taken for five latches is determined until data d1 through d4 corresponding to prefetched addresses a1 through a4 are inputted to the memory accessing device.

When the number of pipeline stages=4, a P4-5E signal for stopping the latch at the fifth step is outputted to the number-of-stages-of-pipelines selection unit 104.

Next, based on the pipeline control conditions and the pipeline mode, the number of pipeline stages is selected. At this time, the selection signal generating unit 102 outputs a SEL signal indicating the condition in selecting a pipeline, that is, indicating which pipeline has been activated. In the number-of-stages-of-pipelines selecting unit 104, latch 1-SEL signal through latch 5-SEL signal are outputted to the pipeline latch unit 105 respectively to select a pipeline.

Furthermore, based on the number of pipeline stages, the valid position of data D0 through D63 is determined. At this time, as shown in FIG. 51 and 54, the address information is delayed by the time taken for five latches by first latch 1 through fifth latch 5.

Figure 58:
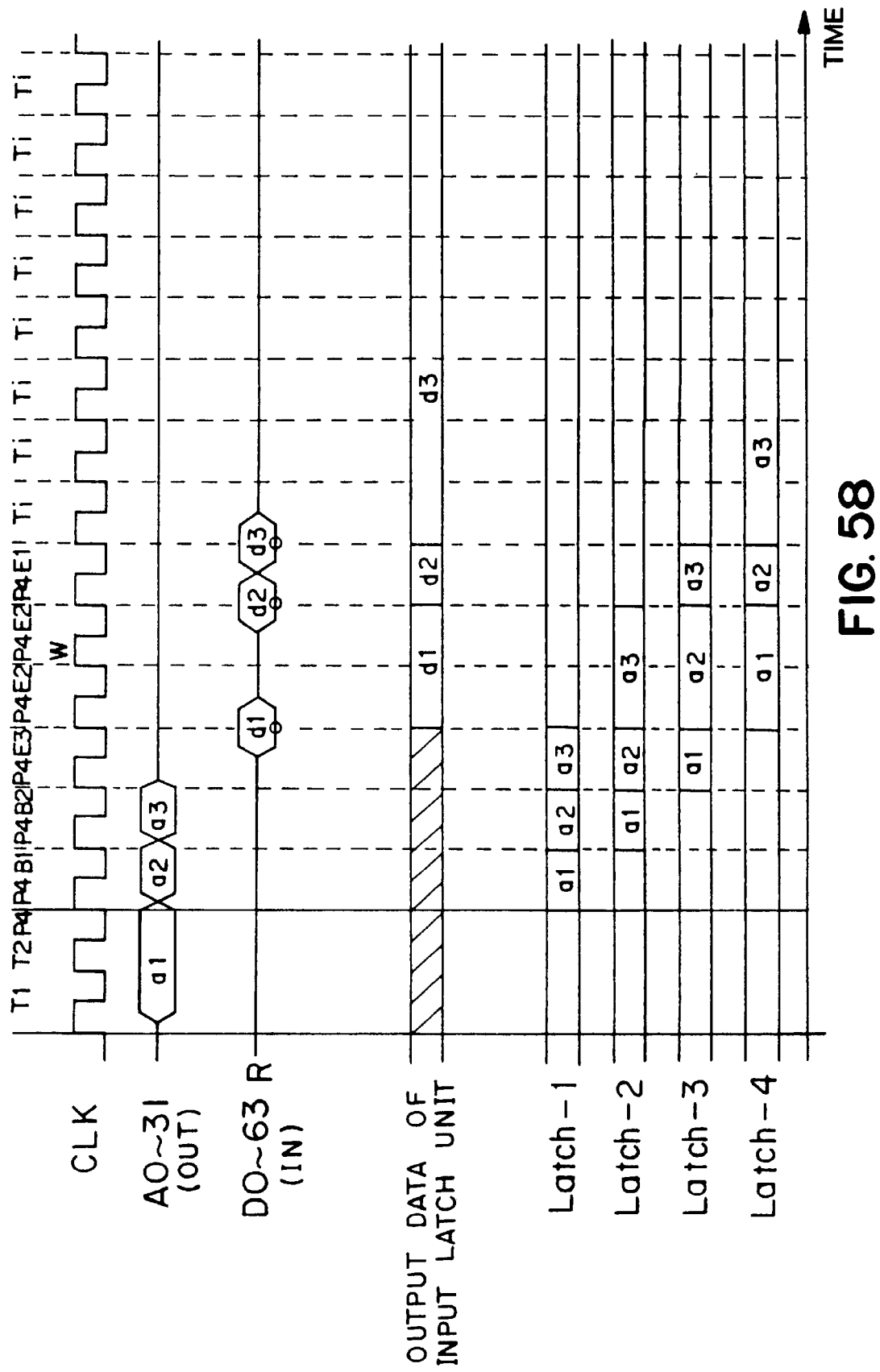
FIG. 58 is a time chart (5) for explaining the operation of the memory accessing device according to the first embodiment.

Thus, data d1 through d4 corresponding to prefetched addresses a1 through a4 are stored in the register 98. FIG. 58 is an operational time chart (5) according to the first embodiment. In FIG. 58, three pieces, smaller than the number of pipeline stages (=4), of data are accessed. In FIG. 58, the pipeline control condition such that the pipeline is delayed by the time taken for four latches is determined until data d1 through d3 corresponding to prefetched addresses a1 through a3 are inputted to the memory accessing device.

When the number of pipeline stages=4, a P4-4E signal for stopping the latch at the fourth step is outputted to the number-of-stages-of-pipelines selecting unit 104.

Next, based on the pipeline control conditions and the pipeline mode, the number of pipeline stages is selected. At this time, the selection signal generating unit 102 outputs a SEL signal indicating the condition of the selection of a pipeline, that is, indicating which pipeline has been activated. In the number-of-stages-of-pipelines selecting unit 104, latch 1-SEL signal through latch 4-SEL signal are outputted to the pipeline latch unit 105 respectively to select a pipeline.

Furthermore, based on the number of pipeline stages, the valid position of data D0 through D63 is determined. At this time, as shown in FIG. 56, the address information is delayed by the time taken for four latches by first latch 1 through fourth latch 4.

Thus, data d1 through d3 corresponding to prefetched addresses a1 through a3 are stored in the register 98.

Figure 59:
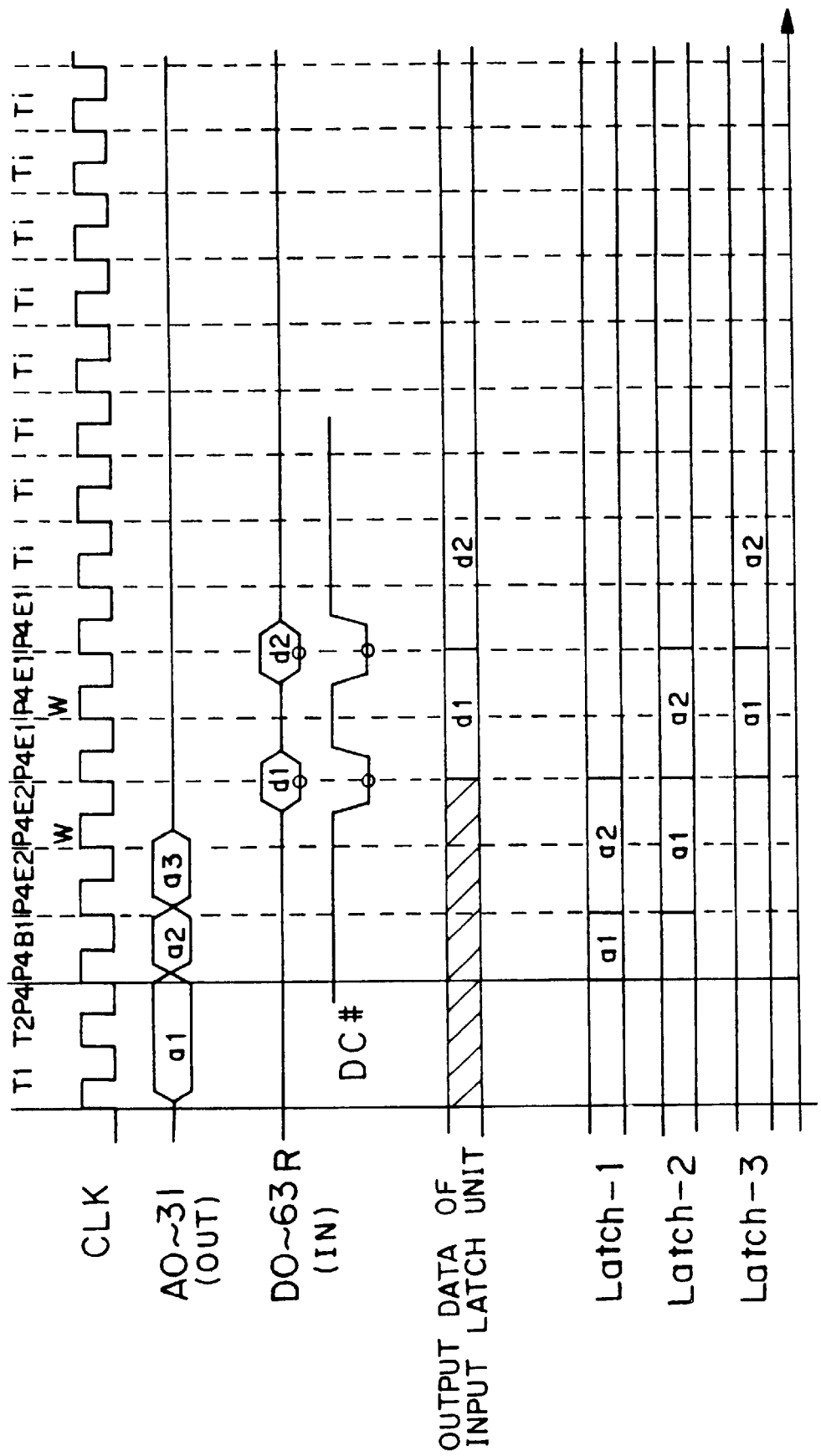
FIG. 59 is a time chart (6) for explaining the operation of the memory accessing device according to the first embodiment.

FIG. 59 is an operational time chart (6) according to the first embodiment. In FIG. 58, as in FIG. 58, two pieces, smaller than the number of pipeline stages, of data are accessed. The time chart is described below by explaining the operation of each unit as in FIG. 51.

Figure 60:
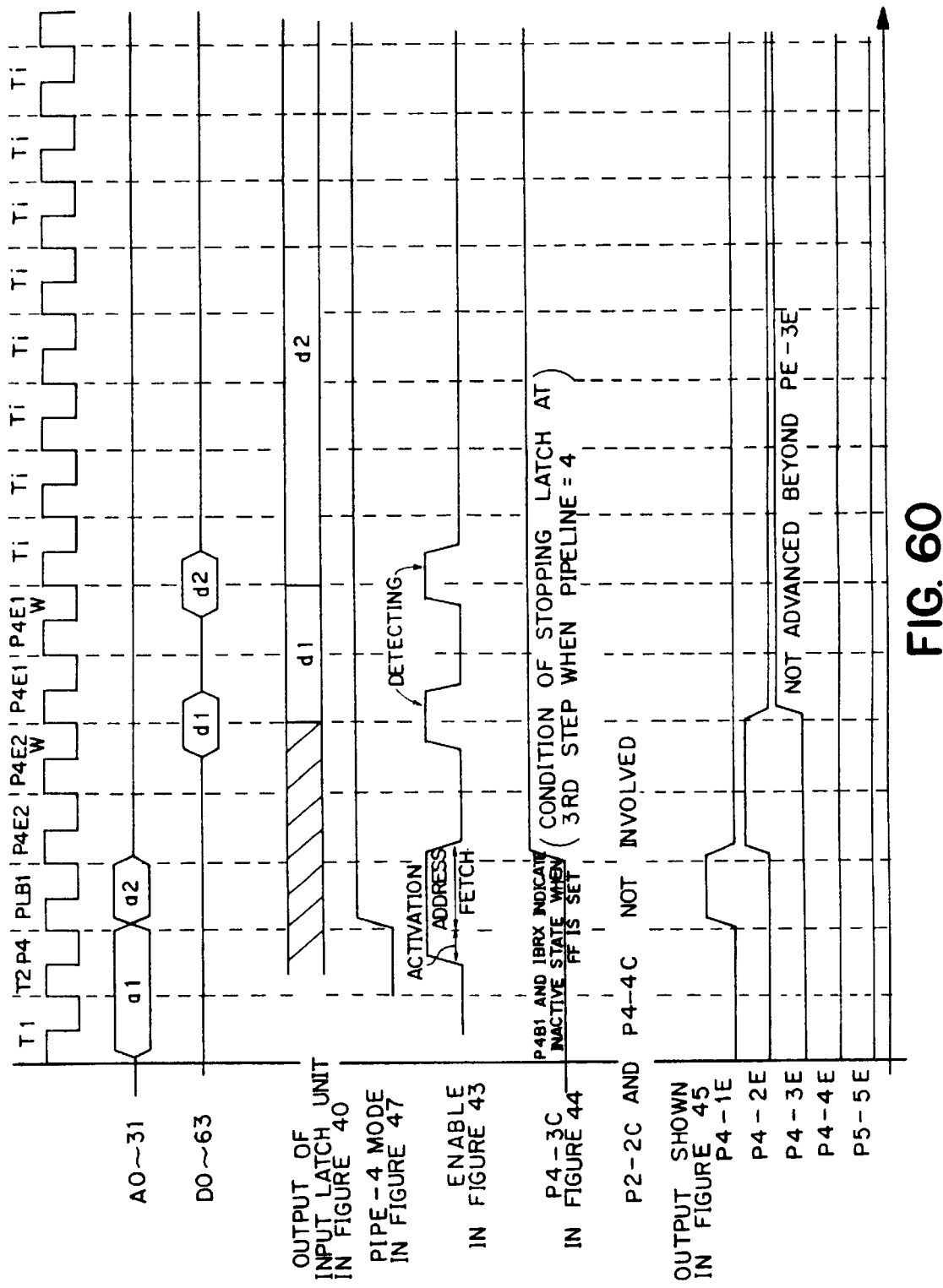
FIG. 60 is a time chart (1) for explaining the detailed operation of each unit according to the first embodiment shown in FIG. 59.
Figure 61:
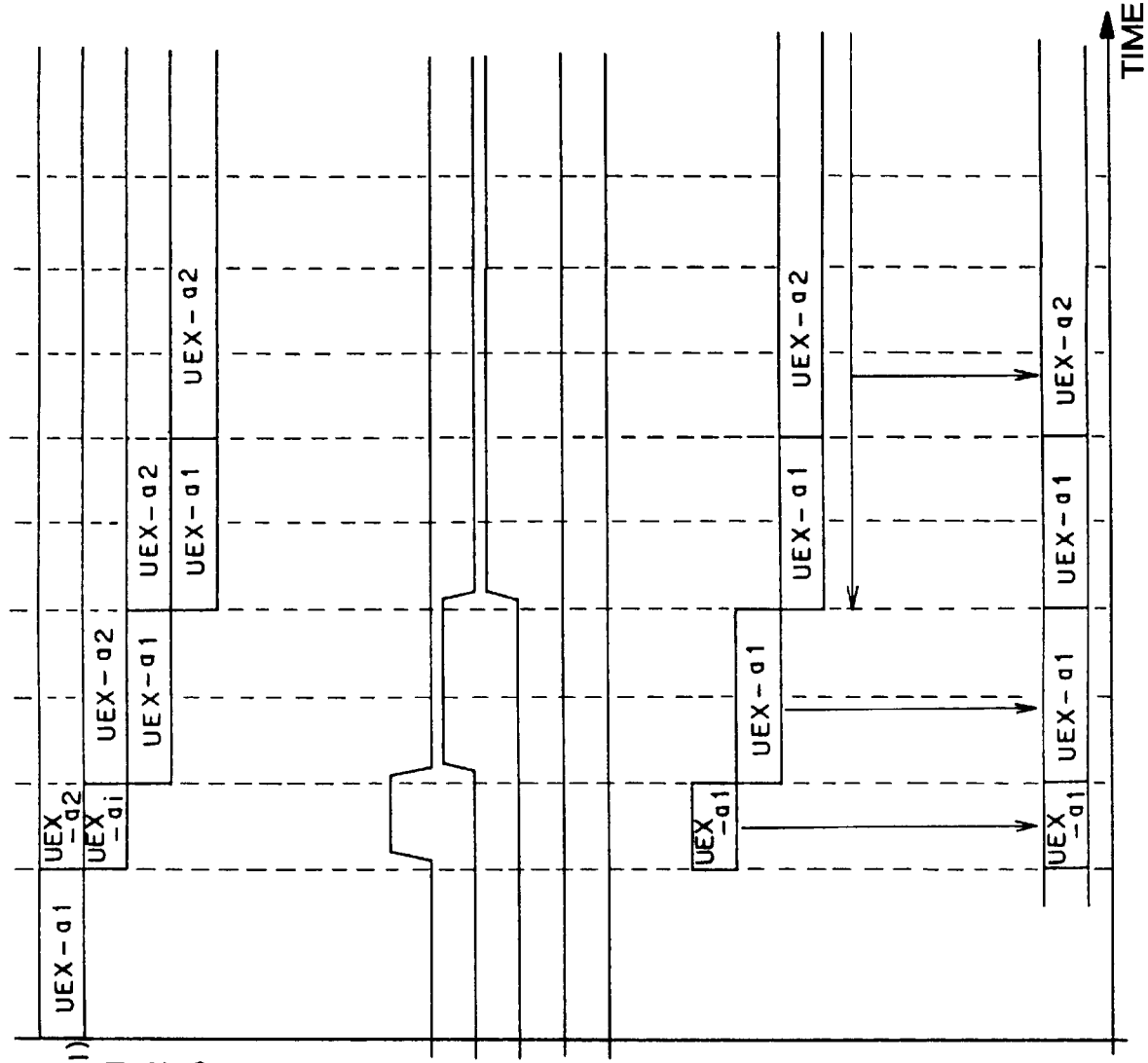
FIG. 61 is a time chart (2) for explaining the detailed operation of each unit according to the first embodiment shown in FIG. 59.

FIGS. 60 and 61 are time charts for explaining the detailed operation of each unit according to the first embodiment. FIG. 59 is a time chart when a state signal P4B1 shown in FIG. 44 indicates the active state, when the output of AND2, that is, the third internal signal S3 indicates "H" after a bus cycle request IBRX indicates the inactive state (that is, indicates "H". "X" indicates that the L level is valid), and when the output P4-3C of F12, that is, the condition that the latch stops at the third step when the number of pipeline stages is four indicates the active state. If the signal indicates the active state, then the address prefetch state terminates as shown in FIG. 60, and an inactive signal shows the inactive state "L". Afterwards, an enable signal indicates the active state when a DC# detection state signal indicates the active state as shown in FIG. 43 and simultaneously when a DC# signal is inputted, which corresponds to the time when data d1 and d2 are inputted. In the number-of-stages-of-pipelines determining unit shown in FIG. 45, a signal P4-1E is outputted at the timing shown in FIG. 52. However, the output of the P4-2E is retained for two-clock period until the enable signal indicates the active state again, and the P4-3E signal continues indicating the "H" state after data d1 has been inputted because a signal P4-3C is inputted to AND5 and the logical circuit 115.

FIG. 61 is a timing chart for explaining the operation before the output of the signal SUEX shown in FIG. 59. In FIG. 61, a higher order address valid signal VEX is inputted to latch 1 at the timing of the output of addresses. Then, the timing of the latch to each latch is controlled according to an enable signal shown in FIG. 60. Therefore, the latch at latches 2 and 3, for example, is operated at a 2-clock timing. The output SUEX of the NAND shown in FIG. 49 is a higher order address valid signal to address a1 until data d2 are inputted. Afterwards, it is a higher order address valid signal to a2.

As described above, the memory accessing device according to the first embodiment comprises an address/data control unit comprising a condition determining unit, a number-of-stages selecting unit, and a valid data detecting unit so that prefetched addresses are associated with the data involved in the memory accesses.

Therefore, the valid position of data can be detected according to the output address information transmitted at the timing of prefetched addresses and internal exceptions, TLB entries, bus use right release, etc. even if the data bus width is not equal to the data size.

Therefore, even if different cycles such as cycles in which only addresses are outputted, cycles in which addresses are converted according to a DC# signal and read data are inputted, and cycles in only read data are inputted coexist, outputted addresses can be correctly associated with load data.

Furthermore, since valid load data can be easily determined, the storage unit, for example, a vector register, of the memory accessing device can be divided into a higher order bit group and a lower order bit group to correctly store in the storage unit the data read from the main storage device. Accordingly, the bus can be maintained in the normal operation condition and the load control of transmission data can be efficiently simplified.

Furthermore, according to the first embodiment of the present invention, the pipeline control conditions can be determined according to the address information and the pipeline information when the address pipeline process is performed based on a resetting operation, the number of pipeline stages can be selected according to the activation conditions, and the valid position of data can be determined according to the number of pipeline stages.

Therefore, the address information can be safely maintained until load data are applied to the memory accessing device even if addresses corresponding to the data are prefetched.

Accordingly, output addresses can be associated with corresponding load data even if the number of pipeline stages is larger than the number of pieces of accessed data. Thus, the valid data can be easily determined. Even if any external factor interferes with an accessing operation during the data transmission, output addresses can be associated with corresponding load data. Therefore, valid data can be easily determined.

Since valid data can be easily determined as described above, the data load can be easily simplified, thereby realizing a memory accessing device capable of a high speed operation using a dynamic RAM.

Next, the second embodiment of the present invention is described. The second embodiment aims at solving the second problem described above. That is, if data from an external memory, for example, the main storage device, are stored in a vector register, for example, in the order they have been stored in the external memory, then the original order of the data cannot be maintained when they are stored in the external memory again after being processed by an arithmetic operation in the vector processor. For example, in the second embodiment as being different from the first embodiment, 64-bit data aligned on the eighth byte boundary are inputted as is through a 64-bit data bus, and the data are stored in the vector register after being rearranged by a load/store pipeline. The load/store pipeline can be tested without additionally preparing a testing scan path.

Figure 62:
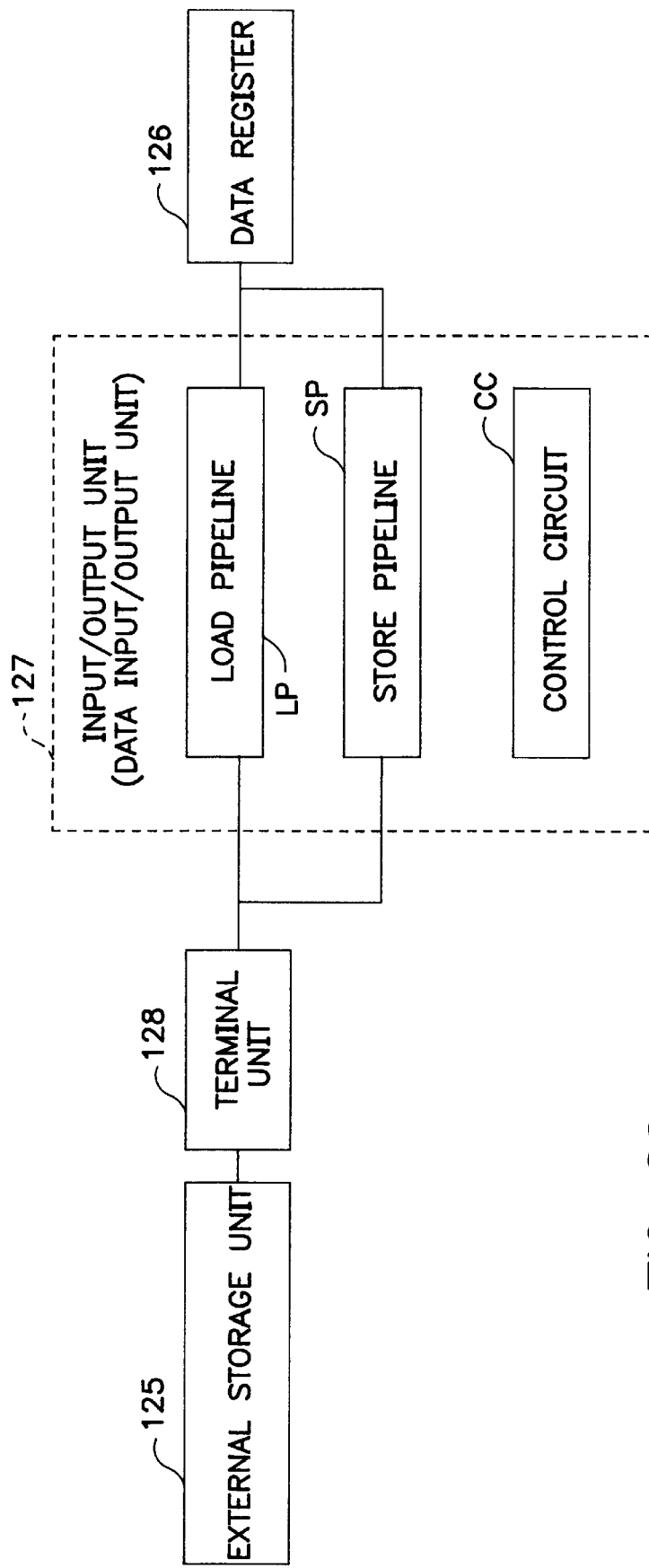
FIG. 62 is a block diagram indicating the principle of the second embodiment of the present invention.

FIG. 62 is a block diagram showing the principle of the second embodiment. A microprocessor according to the present embodiment comprises an external storage unit 125 (for example, a main storage device) for storing data, a data register 126 (for example, a vector register) for holding data, an input/output unit 127 for inputting/outputting data and a terminal unit 128. The input/output unit 127 comprises a load pipeline LP, a store pipeline SP, and a control circuit CC.

To attain the above described object, the microprocessor according to the second embodiment comprises a data storing unit for storing predetermined data, an m-bit width data holding unit (m indicates a positive integer) for holding predetermined data, and a data input/output unit for loading data from the data storing unit to the data holding unit and storing the data from the data holding unit to the data storing unit. If n pieces of m/n (where n indicates a positive integer, and ma) bit width data are processed by the data holding unit, then the m/n bit width data are rearranged by the data input/output unit when data are loaded or stored by the data storing unit and the data holding unit.

If the load pipeline and the store pipeline are tested, then the output of the load pipeline is connected to the input of the store pipeline, and the data inputted to the load pipeline are read through the store pipeline. If the arithmetic operation unit for performing predetermined arithmetic operations is tested, then an arithmetic operation term and a term subject to an arithmetic operation are directly connected to the arithmetic operation unit through the load pipeline. The arithmetic operation result can be read from the arithmetic operation unit through the above described store pipeline.

According to the second embodiment of the present invention, m/n bit width data are rearranged by the data input/output unit when data are loaded from the data storing unit to the data holding unit or stored in the data storing unit. Especially when the data holding unit is a data register comprising 1 bank registers, the data register is divided and the data in series from the data storing unit are loaded for the m/n bit width at predetermined positions in each bank. When they are stored, the above described processes are performed in the reverse order.

That is, after the rearrangement of data during the load/store process, the optimum data array can be obtained according to instructions of the microprocessor. Therefore, the performance of the processor can be fully used, and the procedures can be optimized for all instructions.

Since test data are inputted and outputted through the load pipeline and the store pipeline of the data input/output unit during the test, the processor can be easily tested within a short cycle, and the test period can be successfully shortened.

Figure 63:
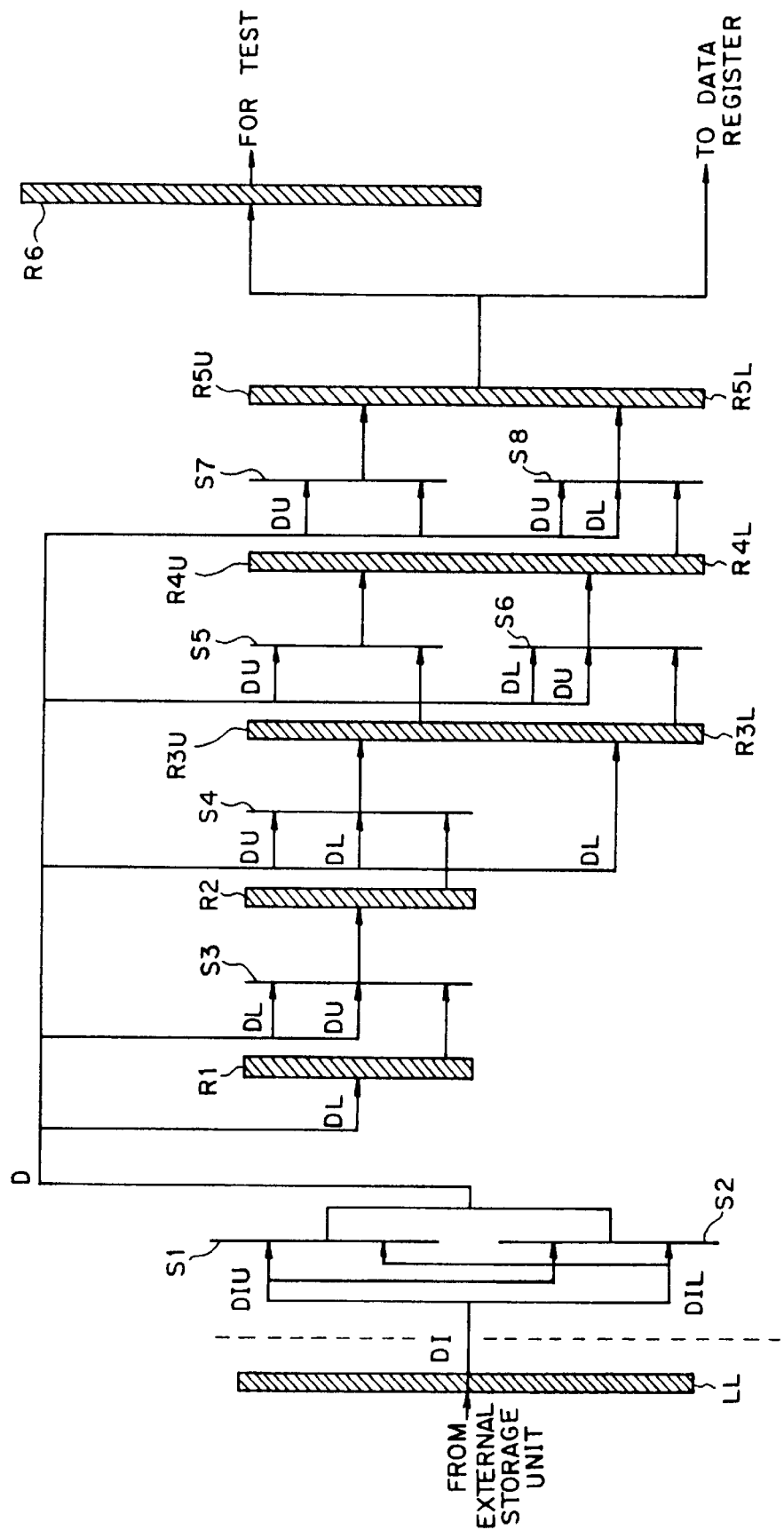
FIG. 63 shows a general configuration of the load pipeline shown in FIG. 62.

FIG. 63 shows the general configuration of the load pipeline shown in FIG. 62.

As shown in FIG. 63, the load pipeline LP comprises a plurality of latches R1, R2, R3U, R3L, R4U, R4L, R5L, and R6, and a plurality of selectors S1 through S8.

In FIG. 63, LL indicates a latch of the I/O unit in, for example, the terminal unit 128; DI indicates 64-bit data outputted from the latch LL; DIU indicates 32-bit data in the higher bits (MSB) of the 64-bit data; and DIL indicates 32-bit data in the lower bits (LSB) of the 64-bit data.

D indicates 64-bit data outputted by S1 and S2; DU indicates 32-bit data in the higher order bits (MSB, output of S1) of the 64-bit data; and DL indicates 32-bit data in the lower order bits (LSB, output of S2) of the 64-bit data.

FIG. 64 shows the selecting conditions for the selectors in the load pipeline LP.

That is, the conditions for selecting DIL by selector S1 is that a 32-bit stride is "−1"; or 32 bits are not in series and the lower order bits are valid; or the load pipeline test code is "1". Otherwise, DIU is selected.

Likewise, the conditions for selecting DIU by selector S2 is that a 32-bit stride is "−1"; or 32 bits are not in series and the higher order bits are valid; or that the load pipeline test code is "1". Otherwise, DIL is selected.

The conditions for selecting DU by selector S3 are that 32-bit stride =±1, 32 bits are aligned, and the load/store flag=B; or that the 32-bit stride =±1, 32 bits are mis-aligned, and the load/store flag=C; or that the load pipeline test code is "8". The conditions for selecting DL are that the 32-bit stride=±1, 32 bits are aligned, and the load/store flag=A; or that the 32-bit stride=±1, 32 bits are mis-aligned, and the load/store flag=B; or that the load pipeline test code is "9". Otherwise, the output of the latch is the preceding step is selected.

The conditions for selecting DU by the S4 are that 64-bit data are used, that the 32-bit data are not in series; or that the 32-bit stride=±1, 32 bits are aligned, and the load/store flag=A; or that the 32-bit stride=±1, 32 bits are mis-aligned, and the load/store flag=B; or that the load pipeline test code is "6". The conditions for selecting DL are that the 32-bit stride=±1, 32 bits are mis-aligned, and the load/store flag=A; or that the load pipeline test code is "7". Otherwise, the output of the latch in the preceding step is selected.

The conditions for selecting DU by selector S5 are that an indirect load (32 and 64 bits) is performed, or that the load pipeline test code is 4 or 5. Otherwise, the output of the latch in the preceding step is selected.

The conditions for selecting DU by selector S6 are that the 32-bit stride =±1, 32 bits are aligned, and the load/store flag=D; or that the 32-bit stride =±1, 32 bits are mis-aligned, and the load/store flag=B; or that the load pipeline test code is "5". The conditions for selecting DL are that the 32-bit stride=±1, 32 bits are aligned, and the load/store flag=C; or that the 32-bit stride=±1, 32 bits are mis-aligned, and the load/store flag=D; or that the load pipeline test code is "4". Otherwise the output of the latch in the preceding step is selected.

The conditions for selecting DU by selector S7 are that a data register test is conducted; or that an arithmetic operation pipeline test is conducted; or that a load pipeline test code is "0", "1", "2" or "3"; or that any store pipeline test is conducted. Otherwise, the output of the latch in the preceding step is selected.

The conditions for selecting DU by selector S8 are that the 32-bit stride =±1, 32 bits are aligned, and the load/store flag=C; or that the 32-bit stride =±1, 32 bits are mis-aligned, and the load/store flag=D; or that the load pipeline test code is "3". The conditions for selecting DL by selector S8 are that the 32-bit stride=±1, 32 bits are mis-aligned, and the load/store flag=C; or that a data register test is conducted; or that an arithmetic operation pipeline test is conducted; or that a load pipeline test code is "0", "1", or "2"; or that any store pipeline test is conducted. Otherwise, the output of the latch in the preceding step is selected.

In the description above, non-serial 32 bits mean that the stride value is not 1 or −1, and accessed data are stored corresponding to the stride value. "Indirect" means that an address is obtained in memory access by adding an offset value to a base address in each cycle, and that there are no rules for the data array.

Figure 15C:
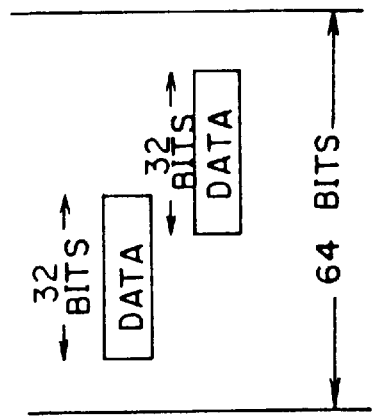
FIGS. 15A, 15B and 15C show the position of data in a bank to be accessed.
Figure 15B:
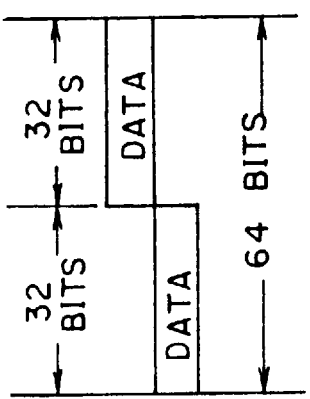
Figure 15A:
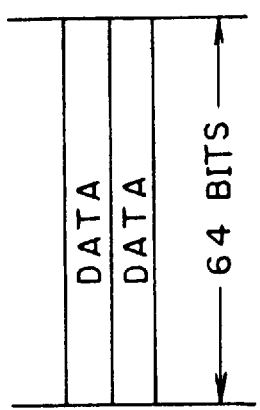
Figure 16:
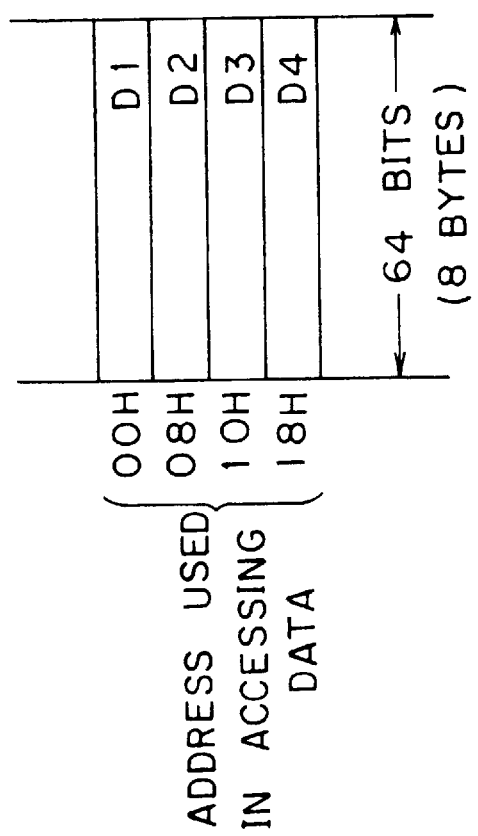
FIG. 16 shows the method of designating an address using a base address and a stride.
Figure 17:
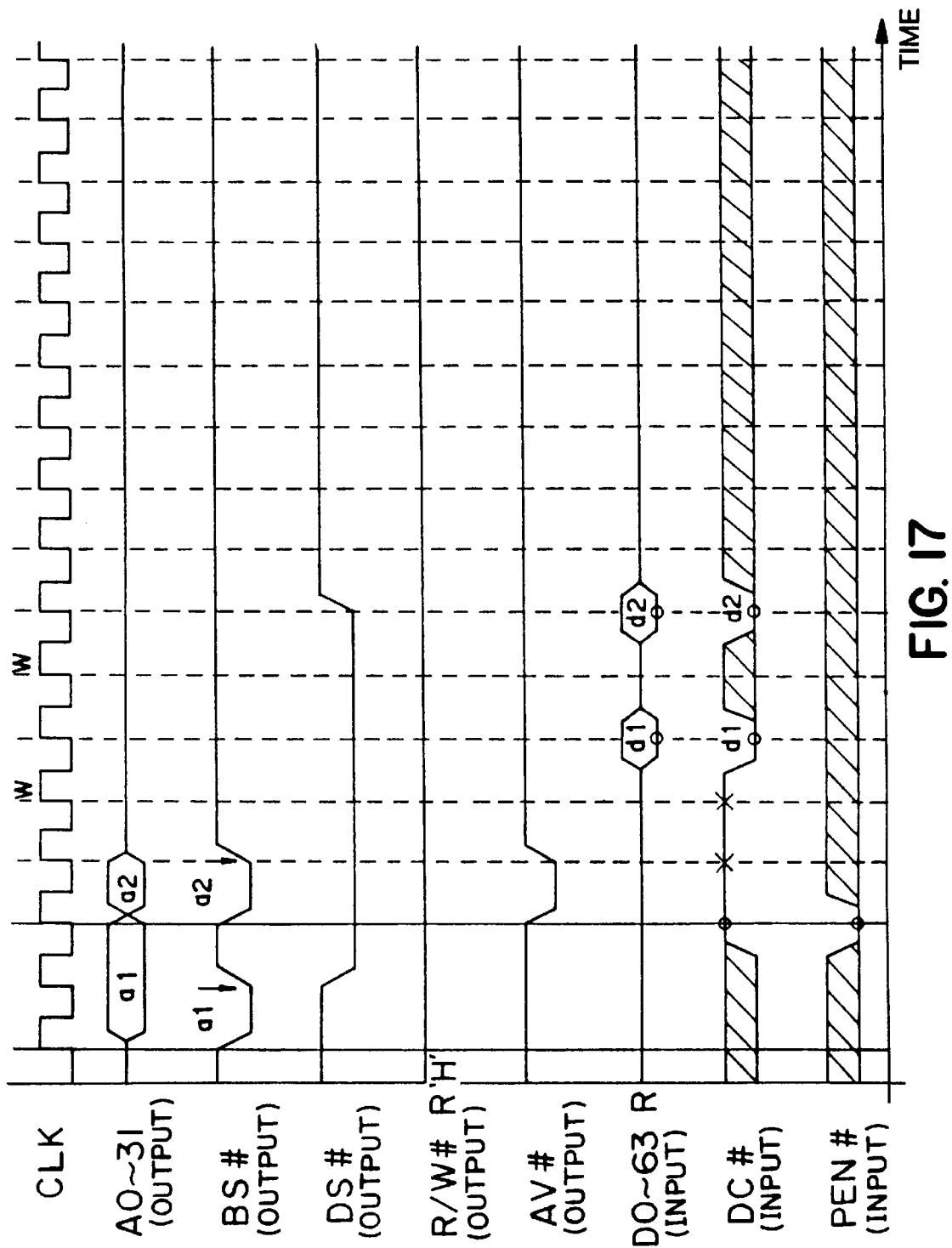
FIG. 17 is a time chart (1) indicating an example of a data reading operation to explain the first problem solved by the present invention.
Figure 18:
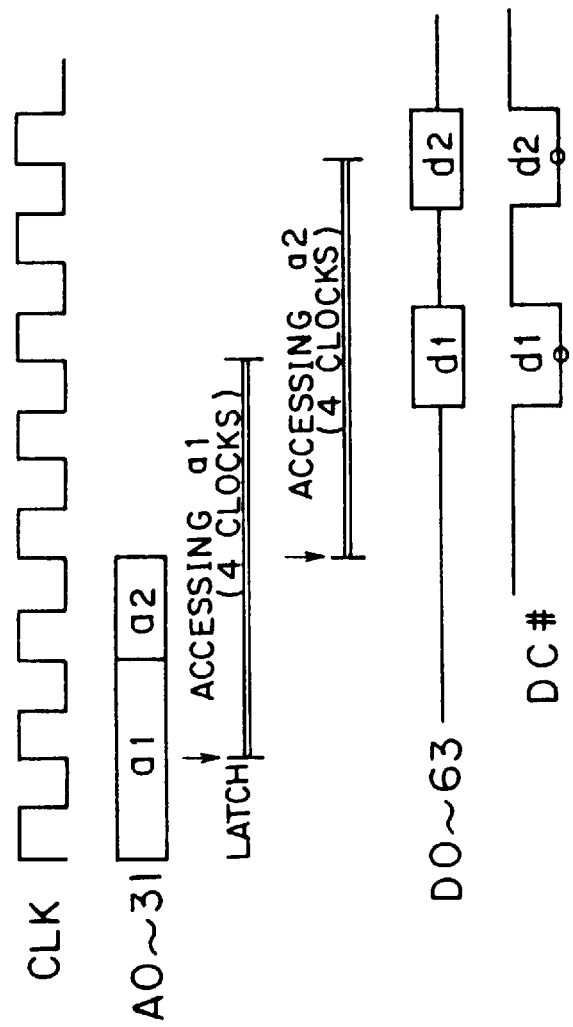
FIG. 18 shows in detail the data accessing operation shown in FIG. 17.
Figure 19:
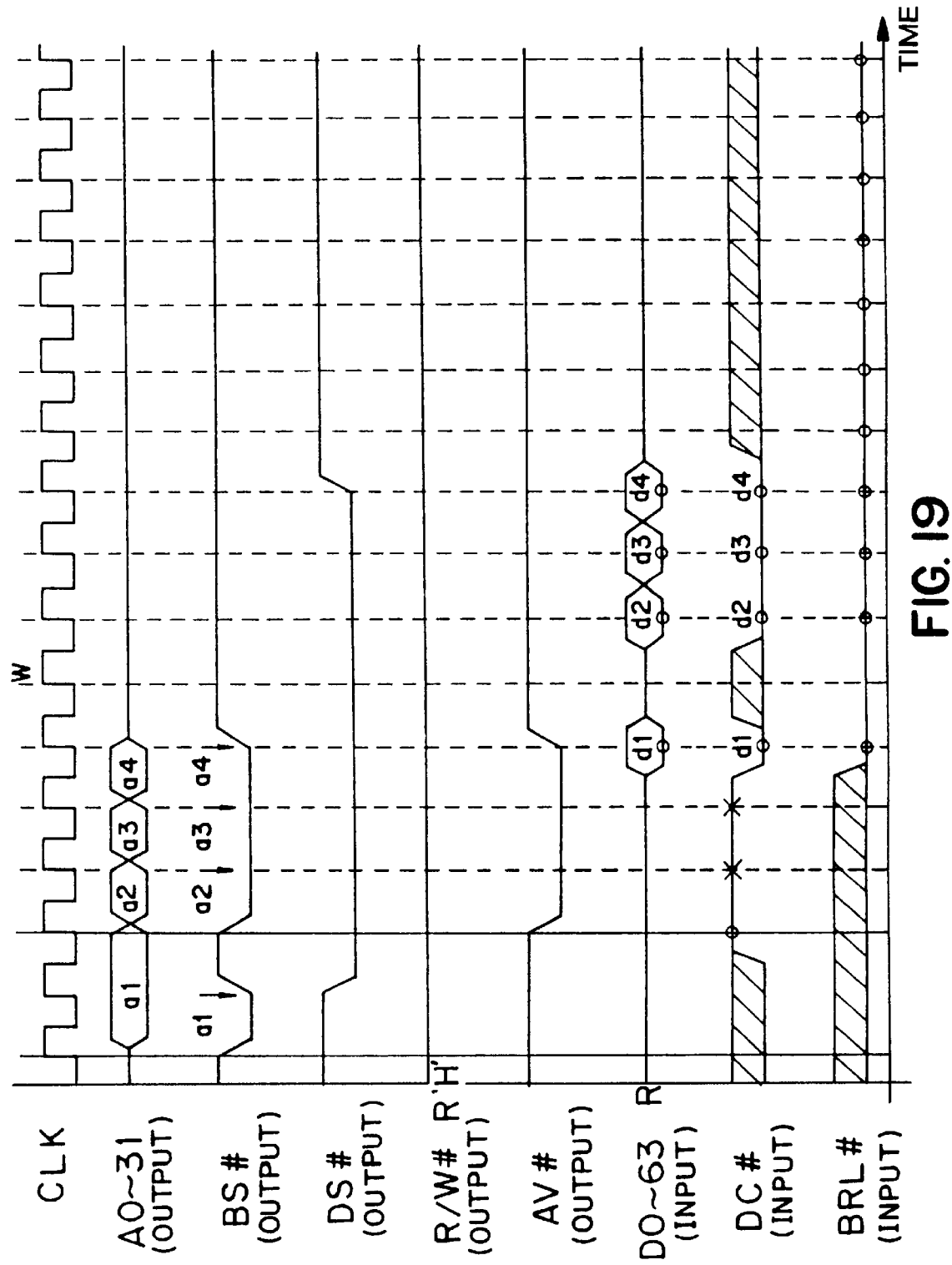
FIG. 19 is a time chart (2) indicating an example of a data reading operation to explain the first problem solved by the present invention.
Figure 20:
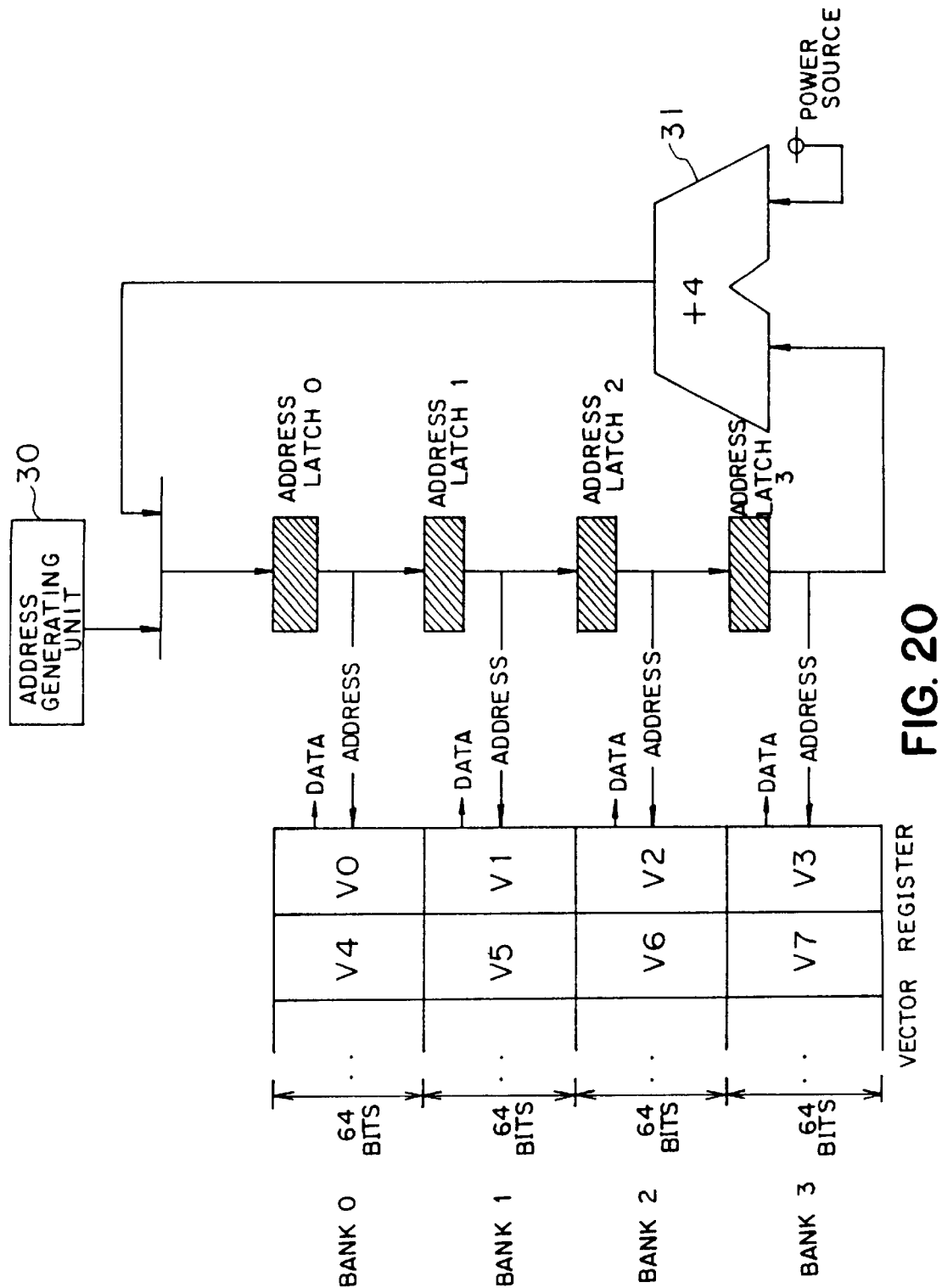
FIG. 20 shows the process of reading data from a vector register shown in FIG. 2.
Figure 21:
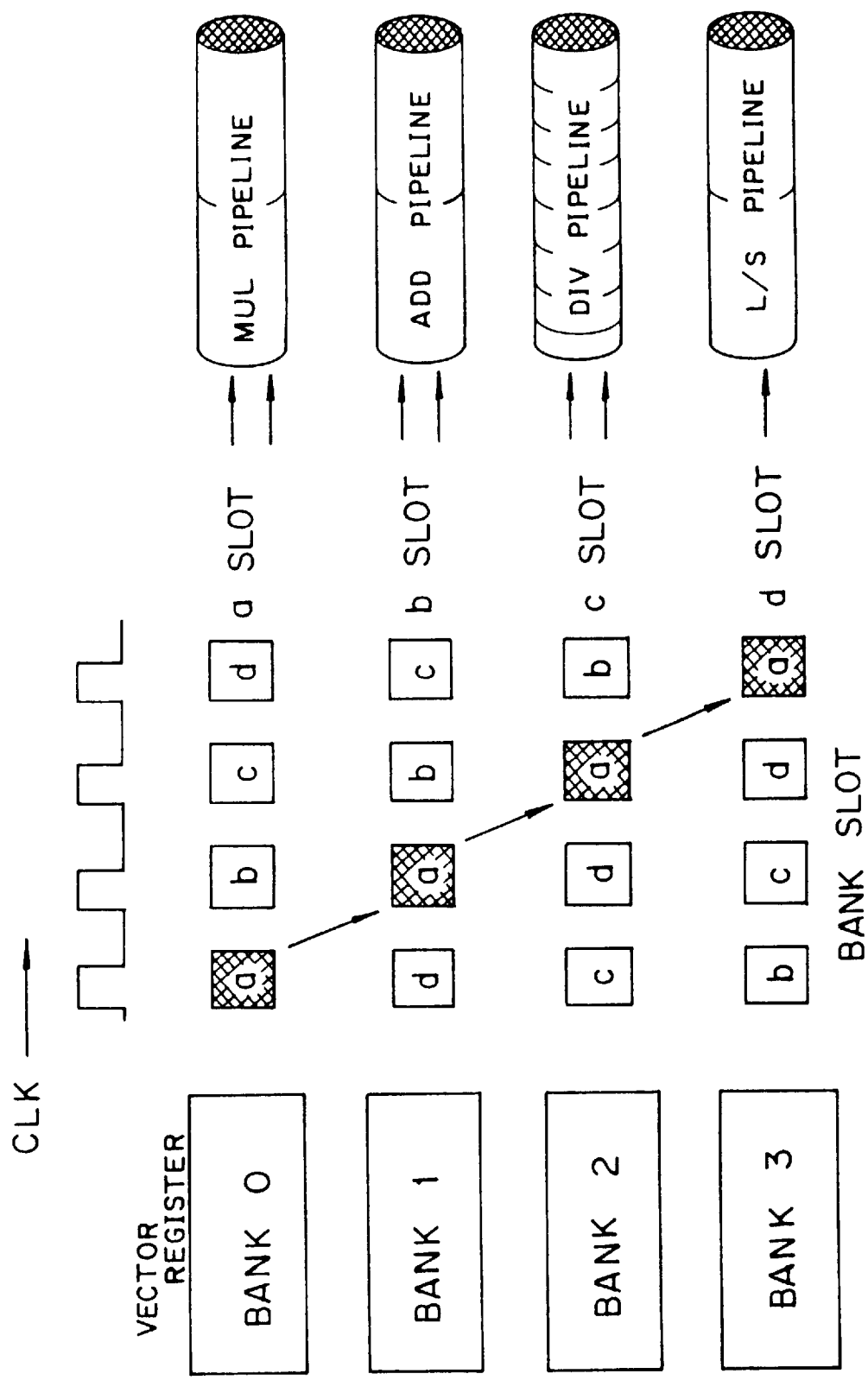
FIG. 21 shows the correlation between a bank slot and a bank accessed by each pipeline.
Figure 22:
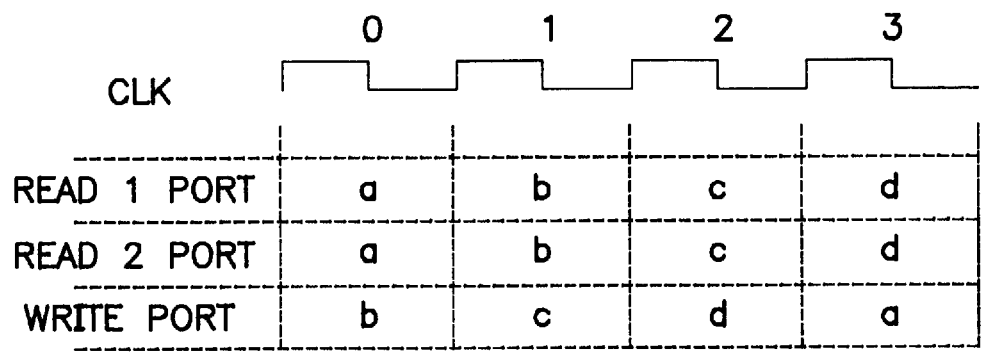
FIG. 22 shows the correlation between a bank slot and an applicable read port and write port.

"32 bits are aligned" means that if two 32-bit data are considered to be 64-bit data, they are aligned on the eighth byte boundary. The state "32 bits are mis-aligned" is shown in FIG. 15B.

Selector S* of the load pipeline LP functions on the above described conditions, and latch R* of load pipeline LP is operated according to the interlocking clock described later in detail.

Figure 65:
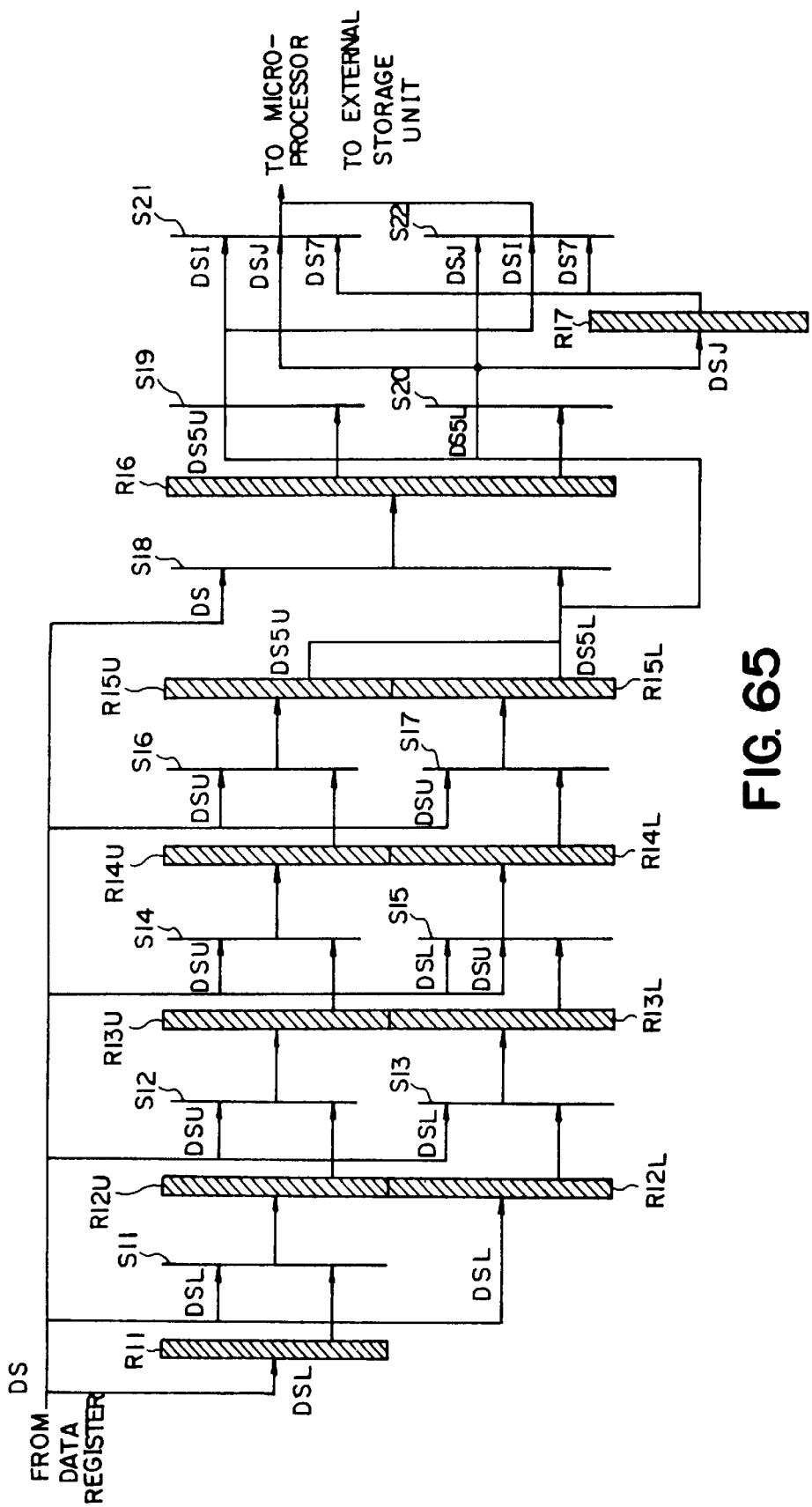
FIG. 65 shows a general configuration of the store pipeline shown in FIG. 62.

FIG. 65 shows the general configuration of the store pipeline shown in FIG. 62.

As shown in FIG. 65, the store pipeline SP comprises a plurality of latches R11, R12U, R12L, R13U, R13L, R14U, R14L, R15U, R15L, R16, and R17, and a plurality of selectors S11 through S22.

In FIG. 65, DS indicates 64-bit data from the data register 126; DSU indicates 32-bit data in the higher bits (MSB) (of the 64-bit data); and DSL indicates 32-bit data in the lower bits (LSB) (of the 64-bit data).

DS5U indicates an output of latch R15U; DS5L indicates an output of latch R15L; DSI indicates an output of selector S19, DSJ is an output of selector S20, and DS7 indicates an output of latch R17, each being 32-bit data.

Figure 66:
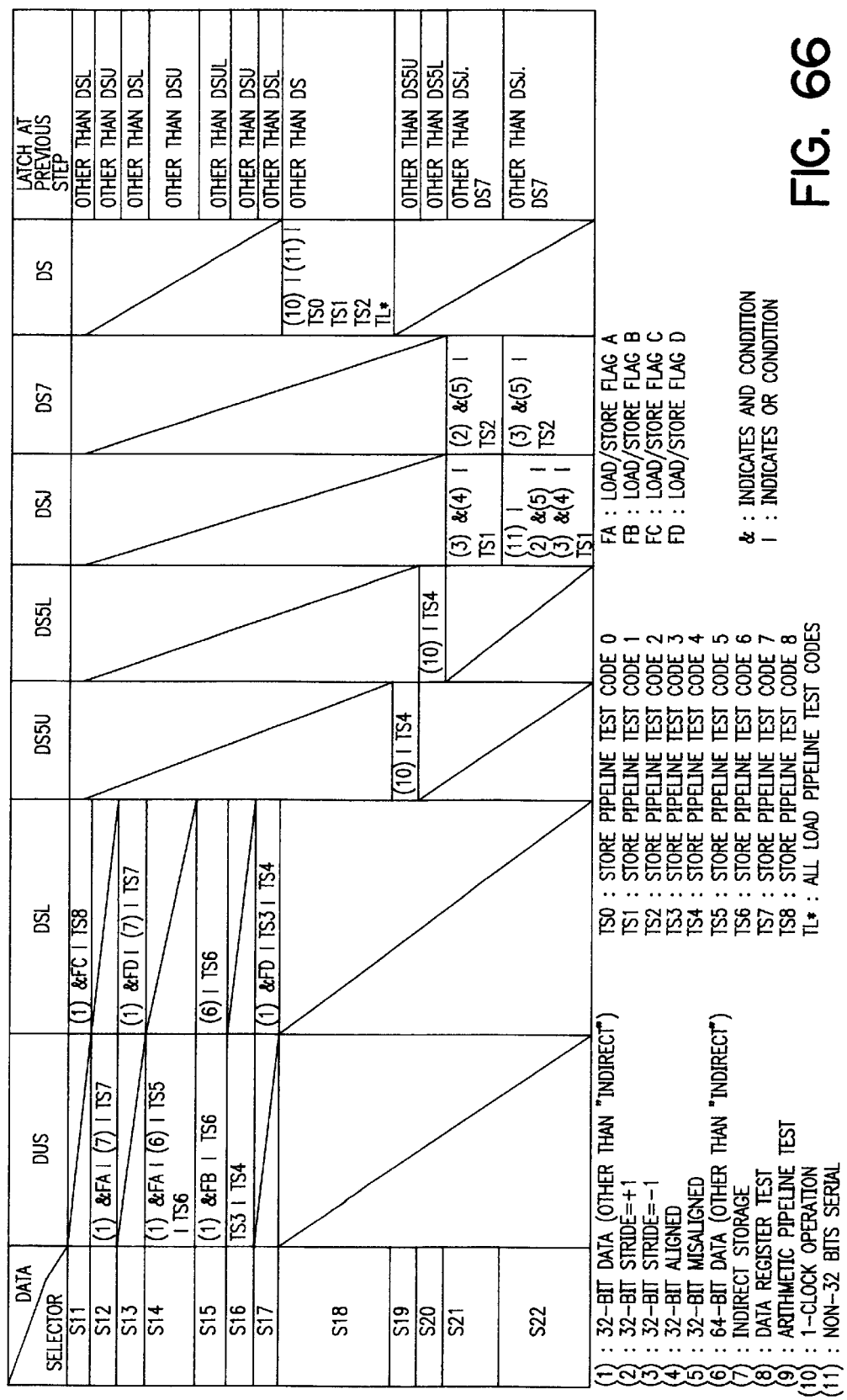
FIG. 66 shows the selection conditions of a selector in the store pipeline.

FIG. 66 shows the selectors' selecting conditions in the store pipeline SP.

That is, the conditions for selecting DSL by selector S11 are that 32-bit data are used (not "indirect"), and the load/store flag is "C"; or that the store pipeline test code is "8". Otherwise the output of the latch in the preceding step is selected.

The conditions for selecting DSU by S12 are that 32-bit data are used (not "indirect"), and the load/store flag is "A"; or that data are stored indirectly; or that the store pipeline test code is "7". Otherwise, the output of the latch in the preceding step is selected.

The conditions for selecting DSL by selector S13 are that 32-bit data are used (not "indirect"), and the load/store flag is "D"; or that data are stored indirectly; or that the load pipeline test code is "7". that the store pipeline test code is "7". Otherwise, the output of the latch in the preceding step is selected.

The conditions for selecting DSU by S14 are that 32-bit data are used (not "indirect"), and the load/store flag is "C", or that 64-bit data are used (not "indirect"); or that the store pipeline test code is "5" or "6". Otherwise, the output of the latch in the preceding step is selected.

The conditions for selecting DSU by S15 are that 32-bit data are used (not "indirect"), and the load/store flag is "B"; or that the store pipeline test code is "6". The conditions for selecting DSL are that 64-bit data are used (not "indirect"), or that the store pipeline test code is "5". Otherwise, the output of the latch in the preceding step is selected.

The conditions for selecting DSU by S16 are that the store pipeline test code is "3" or "4". Otherwise, the output of the latch in the preceding step is selected. The conditions for selecting DSL by S17 are that 32-bit data are used (not "indirect"), and the load/store flag is "D"; or that store pipeline test code is "3" or "4". Otherwise, the output of the latch in the preceding step is selected.

The conditions for selecting DS by S18 is that 1-clock timing is used, that 32 bits are not in series; or that the store pipeline test code is "0", "1", or "2"; or that any load pipeline test code is applicable. Otherwise, the output of the latch in the preceding step is selected.

The conditions for selecting DS5U by S19 are that a 1-clock timing is used, or that the store pipeline test code is "4". Otherwise, the output of the latch in the preceding step is selected.

The conditions for selecting DS5L by S20 is that a 1-clock timing is used, or that the store pipeline test code is "4". Otherwise, the output of the latch in the preceding step is selected.

The conditions for selecting DSJ by S21 are that the 32-bit stride is "−1", and 32 bits are aligned; or that the store pipeline test code is "1". The conditions for selecting DS7 are that the 32-bit stride is "+1", and 32 bits are mis-aligned; or that the store pipeline test code is "2". Otherwise, the output of the latch in the preceding step is selected.

The conditions for selecting DSJ by S22 is that 32 bits are not in series; or the 32-bit stride is "+1", and 32 bits are mis-aligned; or that the 32-bit stride is "−1", and 32-bits are aligned; or that the store pipeline test code is "1". The conditions for selecting DS7 are that the 32-bit stride is "+1", and the 32 bits are mis-aligned; or that the store pipeline test code is "2". Otherwise, the output of the latch in the preceding step is selected.

Selectors of store pipelines function according to the above described conditions. Latches R** of the store pipeline SP except for latch R17 are operated according to an interlocking clock. Only latch R17 is operated according to a master clock having no interlocking function.

The operations involved are described below.

Figure 23:
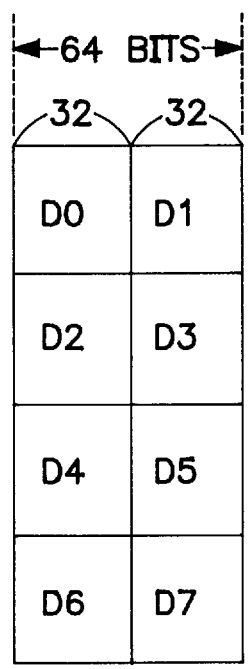
FIG. 23 shows an example of a method of storing data in an external memory.
Figure 24:
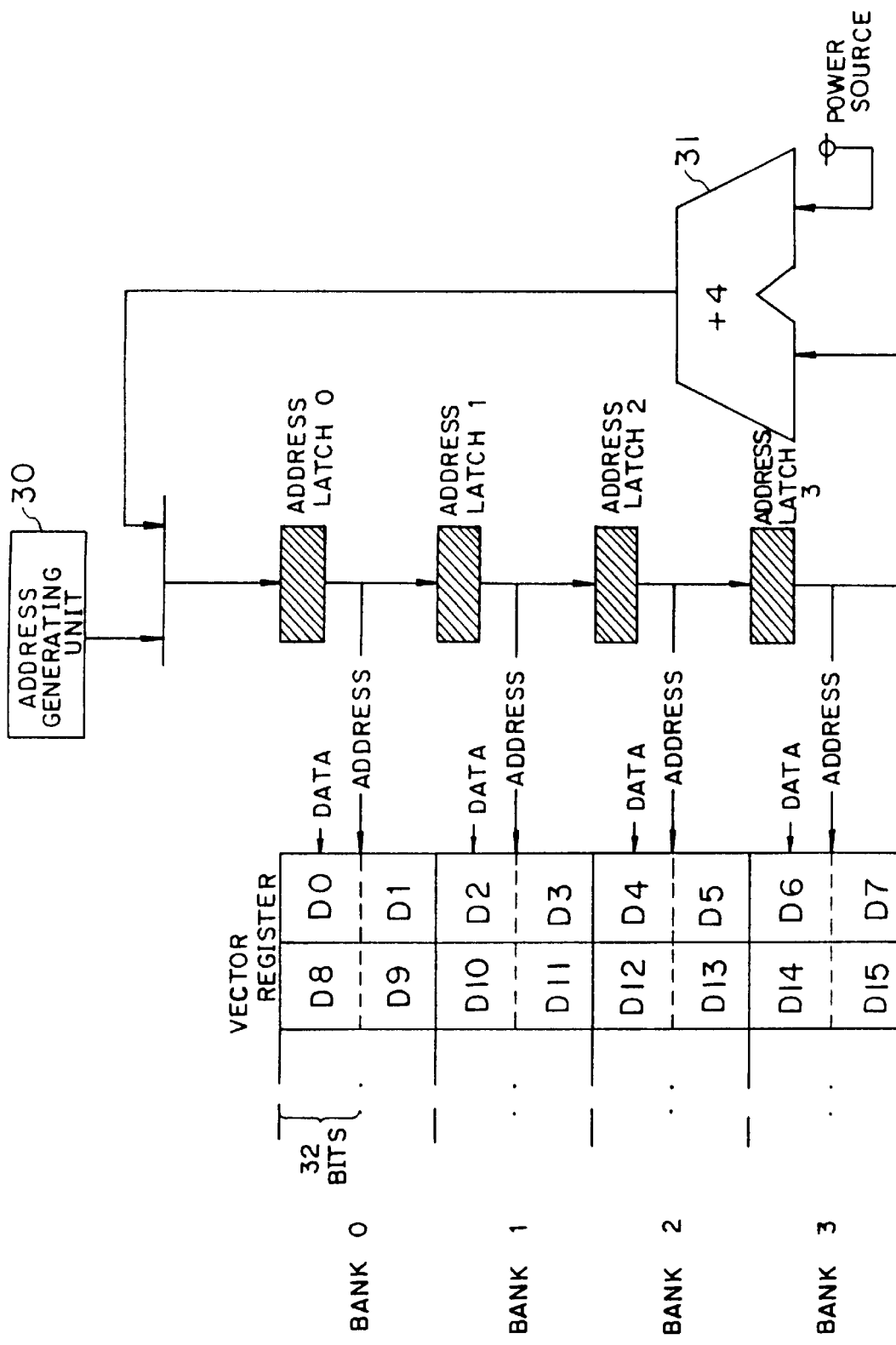
FIG. 24 shows the write of data read from an external memory to a vector register.
Figure 25:
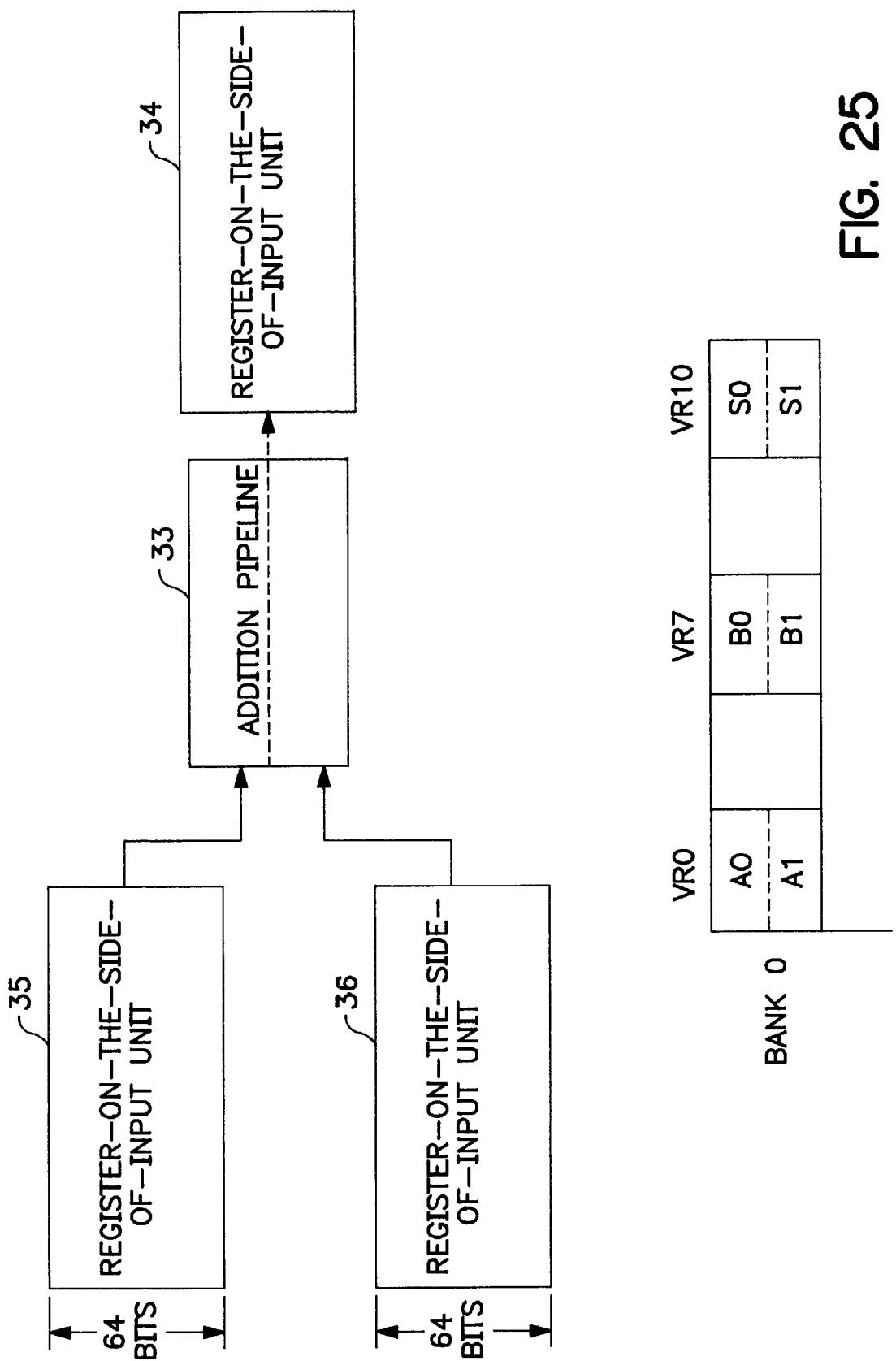
FIG. 25 shows the write of an arithmetic operation result obtained by an addition pipeline to a vector register.
Figure 26:
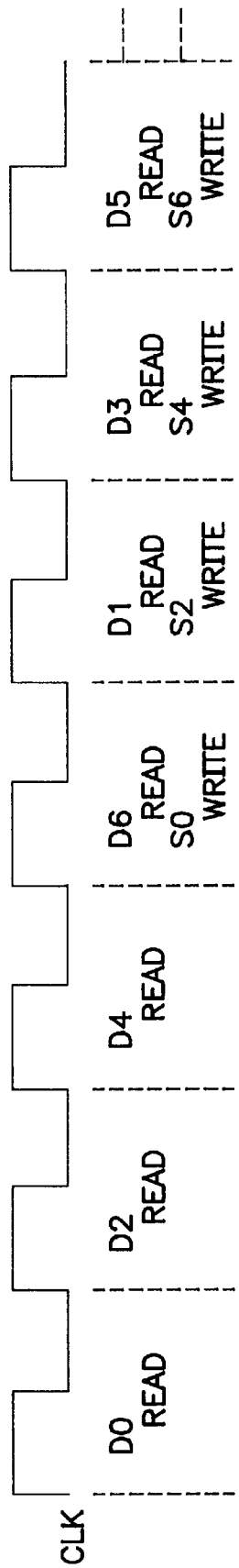
FIG. 26 is an operational time chart of the read of data in a vector register and the write of the conversion result to a vector register.
Figure 28:
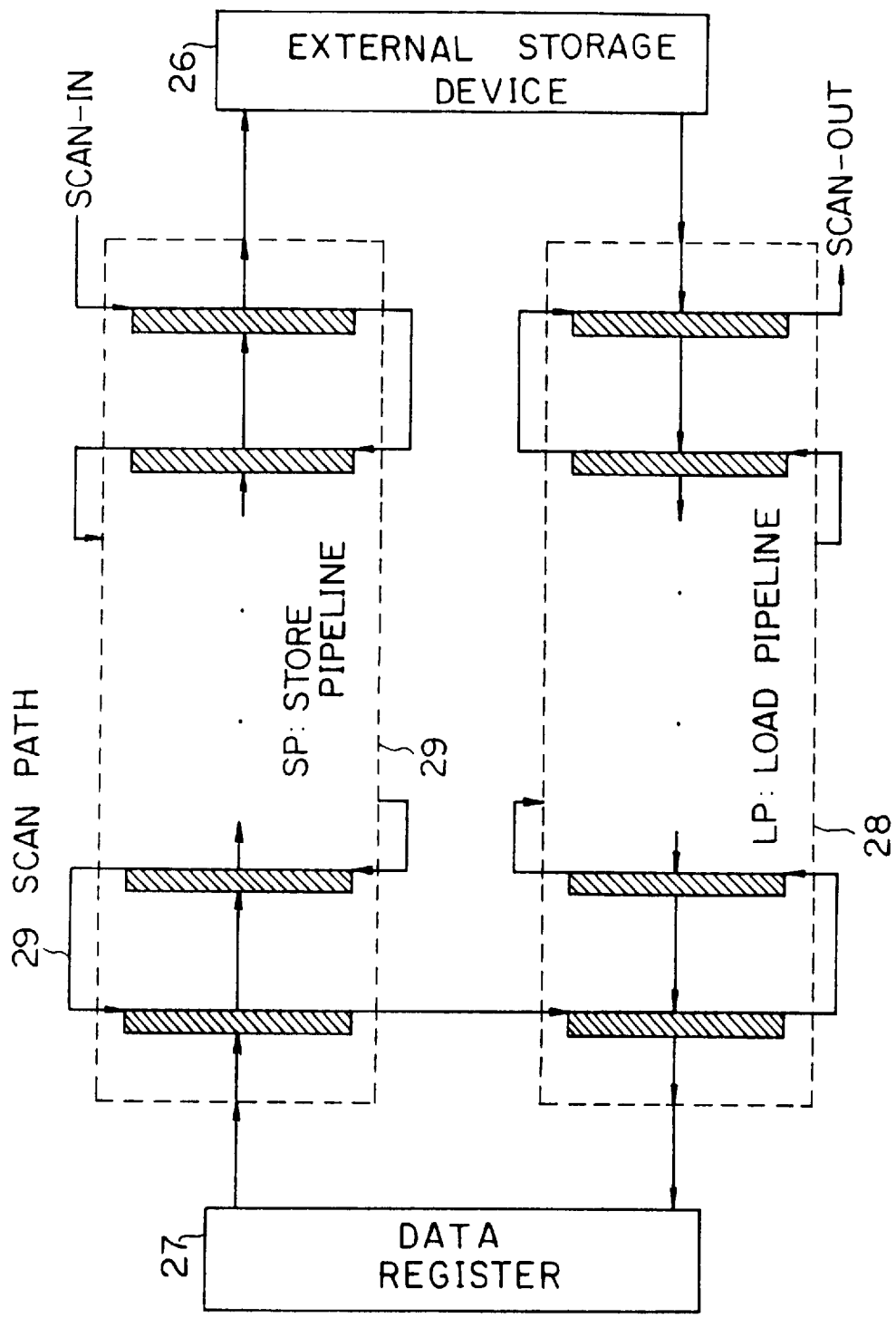
FIG. 28 shows the test method of the load/store pipeline shown in FIG. 6.
Figure 67:
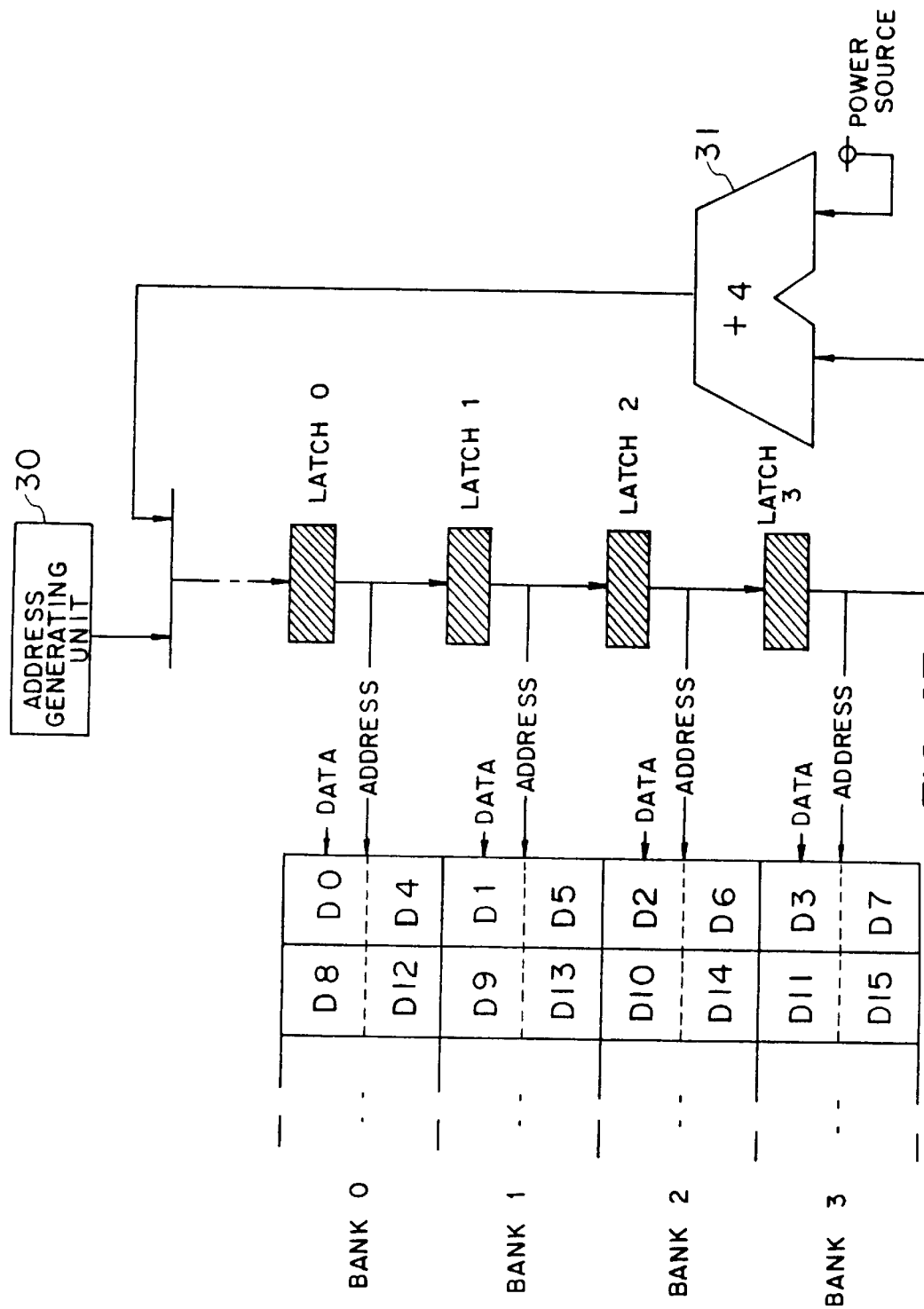
FIG. 67 shows the write of data to the register according to the second embodiment.
Figure 68:
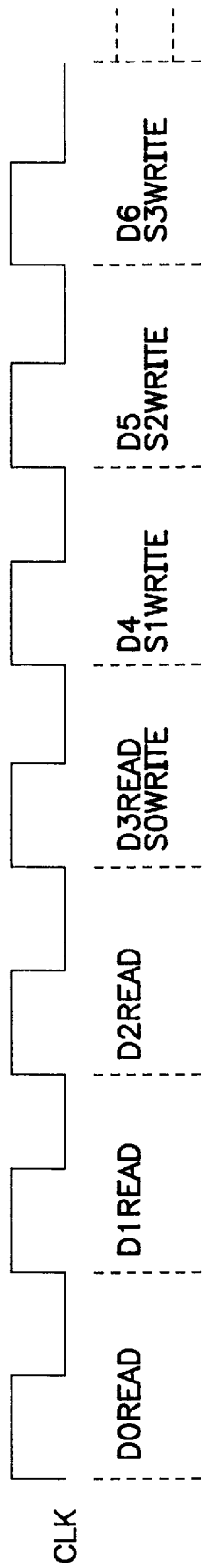
FIG. 68 is a time chart for explaining the converting operation of data in the register according to the second embodiment.

According to the microprocessor of the present embodiment, when data are loaded as shown in FIG. 67 from the external storage unit 125 in which data are stored as shown in FIG. 23 to the data register 126. In FIG. 67, connecting power source to one input of the adder 31 indicates that the carry-in of the adder is constantly assigned "1". Data stored as shown in FIG. 67 are accessed in each bank, and converted, for example, from single precision to double precision by an ADD pipeline as shown in FIG. 68.

Figure 69:
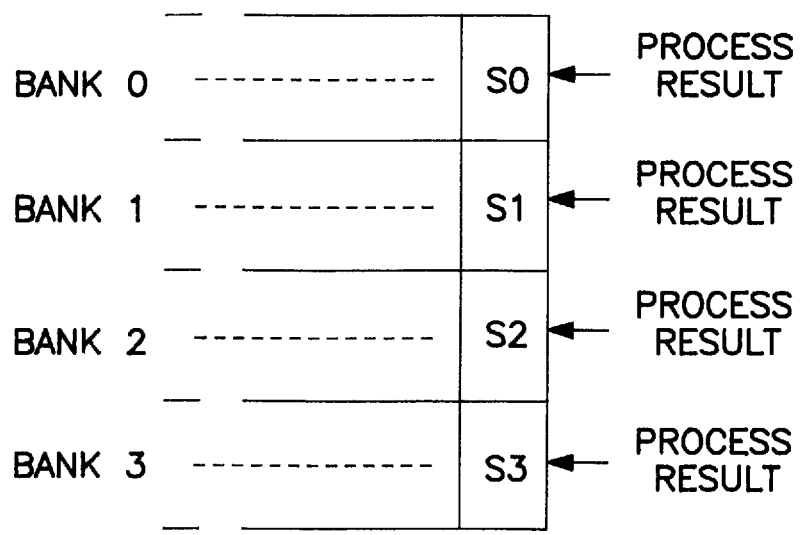
FIG. 69 is the method of storing in a register a conversion result according to the second embodiment.

Data are stored in the data register in the order in which the data can be stored "as is" in the external storage unit 125 as shown in FIG. 69. When 10 data are loaded from the external storage unit 125 to the data register 126 of the microprocessor, 32-bit data are necessarily rearranged, and then loaded and stored in the data register 126 so that the system performance can be improved in response to any instruction. Thus, the performance of the processor can be greatly improved.

When processed data in the data register 126 are stored in the external storage unit 125, 64-bit data can be stored "as is" according to the above described data convert instruction. However, 32-bit data must be rearranged before being stored, and the data rearranged are restored into the original order.

Therefore, according to the present embodiment, data are rearranged between the external storage unit 125 and the data register 126 of the microprocessor, and then loaded or stored.

First, the data rearranging operation is explained by referring to 32-bit data (8 pieces of data) to be loaded in series.

Data can be stored in the external storage unit 125 in various formats. Accordingly, the data array in the external storage unit 125 shown in FIG. 70 can be realized.

Figure 71:
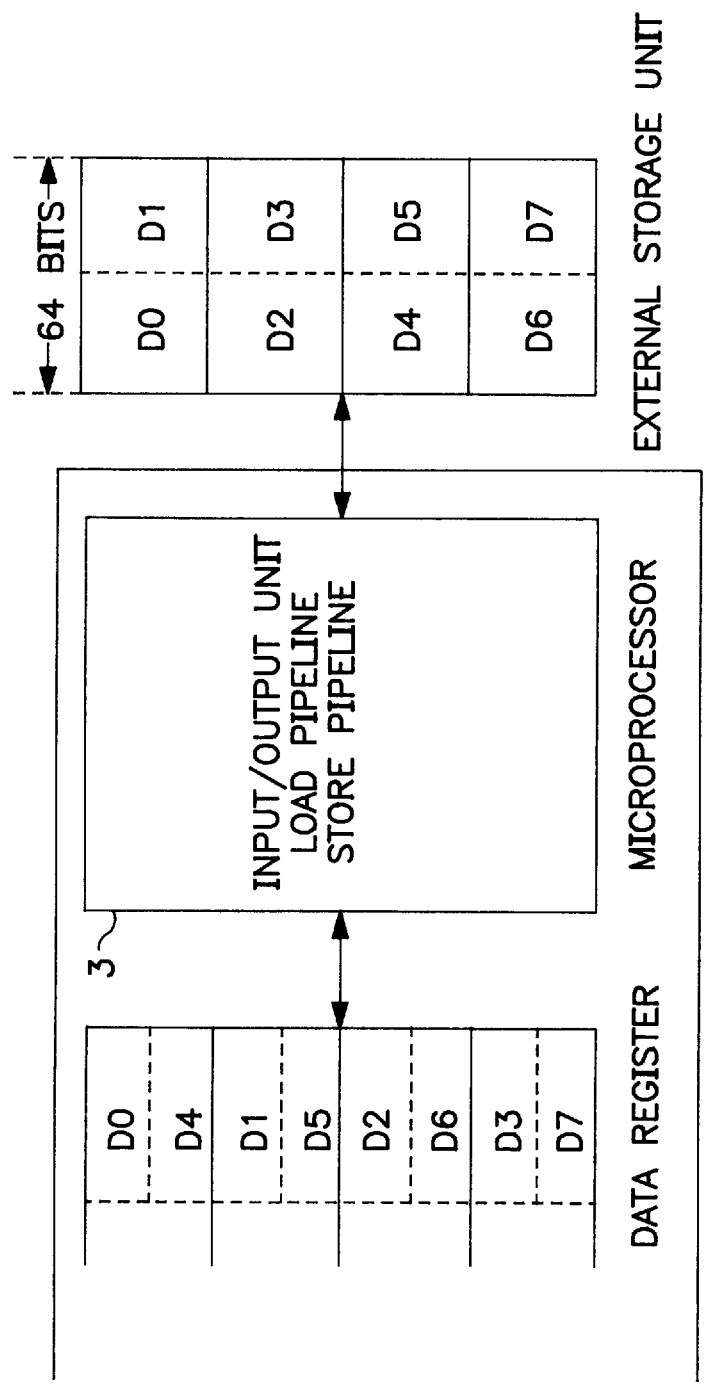
FIG. 71 shows the method of storing data in the register and an external storage unit according to the second embodiment.

However, 32-bit serial data in any data array can be stored as shown in FIG. 71 in the data register 126 in the microprocessor.

If 32-bit data are not arranged in series or loaded in the 64-bit data array, the data are loaded as is to the data register 126 in the microprocessor except the 32-bit misaligned data.

An operation example when data are loaded is explained below in detail.

Assuming that loaded data are 32-bit misaligned data with a stride value of +1, the external storage unit 125 can access a memory with zero wait (with no wait), and the bus timing of the microprocessor is determined such that a pipeline mode is entered to access data at 1-clock timing after accessing data at a 2-clock timing in the basic mode.

First, as shown in FIG. 71, data are rearranged in the load pipeline LP, and the data are outputted to the data register 126. The process is controlled according to a signal from the control circuit CC in the input/output unit 127.

Figure 72:
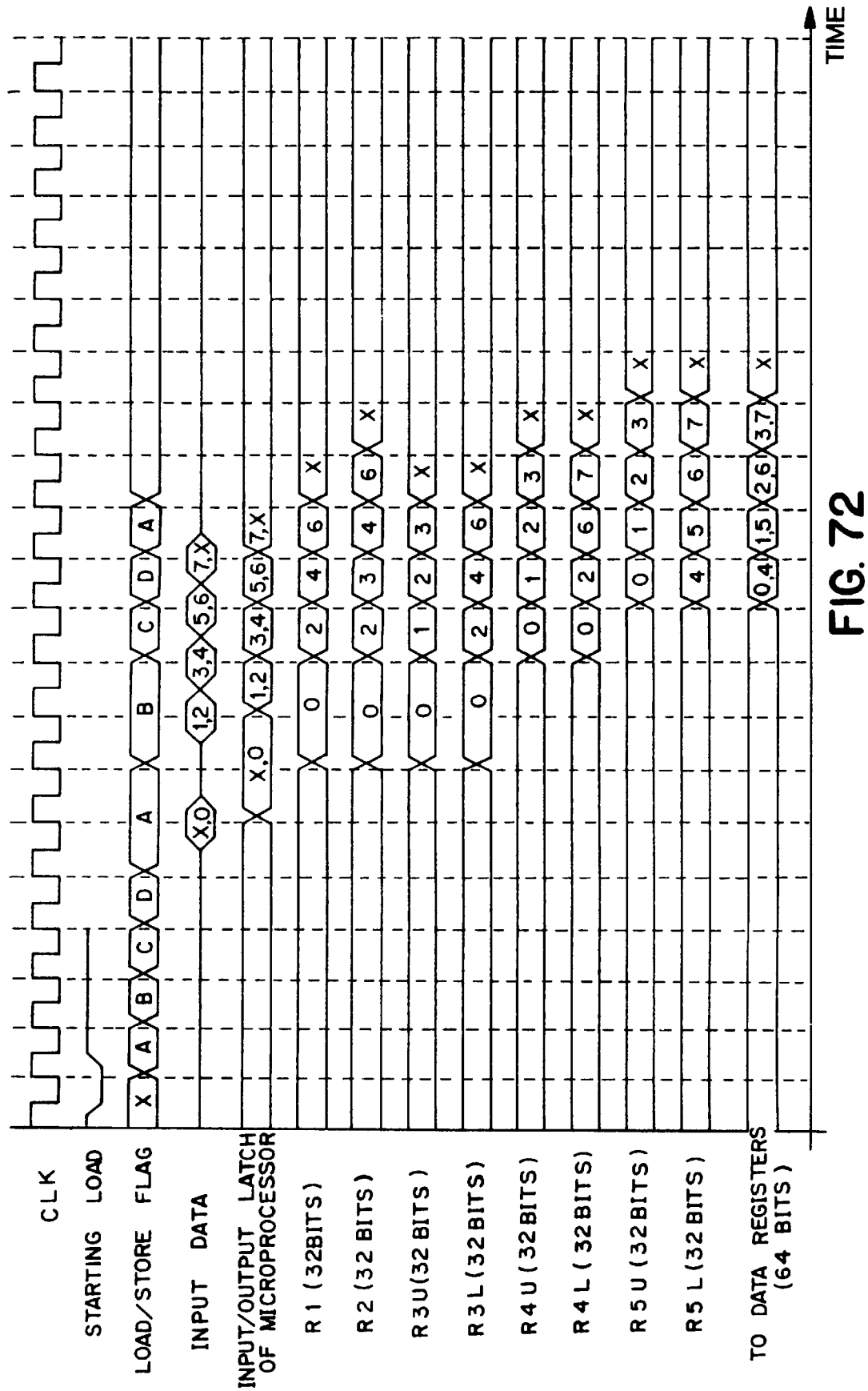
FIG. 72 is a time chart showing the data flow in the load pipeline.

FIG. 72 is a timing chart showing the data flow through the load pipeline.

A typical signal for controlling the load pipeline LP is a load/store flag signal. As shown in FIG. 72, signals A, B, C, and D indicating four conditions are generated according to an interlocking clock in a microprocessor from the rise of the cycle of the clock by detecting the rise of the clock for which a load/start signal indicates the active state in the load pipeline LP after activating the data load instruction of the microprocessor. A load/store flag signal is used in controlling the load pipeline LP.

The information of aligned or mis-aligned data for use in controlling a select signal, or the information of a stride value of 32-bit data are provided by another unit in the microprocessor, for example, an address unit.

Figure 70:
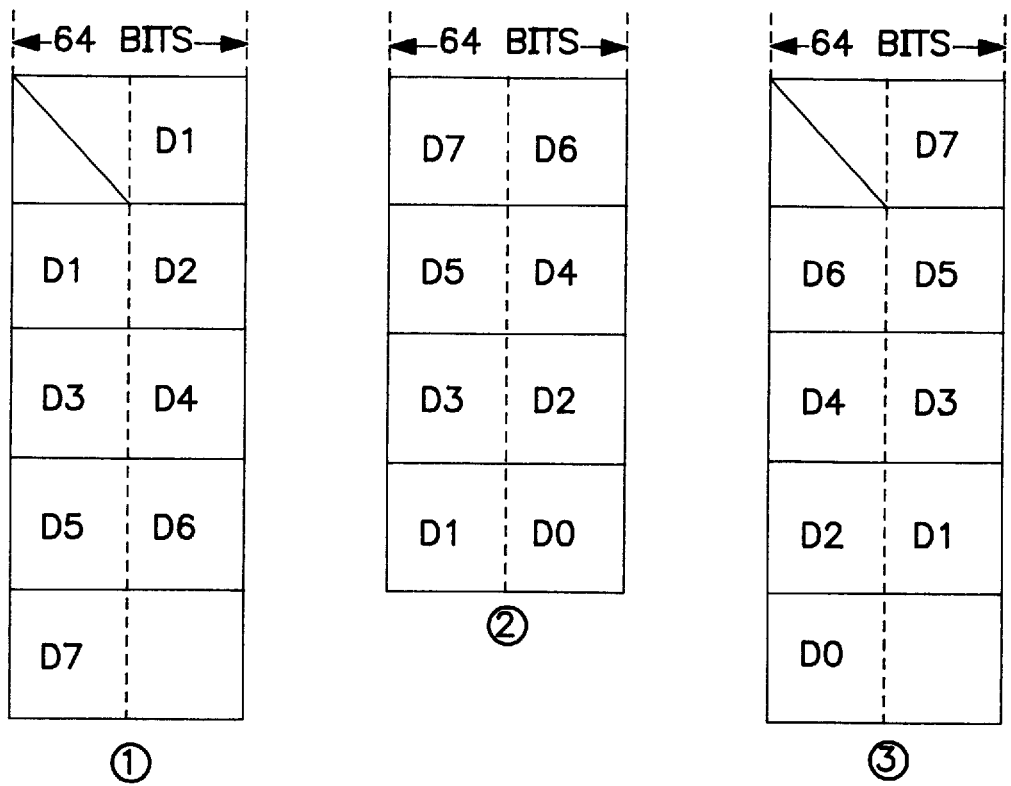
FIG. 70 shows an example of storing data in an external storage unit.

By referring to FIG. 63, the switch of selectors and the storage in latches are explained. First, when the load/store flag indicates "A" after it has changed in a cycle from A to D (A, B, C, and D), it is assigned X.0 as an input data, where X indicates the 32-bit higher order contents. It is shown in FIG. 70-1 as variable. "0" indicates the contents of data D0.

The 64-bit input data are inputted to two selectors S1 and D2 in the next cycle as data DI from the input latch LL. At this time, since the input data are 32-bit misaligned data in series, S1 selects DIU, that is, "X", and S2 selects DIL, that is, "0". The higher order data DU in data D indicates "X", and the lower order data DL indicates "0". Thus, "0" as DL is latched in latch $R^1$ in the next cycle.

Then, selector S3 selects "0" as DL because (4), (7), and FB (load store flag B) are established. The value is stored in latch R2. Then similar processes are performed repeatedly.

Therefore, data X-0, 1-2, 3-4, 5-6, and 7-X inputted to the load pipeline LP are rearranged to 0-4, 1-5, 2-6, and 3-7 through 32-bit width latches R1, R2, R3U, R3L, R4U, R4L, R5U, and R5L so as to prepare the optimum data array at the issue of an instruction of the microprocessor.

Next, an operation example for data when they are stored is explained in detail.

Figure 73:
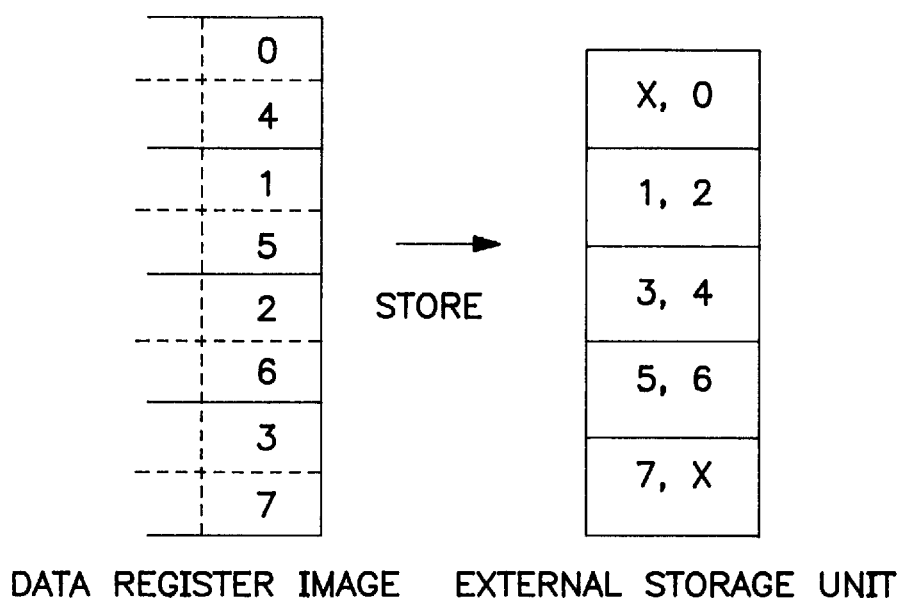
FIG. 73 shows the method of storing data in the external storage unit from the register according to the second embodiment.

The data are stored according to the applicable conditions as their loading was explained and described above. When the data are stored from the data register 126 to the external storage unit 125, they are arranged as shown in FIG. 73.

Figure 74:
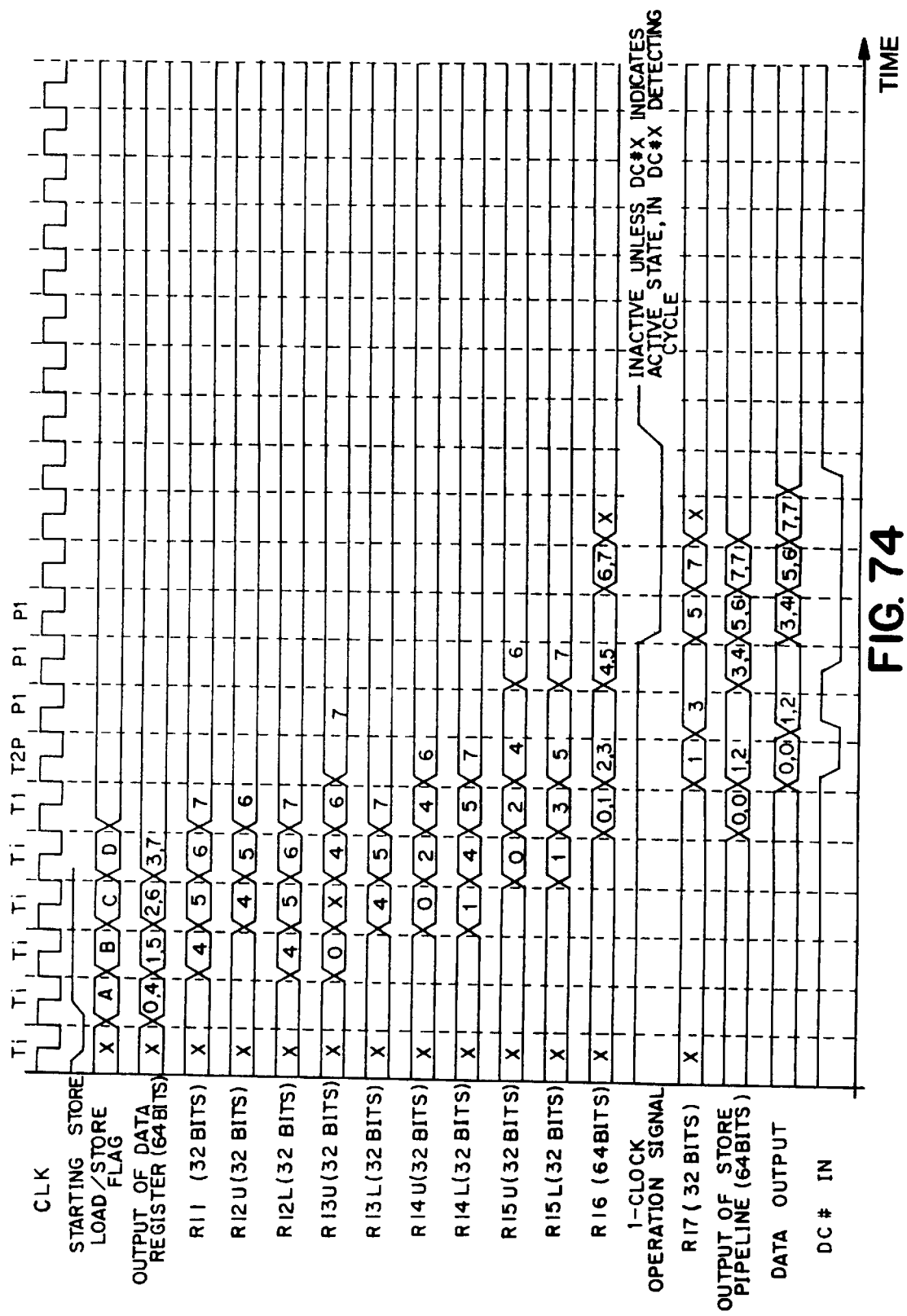
FIG. 74 is a time chart showing the data flow in the store pipeline.

FIG. 74 is a timing chart indicating the data flow in the store pipeline.

Data 0-4, 1-5, 2-6, and 3-7 outputted by the data register 126 are controlled by latches R11, R12U, R12L, R13U, R13L, R14U, R14L, R15U, R15L, R16, R17of the store pipeline SP, and selectors S11 through S22, and are outputted in the format stored in the external storage unit 125.

That is, as in the loading operation, signals A, B, C, and D indicating four conditions are generated as load store flags by detecting the rise of a clock for which a start signal indicates the active state in the store pipeline SP.

Figure 75:
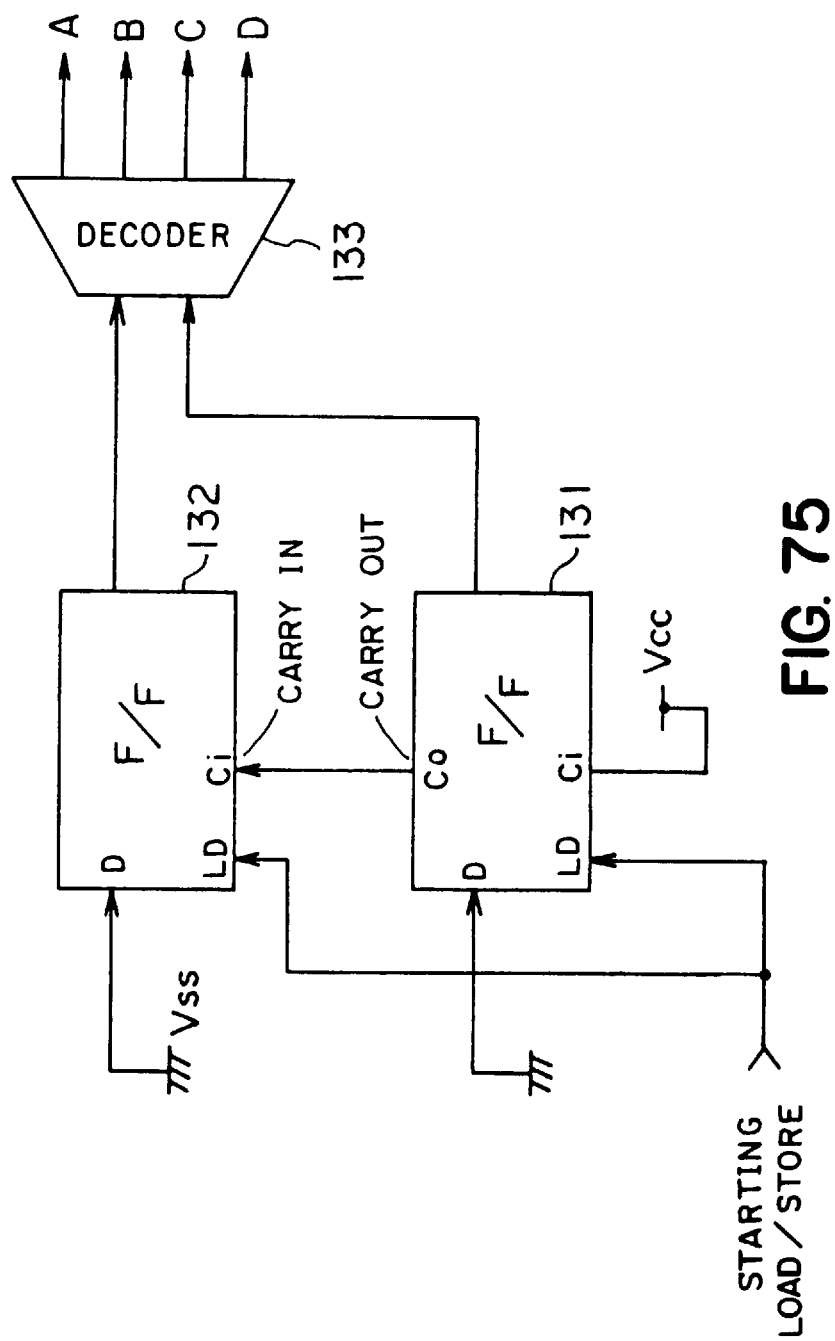
FIG. 75 is a block diagram for explaining the detailed configuration of the load/store flag generating unit according to the second embodiment.

FIG. 75 is a detailed block diagram indicating the load/store flag generating unit according to the second embodiment of the present invention. The load/store flag generating unit is provided in the control circuit in the input/output unit 127 shown in FIG. 62. The circuit as a generating unit comprises two flipflops 131 and 132, and a decoder 133 to which the outputs of these flipflops are applied. The circuit actually configures a 2-bit counter. When a load/store start is detected, 00 is received by a D terminal as an input. Afterwards, the state 01, 10, 11, 00, . . . is repeated and is decoded by the decoder 133 to form flags A, B, C, D, A, . . . These flags are determined regardless of the configuration of the vector register having four banks. They are generated for convenience in rearranging data in the load/store pipeline.

During the control of the store pipeline SP, information such as data types, etc. are provided by other units as in the control of the load pipeline LP. However, in storing data, a 1-clock operation signal is generated by the control circuit CC and used to control the store pipeline SP.

A 1-clock operation signal for use in storing data is used on the select condition of selectors S19 and S20 shown in FIG. 65.

A 1-clock operation is a pipeline operation for transmitting one piece of data at a 1-clock cycle. A store pipeline is operated according to an interlocking clock generated by stopping a clock pulse when a DC# signal is not inputted from an external memory. Outputting data according to an interlocking clock may fail to keep up with the 1-clock operation. Therefore, a 1-clock operation signal is used to control selectors S19 and S20 so that the contents of latches R15U and R15L at one step before latch R16 at the last step in the store pipeline can be outputted. The operation is executed when 64-bit data are stored as well as when 32-bit data are stored for their rearrangement.

In FIG. 74, a symbol Ti assigned to a clock signal indicates that the processor is in the idle state; T1 indicates that a bus use right is obtained to output an address; T2P indicates that data corresponding to addresses outputted according to T1 are inputted/outputted; and T1 indicates that addresses and data are inputted/outputted at each clock as a pipeline cycle. T1 and T2P form the basic mode of data access.

Figure 76:
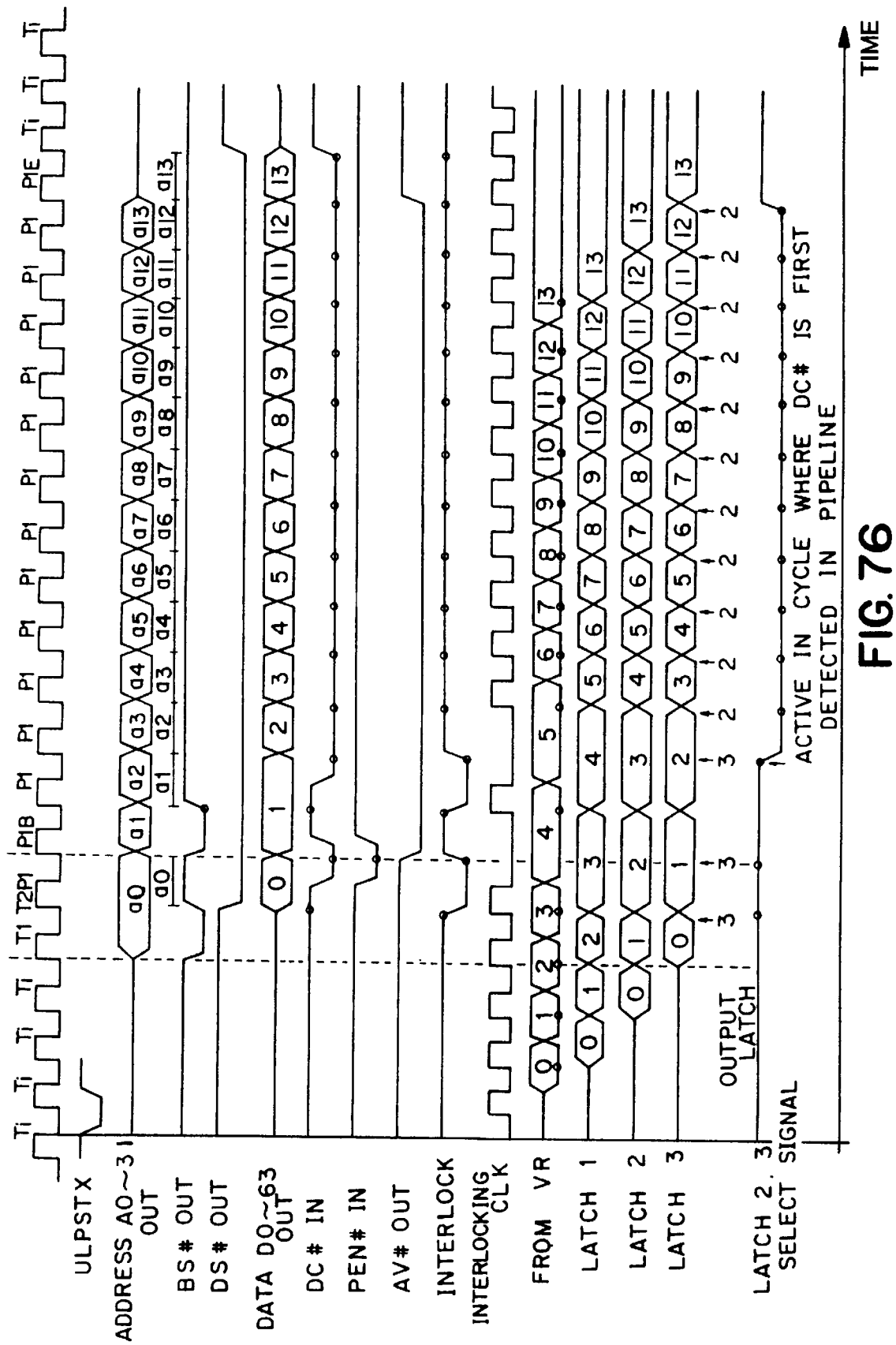
FIG. 76 is a time chart for explaining the 1-clock operation in the store pipeline.

FIG. 76 is a timing chart for explaining the 1-clock operation.

In FIG. 76, latch 2 indicates R15U and R15L shown in FIG. 65, and latch 3 indicates R16 shown in FIG. 65.

FIG. 76 shows the storage of 64-bit data with zero wait (no wait). The pipeline mode (1-clock access) is entered after basic modes T1 and T2P1 are operated. Addresses and data are outputted at each clock from the microprocessor. Latch 1 corresponds to R14.

However, as for the data in latch 3, data "3" cannot keep up with the output latch of the microprocessor when a DC# is returned from an external unit to switch data because the store pipeline SP is operated according to the interlocking clock.

An interlocking clock is controlled according to the input of a DC#. Unless a DC# is returned from an external unit, the clock is turned on or off at one cycle delay. That is, when a storing process enters the pipeline mode for a 1-clock operation, data cannot be provided at an acceptable timing if they are outputted from the store pipeline SP according to the interlocking clock.

Therefore, the present embodiment aims at providing data in an acceptable timing in the 1-clock operation by selecting the outputs of latches R15U and R15L, that is, one latch before the last latch R16.

That is, a 1-clock operation signal indicates the active state by assuming that a 1-clock operation mode is entered if a DC# is returned from an external unit in the cycle where the DC# is detected at the change in the 1-clock operation. If the storage unit allows a wait, then a 1-clock operation signal indicates the inactive state because a DC# may not be returned in the cycle where a DC# is detected.

Accordingly, an acceptable operation is guaranteed during the 1-clock accessing process. FIG. 76 shows the operation of storing 64-bit data where R14through R16are used exclusively. That is, the preceding latches are used for rearranging 32-bit data. In FIG. 76, it is not necessary to rearrange data, and data can be outputted at a higher speed than in the operation shown in FIG. 74.

Next, the test of the load pipeline LP and the store pipeline SP is explained.

During the LSI test involving selectors and latches, the failure analysis is often conducted by reading a scan path. However, with the increasing number of selectors and latches, the test time is extended accordingly. Thus, a failure detecting test within a short time is earnestly demanded.

In the present embodiment, test codes are set in a register, and the values are decoded to open/close a normal path selector so that the register can perform a normal latch to immediately read test data through a data bus.

Data can be provided externally as in the load of data by adding a specific terminal to the terminal unit 128 so that an input/output switch signal can be applied from an LSI external pin when a signal to the terminal indicates the active state. If the signal indicates the inactive state, the current process retains the storage state, that is, data can be outputted from the processor.

Figure 77:
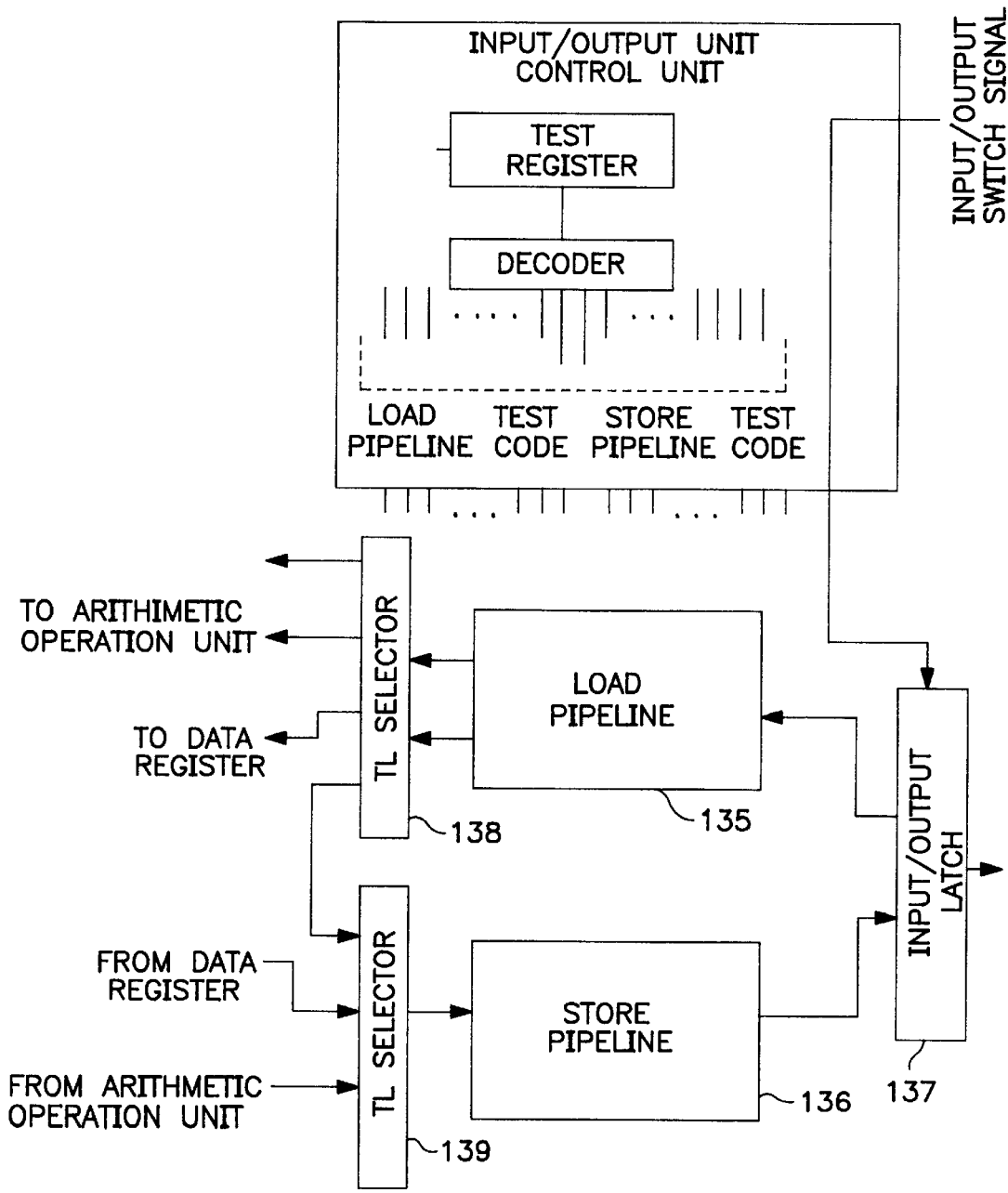
FIG. 77 is a block diagram for explaining the test method of the load/store pipeline according to the second embodiment.

FIG. 77 is a block diagram for explaining the testing operation according to the present invention.

Actually, an operation of testing a load pipeline LP is explained by referring to FIGS. 63 and 64 (selection conditions for a load pipeline LP).

First, if a test code "0" is assigned to a load pipeline LP, data in latches R5U and R5L, the latches nearest to the output side in the load pipeline LP 135, are applied to the store pipeline SP, and read from the input/output latch 137 through latch R16, the latch nearest to the output side in the store pipeline SP 136. That is, the test code "0" starts a test of a selector and a latch in a load pipeline and a store pipeline.

Next, if a test code "1" is assigned to a load pipeline LP, data are swapped in selector S1 in the load pipeline LP 135, and data are inputted in latches R5U and R5L, the latches nearest to the output side, as in the case of the test code "0". Then, the data are read from the input/output latch 137 after being latched in latch R16 of the store pipeline SP 136.

That is, the test code "1" indicates whether or not selector S1 of the load pipeline LP has an error.

Thus, since test codes are associated with the selection conditions of all selectors S1 through S8 of the load pipeline LP, any data can be inputted by changing the test code, and all latches and selectors of the load pipeline LP can be checked by reading the data.

This is not limited to the load pipeline LP, but can be effective with the store pipeline SP. Each latch and selector can be tested by setting a test code of the store pipeline SP and passing through one step of the load pipeline LP.

In the second embodiment, a TL selector 138 and a TS selector 139 are provided as shown in FIG. 77. These selectors 138 and 139 are used to selectively connect the load pipeline LP and the store pipeline SP in testing these lines.

That is, a path from the load pipeline LP to the data register 126 is normally selected, and the data applied to the store pipeline SP are sent from the register 126.

When each arithmetic operation unit (not shown in the figures) in the microprocessor is tested, a path for transmitting arithmetic operation data from the load pipeline LP directly to an arithmetic operation unit is provided for the TL selector, and a path for reading test arithmetic operation results of each arithmetic operation unit from the store pipeline SP is also provided.

Thus, data are directly transmitted to an arithmetic operation unit and directly stored therein because it takes a very long time to perform an arithmetic operation by an arithmetic operation unit by providing data from data register 162 loaded with predetermined data, and to use a path for storing the results of the data register 162 after the results are stored in the data register 162 again. Besides, if the data register 162 has an error, the arithmetic operation unit cannot be tested at all.

Therefore, in the present embodiment, data are inputted according to an input/output switch signal in the test, and arithmetic operation data and non-arithmetic operation data are generated as the data for use in arithmetic operations and provided for an arithmetic operation pipeline.

The data, that is, the result of an arithmetic operation performed by an arithmetic operation unit, are outputted to an external unit through the TS selector 139 and the store pipeline SP.

Latch R6shown in FIG. 63 is a latch used in testing an arithmetic operation unit. After an input/output switch signal has been applied and data are latched in latches R5U and R5L, the first piece of data, that is, the non-arithmetic operation data, are controlled to be latched in latch 6R. The data inputted following the first piece of data, that is, arithmetic operation data, are latched in latches R5U and R5L, and outputted to a path for the data register 126.

Therefore, in testing an arithmetic operation pipeline, the data from the above described two paths can be provided for the arithmetic operation pipeline after being selected by the TL selector 138 as non-arithmetic operation data and arithmetic operation data. The "data" described here are 64-bit width data, but 64-bit data and two pieces of 32-bit data do not make any difference at all.

A unit for outputting an arithmetic operation test result to an external unit by the store pipeline SP through the TS selector 139, that is, a path connecting the store pipeline to the terminal unit 128, is the same as that used in the test of the load pipeline LP except that the TS selector selects different data.

Figure 78:
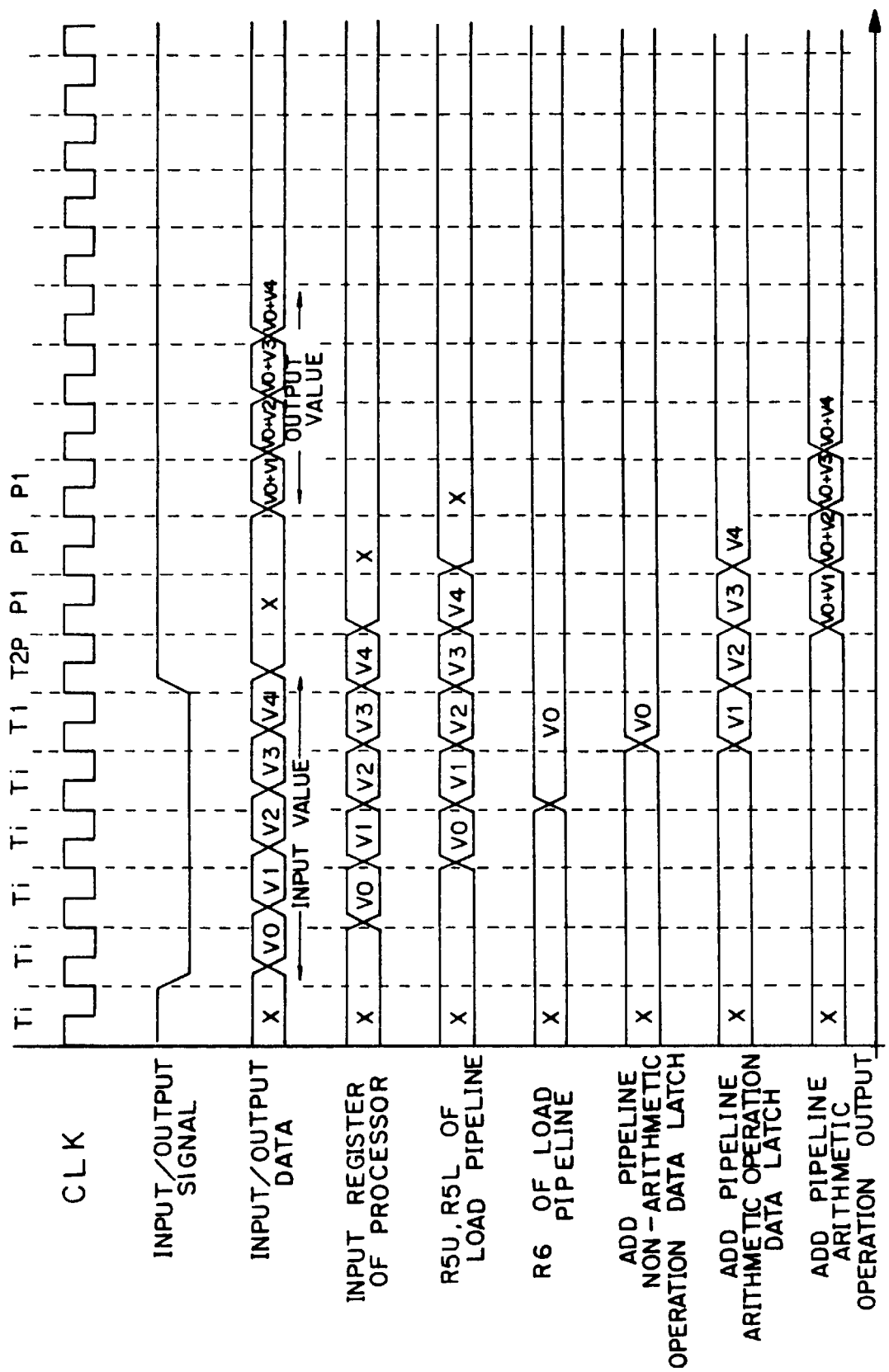
FIG. 78 is a time chart of the operation during a test of an addition pipeline according to the second embodiment.

FIG. 78 is a timing chart explaining the operation of the input/output unit when an ADD pipeline having two pipeline stages is tested.

In the present embodiment, non-arithmetic operation data are once latched in latch R6and fixed. However, they can be switched at each cycle as in latch R5.

Thus, an arithmetic operation unit can confirm the result using the data stored during the normal operation. FIG. 78 is a time chart of a test. A clock need not be an interlocking clock, but fundamentally, it is operated as an input/output unit according to an interlocking clock.

Thus, in the present embodiment, the data are loaded to the data register 126 of the microprocessor, or the data in the data register 126 are stored in, for example, the main storage unit without wasting the advanced performance of the processor. This performance may be realized by all the instructions of the microprocessor.

Furthermore, errors can be detected in a short cycle during the test, and even the processor can be easily tested by providing a path capable of reading a result in a short cycle.

As described above, according to the second embodiment of the present invention, m/n bit width data are rearranged by the data input/output unit when data are loaded from the data storing unit to the data holding unit or stored in the data storing unit. Especially when the data holding unit is a data register comprising 1 bank registers, the data register is divided and the data in series from the data storing unit are loaded for the m/n bit width at predetermined positions in each bank. When they are stored, the above described processes are performed in the reverse order.

Therefore, since the optimum data array can be obtained in response to a microprocessor by rearranging data loaded or stored to a data register, the procedures can be optimized accordingly for any kind of instruction, thereby making the most of the performance of a processor.

During the test, test data are inputted and outputted through the load pipeline LP and the store pipeline SP of the data input/output unit. Therefore, a processor can be easily tested, and the test time can be successfully shortened.

The third embodiment of the present invention will be explained. This embodiment is required to solve the third problem, namely, that an arithmetic operation circuit of a vector processor operating as a memory accessing device is designed to be optimized for respective processing contents thus the time required to develop the memory accessing device cannot easily deal with the case when the arithmetic operation circuit tends to be long and further when the scale of the arithmetic operation is changed. The third embodiment realizes an arithmetic operation circuit which deals with modification of the scale of the arithmetic operation with ease by using a combination of basic circuits which achieve the minimum scale of an arithmetic operation.

Figure 79:
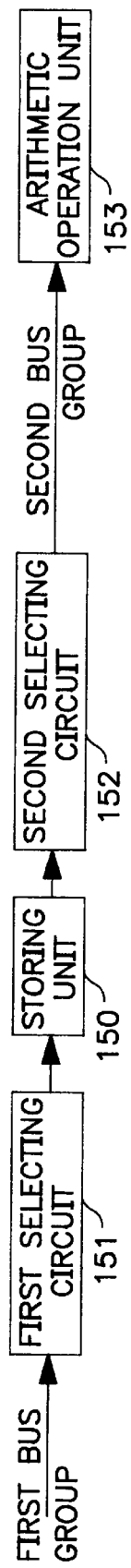
FIG. 79 is a block diagram explaining the principle of the third embodiment of the present invention.

FIG. 79 is a block diagram showing the principle structure of the third embodiment. As shown in FIG. 79, the third embodiment comprises storing unit 150 for storing data, a first selecting circuit 151 for writing to the storing unit 150 data transmitted from the first bus group selected in accordance with a predetermined timing signal, a second selecting circuit 152 for reading the contents of storing unit 150 onto the second bus group selected in accordance with the predetermined timing signal and arithmetic operation unit 153 for executing an undetermined arithmetic operation based on the data read onto the second bus group. These elements form a single basic circuit and an arithmetic operation circuit within the vector processor can be realized by connecting a plurality of basic circuits.

Figure 80:
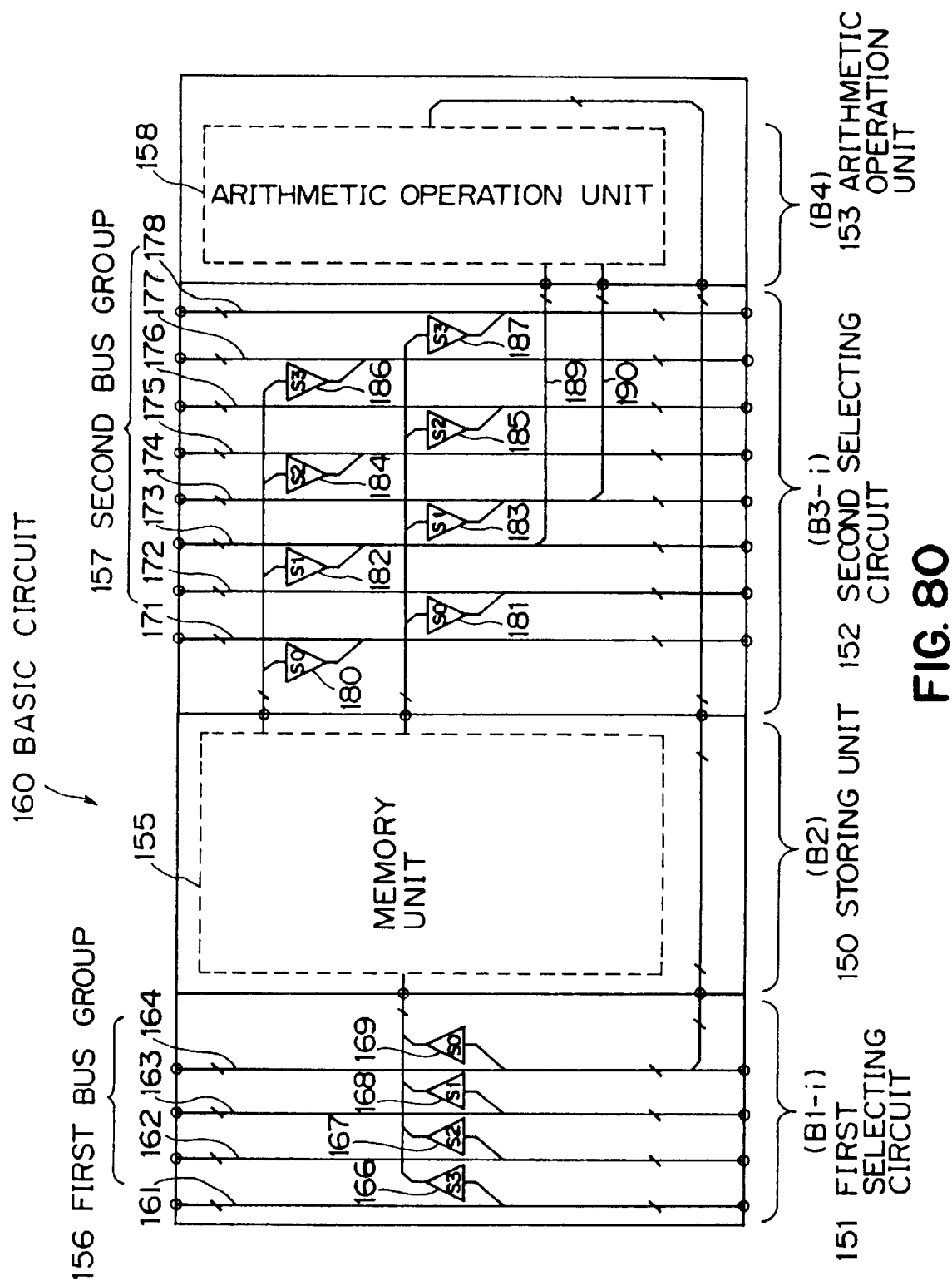
FIG. 80 is a block diagram of the configuration of the basic circuit according to the fourth embodiment.

The third embodiment is explained by referring to the drawings. FIGS. 80–83 show the structures of the arithmetic operating circuit according to the third embodiment applied to a four stage pipeline vector arithmetic operation unit. In FIG. 80 basic circuit 160 comprises four blocks "B1-1", "B2", "B3-1", and "B4". B1-i and B3-i represent a pipeline stage which is called a bank, and four pipeline stages are considered here and thus i is one of 0,1,2, and 3.

The first block from the left, B1, operates as the first selecting circuit 151 and is provided with the first bus group 156 comprising four bus lines 161 to 164 (each of which has a width of 64 bits, for example) and selectors 166 to 169 for respective bus lines. The symbols S0, S1, S2 and S3 shown on the selectors represent the pipeline cycle (shown in FIG. 82) corresponding to the predetermined timing signals. For example, selector 166 selects bus line 161 for the duration of cycle S3, and data on the bus line 161 is written into the memory unit 155 within the second block from the left, B2.

Figure 81:
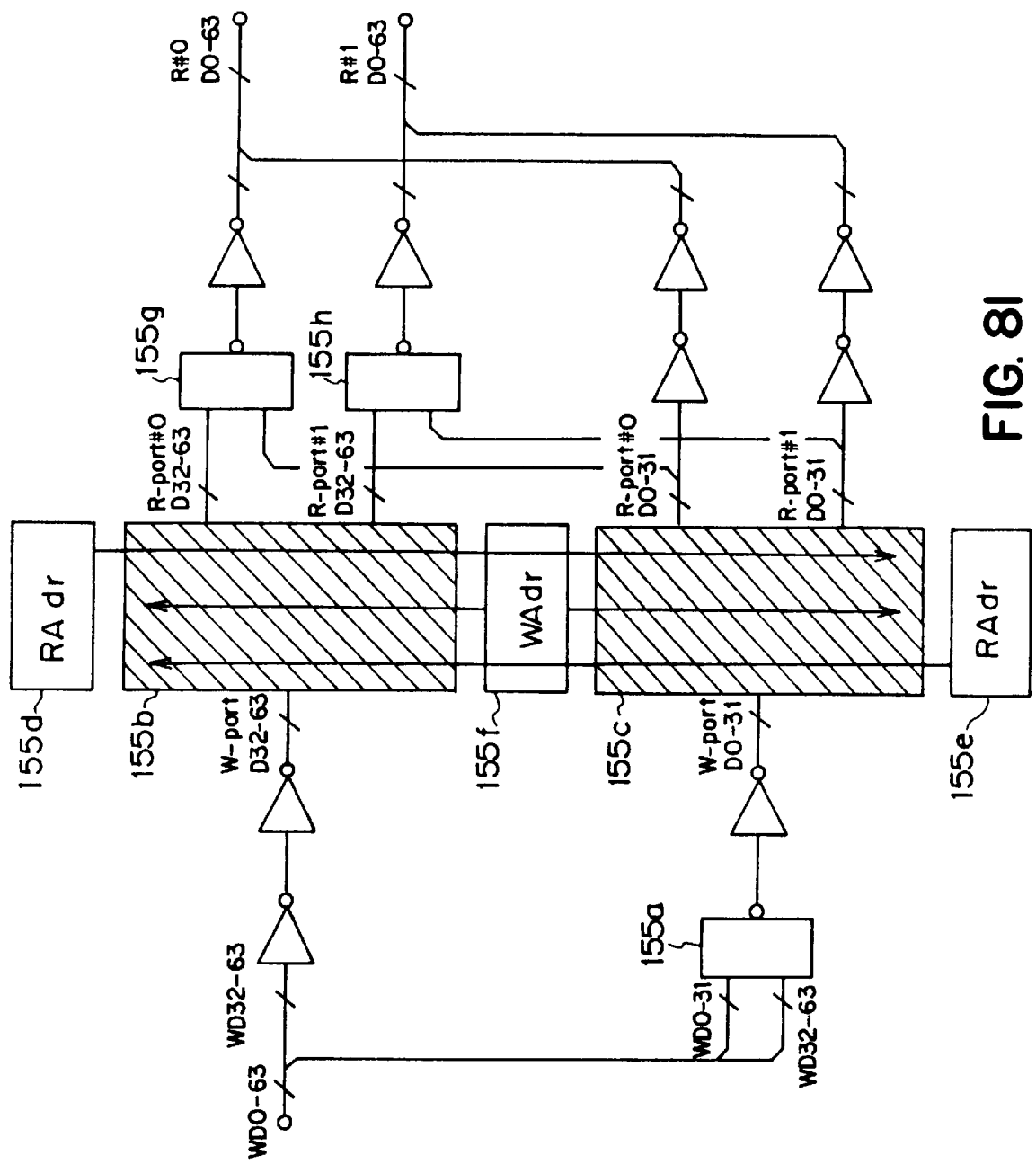
FIG. 81 is a block diagram of the configuration of the memory unit according to the fourth embodiment.

FIG. 81 shows an example of the configuration of memory unit 155. A write selector 155a selects half (WD0-31/WD32-63) of the 64 bits of write data (WD0-63) and the memories 155b and 155c have a capacity of 256×4 bytes each. The memory 155b on the higher side can read 32-bit data (D32-63) from the write port (W-port). Memory 155c on the lower side can input 32-bit data (D0-31) from the write port similarly and can output 32-bit data (D0-31) from read port (R-port#0/R-port#1) respectively. Read decoders 155d and 155e produce read addresses for two memories 155b and 155c. Write decoder 155f produces write addresses for memories 155b and 155c. Read selectors 155g, and 155h select 32-bit data from the two memories 155b and 155c. Memory unit 155 outputs 64-bit data (R#0/R#1) from respective two read ports (R-port#0/R-port#1) along two output routes. The two memories 155b and 155c store either 32-bit data or 64 bit-data according to a switch. The 64-bit data can be stored by switching the write selector 155a in accordance with the state ("0"/"1") of the lowest bit of the address (for example, the 8-bit address). For example, when the lowest bit is"0" the write selector 155a selects WD-0-31 and then this data WD0-31 is stored in the memory 155c on the lower side and thus the data (WD-0-31) is combined with the data (WD32-63) in the memory 155b on the higher side, thereby acting as 64-bit data. Two read selectors 155g and 155h select different read port when the lowest bits of the address is "0", namely, select the read ports "D0-31" and "D32 -63" respectively.

In FIG. 80, the third block 3B-i in FIG. 80 from the left operates as the second selecting circuit 152 and comprises the second bus group 157 including 8 bus lines 171 to 178 (each of which has a width of 64 bits, for example) and selectors 180 to 187 for respective bus lines. The symbols S0, S1, S2 and S3 shown on the selectors represent the pipeline cycles (shown in FIG. 82) corresponding to the predetermined timing similarly to the block B1-i. For example, selector 180 selects the bus line 171 at cycle "S0" and reads the data from the memory unit 155 onto the selected bus line 171.

The right-most block B4 receives the data on the second bus group 157 and comprises arithmetic operation unit 158 for performing the vector operation. The operation result is outputted onto the bus line 164 in the left-most block B1-i. Two predetermined selectors of the selectors 180 to 187 in block B3-i (the selectors 182 and 183 are shown in FIG. 80) are connected to arithmetic operation unit 158 through bus lines 187, 189 and 190 and the predetermined selector is determined by the bank number (pipeline stage) assigned to the basic circuit 150.

Figure 82:
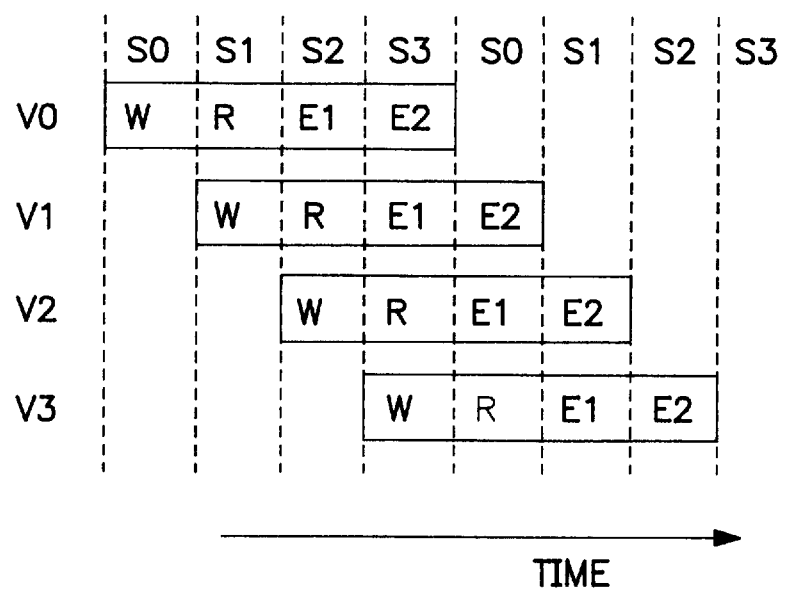
FIG. 82 is a cycle chart of the 4-step pipeline process.

FIG. 82 shows a cycle chart of the four stages of the pipeline processing. Banks V0–V3 sequentially execute write (W) read (R) the first operation (E1) and second operation (E2). The basic circuit 160 is represented by V0. The read (R) cycle of V0 is at S1 and thus selectors 182 and 183 for reading the data in memory block 155 at cycle S1 are connected to operation unit 158. When the basic circuit 160 is V1, the read (R) cycle of V1 is at S42 and thus selectors 184 and 185 for reading the data in the memory block 155 at cycle S2 are connected to arithmetic operating unit 158. When the basic circuit 160 is V2(S3 ), selectors 185 and 187 are connected to the arithmetic operation unit 158, and when the basic circuit 160 is V3 (S0 ), selectors 180 and 181 are connected to the arithmetic operation unit 158.

Figure 83:
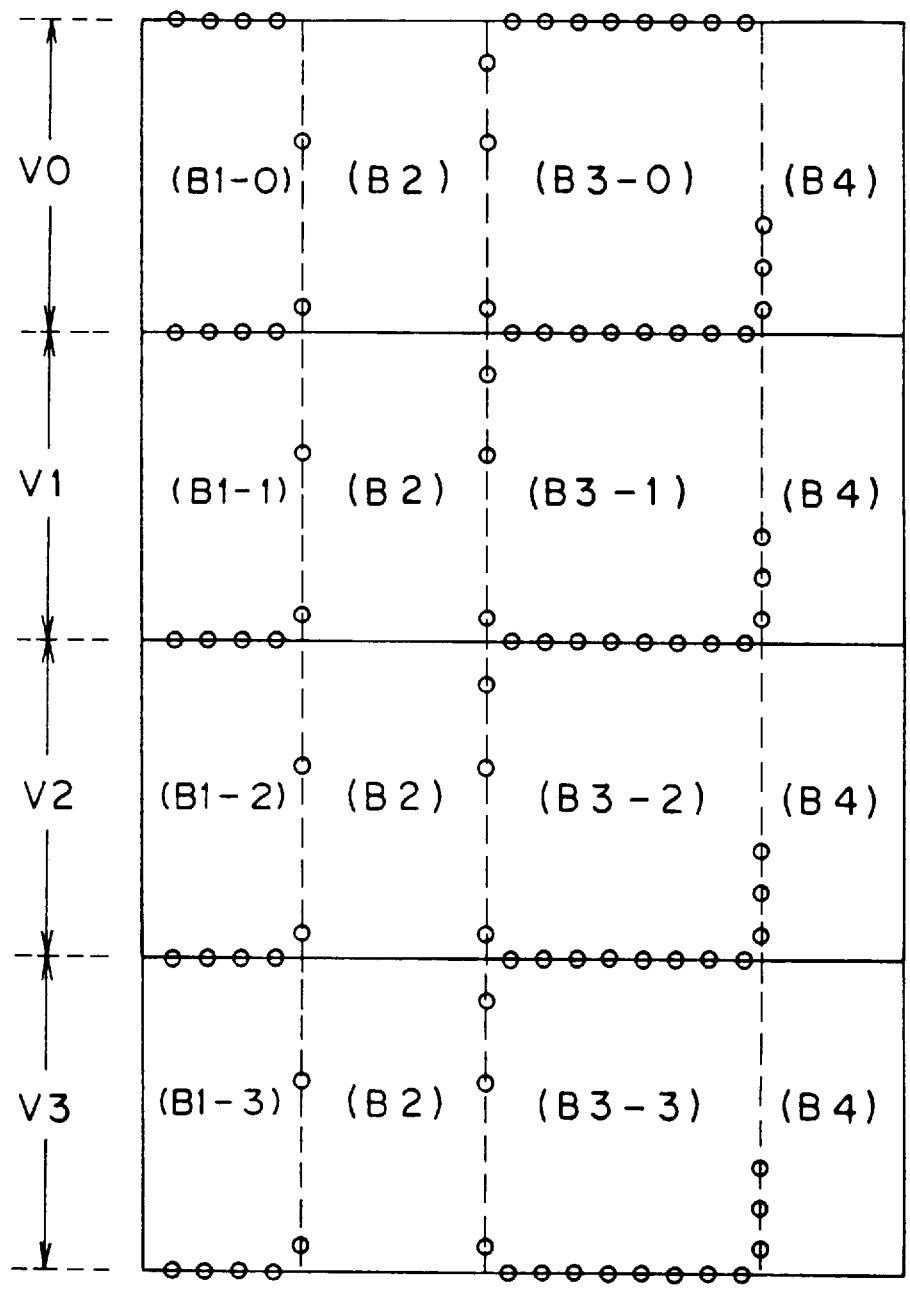
FIG. 83 shows a layout of the 4-step pipeline vector arithmetic operation circuit based on the basic circuit according to the third embodiment.

FIG. 83 shows a layout drawing of the four stage pipeline vector operation units. Respective banks V0 to V3 repeat the operation of the four blocks "B1-i", "B2", "B3-i" and "B4", namely, comprise copies of basic circuit 160. Circles (o) provided on the boundaries of the blocks represent cross-sectional views of the respective bus lines in the basic circuit and the bus lines of the adjacent basic circuit are connected through the cross-sectional view represented by the circles.

According to this construction, the respective banks perform write (W), read (R), the first operation (E1) and the second operation (E2) respectively for respective pipeline cycles (S0 –S3 ).

For example, in the bank V0 (in FIG. 80), at cycle S0;
the bus line 164 of the first bus group 156 is selected and data on the selected bus line 164 is written into memory unit 155 (W);
at cycle S1;
the bus lines 173 and 174 of the second bus group 157 are selected and the data in the memory unit 155 is read (R) onto the selected bus lines 173 and 174;
at cycles S2 and S3;
the data on the selected bus lines 173 and 174 are received by operation unit 158 and a predetermined arithmetic operation is carried out, and thereafter the result of the arithmetic operation is output to the bus line 164 of the first bus group 156.

The sequence of the process is as follows.

The explanation of the data transfer between banks is omitted.

Figure 84:
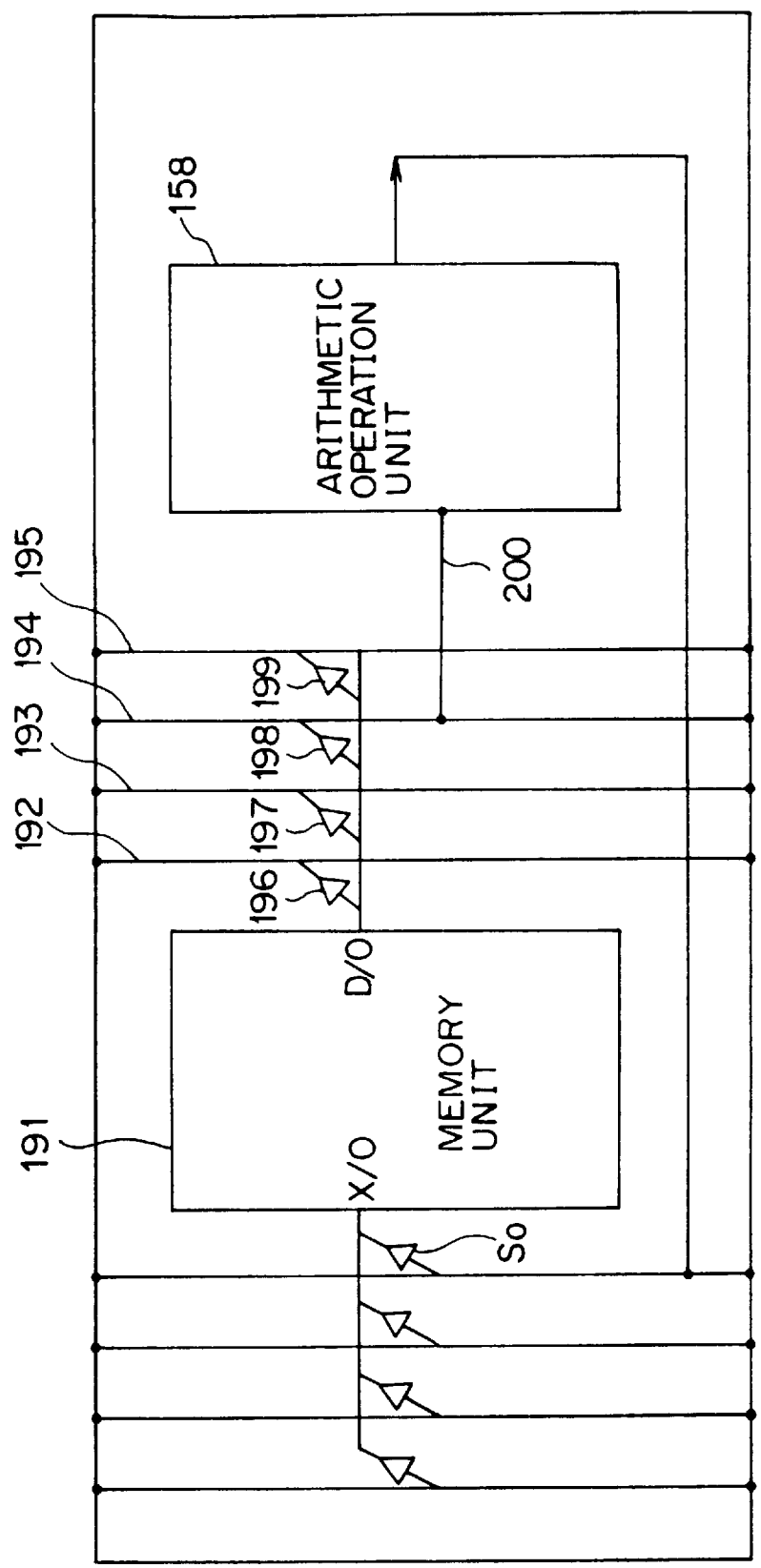
FIG. 84 is a block diagram of the configuration of the basic circuit using a memory unit having one read port.

FIG. 84 shows a block diagram of an embodiment of a basic circuit utilizing a memory unit 191 with a single read port in place of the memory unit 155 with two read ports in FIG. 80. In FIG. 84, in order to read the data twice from the memory unit 191 at cycle S1 corresponding to bank V0 shown in FIG. 82, the selector 198 selects the memory 291 in the first half of the cycle S1 and the memory 194 in the second half and data is transmitted to arithmetic operation unit 158.

As described above in the present embodiment, the basic circuit 160 is formed of four blocks necessary for a minimum scale of arithmetic operation processing (namely, an operation scale corresponding to one bank, for example) and further combinations of basic circuits 160 can be formed. Accordingly, by selecting the number of basic circuits in the combination, the operation scale required is realized, thereby significantly shortening the period required for development of the operation circuit and allowing the circuit to be changed for any scale of operation with ease.

The fourth embodiment of the present invention will be explained. The fourth embodiment is required to solve the fourth problem, namely that data processing by an arithmetic operation of the vector operation processor as a other memory access device is shifted in timing from the processing performed by the input/output unit.

Figure 85:
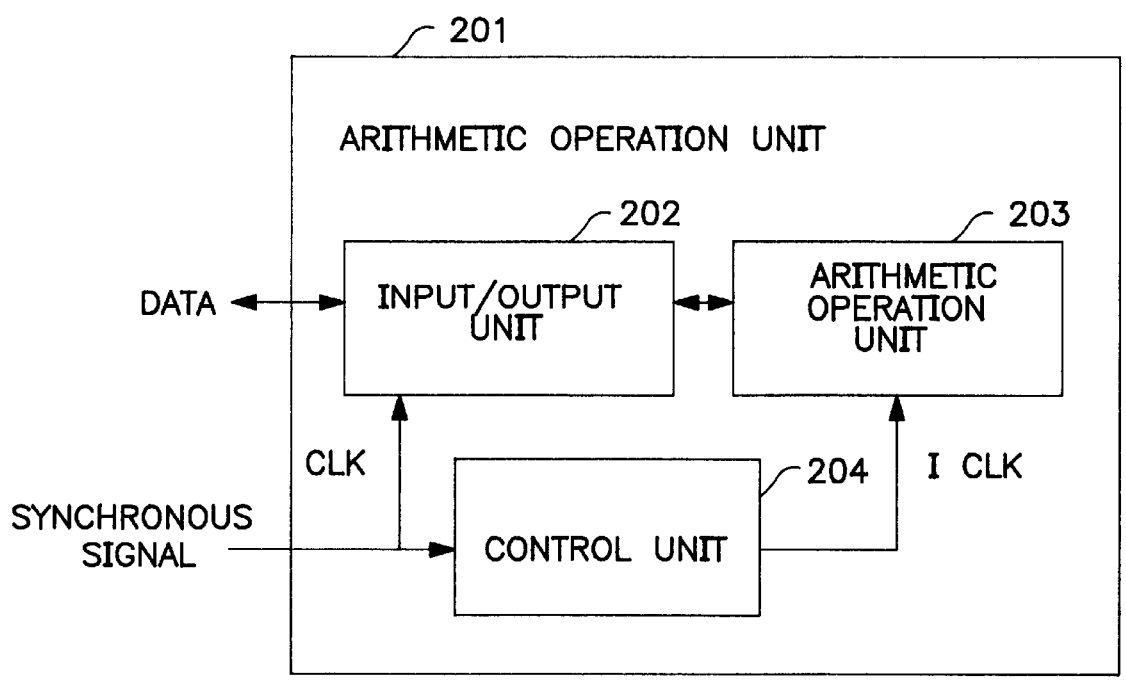
FIG. 85 is a block diagram for explaining the principle of the fourth embodiment of the present invention.

FIG. 85 shows a block diagram of principle structure of the fourth embodiment. In FIG. 85, the arithmetic operation apparatus (for example, a vector processor) comprises input/output unit 202 for performing input and output operations between the processor and external memory based on a synchronous signal received externally (for example a clock signal), an arithmetic operator 203 performing a predetermined arithmetic operation based on the data obtained through the input/output unit 202, and a control unit 204 for controlling the operation of the input/output unit 202 and arithmetic operator 203 based on a control signal received externally. When the timing of the data input/output unit 202 is shifted from the timing of the arithmetic operation in the arithmetic operation unit 203 due to a delay in the operation of the external memory, for example, control unit 204 controls the arithmetic operation of the arithmetic operating unit 203 to adjust the timings between the input/output unit 202 and the arithmetic operation unit 203. The arithmetic operation unit 203 is controlled by using a clock ICLK with an interlock as the synchronous signal supplied to arithmetic operation unit 203.

As described above, in the fourth embodiment, even if the processing of the input/output unit 202 is different from that of arithmetic operation unit 203, the synchronization of the input/output unit 202 and arithmetic operation unit 203 can be established by stopping the operation of the arithmetic operation unit 203 during the period corresponding to the delay of the input/output unit 202 without performing special control of the arithmetic operation unit 203, thereby preventing the processed data from being shifted in relation to each other.

Figure 86:
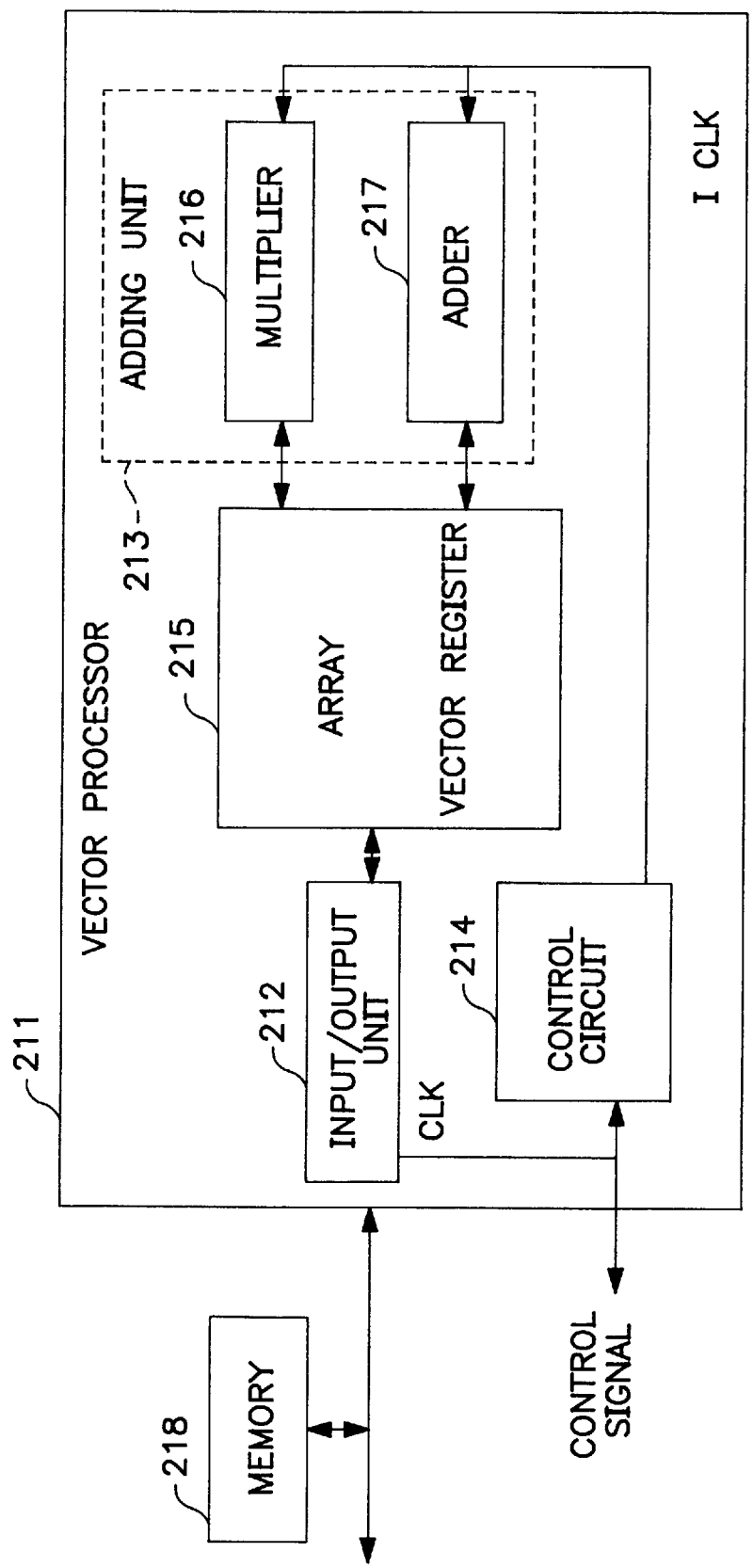
FIG. 86 is a block diagram of the detailed configuration of the fourth embodiment.

The structure of the fourth embodiment will be explained. FIG. 86 shows a block diagram of a structure of the fourth embodiment. The vector processor 211, an operating apparatus comprises input/output unit 212 operating as input and output means 202 and control circuit 214. Further, arithmetic operating unit 213 comprises arrayed vector register 215, a multiplier 216 and an adder 217. An external memory 218 is also provided.

Input and output unit 212 comprises a load/store pipe (L/S pipe) for performing an input and output operation. Input and output 212 transfers the data stored in the external memory 218 to arrayed vector register (VR) 215 upon executing a load command and transfers the data stored in arrayed vector register 215 to an external memory 218 upon executing a stored command. The input/output unit 212 transfers the data in a 2-clock cycle as the basic mode during a continuous operation but the operation of the input/output unit 212 changes depending on the speed of external memory 218.

Arithmetic operating unit 213 is provided with multiplier 216 (MUL pipe) for performing a multiplier operation and adder 217 (ADD pipe) for performing an adding operation and respective operators 216 and 217 perform an operation based on the data stored in the arrayed vector register 215 and write the operation result in the arranged vector register 215. Respective operators 216 and 217 perform parallel operations independently from each other and perform arithmetic operations in units of 1 clock during the conductive operation.

Memory 218 comprises a main storage provided externally, for example, and is required to have a two-clock operation so that the memory 218 is optimized for the input/output unit 212.

Figure 87:
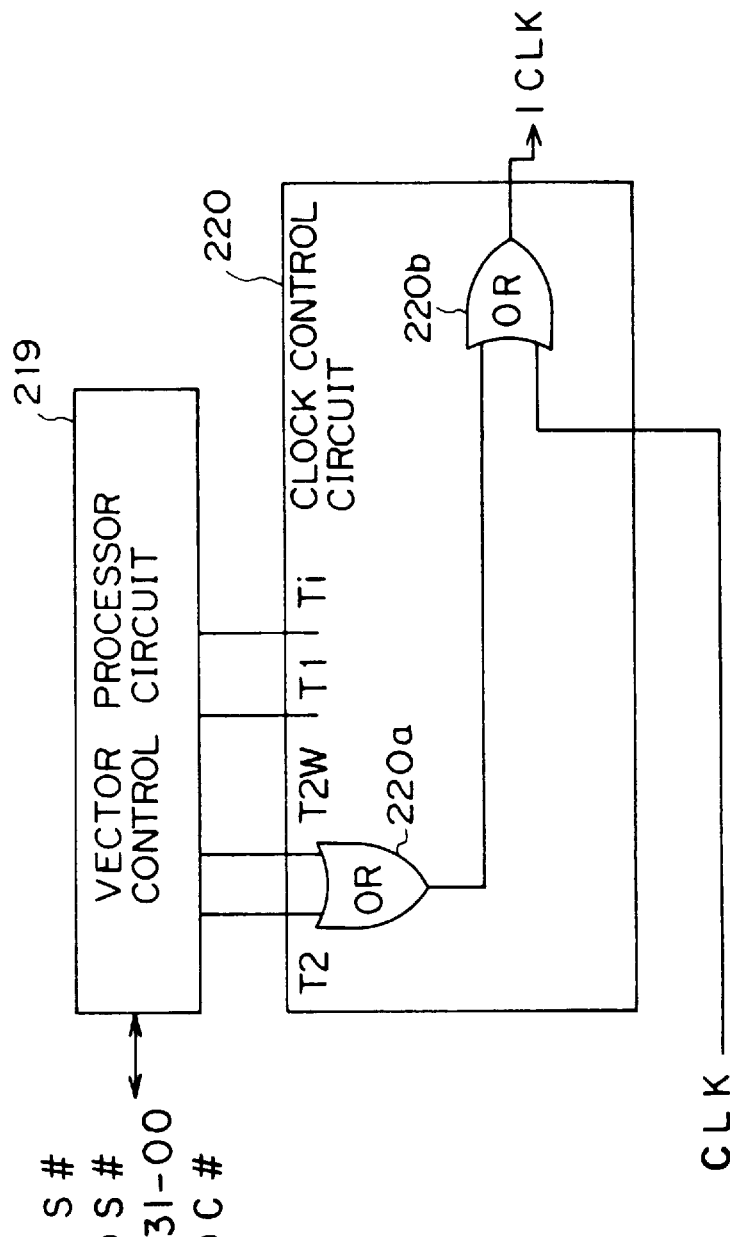
FIG. 87 is a block diagram of the detailed configuration of the control circuit according to the fourth embodiment.

Control circuit 214 is formed of a vector processor control circuit 219 and clock control circuit 220 as shown in FIG. 87 and the vector processor circuit 219 comprises the control circuit of the vector processor 211 and controls the input/output unit 212 and respective operators 216 and 217 in accordance with the command provided from the external unit and performs control of an interface with the external unit.

Clock control unit 220 controls a interlocked clock signal supplied to respective operators 216 and 217 based on the control signal sent from the vector processor control circuit 219.

In FIG. 87, BS# is a bus start signal, DS# are data strobe signals, A31-00 is an address signal, DC# is a data complete signal, and T1, Ti, T2, T2W are internal states signals outputted from the vector processor circuit 218, 219.

Figure 88:
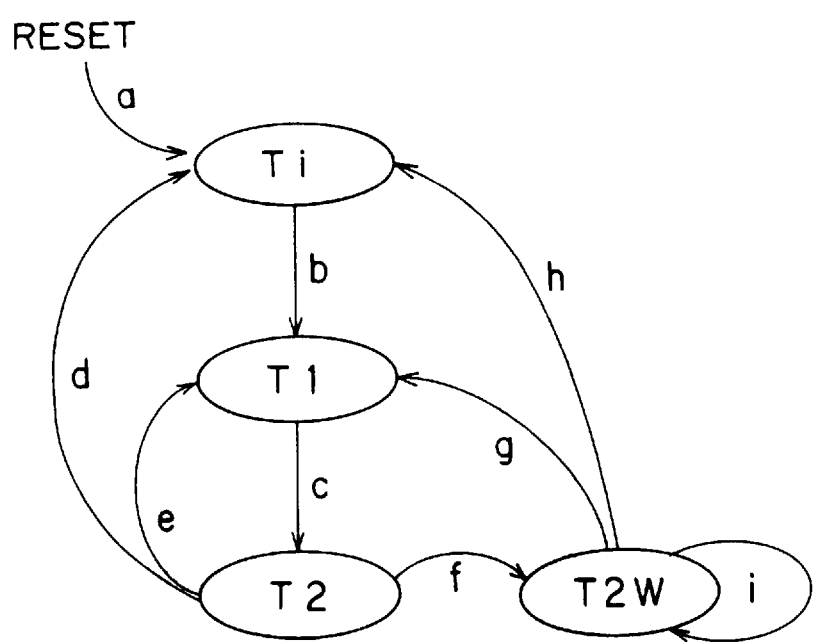
FIG. 88 shows the transition of the internal state according to the fourth embodiment.

FIG. 88 shows a state transition diagram of the internal states.

State Ti is an idle cycle of the bus and indicates a state in which input/output unit 212 stops and the vector processor 211 is reset by an initialization signal in this state.

State T1 indicates activation of the bus. When the operation of input/output unit 212 starts with an input or output signal, a transition shown by d in FIG. 88 is performed to reach state T1. In state T1, address A31-00 is outputted and bus start signal BS# becomes active.

State T2 indicates data access on the bus and in this state T2, the data transfer is performed between the vector processor and external memory 218 through the data bus. In this case, the data strobe signal BS# becomes active and the vector processor receives the data complete signal DC# from the external unit. When the active state of the data complete signal DC# is detected in this state, the state is returned to the state Ti through a transition shown by "e" in FIG. 88 upon the consecutive operation of data input and output, and then the state is returned to the idle state Ti through a transition designated by d in FIG. 88 upon the stop of data input and output and further the state changes to the state T2W designated f in FIG. 88 in a case where the data complete signal DC# is inactive, namely, when the data complete signal DC# has not yet been input from the external memory 218.

The state T2W indicates a wait-state and repeats a loop designated by "i" until the data complete signal DC# becomes active. When the data complete signal DC# becomes active, the same transition as that of T2 is performed from the state T2W through the route designated by g or h. Input and output 212 operate in synchronization with the above described state signal. When the external memory 218 can operate with a two-cycle, the data complete signal DC# becomes active in state T2 and the internal state repeats the state T1 and T2 as the basic mode.

When the external memory 218 operates with three-clock cycle the data complete signal DC# becomes active after a delay of one clock and thus three states T1 T2 and T2W are repeated.

In this case, respective arithmetic operation units 216 and 217 operate in units of one clock, and thus recognize that the periods for states T2 and T2W corresponds to the time delay caused by the repetition of the state T1, T2 and T2W.

Control circuit 214 supplies to arranged vector-register 215 and respective operators 216 and 217 which form the operating unit 213 an internal clock ICLK formed by masking the external clock with a logical OR of the states T2 and T2W in the clock control circuit 220.

The operation will be explained below.

Figure 89:
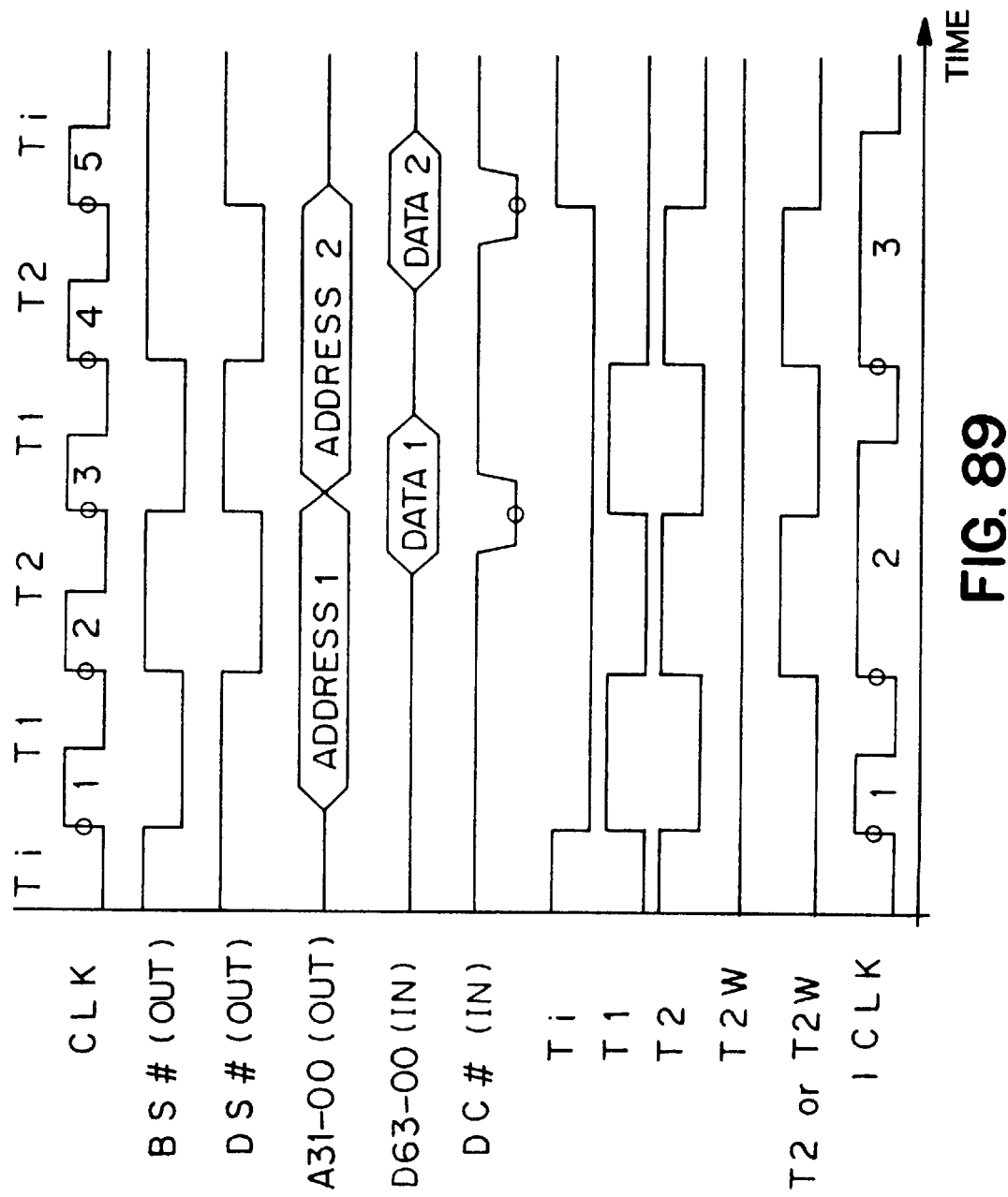
FIG. 89 is a time chart (1) for explaining the memory accessing operation according to the fourth embodiment.

FIG. 89 shows a timing chart for explaining the internal operation in which an external memory operating with a two-clock cycle is connected to this vector processor.

In FIG. 89, input/output unit 212 suffers a delay of five external clock CLK corresponding to the state T2. The internal clock ICLK advances by only three clocks and thus the arithmetic operation means 213 which operates at internal ICLK does not undergo a phase delay as a whole.

Figure 90:
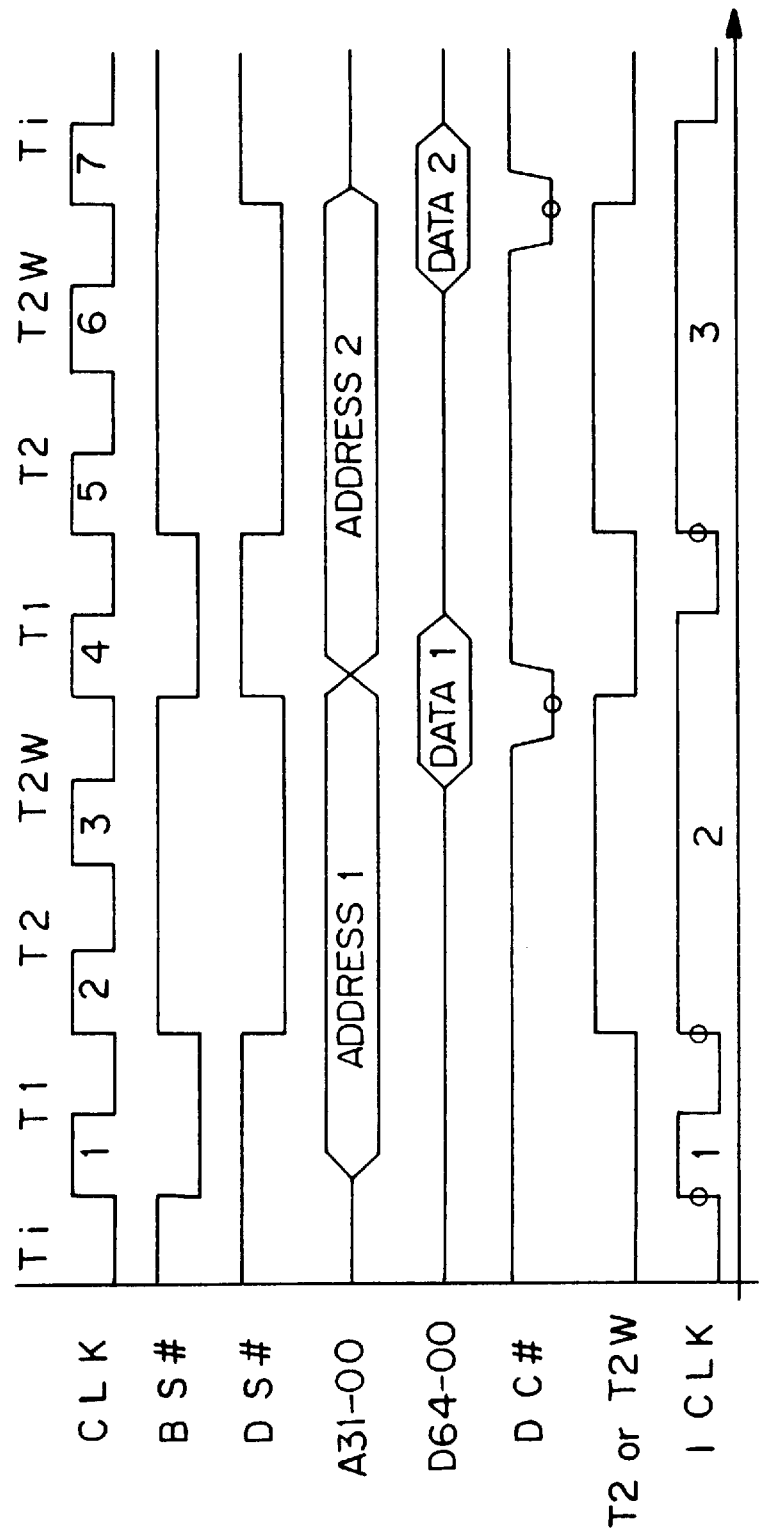
FIG. 90 is a time chart (2) for explaining the memory accessing operation according to the fourth embodiment.

FIG. 90 shows a timing chart for explaining an internal operation in which an external memory which operates with a three-clock cycle, is connected to the vector processor. In FIG. 90, the input/output unit 212 suffers from a delay corresponding to four clocks, namely, corresponding to the respective two states T2 and T2W with regard to seven external clock CLK. However since the internal clock ICLK advances by only three clocks, the operation unit 213 does not cause a phase delay as a whole, similarly to the previous case where an external memory which operates with a two clock cycle, is connected to the vector processor.

As described above, in the present embodiment, even if there is a difference in speed between the input/output unit and the arithmetic operating unit, the vector processor can operate without causing any data shifting or delay.

As it is not necessary to have a special control circuit for the arithmetic operator, the arithmetic operator can operate independently from the input/output unit without reducing the capability of the arithmetic operating unit.

Further, as the speed difference is controlled by data complete signal DC# which is generally used for the bus control, it is possible to connect an external memory of any speed to the vector processor without necessitating any special circuit for an external circuit. The above embodiment is explained by referring to the case where the present invention is applied to the vector processor. The present invention is not limited to the above application and the present invention is applicable to a general system in which an internal arithmetic operator needs to be synchronized with an external memory such as a digital signal processor (DSP) formed of flip-flop FIFOs.

According to the present embodiment, if the processing speed between the input/output unit and the arithmetic operating unit is different, and then the operation of the input/output unit is delayed from the operation of the arithmetic unit, the operation of the arithmetic unit is stopped for a period corresponding to the delay of the input/output unit by using the controlling unit and thus the input/output unit can be synchronized with the arithmetic unit without requiring any special control.

Accordingly, that shift of the processing data which is caused by the speed difference between the arithmetic unit and the input/output unit can be prevented.

The fifth embodiment of the present invention will be explained. The fifth embodiment is required to solve the problem that the microprocessor using an interlocked clock for an internal processor and a system clock for an external bus processor, such as a vector operation processor cannot receive a signal notifying an occurrence of an exception from the external bus system when the interlocked clock is effective and processing is aimed at detecting the occurrence of the exception with certainty.

Figure 91:
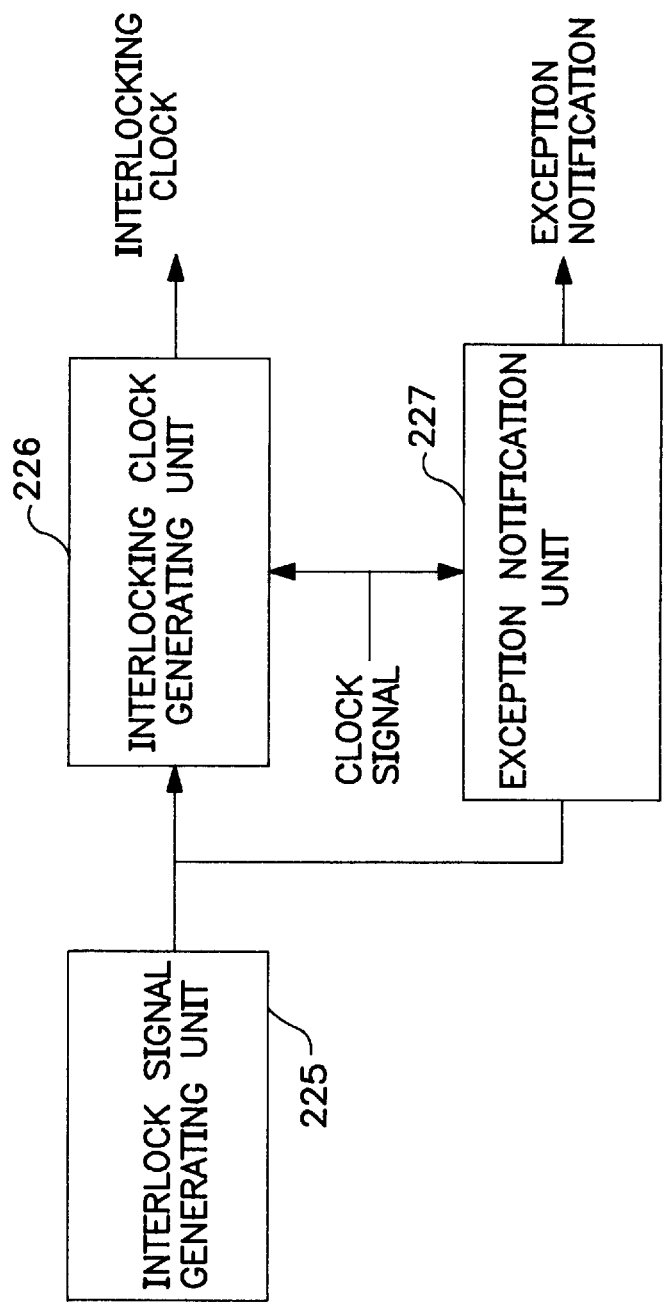
FIG. 91 is a block diagram for explaining the configuration of the principle of the fifth embodiment of the present invention.

FIG. 91 shows a block diagram of the principle structure of the fifth embodiment. It shows a principle block diagram of an arithmetic operation apparatus for detecting the occurrence of the exception reliably by using an interlocked clock, for example, an exception-detecting method of the vector arithmetic operation processor. In FIG. 91, the interlock signal generating unit 225 generates an interlock signal for stopping the operation of the internal processing system of the processor. The interlocked clock generating unit 226 generates an interlocked clock signal based on the interlock signal output from interlock signal generating unit 225 and the system clock signal, thereby supplying this interlocked clock signal to the internal processing system. When the exception occurs in a state in which the interlock is applied to the operation of the internal processing system or where the interlock is applied immediately after the exception occurs, the exception notifying unit 227 notifies the internal processing system of the occurrence of the exception based on the interlock signal generated by the interlock signal generating unit 225. After the interlocked state is released, namely, in the fifth embodiment, after the interlock is released and the internal processing system becomes operational, the occurrence of the exception is noted and thus the occurrence of the exception can be detected with certainty by using an interlocked clock.

Figure 92:
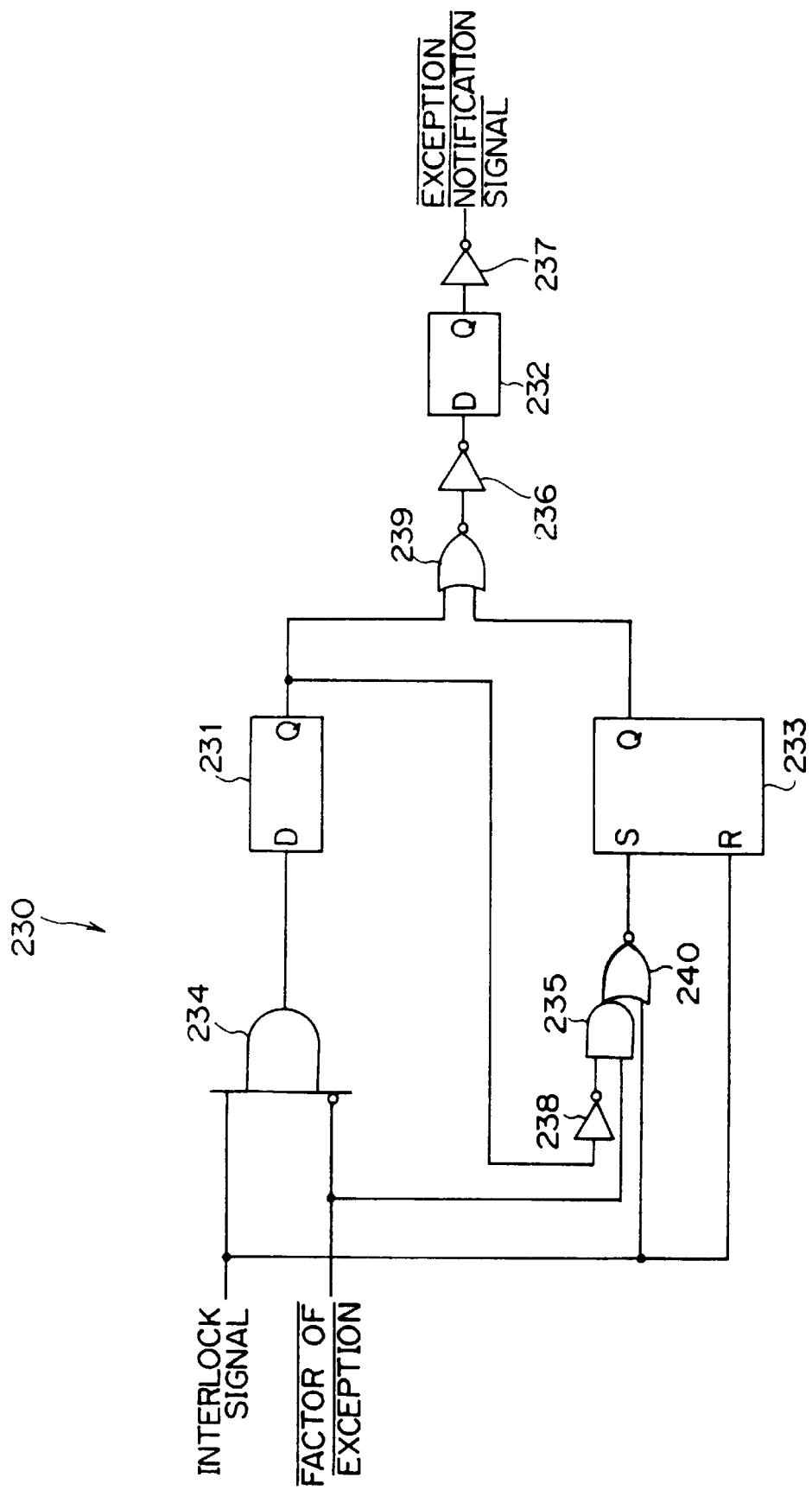
FIG. 92 shows the circuit showing the general configuration of the exception notification circuit according to the fifth embodiment.

FIG. 92 shows a block diagram of the exception notification circuit 230 provided in the vector processor as the embodiment of the present invention. In this embodiment, the vector processor has an internal structure provided by adding the exception occurrence notifying circuit 230 operating as the exception occurrence notifying unit 227 to the prior art shown in FIG. 30. Exception occurrence notifying circuit 230 comprises latches 231 to 233, AND GATES 234 and 235, inverters 236 to 238, and OR GATES 239 and 240.

Figure 30:
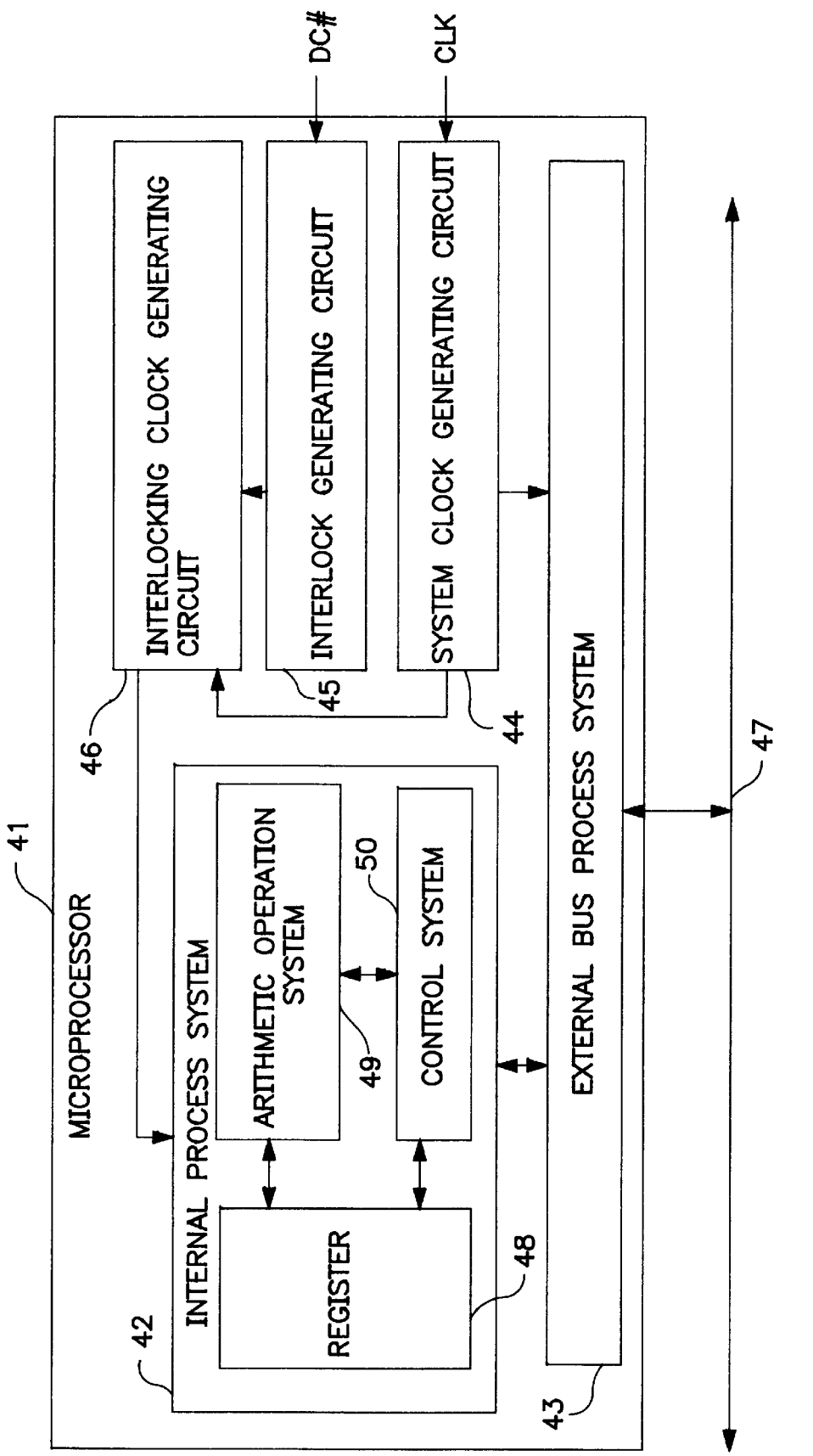
FIG. 30 is a block diagram showing the internal configuration of a processor with an external bus process system and an internal process system each using a different clock.
Figure 31:
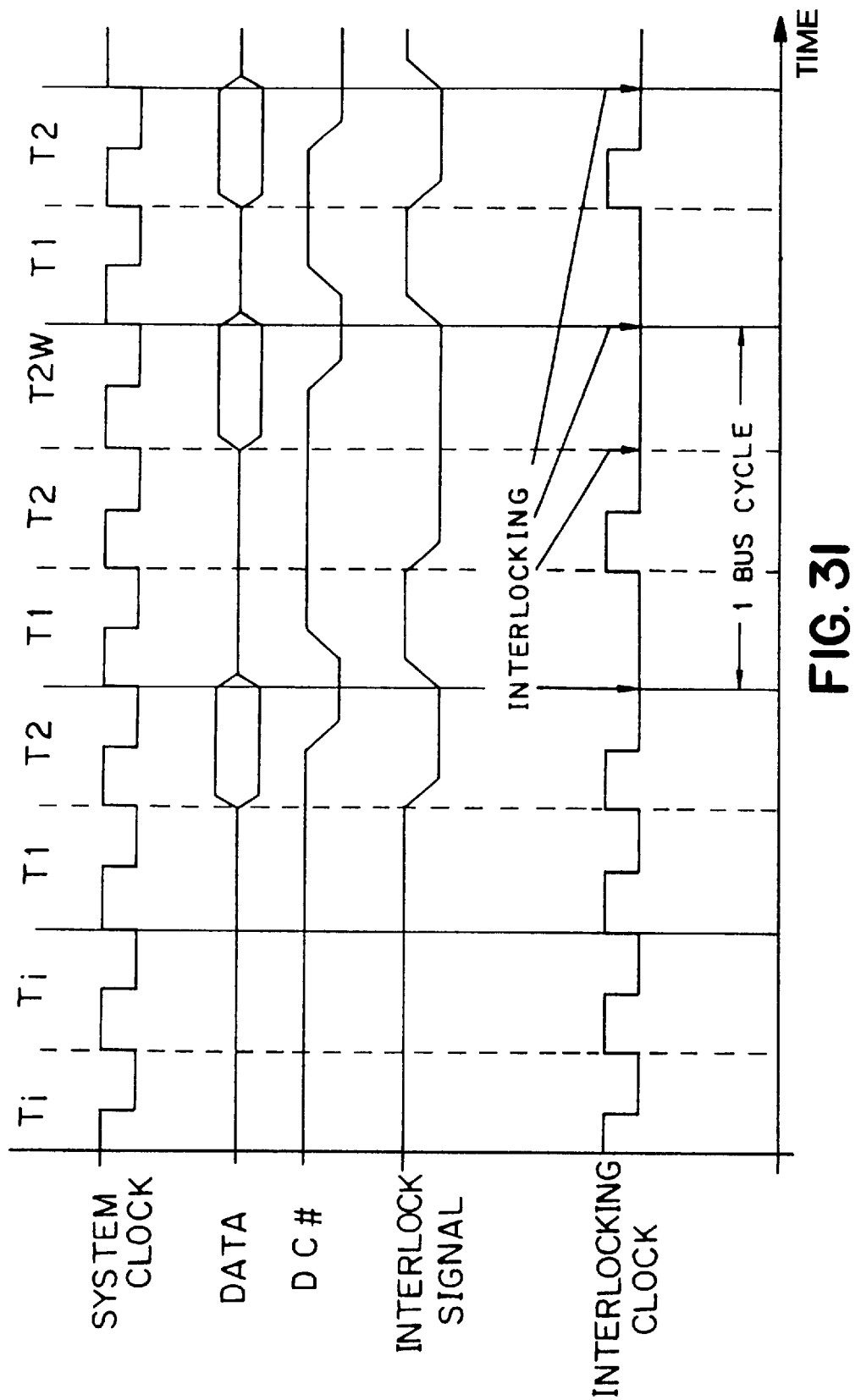
FIG. 31 is a time chart indicating an example of the data transmission shown in FIG. 30.
Figure 32:
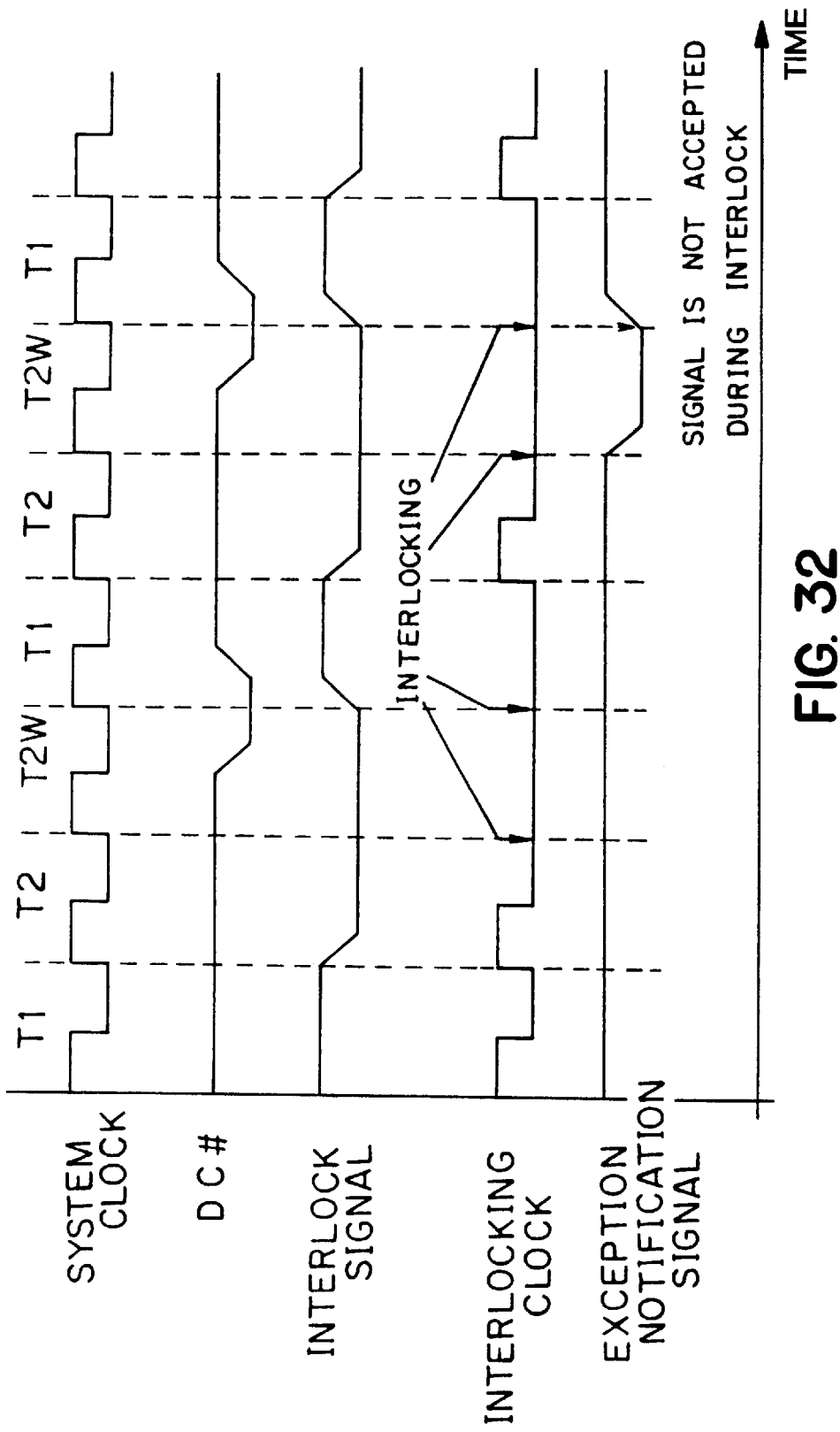
FIG. 32 is a time chart of the data transmission for explaining the fifth problem solved by the present invention.
Figure 33A:
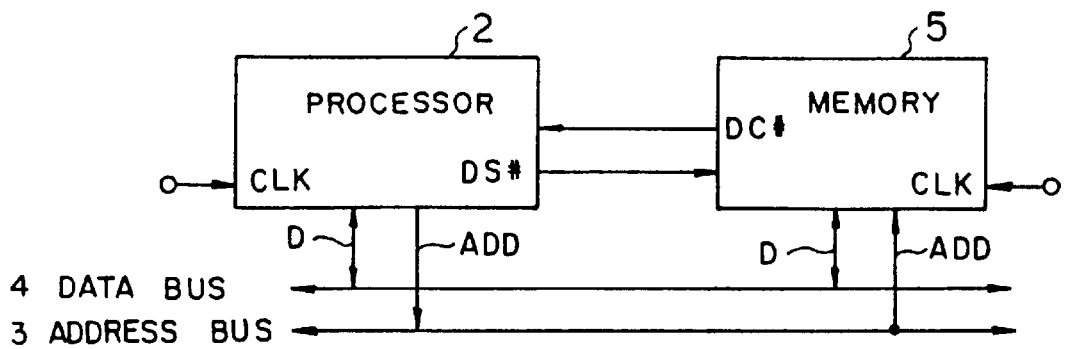
FIGS. 33A, 33B, and 33C show the handshake between a memory accessing device and a memory to explain the sixth problem solved by the present invention.
Figure 33B:
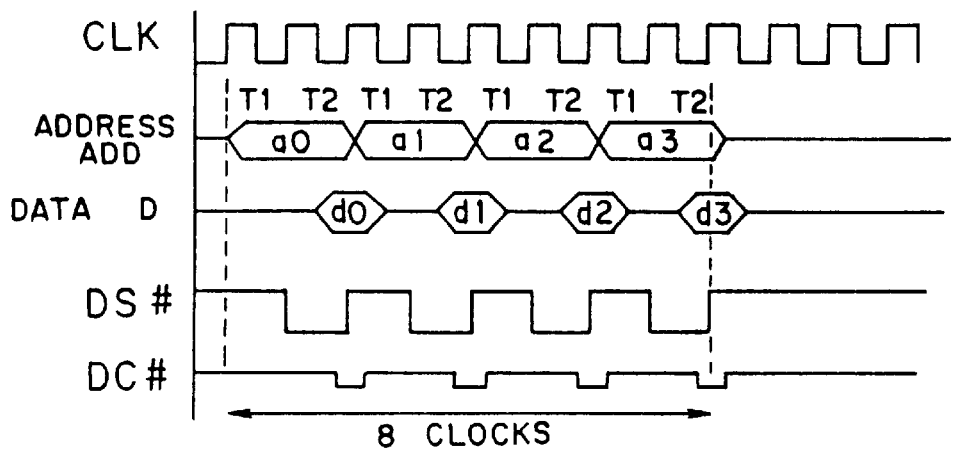
Figure 33C:
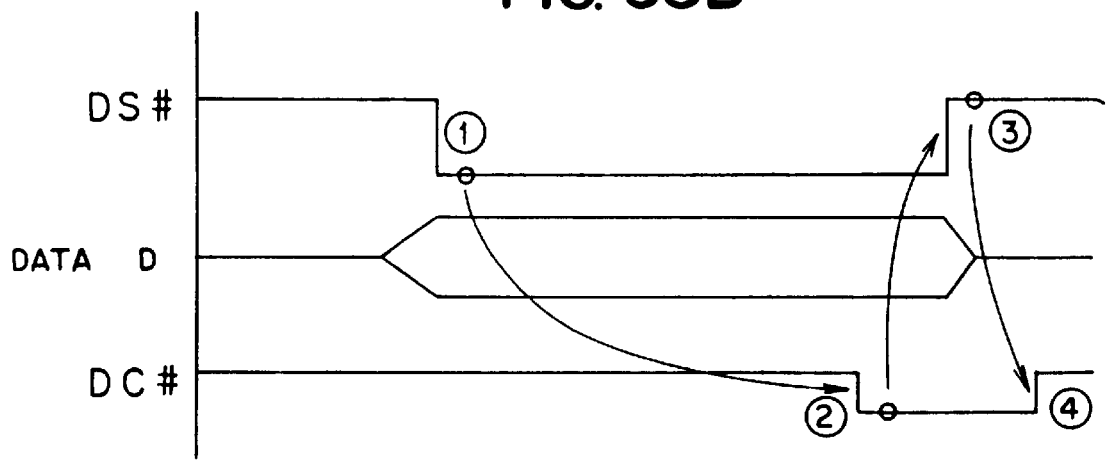

The exception occurrence notifying circuit 230 provides the external bus processing unit 243 shown in FIG. 30 together with the exception occurrence detecting unit for detecting the exception occurrence.

In this embodiment, where the exception occurs in a state in which the interlock is applied to the internal processing system immediately after the exception occurrence, it is necessary to notify the internal processing system of the exception by means of exception occurrence notifying circuit 230. Therefore, in this embodiment, latches 231 to 233 output an exception generating notifying signal based on the interlock signal and the signal causing the occurrence of the exception.

Figure 93:
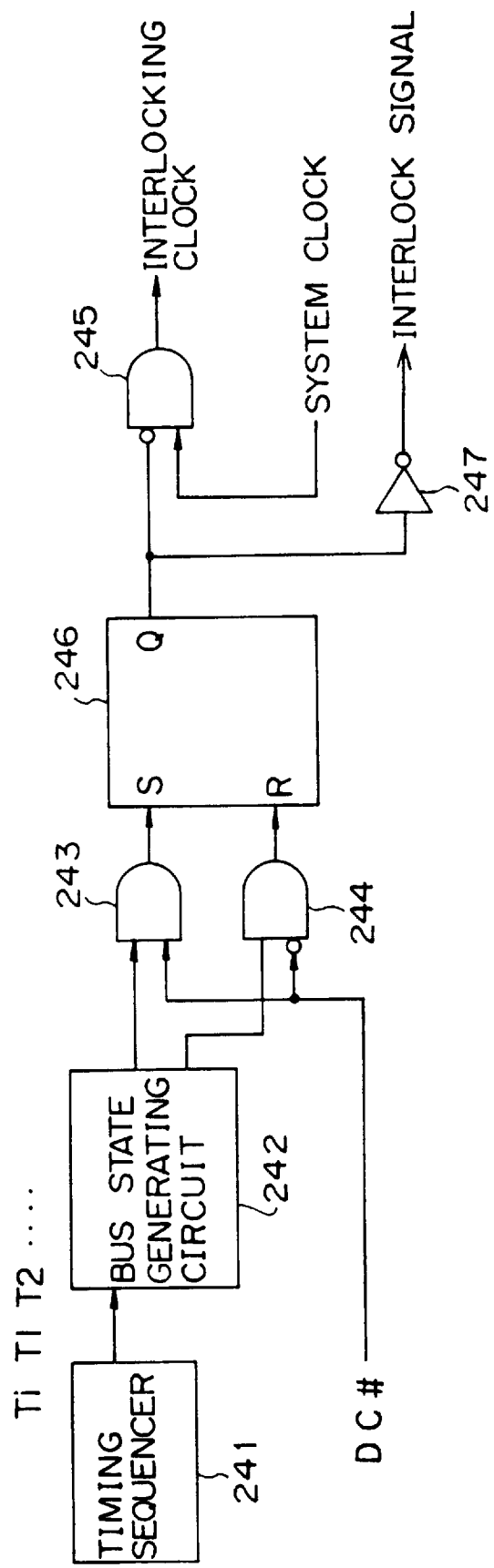
FIG. 93 shows the circuit showing the general configurations of the interlock generating circuit and the interlocking clock generating circuit.

FIG. 93 shows a block diagram of interlock signal generating circuit 245 and interlocked clock generating circuit 246 provided in the vector processor. This block diagram comprises timing sequencer 241, bus state signal generating circuit 242 AND GATES 243 to 245 and R-S FLIP-FLOP 246 which are provided in the masking control unit.

The interlock signal unit is the output of R-S FF 246 and when this interlock signal goes high ("H" level), the system clock stops momentarily and forms an interlocked clock. The R-S FF 246 is set when the signal DC# is inactive (H) and is set when the signal DC# is returned from the external memory and becomes active (L).

The operation of the exception occurrence notifying circuit is explained.

The following cases can be considered for the internal state upon the occurrence of the exception of the bus system.

(1) The exception occurs while the interlock is not applied.
(2) The exception occurs when the interlock is applied.
(3) The interlock is applied immediately after the exception occurs.

The operations will be explained with regard to the above three cases (1) to (3).

Figure 94:
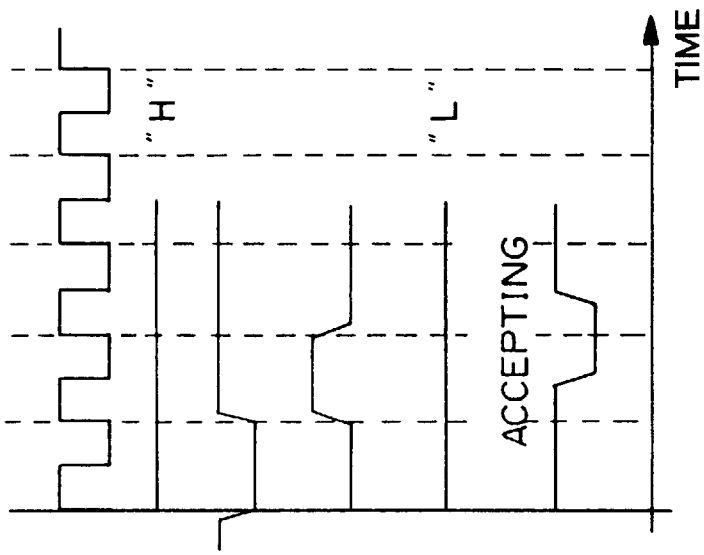
FIG. 94 is an operational time chart (1) of the exception notification circuit.

FIG. 94 is a timing chart for explaining the operation of the exception occurrence notifying circuit when the exception occurs during a period of non-application of the interlock. In the case of (1), the interlock is not applied and thus the interlock signal is high ("H") level. When an exception occurs in this state, the output from the latch is sent to OR GATE 239, inverter 236, latch 232 and inverter 237 as the exception occurrence notifying signal, thereby notifying the internal processing system of the occurrence of the exception. Latch 231 latches an input signal at the rise of the clock and latch 232 latches inputs at the fall of the clock and the internal processing system detects the occurrence of the exception at the rise of the clock.

Figure 95:
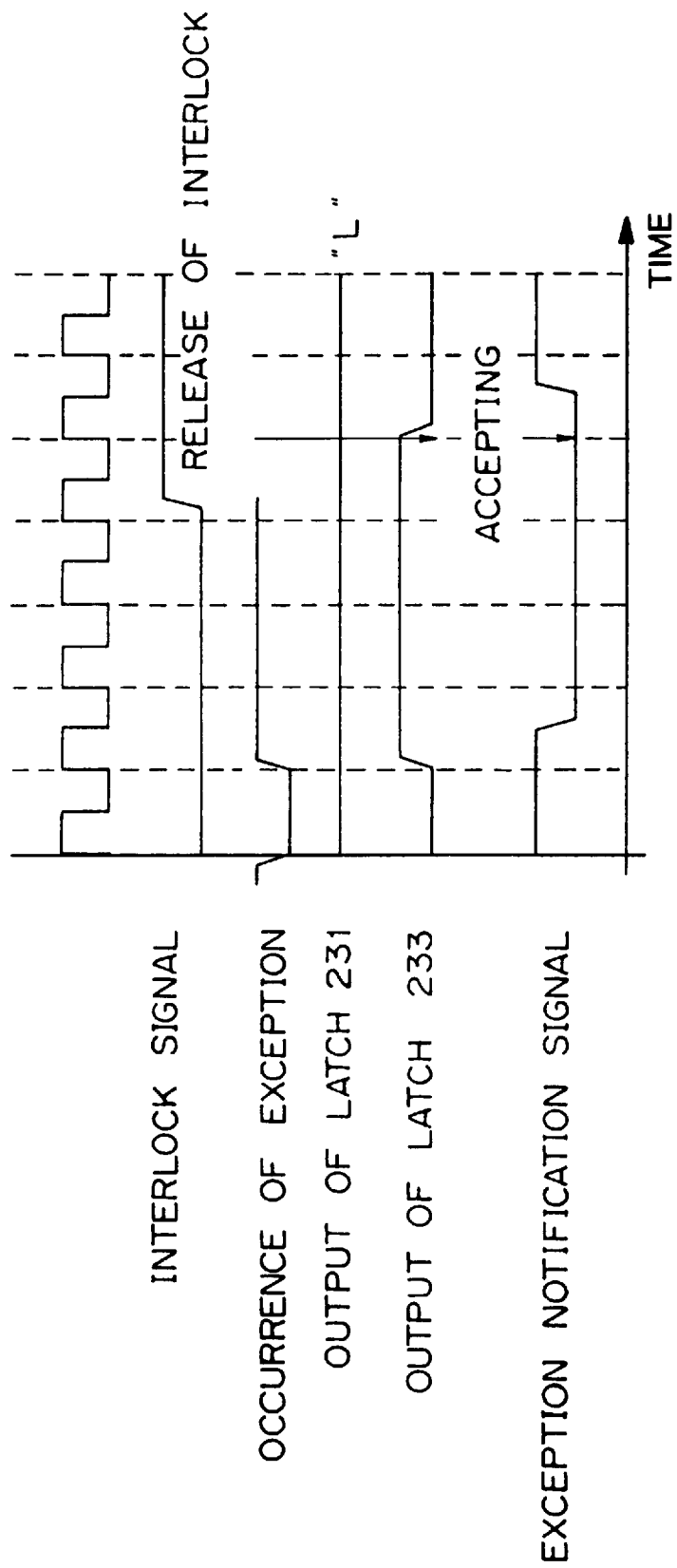
FIG. 95 is an operational time chart (2) of the exception notification circuit.

FIG. 95 is a timing chart for explaining the operation of the exception occurrence notifying circuit where the detection occurs during a period of application of the interlock.

In the case of (2), the interlock is applied and the interlock signal is kept low ("L") level and the output of the latch 231 is kept low ("L") level. When the exception occurs during the period of the interlock operation, latch 232 is set and it is set after the interlock is released.

The latch 233 latches an input signal at the rise of the clock.

At this time, as the exception occurrence notifying signal is issued for the duration of a half clock after the receipt of the exception because the latch 232 operates at the fall of the clock, the exception occurrence signal is input to the internal processing system after the interlock operation is released and thus the occurrence of the exception is reported to the internal processing system.

Figure 96:
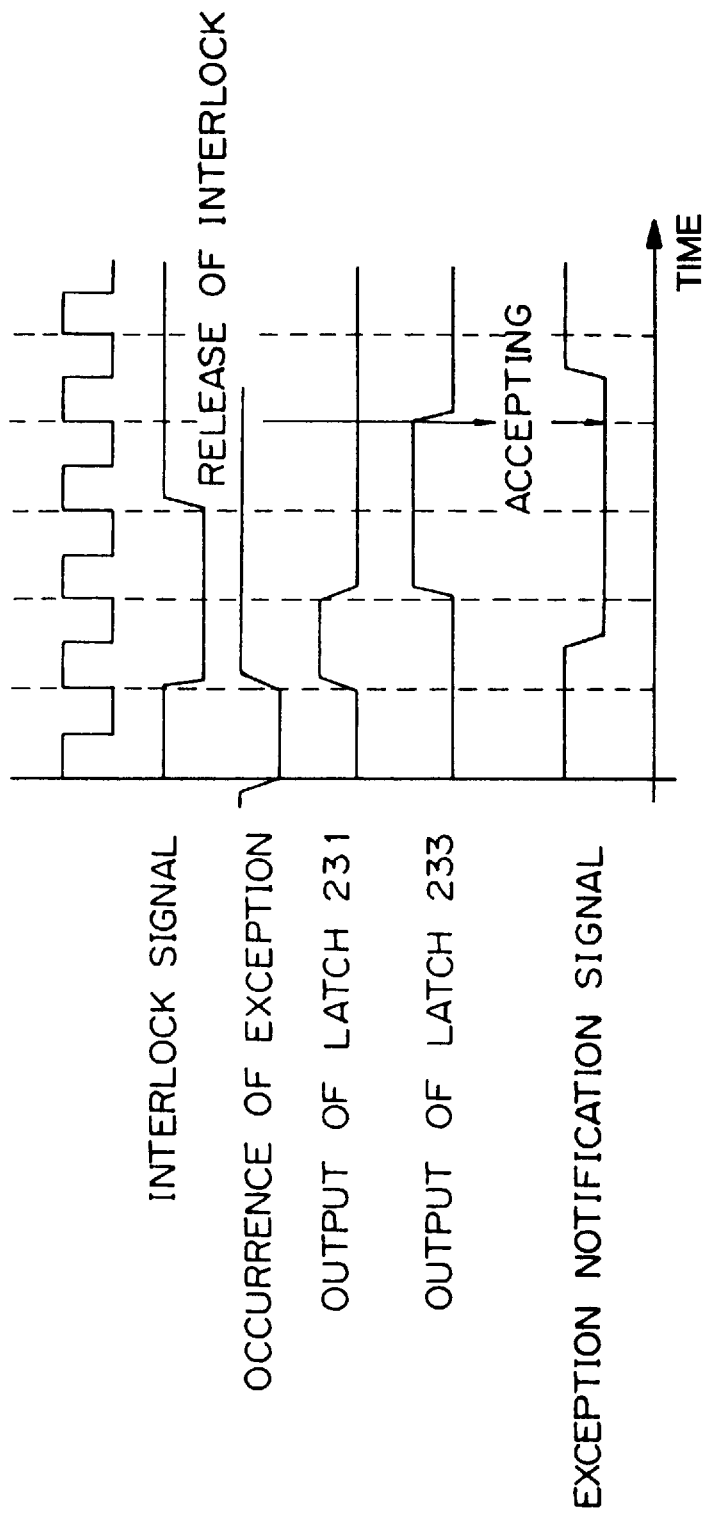
FIG. 96 is an operational time chart (3) of the exception notification circuit.

FIG. 96 is a timing chart for explaining the operation of the exception occurrence notifying circuit when the interlock is applied immediately after the occurrence of the exception. In the case of (3), namely, where the interlock is applied immediately after the occurrence of the exception, as is clear from the timing chart in FIG. 96, the exception occurrence notifying signal provided via latch 231 is not received by the internal processing system because the internal processing system is being interlocked by latch 233, latch 233 is set by the output 231 and is reset after the releasing of the interlock.

As the exception occurrence notifying signal is made active during the half period after latch 233 is reset and thus this signal exception occurrence notifying signal is input to the internal processing system after the releasing of the interlock, thereby reporting the occurrence of the exception to the internal processing system.

As described above in this embodiment, where the exception occurs in a state in which the interlock is applied to the internal processing system or where the interlock is applied to the internal processing system immediately after the occurrence of the exception, the internal processing system can be notified of the occurrence of the exception after the interlock is released, namely, after the internal processing system becomes operational, thereby detecting the occurrence of the exception with certainty by using an interlocked clock.

In the above embodiment, the exception occurrence notifying signal is output to the internal processing system within a half clock after the occurrence of the exception is detected and the interlock is released, due to the delay of the latch 232 which operates on the falling edge of the latch clock. However, the embodiment will be limited to the above half clock timing and will allow a free setting of the timing.

The sixth embodiment is now explained. This embodiment is provided to solve the above explained six problems of the prior art and is to provide the data processing apparatus and the control method for achieving a normal operation of the bus "F" occurring during the period of executing a bus cycle, to avoid the failure of the bus as much as possible and to speed up the data processing operation, even if the bus transmission system or the interleave transmission system is adopted.

Figure 97A:
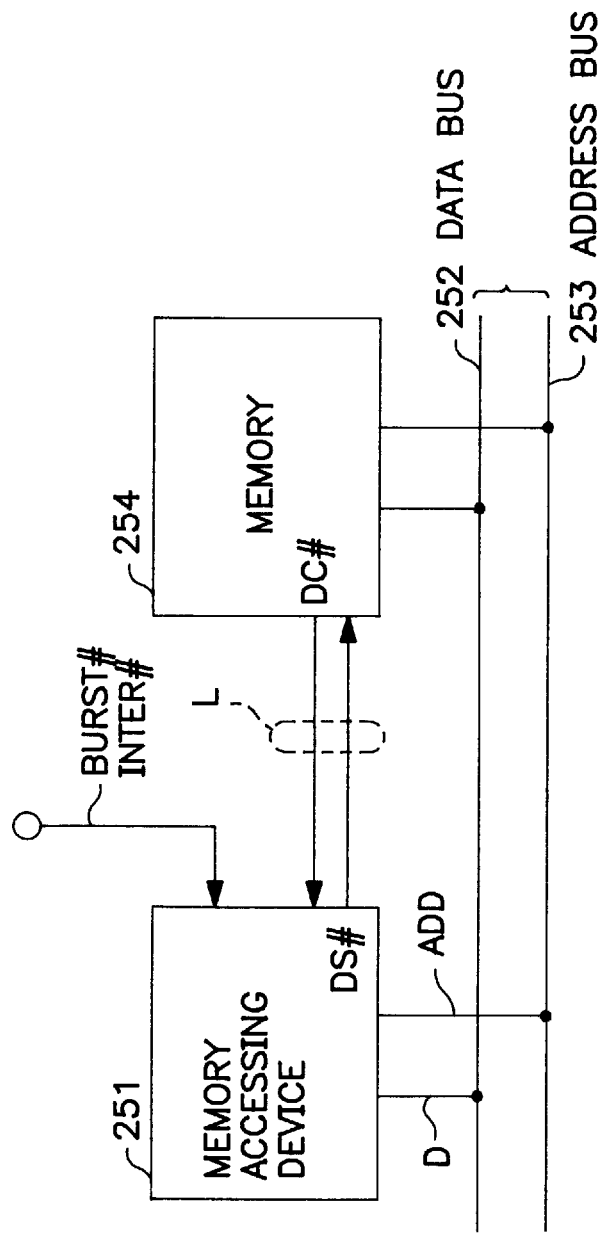
FIGS. 97A and 97B are block diagram for explaining the principle of the sixth embodiment of the present invention.
Figure 97B:
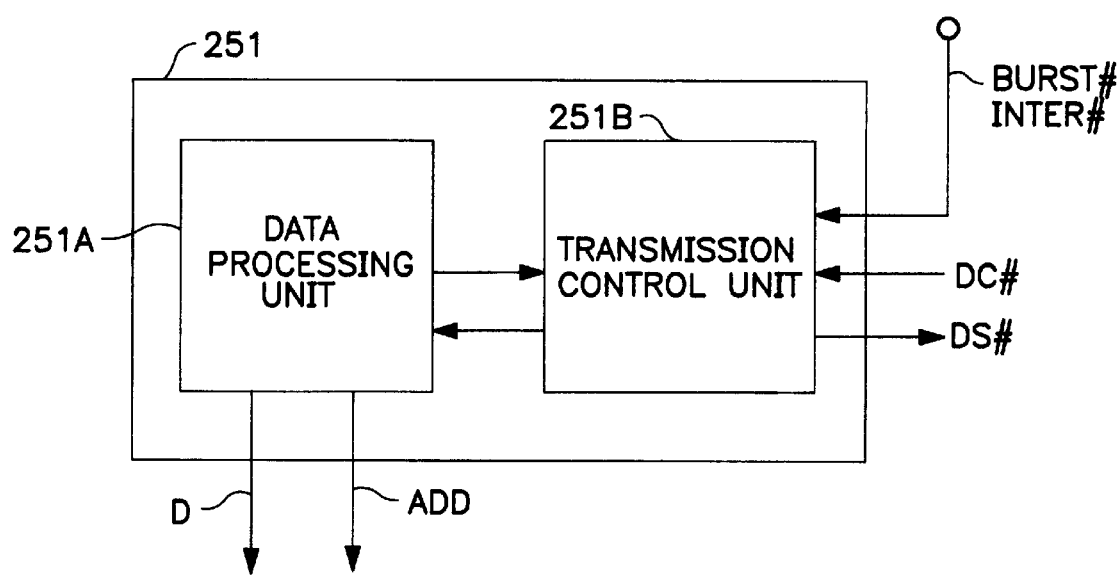

FIG. 97A and 97B respectively show principle drawing of a memory access control method according to the sixth embodiment.

Figure 29:
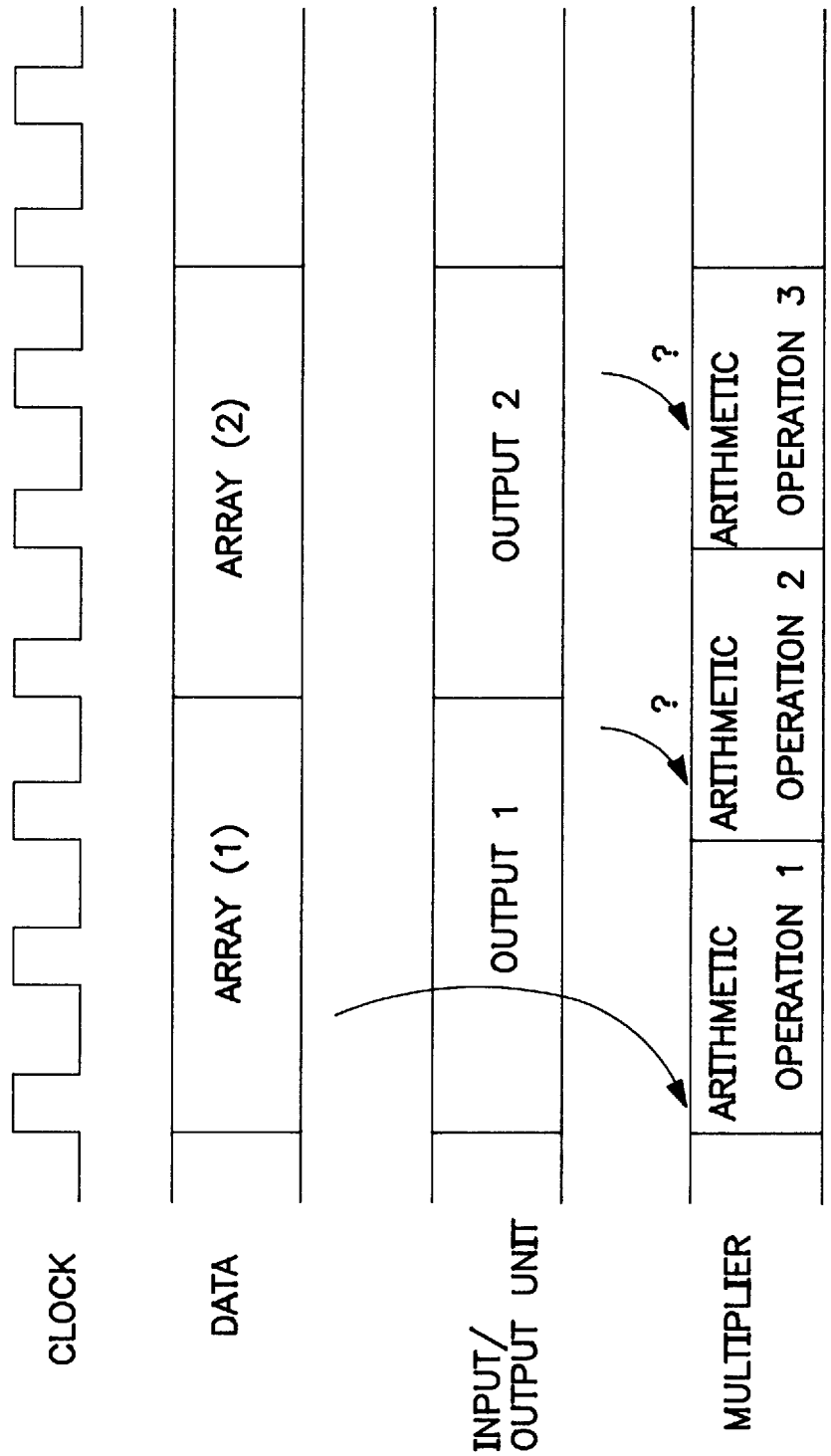
FIG. 29 shows the difference between the process data of an input/output unit and a multiplier to explain the fourth problem solved by the present invention.
Figure 98A:
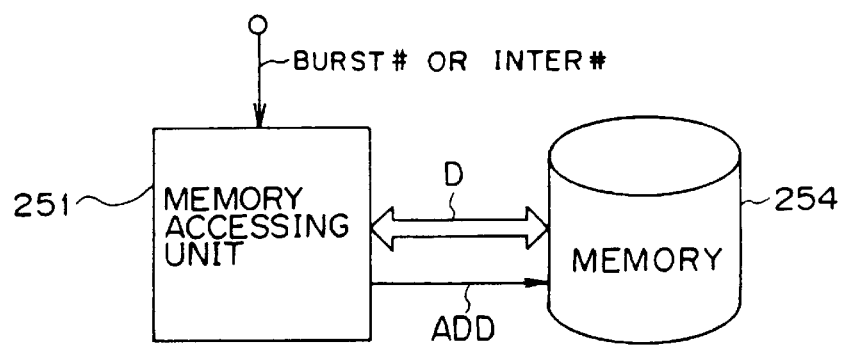
FIGS. 98A and 98B show the principle of the memory access control method according to the sixth embodiment.

The memory accessing device 251 operating as the sixth embodiment is connected to the data bus 252 and address bus 253 shown in FIG. 29A and comprises the data processing unit 251 for processing the data D and transfer control means 251 for controlling the transfer of the data D and address ADD to and from the memory accessing device 251 and memory 254 as shown in FIG. 97B. The memory accessing device 251 detects the internal failure at the last stage of the bus cycle in which the data is transferred and controls continuation of the transfer of the data based on the detection of the internal failure. The method of controlling the memory access according to the sixth embodiment controls the transfer of the data D at address ADD as shown in FIG. 98A and controls the transfer of the data D and address ADD based on the bus mode signal BURST# designating the memory access operation method. The interleave mode signal INTER# and the internal data processing state during the memory access operation.

In the control method, the continuation/discontinuation of the transfer of the data D is determined based on the bus mode signal BURST#, interleave mode signal INTER#, internal bus request signal IREQ# for specifying the continuation of operation of the bus cycle, internal error detecting signal IERR# for specifying the stopping of the operation of the bus cycle and data complete signal DC# for indicating the completion of the transfer of the data D.

Even if the burst transfer method or the interleave transfer method is used, as shown in FIG. 97A, the data strobe signal DS# operating as the first control signal for designating the effective periods of the data D, and data complete signal DC# operating as the second control signal for designating the completion of the transfer of the data D, are transferred along bank control line L connected between memory 254 and memory accessing device 251 and provided separately from bus 252; and the handshake method of transferring the data by confirming the validity of the first and second control signals DS# and DC# can be employer.

Even in case the burst transfer or the interleave transfer method is used, the normal operation of the bus can be maintained even if a failure access during a bus cycle and thus the failure in the system, thereby speeding up the data processing operation.

For example, in the burst transfer method, where the operation result such as four data items operated by the memory accessing device 251 having the function of performing an arithmetic operation are burst-transferred and written in the memory 254, and it is assumed that an error occurs in the operation result, namely, an internal failure occurs when two data D=d0 and d1 are transferred, then the data D=d2 and d3 starting with third data d2 continue to be written as compared with the case of the prior art.

Figure 98B:
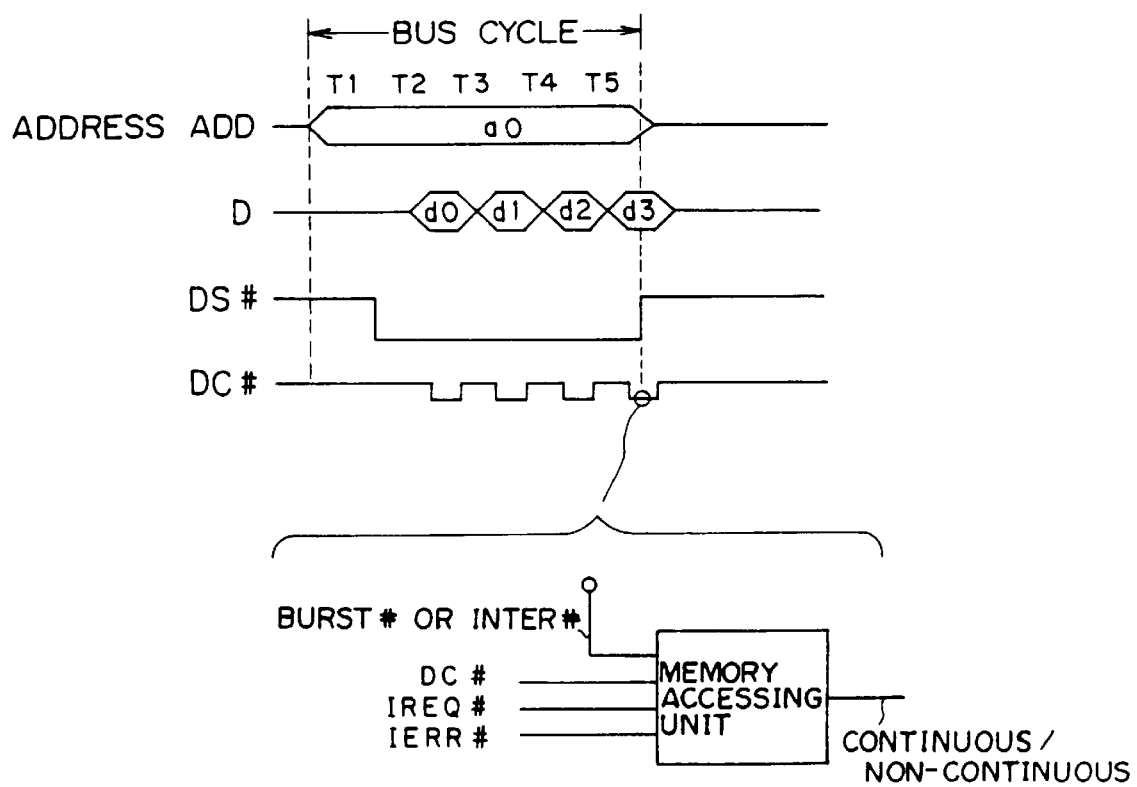

As shown in FIG. 98B, the internal failure is detected in the last state of the bus cycle for transferring the data and based on this detection of the internal failure the continuation/noncontinuation of the transfer of the data is determined. Only when second control signal DC# for the address AND output before the occurrence of the internal failure is valid, is the internal error detection signal IERR# deemed to be detected and is determined based on the burst mode signal BURST#, internal bus request signal IREQ#, internal error detection signal IERR# and based on the logic of the second control signal DC# whether data D should be continue before transferred or should not be transferred further.

Therefore, even if a failure occurs inside the system during the period of the data transfer in the burst transfer mode the failure is recorded in transfer control portion 251B and the bus cycle continues until the handshake between the memory accessing device and the memory 254 is completed and then the bus operation can be stopped after the completion of the handshake operation.

Therefore, it is not necessary to compel the memory accessing device 251 to stop operating during the period of the data transfer, unlike in the prior art, and thus it becomes possible to complete the write process of the data which is currently being transferred. Thus, the interruption of the bus transfer occurs at the last stage of the bus cycle and in this system a failure such as a write error of data D or an operation error caused by using the erroneous data D can be avoided as much as possible.

When the bus right is assigned to the other processor such as the host CPU, then the processor can start the error processing after completion of the write operation of the data D. Accordingly unlike the prior art it is prevented that the unnecessary second control signal DC# (which should be transmitted to memory accessing device 251) is returned during the operation of the other processor, thereby maintaining normal operation of the bus.

As shown in FIG. 98A, in the sixth embodiment, the data transfer continues until the input of four data d0 to d3 for one address a0 in burst mode is completed even when an internal error occurs. Thus the sixth embodiment is directed to a subject which is different from the subject explained as the first problem of the prior art, the first problem occurring in a case where an error occurs during the period of an address prefetch operation and thus the process is moved to the cycle for performing only the data processing by interrupting the address prefetch operation.

Figure 99A:
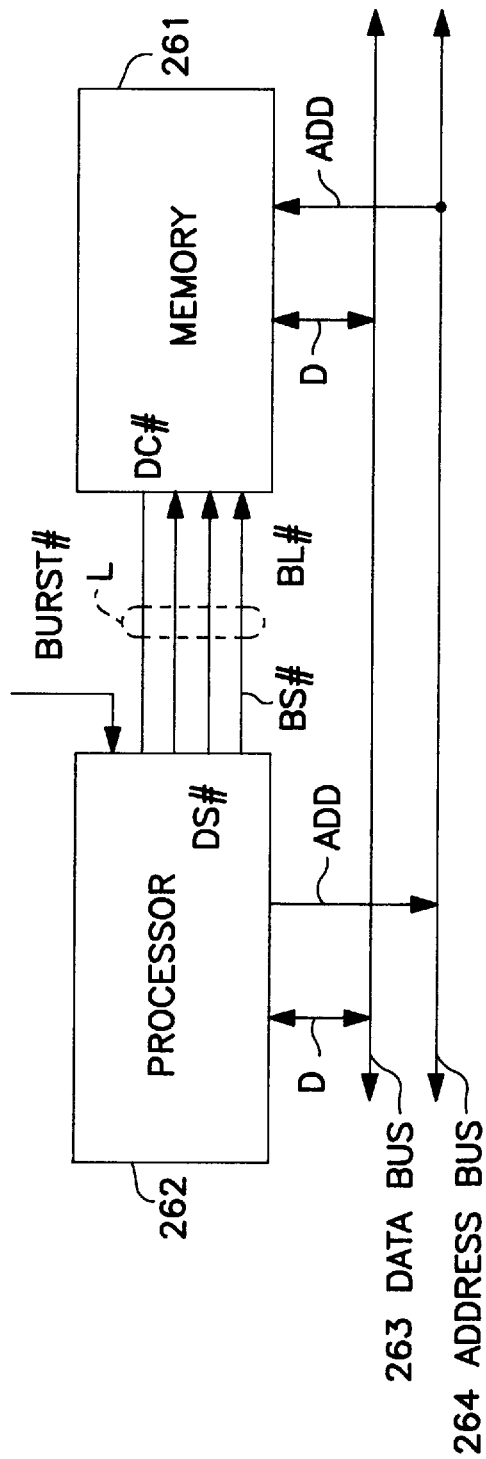
FIGS. 99A and 99B show the configuration (burst mode) of the data processing unit according to the sixth embodiment.
Figure 99B:
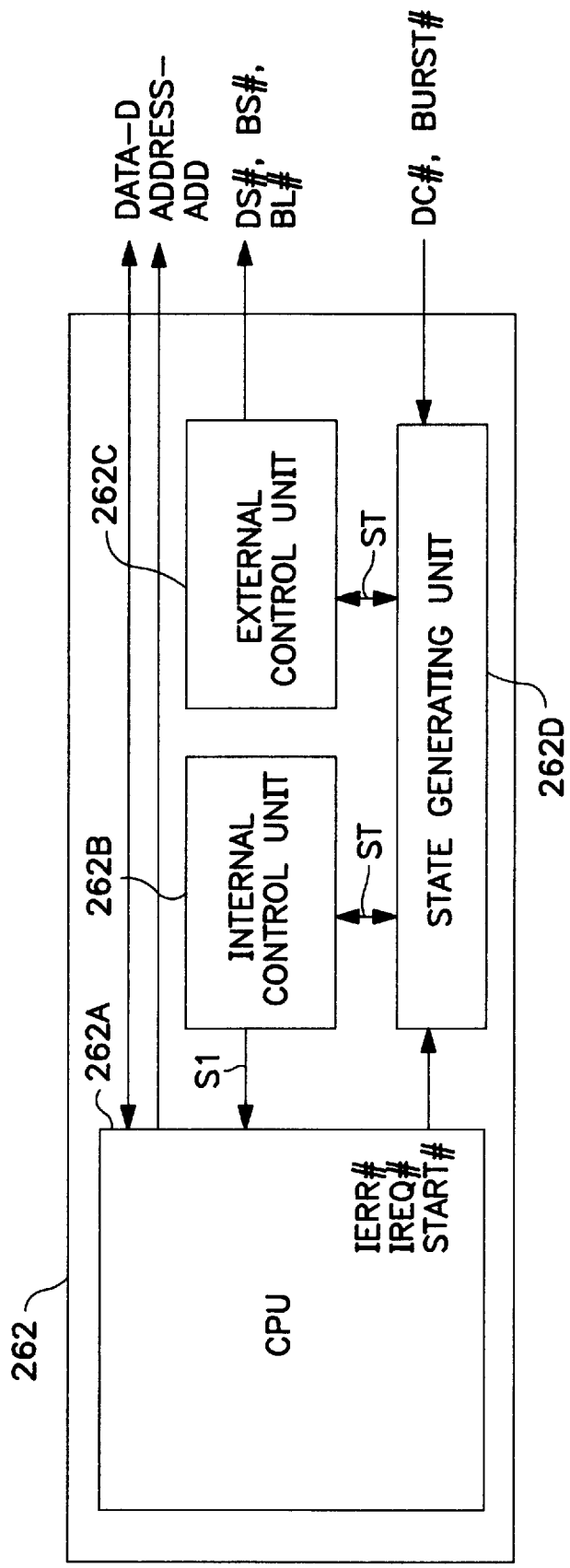

FIGS. 99A and 99B show a structural view of the data processing apparatus operating in the burst mode according to the sixth embodiment.

Figure 100:
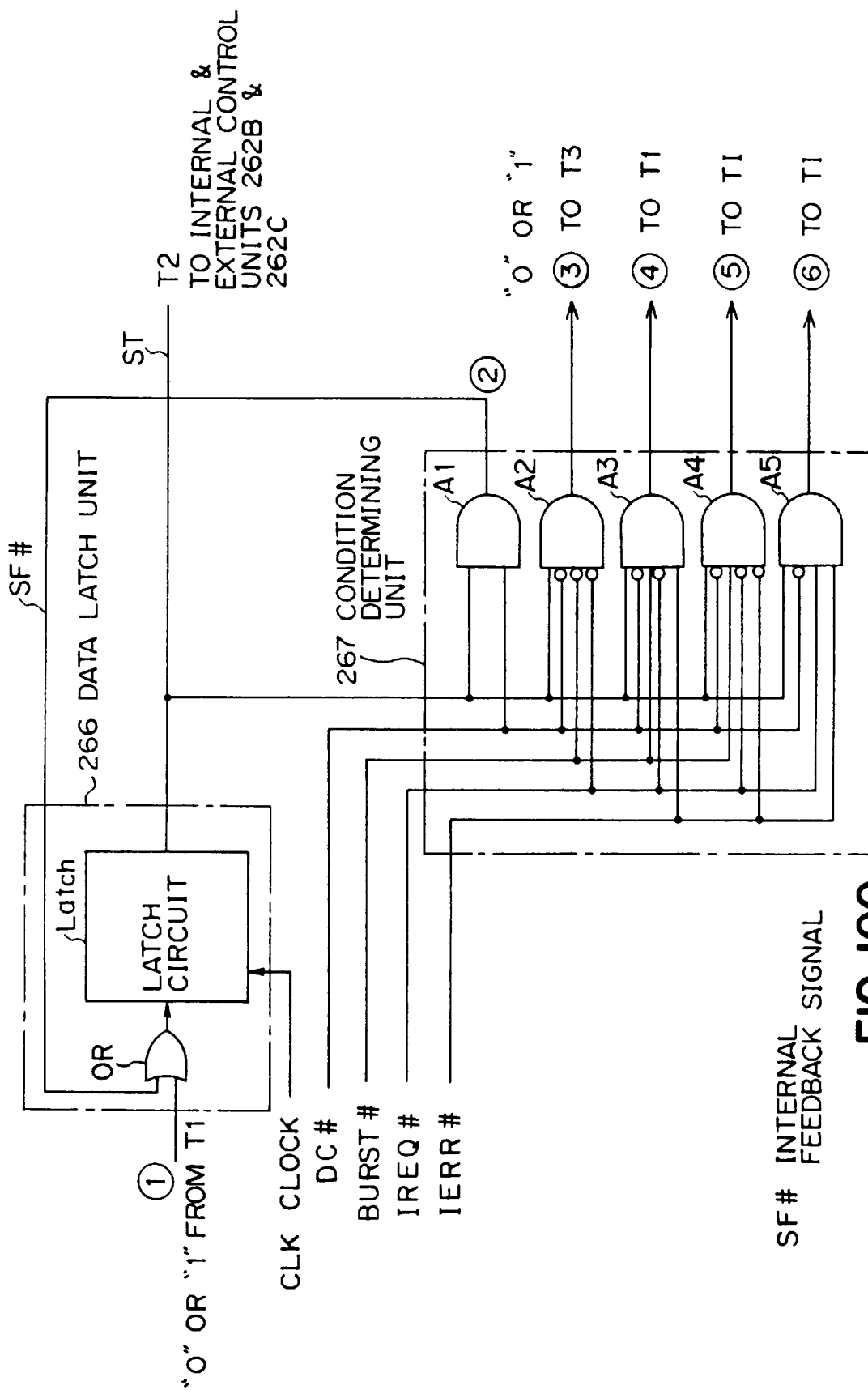
FIG. 100 shows the internal configuration of the important part of the state generating unit.
Figure 101:
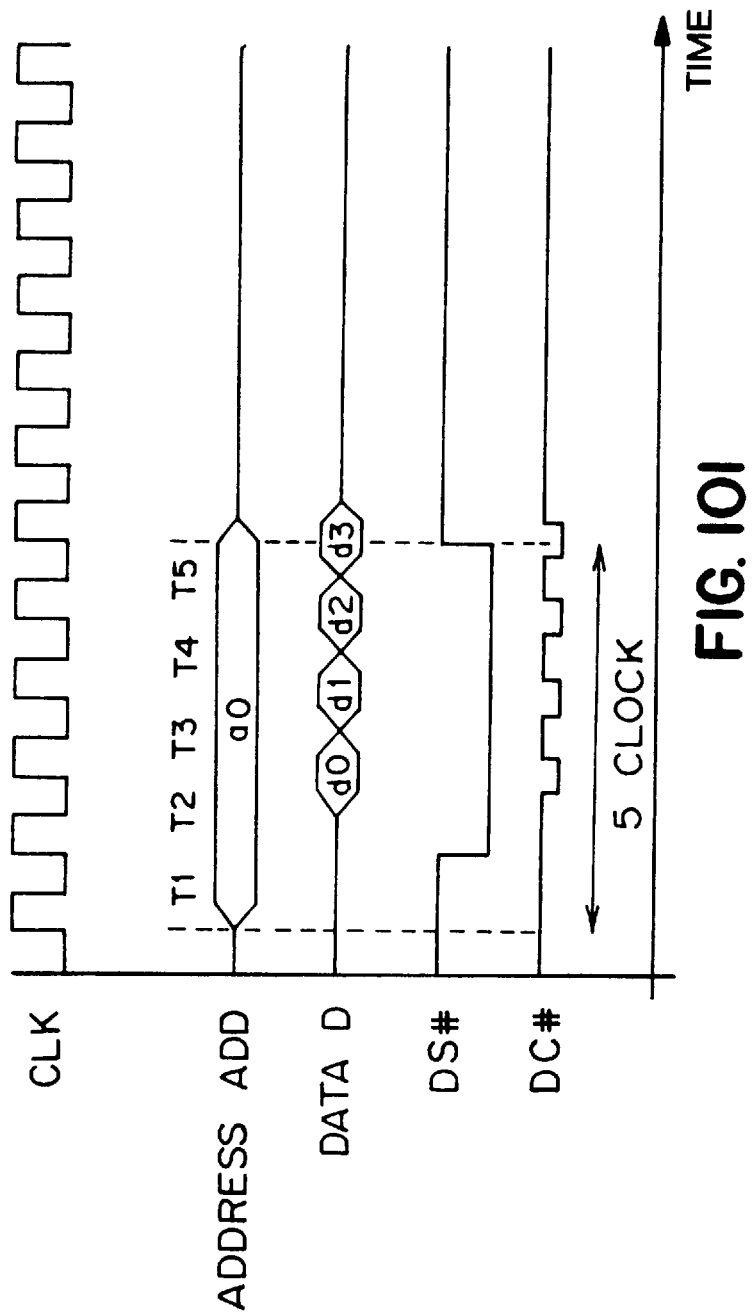
FIG. 101 is an operational time chart of the data processing unit shown in FIG. 99.

FIG. 100 represents the internal structure of the main part of the state generating unit and FIG. 101 shows an operation time chart.

The data processing apparatus for adopting the burst transfer method of performing a memory access by obtaining a bus use right comprises memory 261 and processor 262 which are connected to data bus 263 and address bus 264 as shown in FIG. 99A. The symbol "#" assigned to various signals in the sixth embodiment mean that the signals are active when they are at "0", as in the other embodiments. The data bus 26e transfers the data of the operation result and other data D and the address bus 264 transfers address ADD relating to the data D.

Memory 261 stores the operational result data and other data D and is subjected to a write/read operation. Memory 261 comprises DRAM, for example.

Differently from the prior art, processor 262 transfers data D and address ADD based on the burst mode signal BURST# (which is simply referred to as BURST# signal hereinafter) in addition to the usual data processing. The internal structure of the processor 262 is explained by referring to FIG. 99B.

Control line L is connected between memory 261 and processor 262 separately from data bus 263 and address bus 264 and the data strobe signal DS# (which is referred to as DS# signal hereinafter) operating as one example of the first bus control signals for designating the effective period of the data D, and data complete signal DC# (which is as referred to as DC# signal hereinafter) operating as one example of the second control signal for designating the completion of the transfer of the data D are transmitted along the control line L.

FIG. 99B shows an example of the internal structure of processor 262. The processor 262 comprises CPU (central processing unit) 262A, internal control unit 262B, external control unit 262C and state generating unit 262D.

CPU 262A is an example of data processing unit 251A and performs arithmetic operations on data D and issues address ADD. CPU 262A receives a plurality of internal control signals SI (which are referred to as the SI signal hereinafter) from the internal control unit 262B and outputs an internal error detection signal IERR# (which is referred to as IERR# signal hereinafter), internal bus request signal IREQ# (which is referred to as IREQ# signal hereinafter) and start designating signal START# (which is referred to as START# signal hereinafter) to state generating unit 262D. The START# signal is substantially the same as bus start signal BS#.

The SI signal is an internal control signal for controlling CPOU 262A and the IERR# signal specifies stopping of the operation of the bus cycle and indicates that an error has occurred in the CPU 262A. The IREQ# signal specifies continuation of operation of the bus cycle and represents a period in which a bus cycle is required by CPU 262A. The START# signal designates a start of the bus cycle.

Internal control unit 262B, external control unit 262C and state generating unit 262D constitute an example of transfer control unit 251 B and perform transfer control of data D and address ADD. For example, internal control unit 262B outputs the SI signal to CPU 262A based on a plurality of ST signals (which is referred to as the ST signal hereinafter) for presenting states for clock periods Ti to T5 which are output from state generating unit 262D.

Similarly, external control unit 262C outputs the DS# signal, START signal BS# (which is referred to as BS# signal hereinafter) to memory 261 and block signal BL# (which is referred to as BL# signal) for allowing the burst transfer to the external memory. The DS# signal indicates that the data D transmitted from CPU 262A is effective and becomes active during clock periods T2 to T5 in the time chart shown in FIG. 101.

The BS# signal indicates that CPU 262A has started the bus cycle and becomes active during clock period T1 of FIG. 101. The BL# signal indicates that CPU 162A is performing a burst transfer and similarly becomes active in the clock period T1 of FIG. 101.

In the sixth embodiment (the burst mode) state generating unit 262D outputs the ST signal to the internal control unit 262B and external control unit 262C based on a BURST# signal set by an external means, an IERR# signal output from an external means, and IREQ# signal and a START# signal output from CPU 262A and DC# signal output from memory 261.

FIG. 100 shows an example of the internal structure of the main part of state generating unit 262D according to the sixth embodiment of the present invention and shows a block diagram of the state generating unit for the clock period state in which T2, the BURST# signals and INTER# signals are detected. That is, the data transfer is performed at the clock period T2 in the basic mode and thus the state generating unit detects the BURST# signal to determine whether the data transfer is in the basic mode or the burst mode.

In FIG. 100, the state circuit relating to the clock period T2 of the state generating portion 262D comprises data latch portion 266 and condition determining unit 267.

Data latch unit 266 comprises a two-input logical OR gate OR and latch circuit Latch and inputs the state transition signal "0" or "1" ① output from the state circuit relating to the clock period T1 and outputs the ST signal relating to the clock period T2 to the internal control unit 262B and the external 262C based on reference clock CLK and internal feedback signal SF# (which is referred to as the SF# signal hereinafter) ②.

Condition determining unit 267 comprises two-input logic circuit A1, four-input logic circuits A2 and A5, five-input logic circuits A3 and A4. Two-input logic circuit A1 feeds back the SF# signal to OR gate OR based on the ST signal relating to the clock period T2 and output from the latch circuit Latch and the DC# signal output form the memory 261. For example, when the state transition signal output from the state circuit relating to the clock period Ti is at "1" and DC# signal equals "1", the DC# signal is not active and thus the SF# signal is fed back to the OR gate.

Four-input logic circuit A2 outputs the state transition signal "1" or "0" ③ to the state circuit relating to the clock period T3 in the next stage, based on the ST signal relating to the T2, the inverse of the DC# signal, the inverse of the BURST signal and the inverse of the IREQ signal.

Five-input logic circuit A3 outputs the state transition signal "0" or "1" ④ to the state circuit for clock period T1 relating to the previous stage based on the ST signal relating to the clock period T2, the inverse of the DC# signal, the BURST signal, the inverse signal of the IREQ# signal and the IERR# signal.

Five-input logic circuit A4 outputs the state transition signal "0" or "1" ⑤ to the state circuit (idling state) relating to the clock period T1, based on the ST signal relating to the clock period T2, the inverse of the DC# signal, the BURST# signal, the inverse of the IREQ# signal and the inverse of the IERR# signal.

Four-input logic circuit A5 outputs the state transition signal "0" or "1" ⑥ to the state circuit relating to the clock period T1, based on the state relating to the clock period T2, the inverse signal of the DC# signal, the IREQ# signal and the IERR# signal.

As stated above, according to the data processor apparatus relating to the sixth embodiment (burst mode) of the present invention, as shown in FIG. 99A, the memories and processors which are connected to the data bus 263 and address bus 264 are provided and the processor 262 transfers the data D or address ADD based on the BURST# signal.

As shown in FIG. 99B, the CPU 262A of the processor 262 issues address ADD=0 relating to the data D and then transfers the data D and address ADD by using the internal control unit 262B, external control unit 262C and state generating unit 262D. At this time, the state generating unit 262D transfers data D=d0, d1, d2, and d3 and address ADD based on the internal state of the CPU 262A.

Therefore, even if the burst transfer method is adopted as shown in FIG. 99A, the DS# signal and DC# signal are transferred via the control line L connected between the memory 261 and the processor 262 and provided separately from the data bus 263 and the address bus 264. At this time, four-input logic circuit A2 of the condition judging unit 267 in the state generating unit relating to the clock period T2 does not consider the IERR# signal when the BURST# signal is active, so that, the stage changes to the state T3 and continues the bus transfer even if an internal error occurs.

Therefore, the handshake method of controlling the transfer of data by resolving the validity of the DS# and DC# signals can be adopted.

Therefore, even if the burst mode transfer method is adopted, the present embodiment can maintain normal operation of the bus when a failure occurs during the period in which the cycle is executed and can avoid a failure of the system as much as possible, thereby speeding up the data processing operation.

When DRAM is used for the memory 261 and burst mode transfer is performed, a single transfer of the address ADD enables four data to be read. Thus, the DRAM operating with a cycle of two clock periods requires eight clocks to access for data but the burst transfer (continuous transfer) actually requires five clocks.

Next, a method of controlling the data processing apparatus according to the sixth embodiment (burst mode) will be explained by supplementing the explanation of operation of the data processing apparatus.

Figure 102:
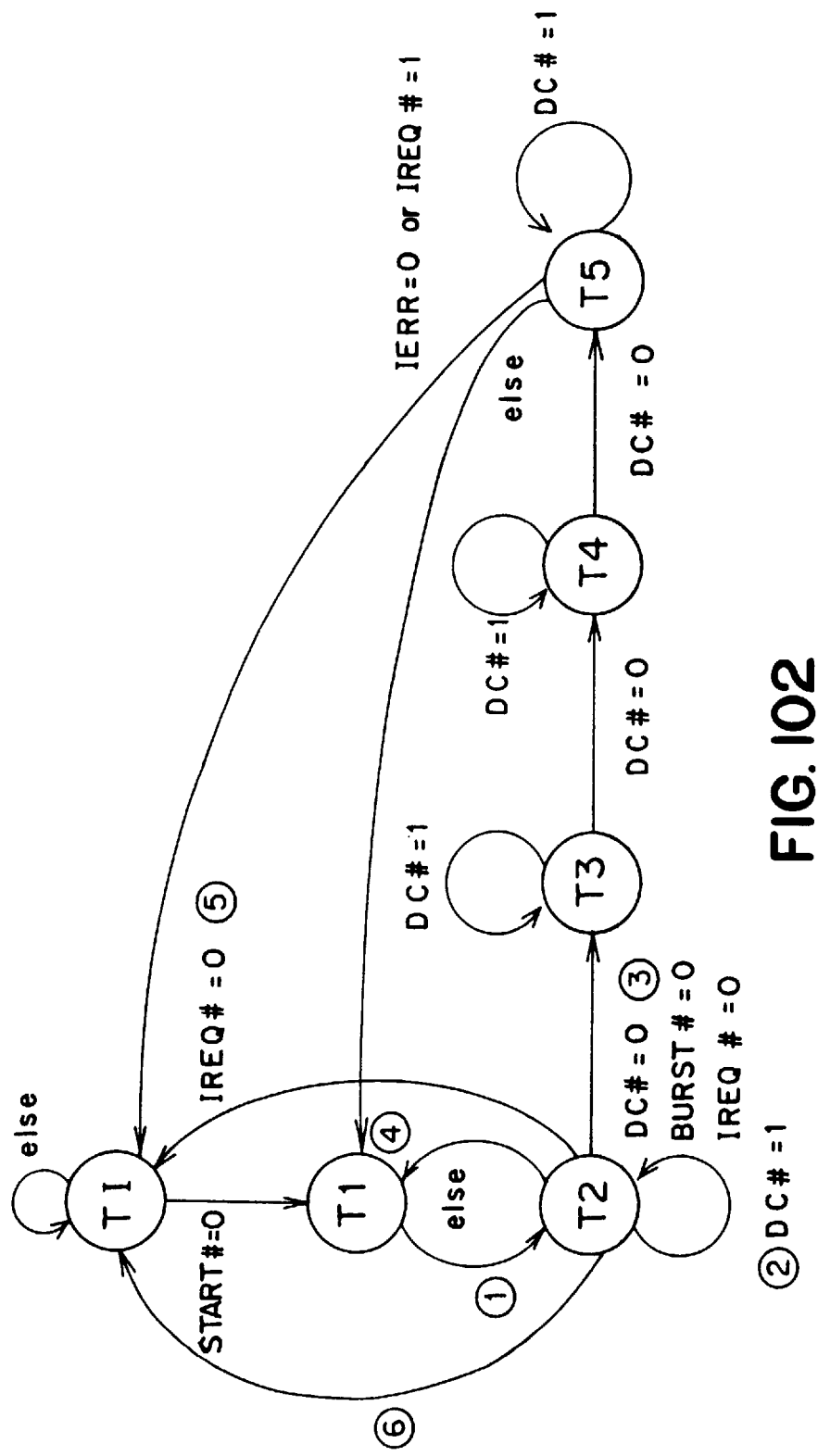
FIG. 102 shows the transition of the internal state according to the sixth embodiment.

FIG. 102 shows a state transition diagram of the data processing apparatus according to the sixth embodiment. For example, the external memory 261 outputs the BURST# signal to allow the burst transfer in response to the request via the BL# signal transmitted from the memory accessing device, and performs transfer control of data D and address ADD. In this case, as shown in FIG. 102, the system is in an idle state which is other than the bus cycle, at the clock period T1. For example, when the data processing apparatus is reset by the host CPU, the idle state corresponds to the state after the reset or after completion of the bus cycle.

Next, when CPU 262A outputs START#="0" to the state generating unit 262D, the state changes to that of the first clock period T1 and to the state for starting the bus cycle.

Thereafter, at the second clock period T2, the data D is transferred when the DS# signal to the external memory 261 becomes active. At this time, the state circuit at the second clock period T2 outputs the state transition signal "1" or "0" to one of the state circuits at the clock periods TI, T1, and T3 and thus the state changes. FIG. 103 relates to the condition of the state generating unit for the clock period T2 as shown in FIG. 100, that is, it relates to the BURST# signal, and designates the destination of the state transition based on the IERR# signal and the IREQ# signal when the DC# signal becomes active. The state transition does not occur when the DC# signal is not active.

The first row in FIG. 103 represents the condition of the logic circuit A5 in FIG. 100, the second row represents the condition at the logic circuit A2, the third row represents the condition at the logic circuit A3 and the fourth row represents the condition at the logic circuit A4. These conditions are the transition conditions when the DC# signal is made active.

Thus, the state circuit relating to the second clock period T2 outputs the ST signal relating to the clock period T2 to internal control unit 262B and external control unit 262C based on the state transition signal "0" or "1" ① output from the state circuit relating to the clock period T1 and the basic CLK and the SF# signal=DC# signal="1" ② as shown in FIG. 100.

As shown in FIG. 98B, in the burst transfer mode, when the address a0 is output at the first clock period T1, the data is received four times regardless of the conditions on the processor side and the DC# signal is made active 4 times and sent to the processor 262. Even if the processor produces an error, it receives the fourth DC# signal and continues the process until the fifth clock period T5.

As compared with the prior art, referring to FIG. 103, as the sixth embodiment utilizes the bus mode condition, the embodiment can not observe the internal error until the transition to the state T3 and the transfer of the data D is completed even if the internal error occurs during the period in which the memory 261 performs a burst transfer.

In the third clock period T3, the state of the burst transfer continues and the data D is transferred from CPU 262A to memory 261. When signal DC# becomes active (="0"), the state changes to that of the fourth clock period T4. While DC# signal="1", the state does not change to that of the fourth clock period T4.

In the fourth clock period T4, the state of the burst transfer continues and the data is transferred. When DC#="0", the state changes to that of the fifth clock period T5. While DC# signal="1", the state does not change to that of the fifth clock period T5. In both the third and fourth clock periods T3 and T4, the monitoring of the IERR# signal relating to the internal error is not performed, in the same way as in the transition between state T2 and T3.

Thereafter in fifth clock period T5, the state reaches the last state of the burst transfer, the DC# signal of the external memory 261 is made active, thereby determining the continuation/noncontinuation of the transfer of the data D. The continuation/noncontinuation of the transfer of the data D is determined based on whether the IERR# is "0" or IREQ# signal="1" for indicating the continued operation of the bus cycle.

FIG. 104 shows the transition conditions in the fifth clock period T5. When both IERR# and IREQ# are at "1", neither a bus request nor an error exist and thus the state is idle. When IERR# is at "0" an error has occurred and thus the state changes to idle regardless of the existence of the bus request. When IERR# is at "1" and IREQ# is at "0", an error has not occurred and the bus request exists, thereby enabling the state to change to the state T1 and continuing the bus transfer.

According to the method of controlling the data processing apparatus according to the sixth embodiment of the present invention, as shown in the state transition diagram of FIG. 102, the data D and address ADD are transferred based on the BURST# signal determined externally and the internal data processing state during the operation of the memory access.

In the burst transfer system, for example, the result data operated on by the processor 262, which has the function of performing arithmetic operations, is burst-transferred, and when the transferred data is written in the memory 261, it is assumed that an error occurs in the operation result i.e., internal failure occurs at the third clock period T3 in which two data D=d0 and d1 have been transferred. Then, the writing of the third and fourth data D=d2 and d3 continues, unlike the prior art.

The internal error occurring in the third clock period T3 is detected in the fifth clock period T5 which corresponds to the last state of the bus cycle concerning the data D, and based on the result of this detection of the internal error, continuation/noncontinuation of the transfer of the data is determined. When all the DC# signals corresponding to the address ADD output before the occurrence of the internal failure are active, the state transitions occur sequentially between states T2 and T5 and continuation/noncontinuation of the transfer of the data D is determined based on the IERR# signal in the last state T5.

As shown in FIG. 98B, when an address a0 is output in the first clock period T1 in the case of the burst transfer, the data D is in the memory four times regardless of the conditions on the processor side and the DC# signal is sent four times to processor 262. If there is any error, it receives the fourth DC# signal and continue the process until the fifth clock period T5.

Therefore, even if the failure occurs internally during the period of the data transfer in the data transfer mode, the failure condition is left in the active state and the bus cycle is continued until the handshake operation necessary for the memory 261 is completed. It becomes possible to stop the bus operation after the handshake operation is completed.

Therefore it becomes possible to complete the write operation of the data D which is currently being transmitted and thus the processor 262 is not compelled to stop operating during the period of the data transfer, unlike in the prior art. Therefore, the interruption of the bus transfer occurs in the last state of the bus cycle and thus data D write errors and a failure of the operation using the erroneous data D can be prevented as much as possible. After the completion of the write operation of the data, the bus use right is assigned to the host CPU and the host CPU starts the error processing. Accordingly the possibility that an erroneous DC# signal is transmitted from the memory side to the host CPU as in the prior art is eliminated, thereby assuring the normal operation of the bus.

Figure 105A:
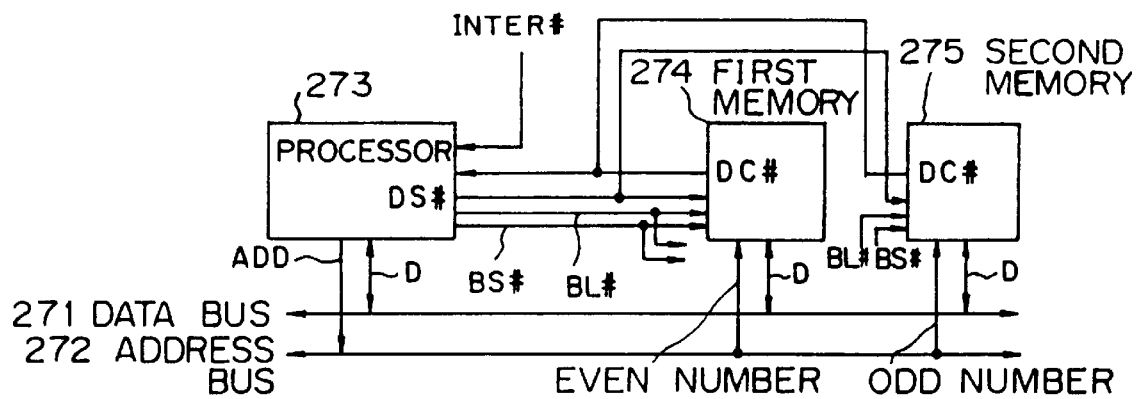
FIGS. 105A and 105B show the configuration (interleave mode) of the data processing unit according to the sixth embodiment.
Figure 105B:
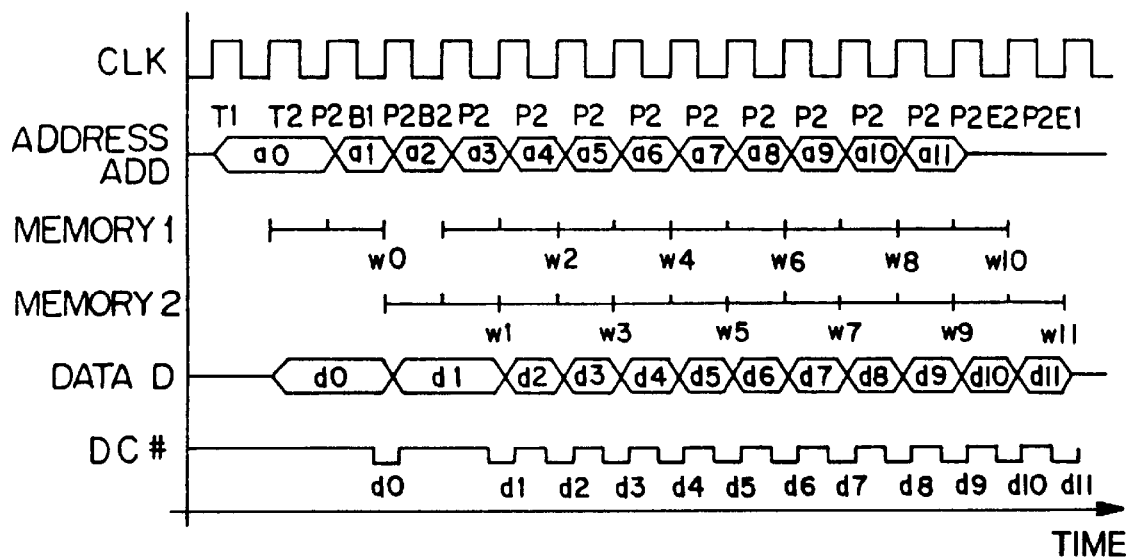

FIGS. 105A and 105B explain a modification of the sixth embodiment of the present invention when the data processing apparatus is in the interleave mode. FIG. 105A shows a block diagram of the data processing apparatus in the interleave mode and FIG. 105B shows an operational time chart. The data processing apparatus utilizing the interleave transfer method with two banks upon performing a memory access by obtaining a bus use right comprises processor 273 connected to data bus 271 and address bus 272 and first and second memories 274 and 275.

Processor 273 controls a transfer of the data D and address ADD based on the interleave mode signal INTER# (which is referred to as INTER# signal hereinafter) in addition to the data processing operation. The basic structure of the processor 273 is the same as that of processor 262 shown in FIG. 99.

The first memory 274 stores the operation result data and other data D which is at even address ADD and has them written and read. DRAM is used for memory. The memory 274 can operate at a lower speed as compared with the memory 261 shown in FIG. 99.

The second memory 275 stores the operation result data and other data D which is at odd addresses AND and allows it be written and read.

A control line L is connected between the first and second memories 274 and the processor 273 separately from the data bus 271 and address bus 272, and the DS# signal and DC# signal designating the active period of the data D is transmitted through the control line L. The parts with the same symbols and names as those in FIG. 99 perform the same functions and thus their explanations are omitted. According to the data processing apparatus in the interleave mode shown in FIG. 105A the data processing apparatus comprises the first and second memories 274 and 275 connected to the data bus 271 and address bus 272, and processor 273 controls transfer of the data D and an address ADD based on the INTER# signal.

As shown in FIG. 105B, the CPU of the processor 273 issues address ADD=a0 to all relating to the data D and then the inner control unit, outer control unit and state generating unit, control transfer of the data D and address ADD. The state generating unit produces a state signal for transferring the data D and address ADD based on the internal state of the CPU.

In the case of the interleave transfer method, as shown in 105A, the DS# signal and DC# signal are transferred through control line L, connected to the first and second memories 274 and 275 and processor 273, independently of data bus 271 and processor 272 and it is possible to use the handshake method for controlling a transfer of the data D by confirming the validity of the DS# and DC# signals.

By prefetching an address ADD for the first and second memories 274 and 275 which are divided into two banks holding the even addresses and the odd addresses respectively, the first and second memories 274 and 275 can appear to operate at double speed. When the memory access is performed in two-clock periods, 22 clocks are usually necessary for accessing 11 data but in the interleave transfer method with two banks, 15 clocks are required for accessing 11 data.

Therefore for the case of utilizing an interleave transfer method, the normal bus operation is assured when the failure occurs during the execution of the bus cycle, thereby preventing a failure of the system from occurring and speeding up the data processing. FIG. 105 shows the case in which the circuit comprises first and second memories, namely, two banks, but this invention can achieve the same effects for a plurality of memories, that is, four or six banks can achieve the same effects as the memory with two banks.

The seventh embodiment of the present invention will be explained. The seventh embodiment is provided to increase data transfer efficiency by performing a switching operation of a burst mode and a basic mode in accordance with the seventh object, that is, in accordance with the arrangement of the data to be transmitted between a processor and a memory.

Figure 106:
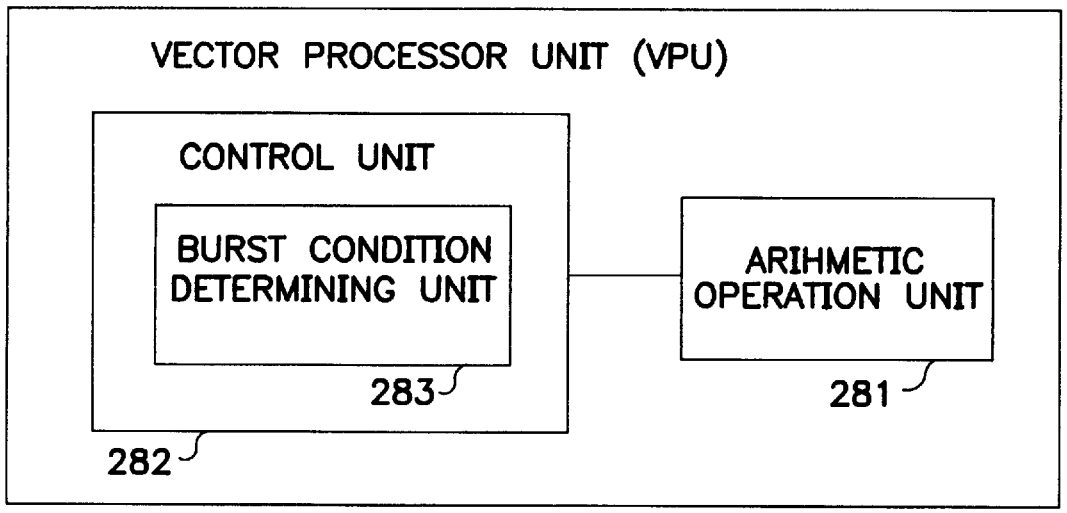
FIG. 106 is a block diagram for explaining the principle of the seventh embodiment of the present invention.

FIG. 106 shows a block diagram of a principle structure of the seventh embodiment of the present invention. In FIG. 106, the processor, such as vector processor unit 280, is provided with arithmetic operation unit 281 and control unit 282 internally. The control unit 282 comprises burst condition determining unit 283 which determines whether the burst mode transfer is proper or not. Control unit 282 performs a switching operation of the data transfer mode between the burst mode and the basic mode, thereby achieving an efficient bus access in accordance with the arrangement of the data.

Figure 107:
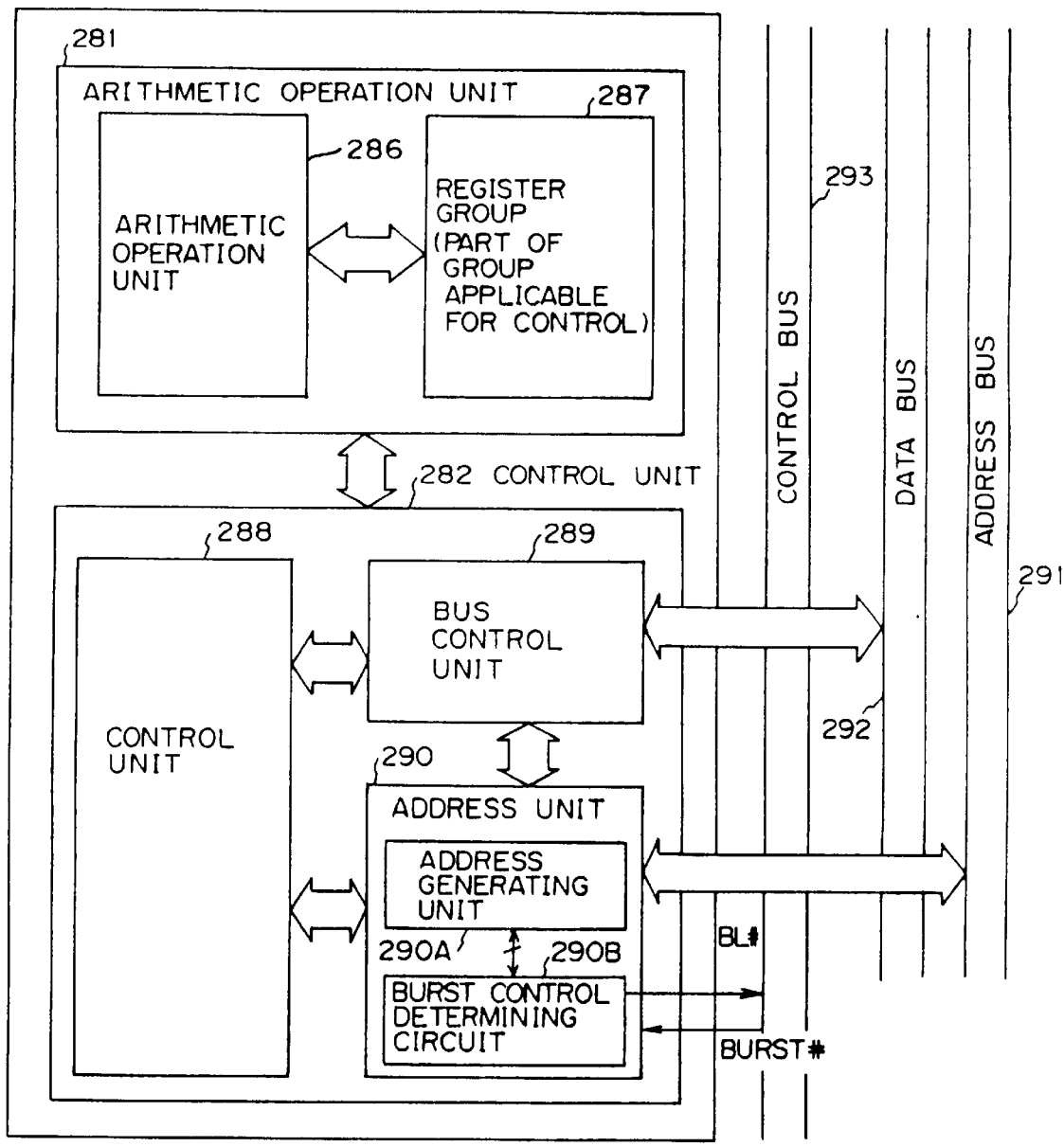
FIG. 107 is a block diagram of the detailed configuration of the seventh embodiment.

FIG. 107 shows a block diagram of the seventh embodiment. The processor 280 comprises an arithmetic section in correspondence with the principle block diagram shown in FIG. 106. Arithmetic operating portion 281 comprises arithmetic operating unit 286 for performing various operations and a register group 287 for storing data for operation and data for control, for example a vector register. Control section 282 comprises control unit 288, bus control unit 289 and address unit 290.

Address unit 290 is connected to address bus 291 and bus control unit 289 is connected to data bus 292. The burst mode signal BURST# is transmitted from the memory side to address unit 290 through control bus 293 and a control line for outputting a block transfer permission signal BL# upon satisfying the burst condition is connected to the processor side. Burst condition determining circuit 283 is provided in the address unit 290 which comprises address generating unit 290A and burst condition determining circuit 290B for determining whether the burst mode or the basic mode is required upon performing the data transfer.

Figure 108:
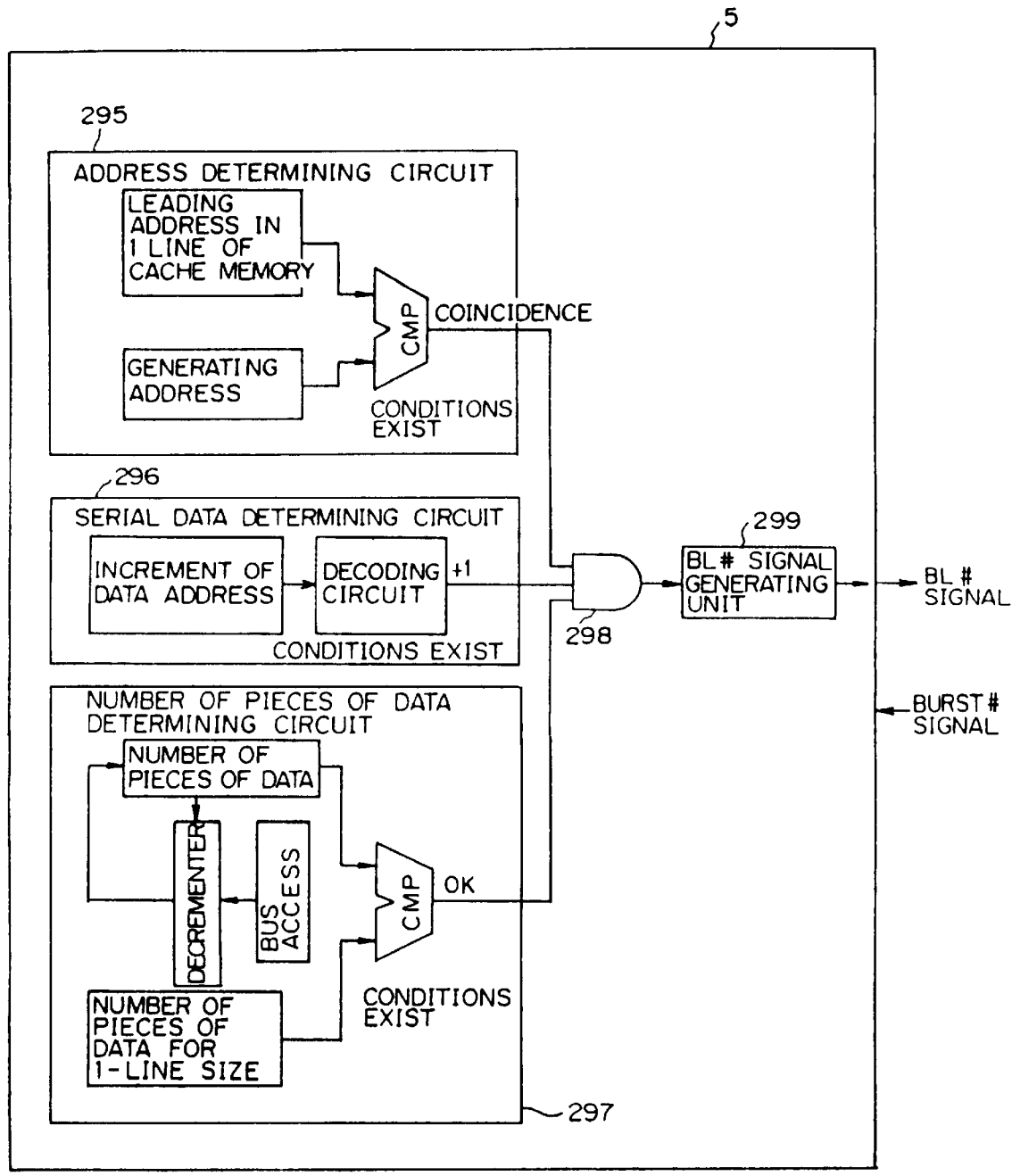
FIG. 108 is a block diagram of the detailed configuration of the burst condition determining circuit according to the seventh embodiment.

FIG. 108 shows the detailed structure of burst condition determining circuit 290B. As shown in FIG. 108, burst condition determining circuit 290B comprises three determining circuits for performing a predetermined determining operation based on the information relating to the data transfer from the control section 282 and these three determining circuits comprise continuous data determining circuit 296, address determining circuit 295 and number-of-data determining circuit 297. The burst condition determining circuit 290B further comprises logical product circuit 298 for determining whether the necessary condition is established in all the determining circuits 295 to 297 and BL# signal generating unit 299 for generating the BL# signal to be output to the memory side.

The following three conditions should be established if the data transfer in the burst mode is optimized. The continuous data determining circuit 296, address determining circuit 295 and number-of-data determining circuit 297 determine whether these following three conditions are established.

(1) Continuous Data Condition

There are two cases the first case is where data stored continuously in a memory is loaded in the register and the second case is where the data is continuously stored in the memory. In these cases the addresses should increase, that is, the difference between succeeding addresses should be positive. The continuous data determining circuit 296 determines whether the data is continuous and the addresses are increasing. The address increment is sent from the register in the arithmetic operating portion 281 in FIG. 107.

(2) Address Condition

The address of the continuous data arrangement should start at the head address of one line of the external cache memory. The address determining circuit 295 determines whether a continuous address starts at the head address. The head address of one line of the cache memory is maintained in the register within the address judging circuit 295 from address generating unit 290A.

(3) Number-of-data Condition

This determines whether the number of data to be loaded or stored continuously is at least one line of cache memory. The size of one line which constitutes a unit of access to the cache memory is the data width times four. The number-of-data-items determining unit 297 determines whether one line's worth of data exists, depending on the size of the data from the register in the arithmetic operating unit 281.

Figure 109:
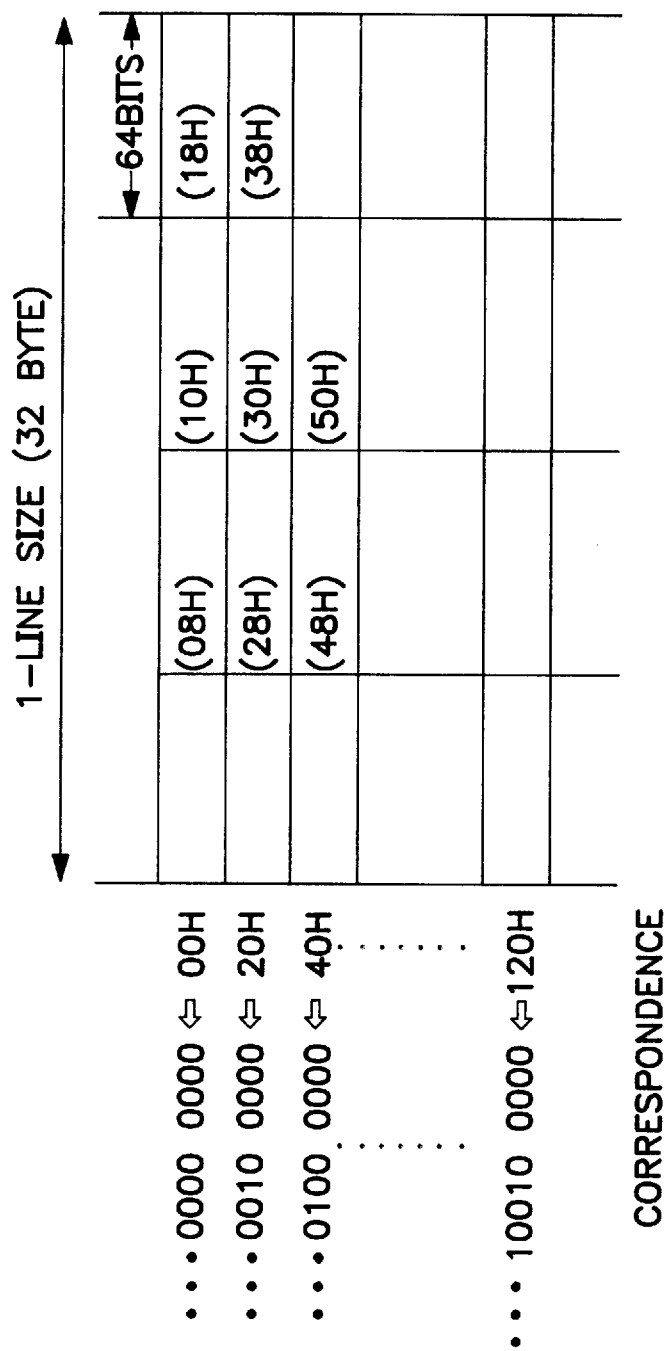
FIG. 109 shows the data storage method in the cache memory.

FIG. 109 shows an explanation of a method of storing the data in the cache memory. One line of the cache memory has a length of four times the ordinary data bus width. When the width of the data bus is 64 bits, namely 8 bytes, one line of the cache memory comprises 32 bytes. Accordingly one line of the cache memory includes 8 data items in the case of the 32 bit data and includes 4 data items in the case of the 64 bit data.

As described above, in the present invention, the address provided to the data is a so-called byte address and thus the head address of one line of the cache memory is as shown in FIG. 109 and the lower 5 bits are all 0 as shown on the left side of the FIG. 109. In the case that the address comprises 32 bits for example, the lower 5 bits, namely, A27 to A31 are all 0. Therefore, it is sufficient for the address determining process in the aboverecited address condition (2) to determine whether the lower 5 bits of the generated address are all "0" or not. 1

As described above, it is necessary for the data transfer in the burst mode that the above three conditions are all satisfied. In the present embodiment, the continuous data determining circuit 296, address determining circuit 295 and number-of-data determining circuit 297 determine whether these three conditions are satisfied. In the case of the satisfying of the conditions, BL# signal generating unit 299 outputs the BL# signal and the data transfer is carried out in the burst mode. On the other hand in the case that the conditions are not satisfied, the data transfer is carried out in the basic mode.

Figure 110:
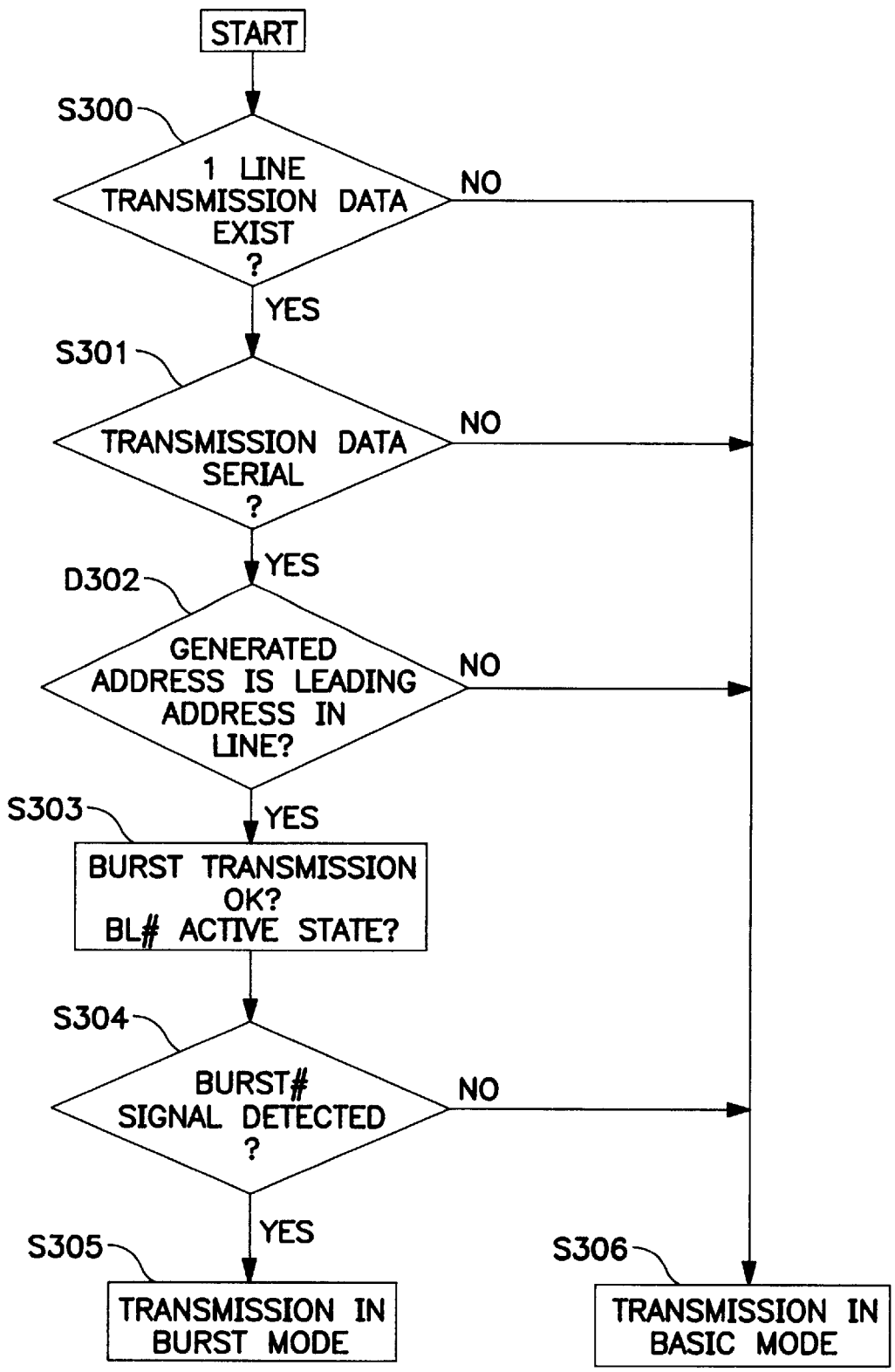
FIG. 110 is a determining process flowchart for the data transmission mode according to the seventh embodiment.

As shown in FIG. 110, when the three conditions checked in S300 to S302 are satisfied, block access request signal BL# of the external terminal becomes active (S303) and it is notified to the external unit that the transfer in the burst mode is now possible. As a result, the burst access response signal BURST# is returned and when this signal is detected (S304) the data transfer in the burst mode is carried out (S305). In the case that the conditions are not satisfied (namely where any one of S300 to S302 is NO), or where the burst access response signal BURST# is not detected (NO in S304), the data transfer in the basic mode is carried out (S306).

Accordingly, in the seventh embodiment, where a vector operation processor is used for performing data processing in addition to the general purpose processor, and the vector data to be dealt with is not always continuous or is provided in a data arrangement which is not suitable for burst mode transfer, the data transfer is conducted in the basic mode instead of the burst mode, thereby avoiding an adverse influence on the performance of the system due to the decrease of the efficiency of the bus access and thereby enabling optimum data transfer at all times.

As is apparent from the above explanation, according to the seventh embodiment, means for determining whether the transfer in the burst mode is optimum, based on the data to be dealt with, is provided to the vector processor. When the conditions for optimum data transfer in the burst mode are satisfied, the transfer in the burst mode is carried out. When the conditions are not satisfied, the data transfer is carried out in the ordinary transfer mode, namely, the basic mode. As the data transfer mode is switched as described above, it becomes possible to perform an efficient bus access in accordance with the conditions such as the arrangement of the data. Therefore in an information processing apparatus provided with a vector operation processor, an external cache memory connected to the vector operation processor or an external memory with a high-speed transfer mode it becomes possible to perform efficient bus access in accordance with the arrangement of the data to be dealt with when the data transfer is carried out.

Next, the eighth embodiment of the present invention will be explained. This embodiment is provided to achieve the eighth object of the present invention, namely, to generate a suitable transfer address in accordance with the arrangement in memory of the data to be transferred so that two data items of 32 bits are simultaneously transferred using a data bus with a width of 64 bits.

FIG. 111 is a functional block diagram of the eighth embodiment and shows the transfer address generating method for transferring two data items of 32 bits simultaneously or one data item of 32 bits by using the data bus width of 64 bits.

In step (S) 308 in FIG. 111, it is determined whether the base address for the transferred data stored in the memory is in the higher order 32 bits of 64 bits or in the lower order 32 bits of 64 bits and also the value of the stride is determined.

When the stride value is +1 or −1, it is determined in S309 first whether two data items are transferred or one data item is transferred and the output address for the data transfer is generated in response to the decision made in step S309. At this time, when the base address is in the higher 32-bit side and the stride value is +1, two data items are transferred. When the stride value is −1, one item of data is transferred. This is because, when the value of the stride is −1, and the two data items comprise 64 bits, the two data items are not aligned on the eight-byte boundary as explained in FIG. 15B and thus two data items are not suitable for transfer of 64 bits.

Sequentially in step S310, an output address is generated upon the second and subsequent data transfers. In the second and subsequent data transfers, an increment of the address obtained by multiplying the stride value by the bus width or half the bus width depending on the number of the previous transfer data and whether the stride value is 1 or −1, is added to the previous output address thereby generating the output address. For example, when the data address is in the lower 32-bit side, and the stride value is 1, one data item is transferred the first time. The second time, the address "4" corresponding to the 32 bits obtained by multiplying half of 64 bits, namely, 32 bits by the stride value is added to the first output address (base address), thereby forming the row output address, and then two data items are transferred.

Figure 34:
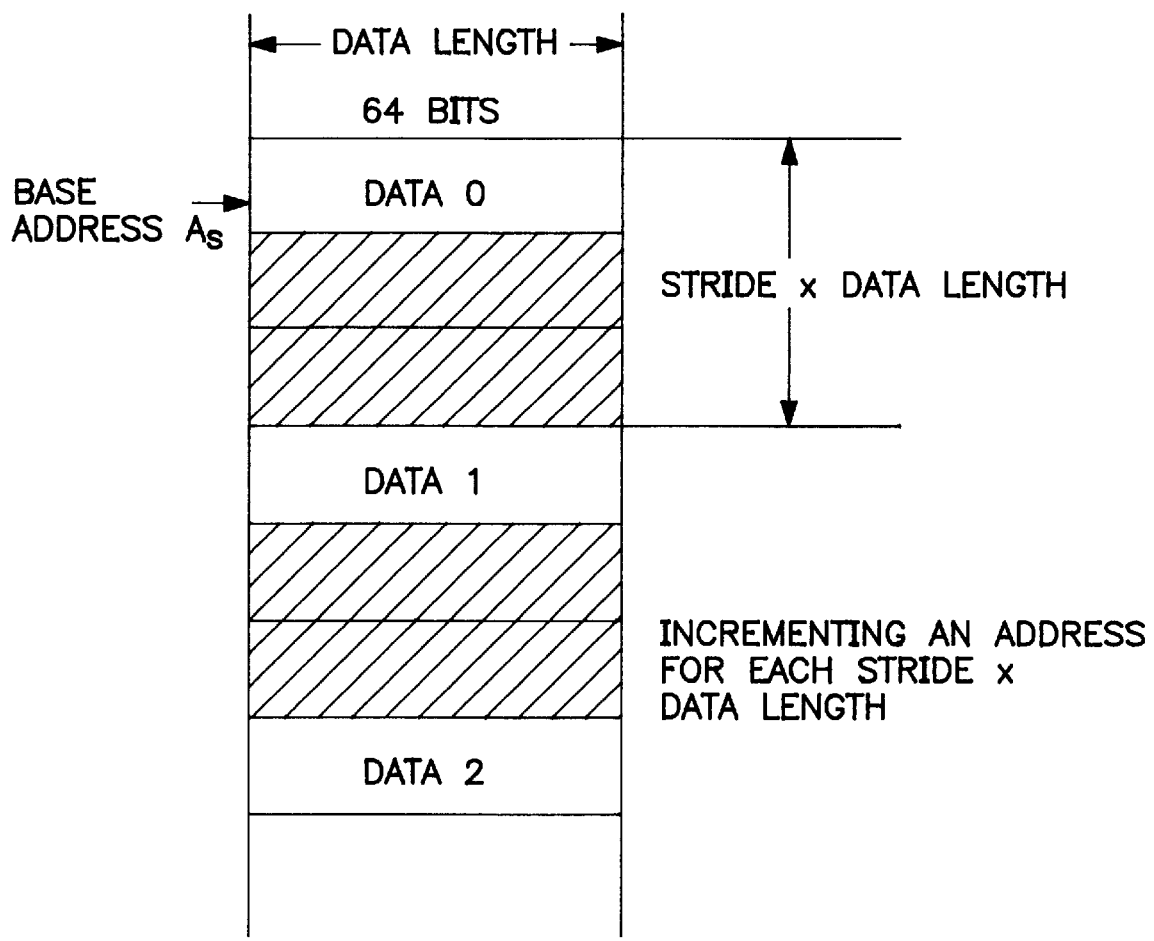
FIG. 34 shows the method of designating an address of transmission data for explaining the eighth problem solved by the present invention.
Figure 112A:
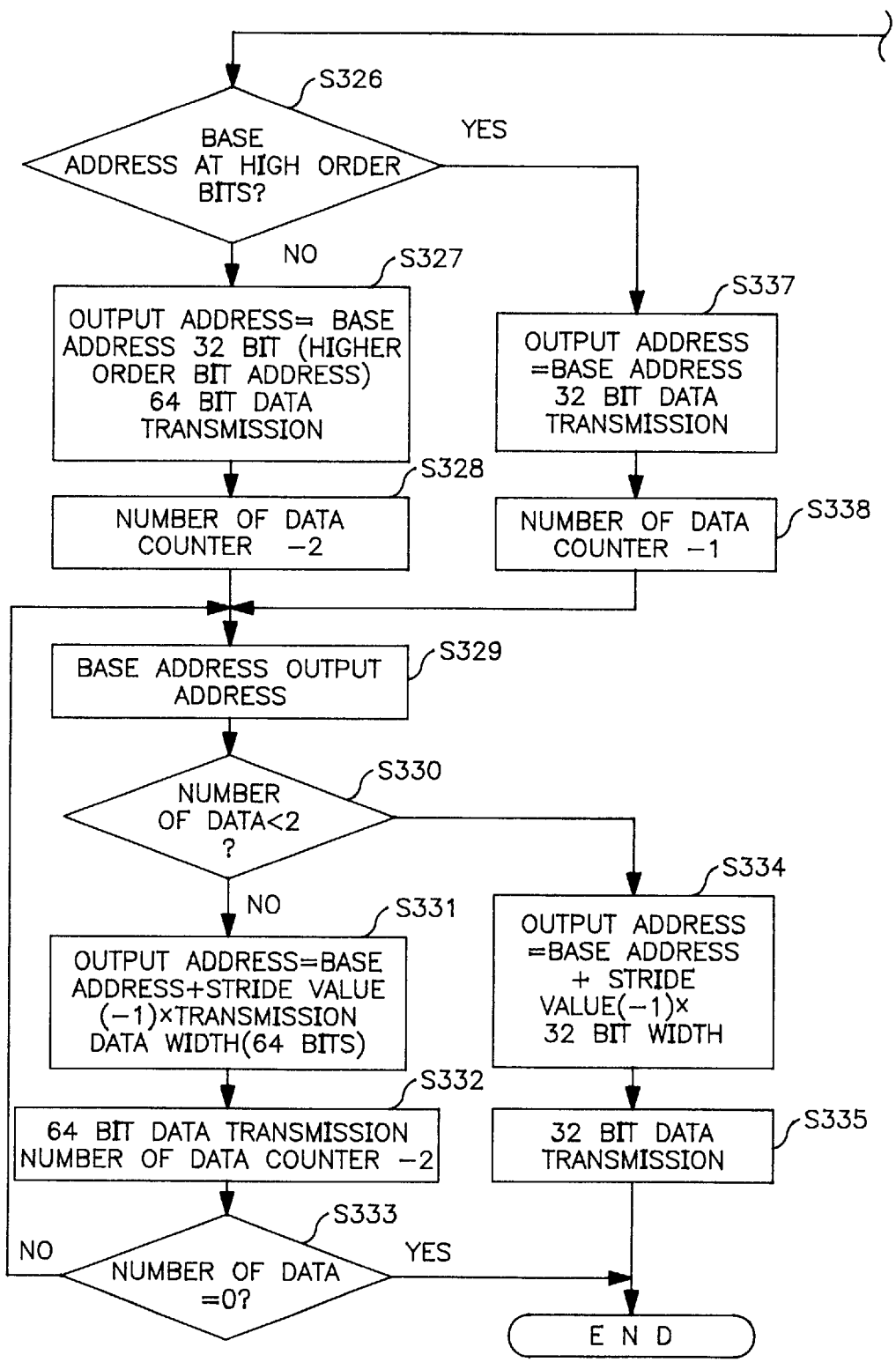
FIG. 112 is a detailed process flowchart of the data transmission method according to the eighth embodiment.
Figure 112B:
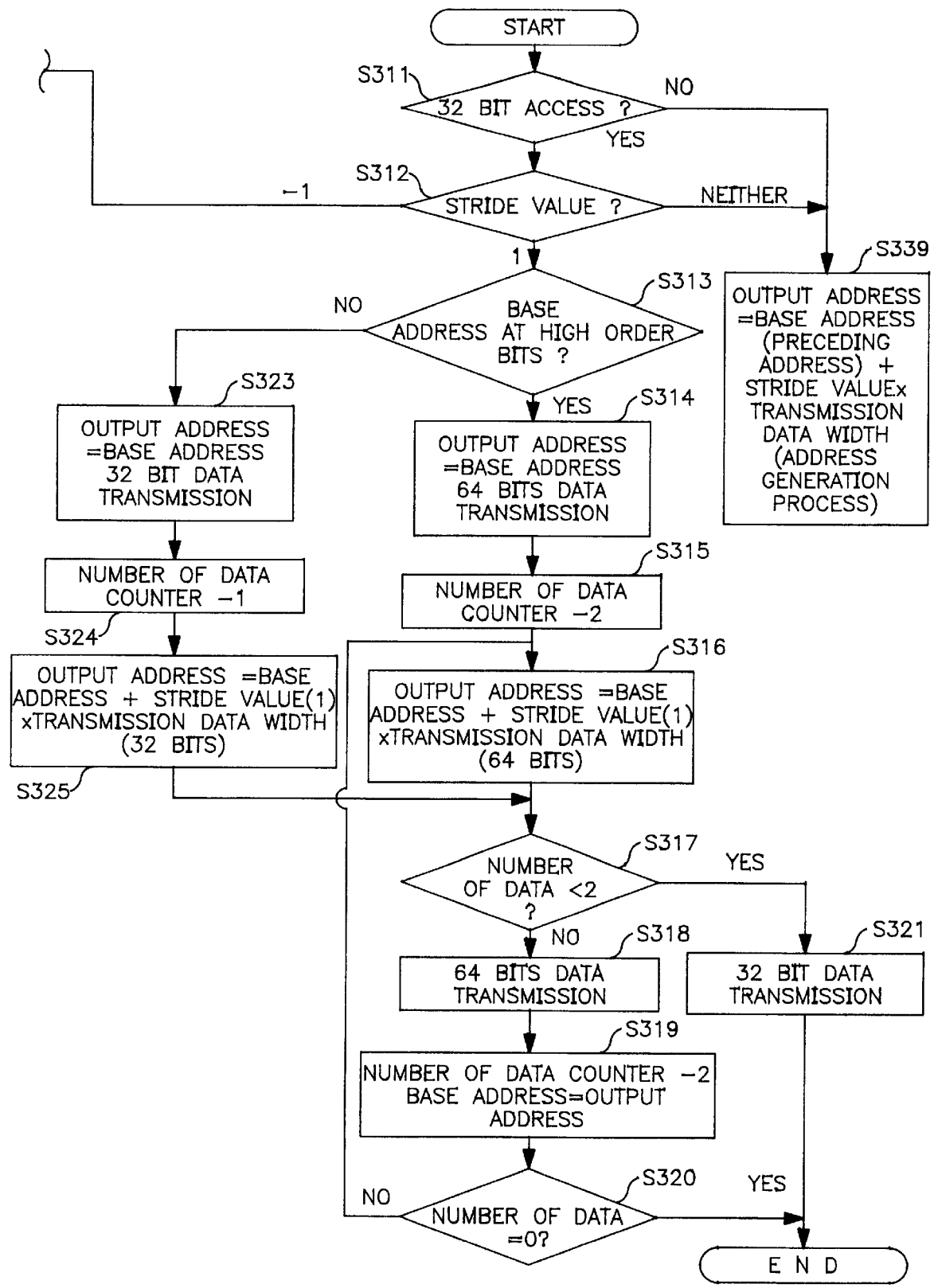
Figure 113:
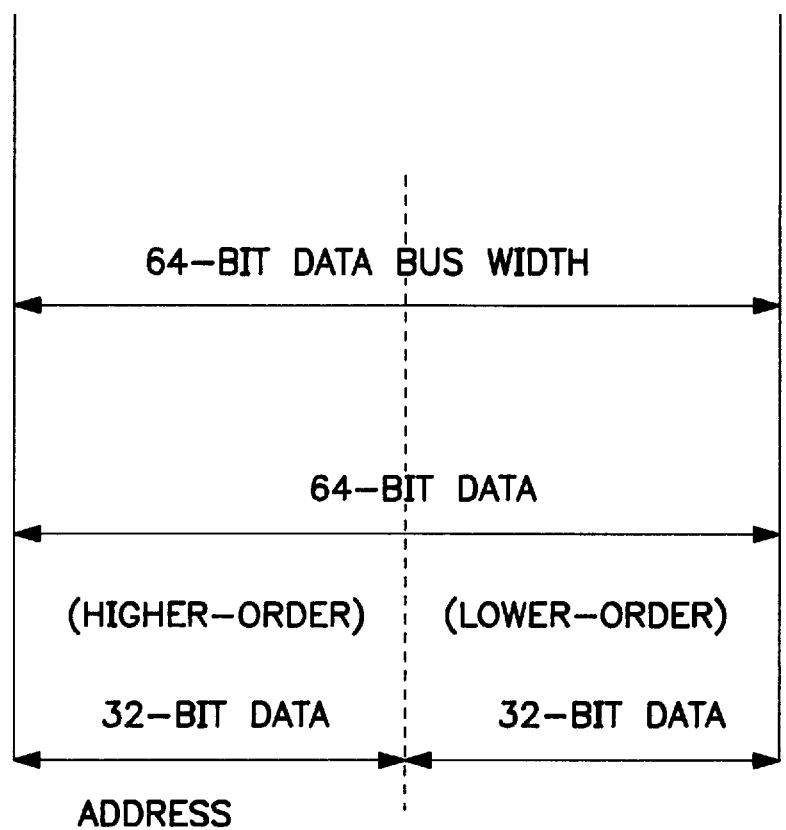
FIG. 113 shows the correlation between the data bus width and the data length according to the eighth embodiment.

FIG. 112 shows a flowchart of the operation of the eighth embodiment. This embodiment relates to a method of generating the data transfer address using the base address stride value which is briefly explained in the prior art shown in FIG. 34 and relates to an address generating method for transferring one data item of 64 bits, two data item of 32 bits simultaneously or one data item of 32 bits by using a data bus whose width is 64 bits.

In FIG. 112, the microprocessor determines whether the 32 bit data can be accessed (step 311) and determines the stride value when 32 bit data is accessed (step 312), where the stride value may be "1", "−1" or other values.

A method of generating an address where the stride value is determined to be "1" in step 312 is explained by referring to FIGS. 112 and 114. In this case, it is determined whether the base address starts from the higher side (step 313). When the base address starts from the higher side, the data transfer of 64 bits, namely, simultaneous transfer of two data items of 32 bits using the first output address as the base address is represented by the numbers 1, 2 and 2 enclosed in rectangles shown in $A_{B1}$ in FIG. 115 (step 314).

Figure 115:
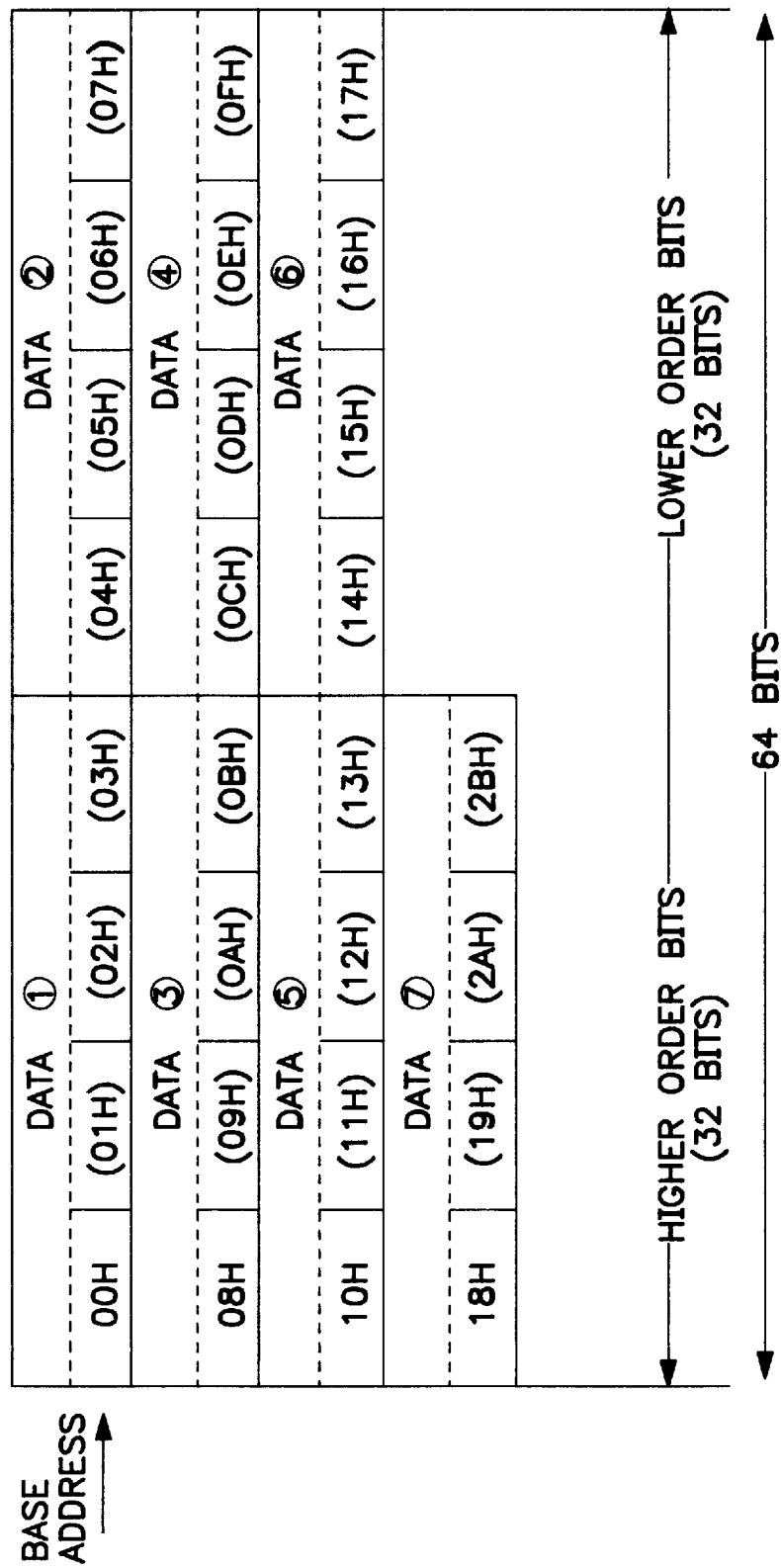
FIG. 115 is a view for explaining an address assigned to corresponding 10 data when base addresses occupy higher order bits.

FIG. 115 explains an example of an address for respective data when the base address is in the higher 32 bit side. In FIG. 115, where the base address is 00H, the data can be aligned on the 8 byte boundary by combining data item ① and data item ② even if the one data item is 32 bits, thereby enabling an access in units of 64 bits. Therefore, the output address at the time of 64 bit access combining data item 1) and data item ②, namely, at time of accessing the first data, is 00H and the address 04H of the data item ② need not be output.

In FIG. 112, the counter for the number of data items is decremented by "2" at step 315. The number of data items to be transferred is previously stored in the number-of-data items counter. Two data items are transferred in step 314 and thus "2" is the decrement in step 315.

Next, "8" as the address increment, corresponding to the value obtained by multiplying the stride value "1" by 64 bits (which represents the width of the transfer data) i.e. the data length times the decrement value of the counter is added to the base address, thereby producing the output address (step 316). Subsequently, it is determined whether the number of the remaining data items given by the number-of-data items counter is smaller than "2" (step 317). When the number of the remaining transfer data items is greater than "2", the data transfer of 64 bits is performed based on the address generated by the step 316 (step 318) and thereafter the value of the number-of-data items counter is decremented, thereby updating the base address to the count output address (step 319). The updating of the base address as recited above is for explaining the process and the original base address is given initially.

Next it is determined whether the value of the number-of-data items counter is "0" (step 320). When the value of the number-of-data items counter is not "0", the process returns to step 316 and once again the address increment corresponding to the value obtained by multiplying the stride value is "1" by 64 bits is added to the base address, thus generating the output address. In the following steps as is similar to the above, the value obtained by adding the address increment corresponding to 64 bits to the previous address, namely, the updated base address, for example, in steps 316 to 320, is generated as the new output address and 32-bit data items are transferred in units of two data item in accordance with the sequence shown by the circled numbers in FIG. 114A.

When the number of remaining data items becomes one, the process advances from step 317 to 321 and the eleventh data item of 32 bits is transferred using the output address generated in step 316. When the number of data items is found to be "0" in step 320, a transfer of data with 32 bits is performed in step 321 thereby completing the process of generating the addresses.

Figures 114A, 114B:
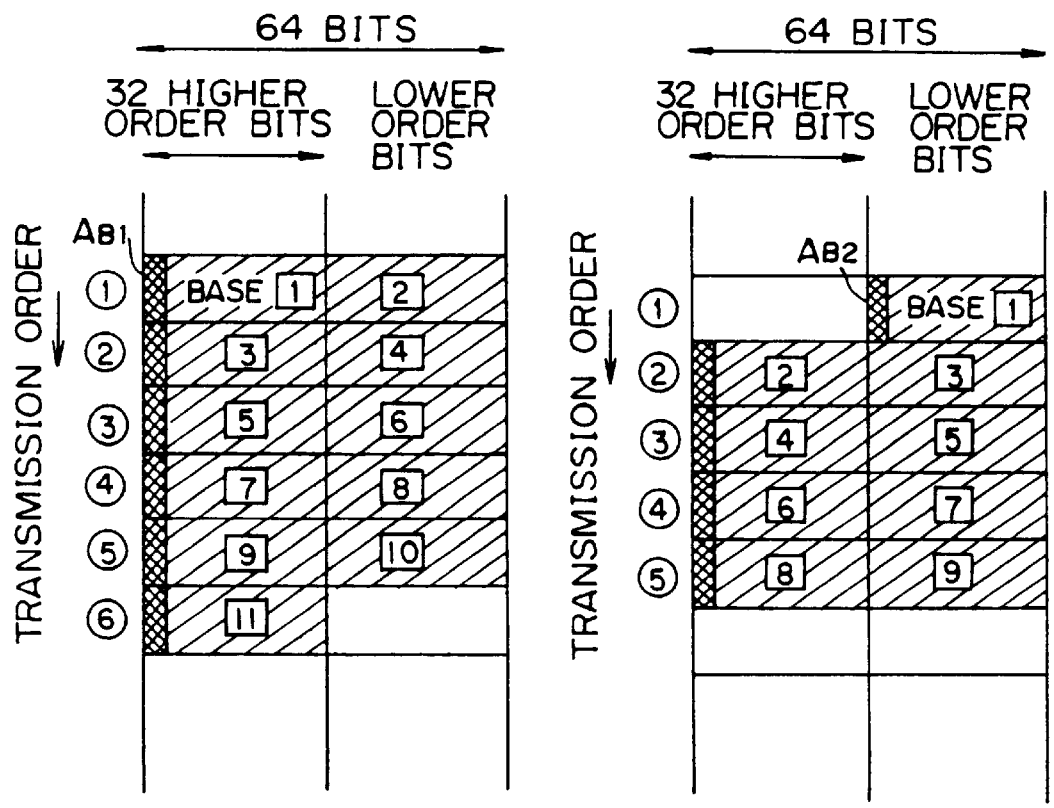
FIG. 114A and 114B show an example of a data storage when the stride value is "1"

When it is found that the stride value is "1" and the base address starts from the lower side in step 313, the method of generating the address will be explained by referring to FIGS. 112A and 114B. In this case, as shown in FIG. 114B, the first output address is considered as the base address $A_{B2}$ and the first data item of 32 bits is transferred (step 323).

After the number-of-data items counter is decremented by "1" (step 324) the length of the transfer data item of 32 bits obtained by multiplying the data length (i.e., 32 bits, for example) by the decremented value "1" is multiplied by the stride value "1" and the address increment "4" corresponding to the resulting product 32 bits is added to the base address $A_{B2}$, thereby generating the second output address (step 325).

Thereafter, the processes of steps 317 to 321 and 316 are carried out on the data item of 32 bits and are transferred in units of two data items when the number of the remaining data is more than two or equal to two, and the value obtained by adding the address increment corresponding to 64 bits to the previous output address is generated as the new address. The data is transferred in the sequence shown in the circled numbers in 114B.

Figures 116A, 116B:
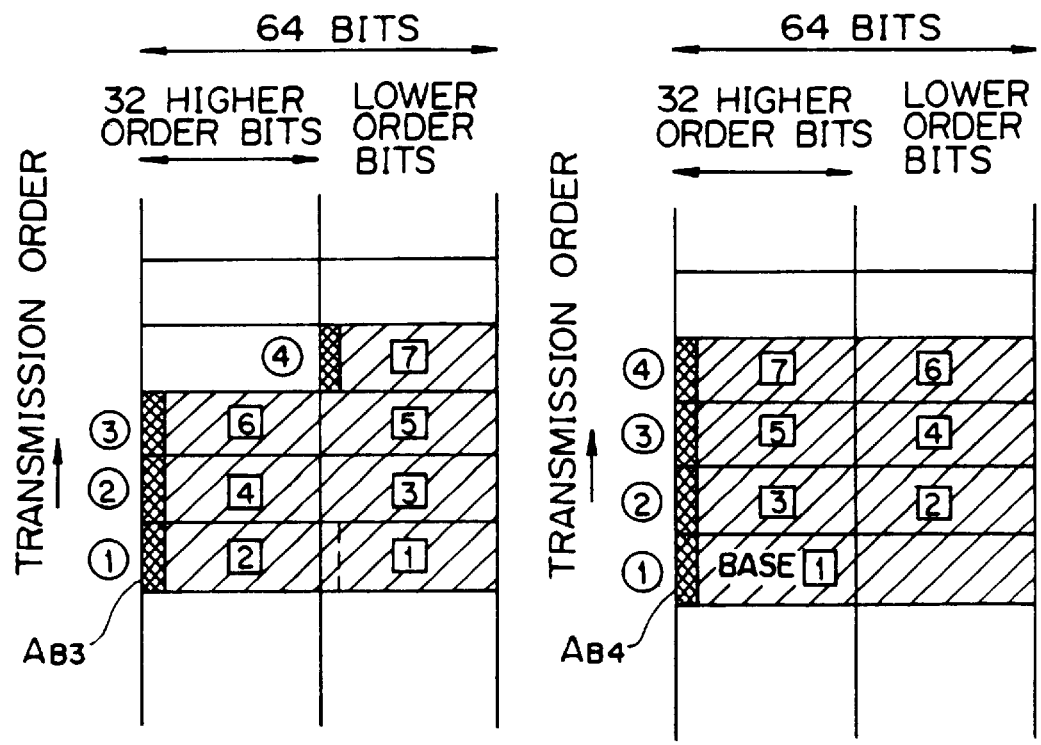
FIGS. 116A and 116B show an example of data storage when the stride value is "−1"

The method of generating the addresses is explained by referring to FIGS. 112 and 116A when the stride value is found to be "−1" in step 312 and the base address is found to start at the lower side in step 326. In this case, the first output address is not the base address but the address $A_{B3}$ in FIG. 116A designating an address of the higher 32-bit side of the data, the address being counted from the base address. Then the first and second 32 bits data item are transferred based on the address $A_{B3}$ (step 327).

Figure 117:
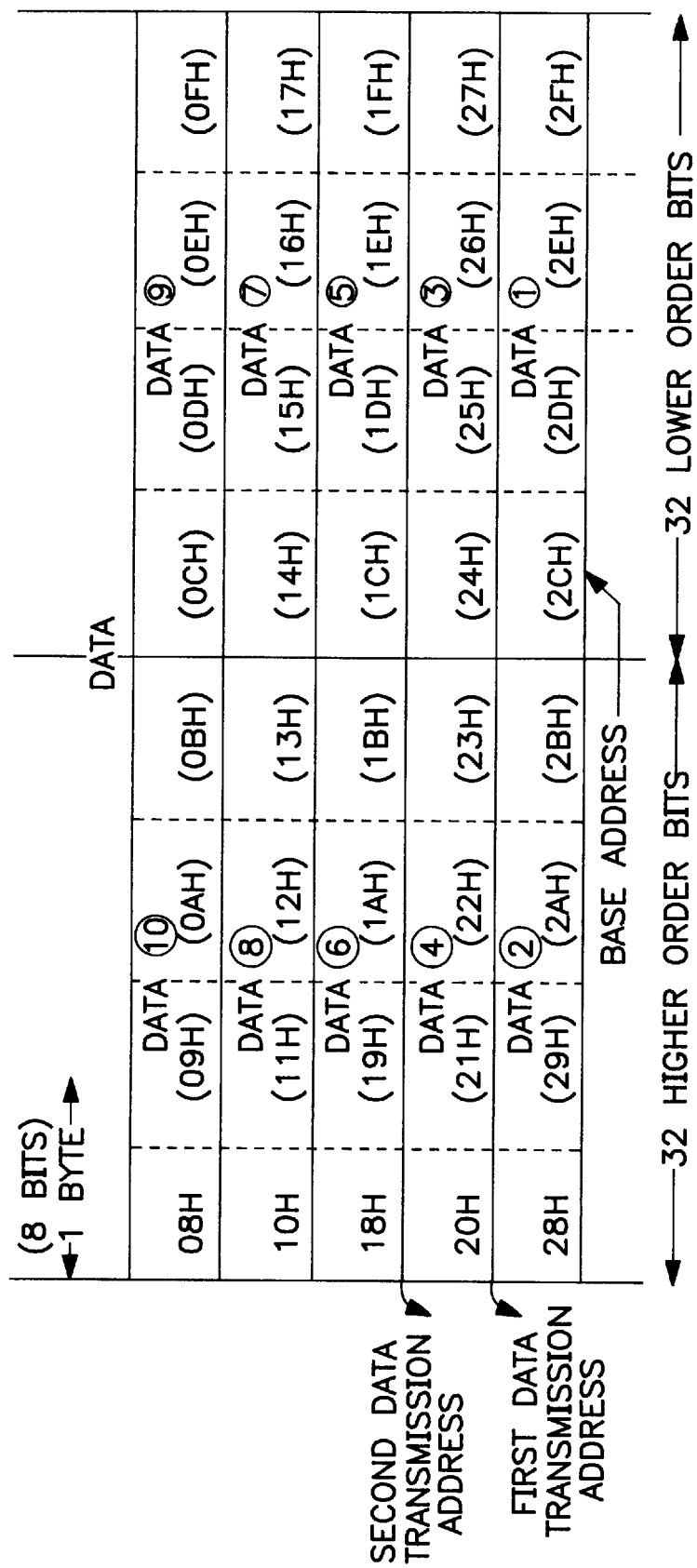
FIG. 117 is a view for explaining an address assigned to corresponding data when base addresses occupy lower order bits.

FIG. 117 is an explanatory view of an example of an address data where the base address is located in the lower side and the stride value is −1. In FIG. 117, when the base address is 2CH and the stride value is −1, the data ② exists in the higher side of the 64-bit data item containing data ①. In that case, as explained by referring to FIG. 115, the 64-bit data item obtained by combining the data ② with the data ① will align on a boundary thereby enabling a 64-bit access. At this time, the address of the data transfer is the address of the head-byte of the data 2 will, namely, 28H and this is obtained by subtracting 4 bytes from the base address 2CH.

As shown in FIG. 112, after the number-of-data items counter is decremented by "2" (at step 328) the first output address $A_{B3}$ is updated at the base address (at step 329), and then it is determined by whether the number-of-data item counter is less than "2" (at step 330). When the value of NO-NO counter is equal to or more than "2", the address increment corresponding to the product obtained by multiplying the stride value "−1" by transfer data with (64 bits) is added to the updated base address, thereby generating the output address (at step 331).

In step 331, the value obtained by subtracting the address corresponding to 64 bits from the previous output address is generated by subtracting the address corresponding to 64 bits from the previous output address and is generated as a new output address. Based on this new output address, two data items of 32 bits are transferred and after the number-of-data items counter is decremented by "2" (at step 332), it is judged whether the number-of-data items counter is "0". (at step 333)

When transfer data remains, the head-byte address of the higher side data item is generated as the output address and data items of 32 bits are transferred in units of two as shown in steps 329 to 330. When the number of remaining transfer data items becomes 1, step 330 advances to step 334 and the address corresponding to the value obtained by multiplying the stride value "−1" by one data length of 32 bits is added to the previous output address (base address), thereby generating the resultant value as the output address. Based on this output address, the seventh lower side data item of 32 bits is transferred as shown in FIG. 116A (at step 335), after the step 333 or 335 is performed, the address generating process is complete.

Next, where the stride value is found to be "−1" in step 312, and the base address is found to start from the higher side in step 326, the address generating method as shown in FIG. 112 and 116B will be used and explained. In this case, the first output address is generated as the base address as schematically shown by $A_{B4}$ in FIG. 116B., and the first data of 32 bits is transmitted (at step 337). Then, the number-of-data items counter is decrement by "1" (at step 328). The step 329C is performed and the subsequent data is processed. Accordingly, as schematically shown in FIG. 116B, the head-byte address of the higher side data is generated as the output address, the data items of 32 bits are transmitted in units of 2 in the sequence shown by the circled numbers.

When it is found in step 311, that the address access is not performed in units of 32 bits or when the stride values are neither "1" nor "−1" in step 312, the value obtained by adding the address increment corresponding to the product of the stride value and the transfer data width to the previous output address is generated as the present output address as is similar to the prior art.

Figure 118:
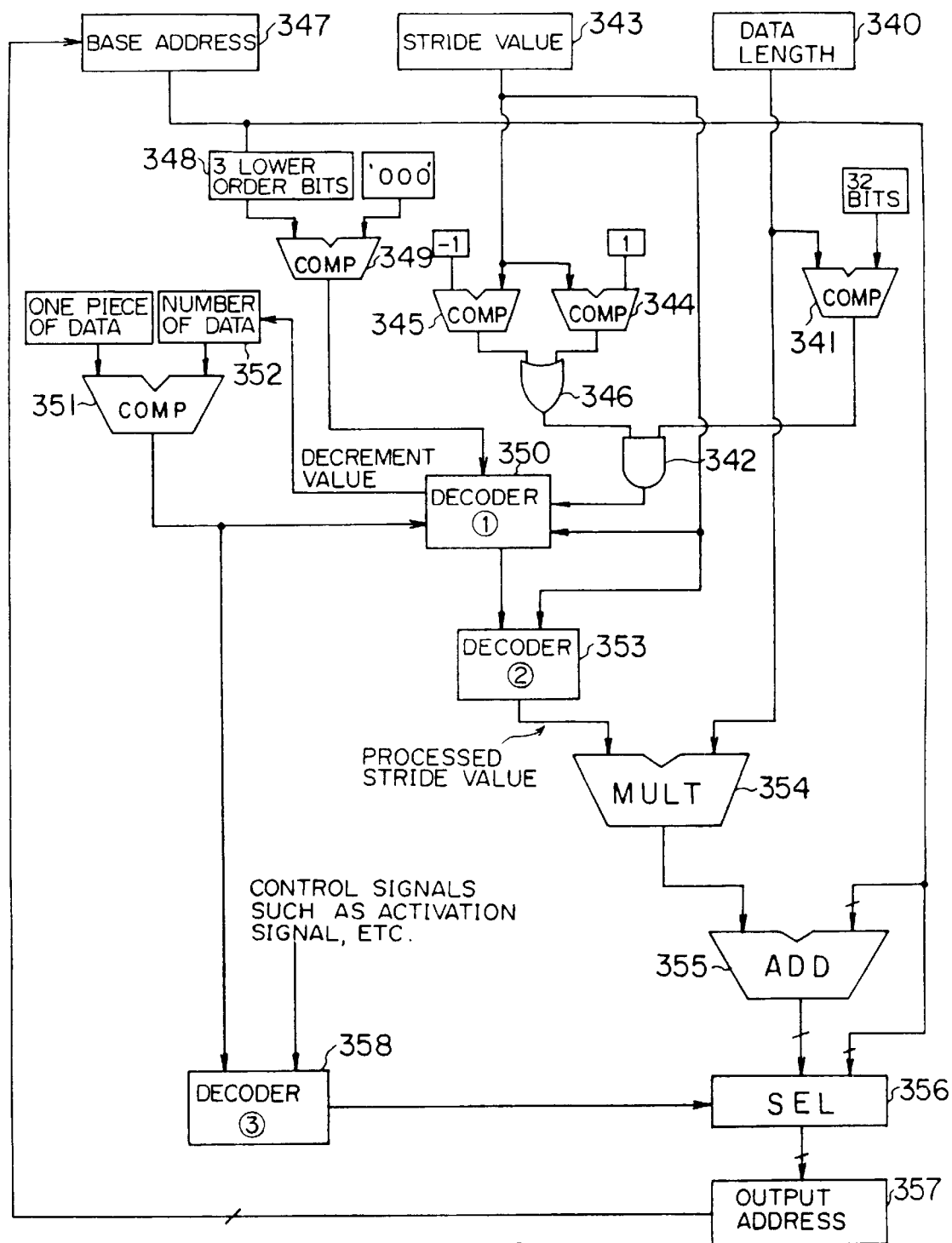
FIG. 118 shows the hardware configuration for realizing the eighth embodiment.

FIG. 118 is an explanatory view of a hardware structure realizing the eighth embodiment of the present invention. In FIG. 118, the data length 340, for example 32 bits or 64 bits is input to comparator 341. Comparator 341 determines whether the data length 340 is 32 or not and in the case of 32 bits, "1" is output to AND gate 342. On the other hand, the stride value 343 is input to comparators 344 and 345, and it is respectively determined whether the stride value is "1" or "−1". When either of the above stride values is found, "1" is output to OR gate 346 AND the output of OA circuit 346 is input to AND circuit 342.

Further, the lower three bits 348 of base address 347 are input to comparator 349 and it is determined whether the lower three bits are all "0" or not. When they are all "0", "1" is output to decoder 350. When the lower three bits are all "0", the base address should be a high order side as designated by 00H, 08H, 10H, 18H . . . in FIG. 115.

The decoder 350 outputs to decode 353 the output of circuit 342, namely, a signal designating that a data length is 32 bits and the data transfer is conducted for the data stored continuously; the output of comparator 429, 15 namely, a signal for judging whether the base address is in the higher side or in the lower side; and a signal indicating whether 32-bit access or 64-bit access is to be used by decoding the output of comparator 351.

Comparator 351 judges whether the number of the remaining data items to be transferred is "1" and determines whether the number of data items 352 20 after the decrement is "1" or not, depending on the judgment of the decoder 350, namely, the number of decrements as the number of data to be transmitted. When the number of remaining data is "1", comparator 351 outputs the signal designating "1" to decoder 350.

Thus the condition based on which the decoder 350 decides to perform 64-bit access is that the number of remaining data items is equal to or greater than two and the base address is in the higher side in the case of a stride value being equal to "1" and the base address is in the lower side in the case of a stride value being equal "−1". The condition based on which 32 bits access is decided or is that the base address is in the lower side in the case of the stride value being equal to "1", and the base address is in the higher side in the case of the stride value being "−1" . Decoder 353 multiples stride value 343 by two when decoder 350 decides to perform the 64-bit access and outputs the stride value as is to multiplier 354 when decoder 350 decides on 32-bit access. The multiplier 354 outputs, to adder 355, the result obtained by multiplying the data length 32-bit number 340 by the modified value output by decoder 20, namely, twice the stride value in the case of the 64-bit access and the stride value in the case of 32-bit access.

Adder 355 adds the output of multiplier 354 to base address 347 and the sum is output to the selector 356. Selector 356 selects the output of adder 355 in the normal case to provide the selection result as output address 357. At this time, the output address 357 is used to update the base address 357 for the preparation of the next data transfer.

In a special case, decoder 358 enables the selector 356 which selects the base address value 347. For example, where the number of the data item to be transmitted is only one upon starting or the number of the remaining data items becomes only one according to the output from comparator 351, the decoder 358 enables vector 356 to select the base address value 347 as is thereby outputting the base address value as the output address 357.

Figure 119:
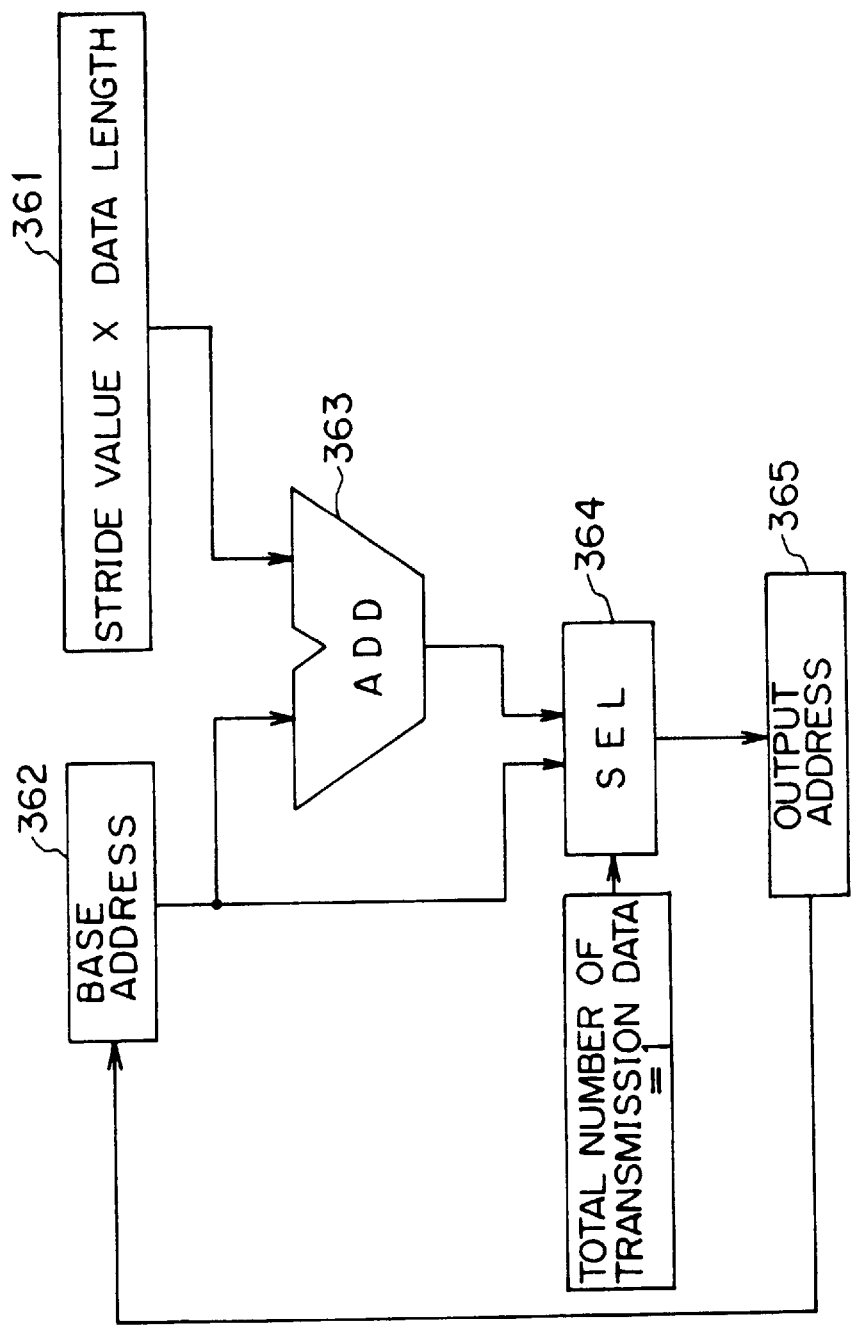
FIG. 119 shows the hardware configuration for generating an address in S339 in FIG. 112.

FIG. 119 is an explanatory view of a hardware structure for performing the address generation in step S339 of FIG. 112. In FIG. 119, adder 363 adds the product of stride value and data length (number of bytes 361) to base address 362 and generates the output address 365 through selector 364 in a normal case. When the total number of transfer data items is only one, selector 364 enables the selection of base address 362 to output the result as output 365.

FIG. 120 shows how to generate a data transmission address for use in transmitting more pieces of data simultaneously through, for example, a 64-bit width data bus, for example, when four pieces of 16-bit data are simultaneously transmitted.

FIG. 120A shows the data transmission where a stride value is "1". When a stride value is "1", four pieces of 16-bit data can be simultaneously transmitted if a base address or the previous data transmission address occupies the highest order bits in a 64-bit data storage area and if more than three pieces of data follow as remaining transmission data. Otherwise, data can be transmitted in two-piece units, that is, 32-bit data can be simultaneously transmitted. However, in the present embodiment, data are transmitted piece by piece for easy operation.

In FIG. 120A, the number in a circle refers to the order of data transmission, and the address of the data at that position is generated as a data transmission address according to the order specified by the number. That is, in the first and second data transmissions, data are transmitted piece by piece. In the third and fourth transmissions, they are transmitted in 4-piece units. In the fifth to seventh transmissions, they are transmitted piece by piece.

FIG. 120B shows the data transmission where a stride value is "−1". When a stride value is "−1", four pieces of 16-bit data can be simultaneously transmitted if a base address or the previous data transmission address occupies the lowest order bits in a 64-bit data storage area and if more than three pieces of data follow as remaining transmission data. As shown in FIG. 120B, four pieces of 16-bit data are transmitted with the addresses marked with circles as the data transmission addresses in the fourth and fifth transmissions. In the other transmissions, data are transmitted piece by piece.

As described above, according to the present embodiment, 32-bit data can be transferred through the data bus with a width of bits in units of two and can increase the bus transfer efficiency and thus can have freedom or flexibility in use of the memory greatly increased since the data can be transferred in the direction going from high address to low address.

Finally, the ninth embodiment of the present invention will be explained. AC characteristic for an LSI such as a vector processor integrated on one chip, and particularly, both characteristics of set up time and delay time are improved, thereby enabling high-frequency operation.

Figure 121:
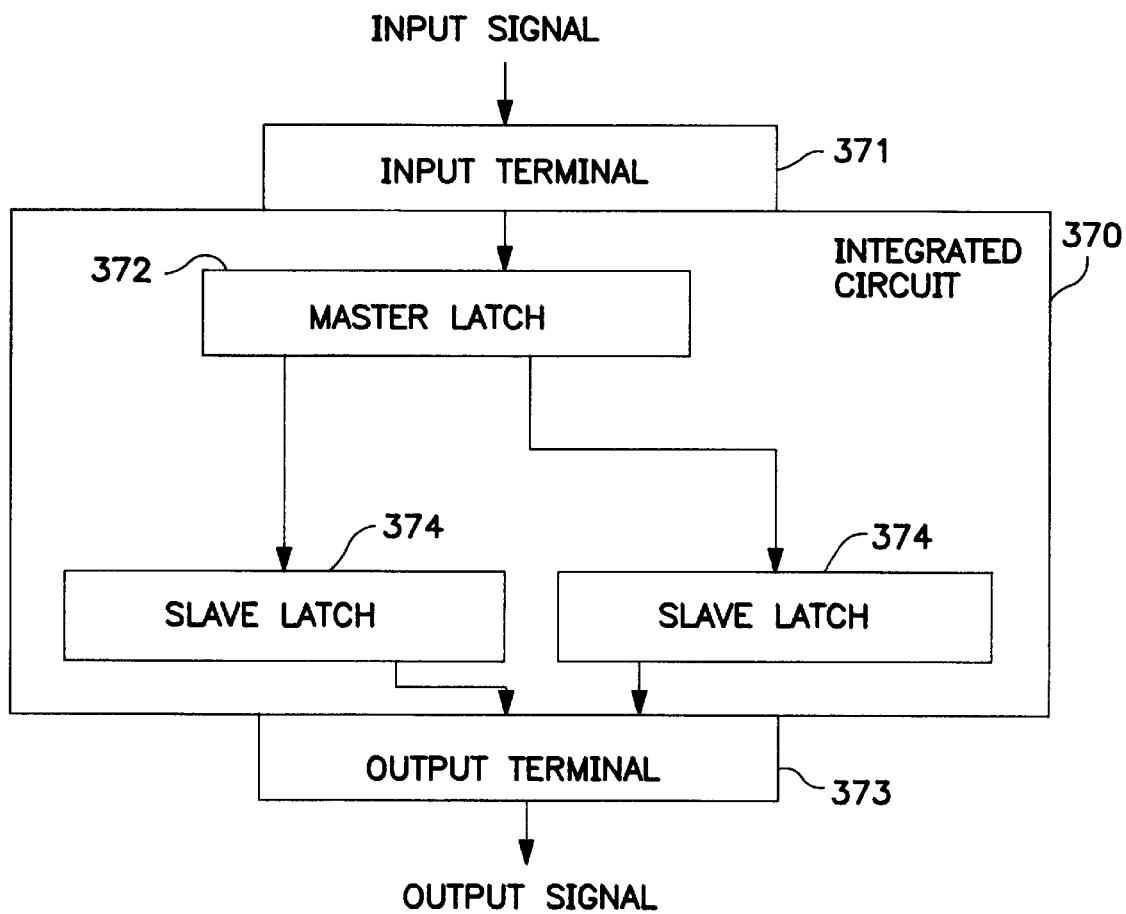

FIG. 121 shows a principle block diagram of the ninth embodiment. In FIG. 121, in an integrated circuit controlled by a single phase clock, the set-up time for an input signal from an outside unit, and the delay time for an output signal to be output in response to the input signal, can be included in the ninth embodiment.

In FIG. 121, a master-slave latch for latching the output control signal, for controlling the output signal in accordance with the input signal from the external unit and the control signal in the integrated circuit, is divided into the master latch 372 and slave latch 374. The master latch 372 is provided near 15 input terminal 371 of the input signal provided from the external unit and the slave latch 371 for inputting the output of the master latch 372 is provided near the output terminal 373 for the output signal. FIG. 121 shows two slave latches 374 for controlling the data to output the signal by dividing the output signal, for example, a 64-bit signal into two signals of 32 bits.

The ninth embodiment is directed to the case where the contents of a register, provided in a large scale integrated circuit such as a vector operation processor integrated on one chip, is output externally in accordance with an address input from the outside of the integrated circuit.

That is, in the LSI where a wiring length is large in a chip, a signal delay due to a wiring considerably affects the following process, and the internal operation is controlled according to a single-phase clock, an output control signal corresponding to an address, chip select, input signals inputted externally such as a read/write selection signal, and an internal control signal is latched in the master latch 372, and outputted and latched in the slave latch 374 provided near the data bus external terminal unit so that the output of data can be controlled.

As described above, assuming that a register is provided in the vector arithmetic operation processor and can be read at a 2-clock cycle. The master latch 372 is turned on when the clock indicates the "L" level, and holds the present state when it indicates the "H" level, while the slave latch 374 is turned on when it indicates the "H" level and holds the present state when it indicates the "L" level, an output control signal is latched in the master latch 372. The output of the master latch 372 is latched in the slave latch 374 while the second clock indicates the "H" level and immediately used to control output. Thus, the process performed by the prior art, that is, an output control signal is latched at the rise of the second clock in a master slave latch provided near the input terminal 371, and outputted and sent to the data bus external terminal unit through a long wiring after a long delay so that it can be used to control the output of data, can be improved in its high frequency characteristic.

Figure 122:
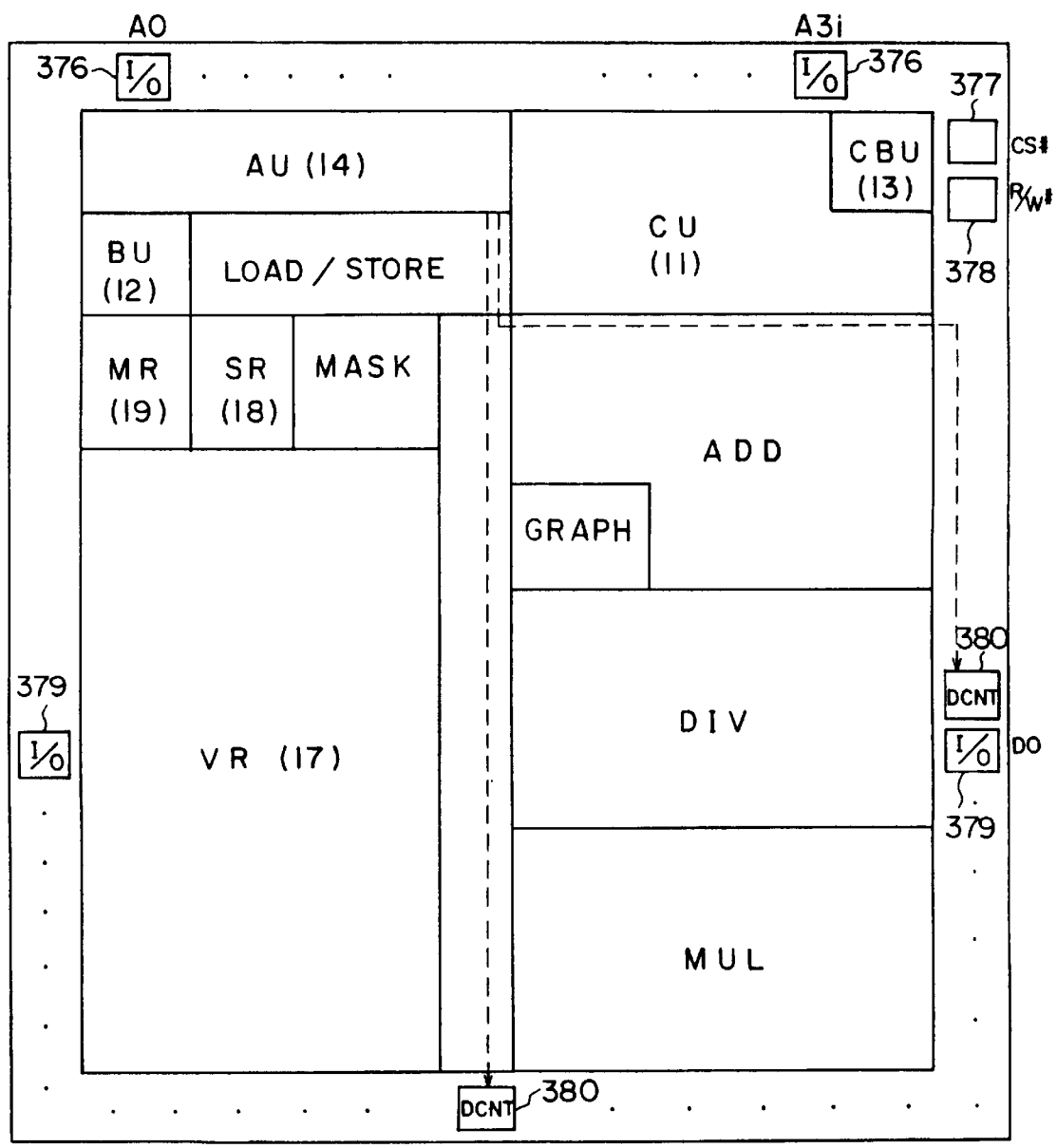

FIG. 122 shows the configuration of the vector processor unit according to the ninth embodiment. In FIG. 122, the units also shown in FIGS. 2 and 3 are assigned the signs shown in those figures. In addition to the units shown in FIGS. 2 and 3, FIG. 122 shows an input/output (I/O) unit to an address bus 376, a chip select signal input terminal 377, a read/write selection signal input terminal 378, a data input/output unit (I/O) 379, and a data bus control unit (DCNT) 380 for controlling the input/output of data to a data bus. The data bus control unit (DCNT) 380 and the input/output unit (I/O) 379 are provided near (or in) the data bus external terminal unit described by referring to FIG. 35.

Figure 35:
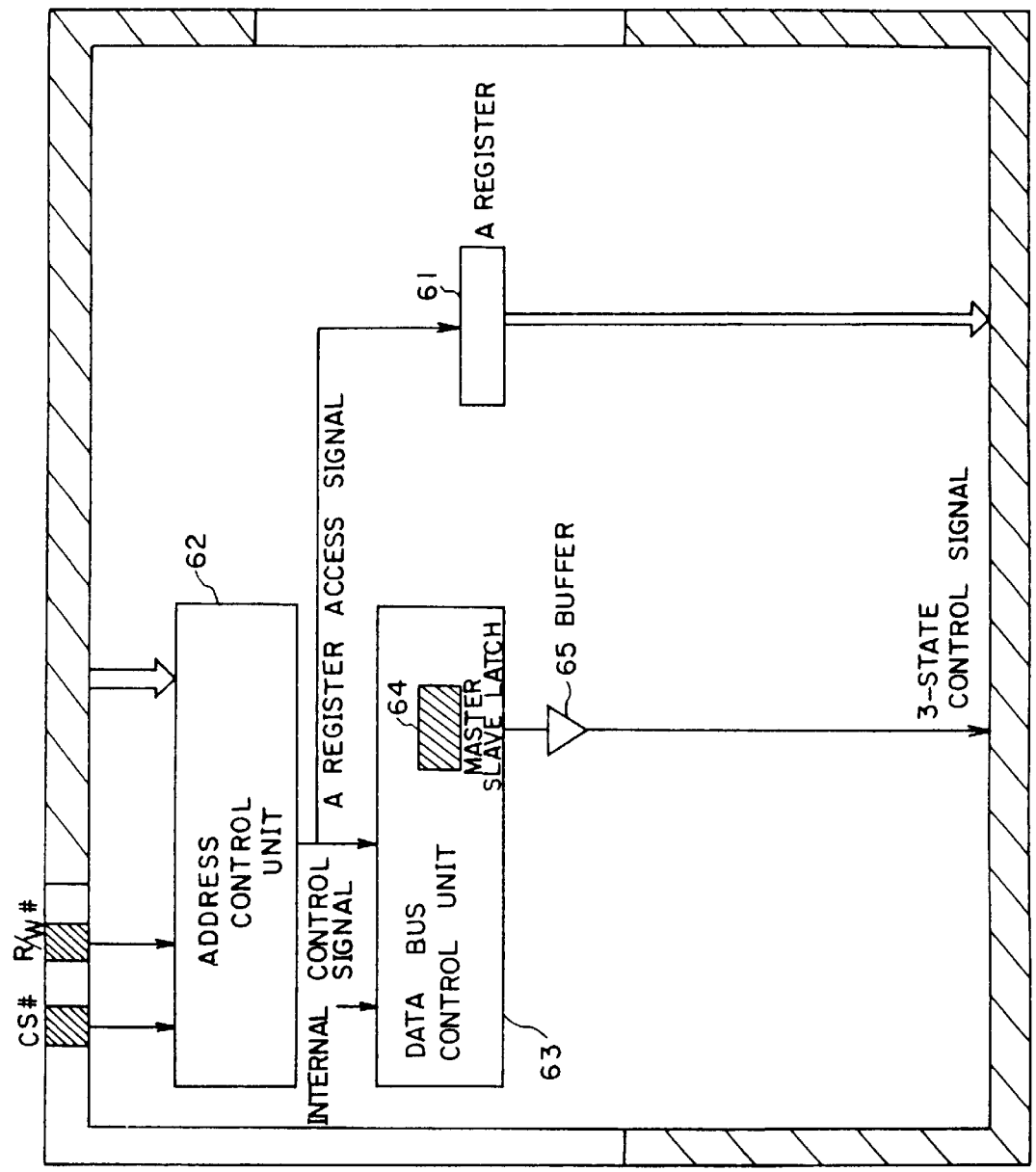
FIG. 35 shows an example of an array of master slave latches for the three-state control of data bus for explaining the ninth problem solved by the present invention.
Figure 123:
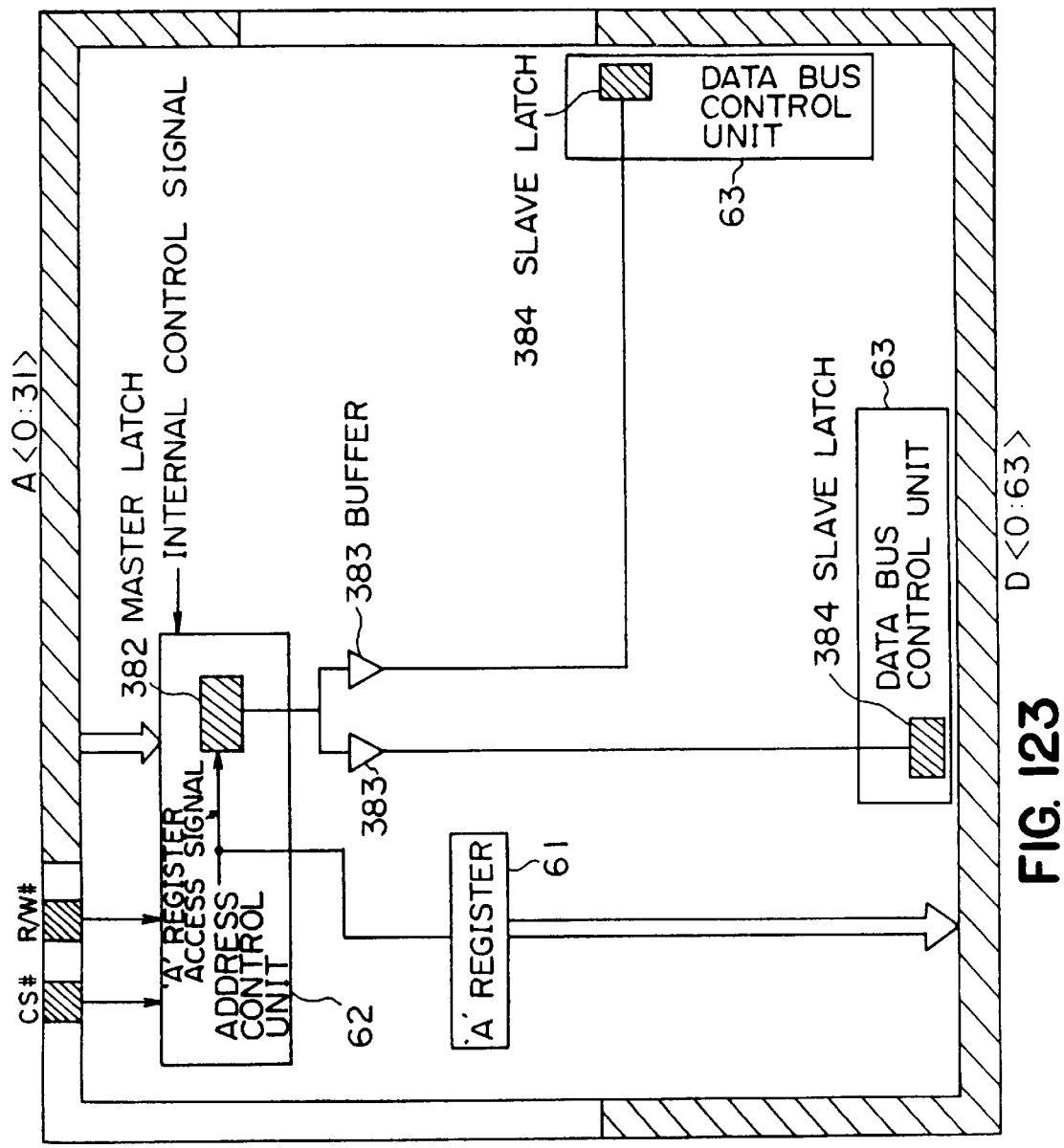

FIG. 123 shows the positions of the master latch and the slave latch according to the ninth embodiment. In FIG. 123, units similar to those shown in FIG. 35 are assigned the symbols indicated therein. According to the ninth embodiment, in response to externally inputted addresses, chip select signals, read/write selection signals, and internal control signals, the address control unit 62 controls to latch an A register access signal in the master latch 382 in the address control unit 62, and to send the output of the master latch 382 to the slave latch 384 in the data bus control unit 63 through the buffer 383.

In the present embodiment, a data bus has a large bit width, that is, 64 bits. Since driving the input/output unit 379 for 64 pieces of data using one slave latch means a heavy load, two units of data bus control units 63 are provided each unit comprising a slave latch 384 to operate the input/output unit 379 for every 32nd bit.

Figure 124:
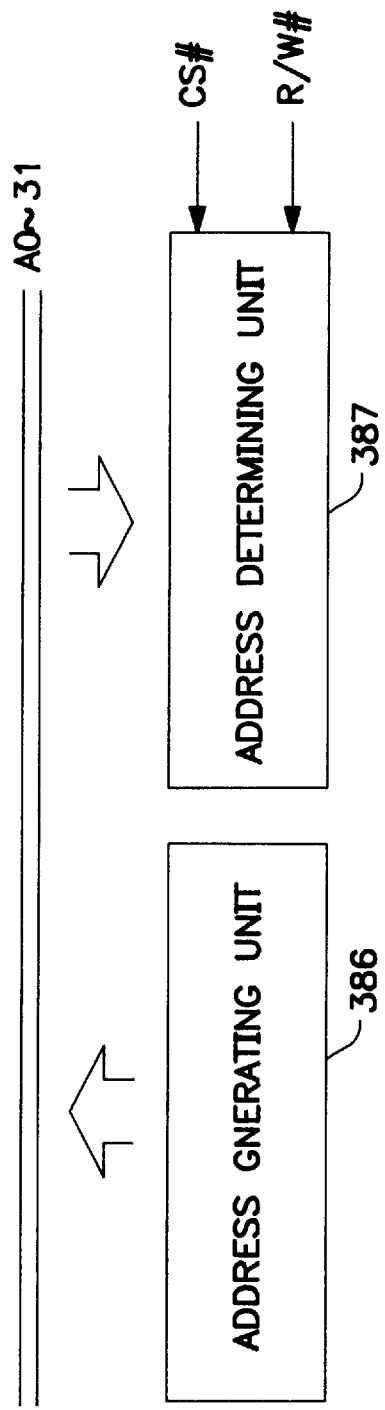

FIG. 124 is a block diagram showing the address control unit 62 shown in FIG. 123. The address control unit comprises an address determining unit 387 for determining, for example, to which internal register the address corresponds when, as shown in FIG. 1 for example, the vector processor unit 2 has a bus use right of the address bus 3 and the data bus 4, and individually accesses the memory 5, and when the address generating unit 386 for generating an address for use in accessing data and the host CPU access an internal register of the vector processor unit 2 as explained as the target function of the present embodiment.

Figure 125:
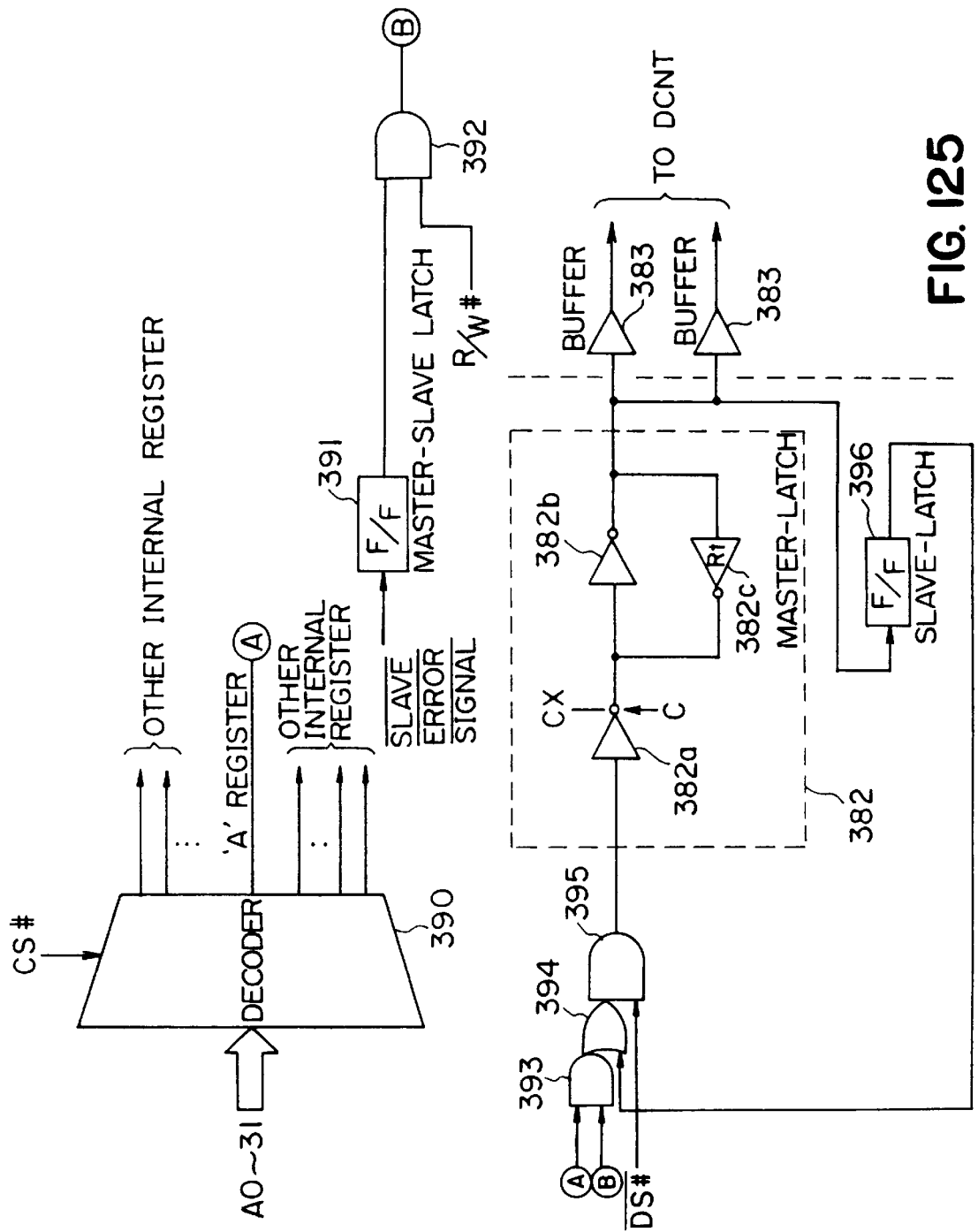

FIG. 125 is a block diagram showing the detailed configuration of the address determining unit 387 shown in FIG. 124. In FIG. 125, the address determining unit 387 comprises a decoder 390 for decoding, for example, a 32-bit address inputted through an address bus as shown in FIG. 123, a master slave latch 391 for receiving a master slave error signal (negative logic) indicating that an address of a register not existing in the vector processor unit, a first AND circuit 392 for receiving the output of the master slave latch 391 and a read/write selection signal, a second AND circuit 393, an OR gate 394, a third AND circuit 395, a master latch 382, and a slave latch 396 for latching the output of the master latch 382 and applying it to one input terminal of the OR circuit 394.

An externally inputted address is decoded by the decoder 390. If the address refers to the A register 61 shown in FIG. 123, then it is indicated by a signal A to be inputted to one internal terminal of the second AND circuit 393. The slave error signal inputted to the master slave latch 391 at this time is "H". If the read/write selection signal indicates "H" indicating a read, then the output B of the first AND circuit 392 indicates "H", and the signal is applied to one input terminal of the second AND circuit 393. The output of the second AND circuit 393 is applied to the third AND circuit 395 through the OR circuit 394.

A data strobe signal (DS#) of negative logic is applied to the other input terminal of the third AND circuit 395. The signal indicates that the contents of the A register are received, that is, a signal applied by a host CPU. If the signal does not indicates the active state by "L", the output of the third AND circuit 395 indicates "H", and the value is inputted in the master latch 382.

A three-state buffer 382a in the master latch 382 is turned on when a clock indicates the "L" level, and the output of the third AND circuit 395 is latched by an inverter 382b and 382c capable of latching data (a latching operation is performed by the 382c). The result is provided to two slave latches 384 through the buffer 383 shown in FIG. 123.

In FIG. 125, the second AND circuit 393, the OR circuit 394, and the third AND circuit 395 form one reset/set flipflop (R-S FF). That is, the FF maintains the set state until a data strobe signal indicating that data are received externally indicates the active state as a reset signal. This function is required because the data output state must be retained unless a signal indicating that data are received is inputted. To maintain the state, the output of the slave latch 396 is inputted to the OR circuit 394.

The contents of the output of the slave latch are the same as the contents of the output of the slave latch 384 shown in FIG. 123. In the present embodiment, however, since the slave latch 384 is provided apart from the master latch 392 in the address control unit 62, the wiring to the OR circuit 394 is necessarily extended and problems such as a delayed signal arise. Therefore, the slave latches are provided independently. The contents of the slave latch are fed back because data are immediately switched and cannot be maintained in the set state if the output of the master latch is fed back.

Figure 126:
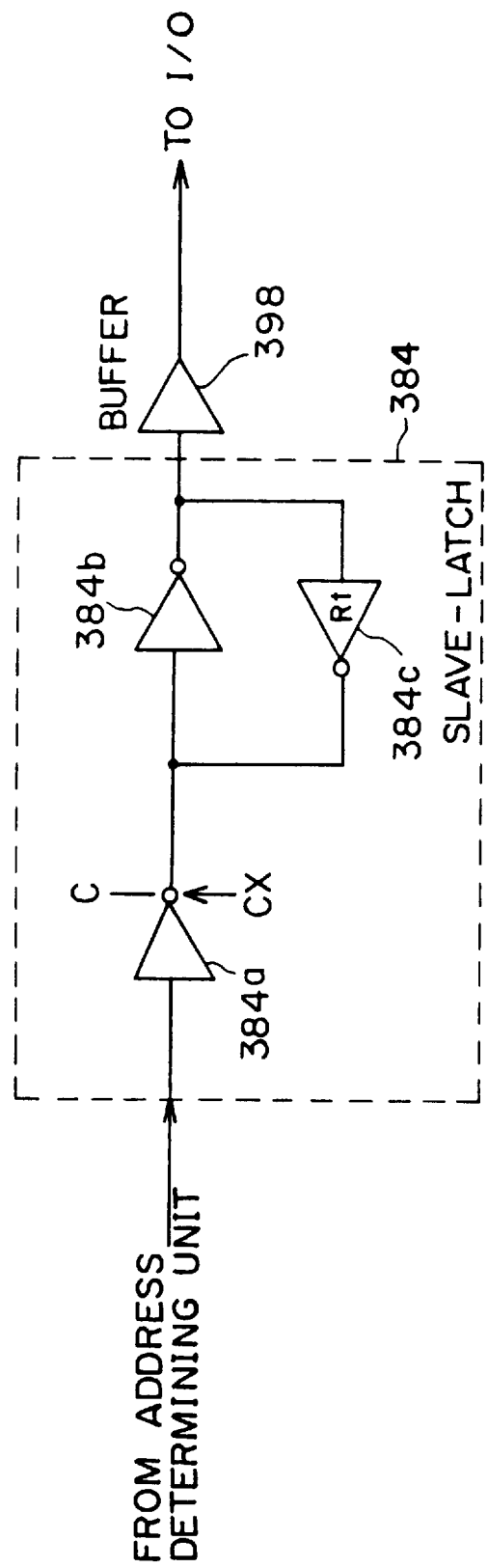

FIG. 126 is a block diagram of the configuration of the data bus control unit (DCNT) to which the output of the address determining unit shown in FIG. 125 is applied through the buffer 383. In FIG. 126, the data bus control unit comprises a slave latch 384 and a buffer 398 for outputting the output of the slave latch to the input/output unit (I/O) 379. The configuration of the slave latch 384 is similar to that of the master latch 382 shown in FIG. 125. However, the three-state buffer 382a in the master latch 382 is turned on at the "L" level of the clock signal, while the three-state buffer 384a in the slave latch 384 is turned on at the "H" level of the clock signal.

Figure 127:
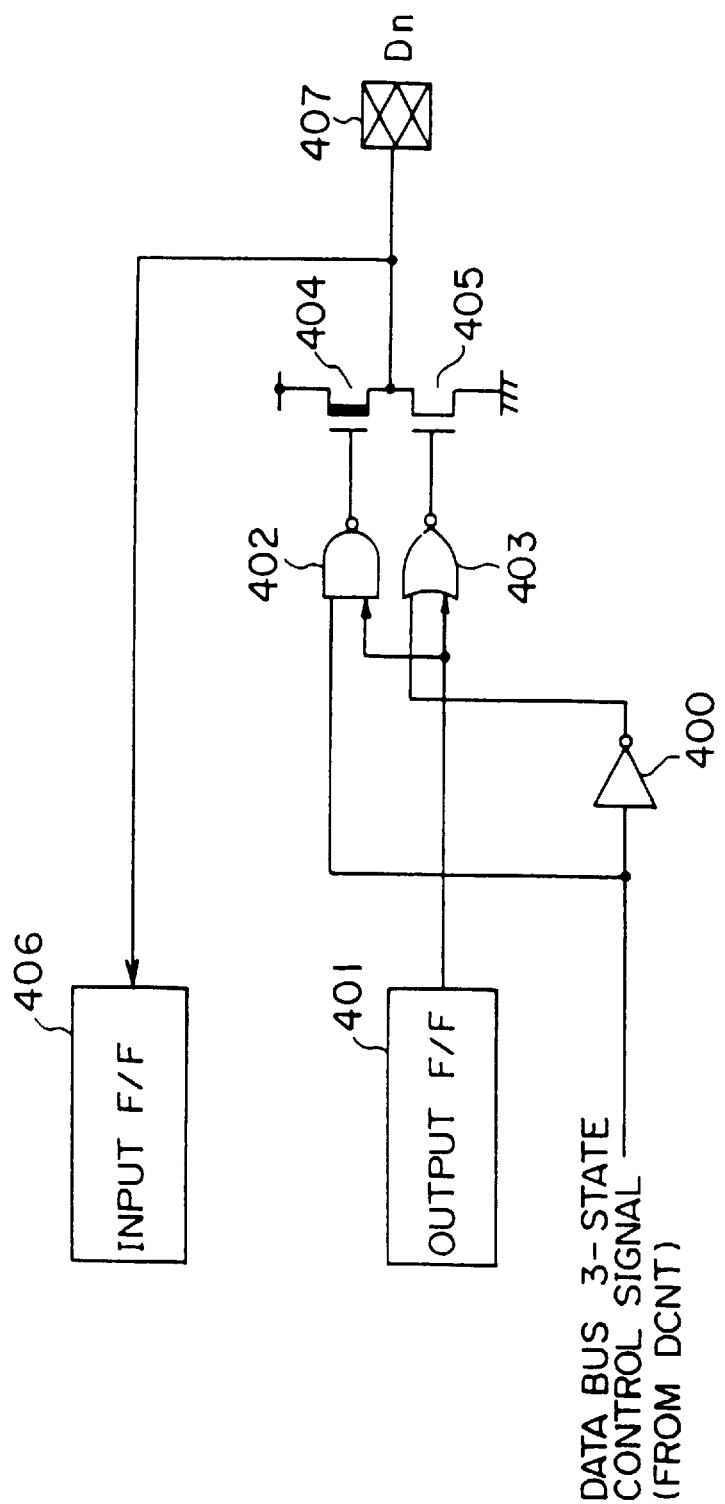

FIG. 127 is a block diagram showing the configuration of the input/output unit (I/O) for a data bus. In FIG. 127, the input/output unit comprises an inverter 400 for receiving a data bus three-state control signal outputted by the buffer 398 in the data bus control unit shown in FIG. 126, an output flipflop 401 for receiving the contents of the A register through the internal data bus when the output data to the data bus, that is, the A register access signal, indicates the active state as shown in FIG. 123, a NAND gate 402, a NOR date 403, MOS FETs 404 and 405, and the input flipflop 406 for storing data inputted through the data bus from an external unit.

In FIG. 127, $D_n$ 407 indicates 1-bit data bus, that is, the input/output unit (I/O) 379 occupies 64 bits in FIG. 122. In the 64-bit input/output unit, the output of 32-bit data is controlled by two data bus control units 380 shown in FIG. 122. That is, when data are outputted, a logical value 1 is applied to the master latch 382 by the second AND circuit 393, the OR circuit 394, and the third AND circuit 395 shown in FIG. 125, the slave latch 384 shown in FIG. 126 latches 1, and 1 is applied as a data bus three-state control signal to the I/O shown in FIG. 127.

Figure 128:
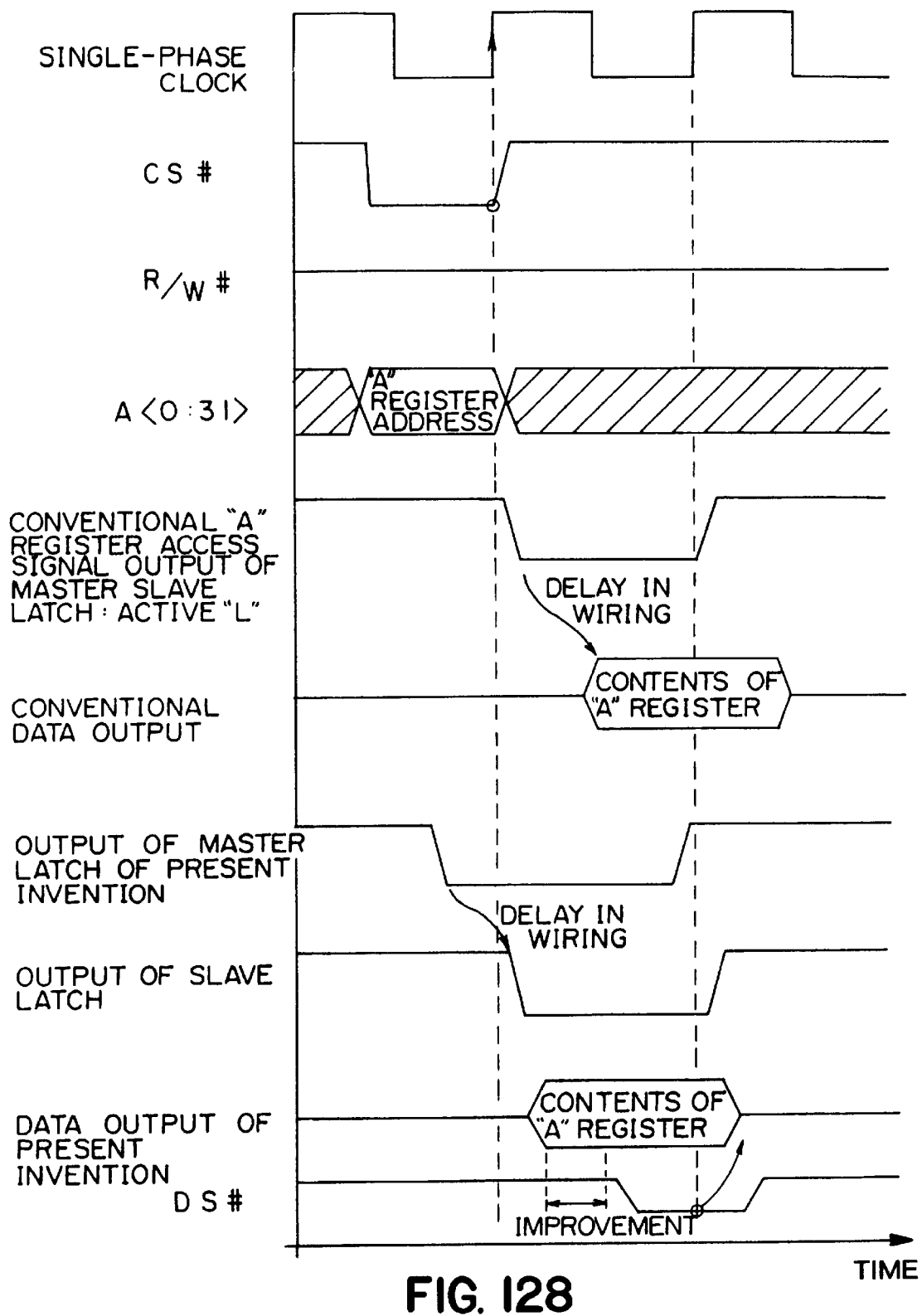

FIG. 128 shows the comparison between the data output timing according to the ninth embodiment with the prior art. As described above, the effect of the present embodiment is explained assuming that the A register is read at a 2-clock cycle, and that the latch of the output control signal to the master slave latch 64 by the prior art shown in FIG. 35 is performed at the rise of the second clock.

According to the present embodiment, the latch to the master latch is performed when the clock indicates the "L" level and the latch to the slave latch indicates the "H" level. Therefore, when the A register address is outputted at the latter half of the first clock in response to the chip select signal, a read/write selection signal, etc. is inputted at the first clock, the output of the third AND circuit 395 is immediately latched to the master latch 382 as shown in FIG. 125, and the output is transmitted to the slave latch 384 after the wiring delay when the second clock indicated "H" so that data, that is, the contents of the A register, are outputted immediately.

When an external DS# signal indicates the active state, it is detected at the rise of the third clock. At that time, the data bus three-state control signal shown in FIG. 127 indicates the "L" level, and the output of data stops. Therefore, compared with the prior art technology in which the output of the master slave latch is obtained at the rise of the second clock, and data are outputted after the wiring delay, the present embodiment can output data sooner.

As described above, by providing near the address input terminal the address control unit containing the master latch and by providing the data bus control unit near the data bus external terminal unit the data bus control unit containing the slave latch, the setup time from the input of an external signal to the latch of the register access signal latch in the master latch and the delay time from the output of the master latch to the output of the contents of the register as an output signal can be improved simultaneously, and the setup time and the delay time can be almost equalized. Thus, the high frequency characteristic can be greatly improved in an integrated circuit.

The present invention can be used in various data processing devices for processing data by accessing an external memory like vector arithmetic operation processor units integrated on one chip. It is applicable in all industries in which data processing devices are used.

What is claimed is:

1. A memory accessing device in a pipeline processor for sending data to, or receiving the data from, an external memory via an address bus and a data bus, comprising:

data storing means for storing the data sent to, or received from, the external memory;

address/data control means for inputting/outputting the data between said data storing means and the external memory via the address and data buses, said address/data control means comprising:

a condition determining unit to determine pipeline control conditions based on pipeline information including pipeline activation conditions indicating an actual number of pipeline stages associated with the number of prefetched addresses, and based on address information associating the addresses prefetched to the address bus with the corresponding data prefetched to the data bus; and a number-of-stages selecting unit which selects the actual number of pipeline stages for operation based on pipeline activation conditions and the pipeline control conditions.

2. The memory accessing device according to claim 1, wherein said address/data control means further comprises:

a valid data detecting unit which detects a valid position in data inputted from said external memory based on the actual number of pipeline stages selected by said number-of-stages selecting unit.

3. The memory accessing device according to claim 2, wherein said address/data control means further comprises load data control means;

wherein said data storing means comprise register means; and wherein said memory accessing device further comprises:
  instruction control means for controlling an instruction executed in said memory accessing device;
  address generating means, activated by said instruction control means, for generating addresses outputted to the address bus and outputting the address information to said load data control means;
  timing sequencer means, controlled by said instruction control means, for outputting a state signal as the pipeline information to said load data control means;
  input latch means for temporarily latching input data inputted from the external memory;
  data selector means for selecting a valid portion of data outputted by said latch means based on a higher order active signal indicating higher order bits in input data are valid and a lower order active signal indicating lower order bits in input data are valid, each active signal being outputted by said load data control means; and
  load pipeline means for adjusting the timing of valid data outputted by said data selector means and outputting the valid data to said register means.

4. The memory accessing device according to claim 3, wherein said data storing means is controlled by dividing data into higher order bits and lower order bits according to a first enable signal for writing to higher order bits in data storage area of said register means and a second enable signal for writing to lower order bits when the length of data transmitted from the external memory is less than the width of the data bus between the external memory and memory accessing device.

5. The memory accessing device according to claim 4, wherein said load pipeline means transmits data to said register means by assigning transmission data to higher order bits and lower order bits on a bank selector bus for transmitting data between said load pipeline means and register means according to the first and second enable signals when data is stored in said register means by dividing it into higher order bits and lower order bits.

6. The memory accessing device according to claim 3, wherein said condition determining means comprises:
  address information control means for receiving the address information and the pipeline information; and
  number-of-pipeline stages determining means for outputting the pipeline control conditions based on the address information and the pipeline information received by of said address information control means;

wherein said number-of-stages selection means comprises:
  selection signal generating means for receiving the pipeline activation conditions and outputting a selection signal generated based on the pipeline activation conditions; and
  number-of-pipeline stages selecting means for outputting the actual number of pipeline stages based on the output of said selection signal generating means; and wherein said valid data detecting means comprises:
  pipeline latch means for outputting to said data selector means a high order/low order address valid signal indicating whether higher order bits or lower order bits are valid in data inputted from said external memory, based on the input of the higher order/lower order active signals indicating which portion is valid in data referred to by the addresses prefetched to the address bus, and based on the actual number of pipeline stages selected by said number-of-pipeline stages selecting means.

7. The memory accessing device according to claim 6, wherein said selection signal generating means comprises a plurality of flip-flop means, each corresponding one to one to each pipeline stage of the predetermined number of pipeline stages, outputting a pipeline mode signal indicating an activation of a corresponding one of the predetermined number of pipeline stages, and resetting when the corresponding one of the predetermined number of pipeline stages is not activated.

8. The memory accessing device according to claim 6, wherein said number-of-stages determining means comprises flipflops forming the predetermined number of pipeline stages; and wherein said address information control means comprises:
  signal generating means for outputting a write enable signal to latches forming said pipeline latch means according to the state signals outputted by said timing sequencer as the pipeline information, and outputting a data input enable signal to the flipflops forming the predetermined number of pipeline stages, and
  condition extracting means for outputting to the predetermined number of pipeline stages latch stop condition signals for stopping a latching operation according to the write enable signal before the last pipeline stage in latches connected serially in said pipeline latch means according to the address information, pipeline information, and a data complete signal sent from the external memory for informing of the completion of transmission of data sent to the memory accessing device.

9. The memory accessing device according to claim 8, wherein said number-of-pipeline stages determining means comprises:
  first pipeline/bus control means for receiving signals among latch stop condition signals outputted by said condition extracting means, and outputting to said number-of-pipeline stages selecting means the pipeline control conditions when four stages of the predetermined number of pipeline stages are activated,
  second pipeline/bus control means for receiving signals among said latch stop condition signals, and outputting to said number-of-pipeline stages selecting means the pipeline control conditions when two stages of the predetermined number of pipeline stages are activated, and
  third pipeline/bus control means for receiving an activation signal, indicating that one of the predetermined number of pipeline stages is activated, receiving said data input enable signal from said signal generating means, and outputting to said number-of-pipeline stages selecting means the pipeline control conditions when one of the predetermined number of pipeline stages is activated.

10. A data processing system sending data to, or receiving the data from, an external memory via an address bus and a data bus, the data processing system comprising:

a plurality of vector arithmetic processors for performing vector arithmetic operations, wherein each of said vector arithmetic processors comprises:

a control unit for controlling the vector arithmetic operations;

an instruction buffer unit for storing instructions to be executed;

a bus control unit for controlling data transmission performed between said each of said vector arithmetic processors and said external memory;

an address unit for generating addresses for the data transmission;

a vector unit including a vector pipeline having operation units and data storing means for storing the data sent to or received from the external memory; and a memory accessing device comprising:

an address/data control unit which inputs/outputs the data between the data storing means of the vector unit and the external memory via the address and data buses, said address/data control unit comprising:

a condition determining unit which determines pipeline control conditions based on pipeline information including pipeline activation conditions indicating an actual number of pipeline stages associated with the number of prefetched addresses, and based on address information associating the addresses prefetched to the address bus with the corresponding data prefetched to the data bus; and a number-of-stages selecting unit which selects the actual number of pipeline stages for operation based on pipeline activation conditions and the pipeline control conditions.

11. A data processing system comprising:

a memory accessing device;

an external memory; and a data storing unit which stores data sent to or received from said external memory;

a central processing unit for controlling memory access between said memory accessing device and said external memory;

wherein said memory accessing device sends data to, or receives data from, said external memory after obtaining a bus use right for a data bus and an address bus between said data storing means and said external memory; and an address/data control unit which inputs/outputs the data between said data storing means and said external memory, via the address and data buses, said address/data control unit comprising:

a condition determining unit which determines pipeline control conditions based on pipeline information including pipeline activation conditions indicating an actual number of pipeline stages associated with the number of prefetched addresses, and based on address information associating the addresses prefetched to the address bus with the corresponding data prefetched to the data bus; and a number-of-stages selecting unit which selects the actual number of pipeline stages for operation based on pipeline activation conditions and the pipeline control conditions.

12. A memory accessing device, in a processor having pipelines, for correctly associating prefetched addresses from an address bus with corresponding prefetched data from a data bus, when sending data to and receiving data from an external memory, comprising:

a condition determining device to determine pipeline control conditions based on pipeline information containing pipeline activation conditions indicating an actual number of pipeline stages associated with the number of prefetched addresses, and based on address information required to associate the addresses prefetched to the address bus with the corresponding data prefetched to the data bus, a number-of-stages selecting device to select the actual number of pipeline stages for operation based on pipeline activation conditions and the pipeline control conditions; and a valid data detecting device to detect valid data positions in the prefetched data based on the number of pipeline stages selected by said number-of-stages selecting device and correctly associating the valid data positions in the prefetched data with the prefetched addresses.

13. A method for correctly associating prefetched addresses from an address bus with corresponding prefetched data from a data bus, when sending data to and receiving data from an external memory, in a processor having pipelines, comprising the steps of:

determining pipeline control conditions based on pipeline information containing pipeline activation conditions indicating an actual number of sideline stages associated with the number of prefetched addresses, and based on address information required to associate the addresses prefetched to the address bus with the corresponding data prefetched to the data bus;

selecting the actual number of pipeline stages for operation based on pipeline activation conditions and the pipeline control conditions; and detecting valid data positions in the prefetched data based on the actual number of pipeline stages selected and correctly associating the valid data positions in the prefetched data with said prefetched addresses.

* * * * *